United States Patent [19]

Durbin et al.

[11] Patent Number: 4,970,658

[45] Date of Patent: Nov. 13, 1990

[54] KNOWLEDGE ENGINEERING TOOL

[75] Inventors: Gary L. Durbin, Oakland; David H. Somerville, Albany, both of Calif.

[73] Assignee: Tesseract Corporation, San Francisco, Calif.

[21] Appl. No.: 312,109

[22] Filed: Feb. 16, 1989

[51] Int. Cl.$^5$ .............................................. G06F 15/18
[52] U.S. Cl. .................................... 364/513; 364/200
[58] Field of Search ........................ 364/513, 200, 900

[56] References Cited

U.S. PATENT DOCUMENTS 4,783,752 11/1988 Kaplan et al. ...................... 364/513

OTHER PUBLICATIONS

On Verification of Database Temporal Constraints; ACM-Association of Computing Macinery; 1985; pp. 169-179; C. H. Kung.
Temporal Data Base Management; Artificial Intelligence; 32 (1987) 1-55; Elsevier Science Publishers; T. L. Dean et al.

Primary Examiner—Allen MacDonald
Attorney, Agent, or Firm—Townsend and Townsend

[57] ABSTRACT

A knowledge engineering tool for building expert systems is disclosed. The knowledge engineering tool includes a knowledge base containing "if-then" rules and an inference engine that includes a plurality of object processors. Each object processor has access to a set of variables defining an object. Rules are selected from the knowledge base and routed to the object processors having access to the objects referenced in the rule. In a parallel processing configuration, each object processor executes on a processing unit and rules are passed as messages.

72 Claims, 21 Drawing Sheets

Relational Objects

KNOWLEDGE ENGINEERING TOOL

BACKGROUND OF THE INVENTION

Artificial Intelligence (AI) is the field of science and engineering that attempts to produce machine systems that have intelligent behavior Expert systems is a branch of AI that attempts to produce systems that can reason in the same manner as a human expert. Additionally. expert systems are generally based upon developments in systems engineering since knowledge engineering tools (the systems that are used to build expert systems) are generally automatic programming systems that perform some portion of the design structural procedural or operational activities of programmers. An expert system is a rule-based program incorporating a knowledge base and a knowledge engineering tool. The purpose of an expert system is to duplicate the function of an expert in a particular area of expertise by processing the rules in the knowledge base and developing conclusions.

Most expert systems have been built using knowledge engineering tools. These tools include programming languages such as C. LISP, ADA Prolog and Smalltalk and expert systems shells such as OPS5 S1 Nex pert, and KEE. Knowledge engineering tools generally provide more functions than programming languages; they may include rule editors, inference engines and explanation systems. Rule editors assist developers in the building of knowledge bases and situational data to develop conclusions. Explanation systems explain the conclusions of the inferencing session to the developer or user of the knowledge engineering tool.

Many problems exist in knowledge engineering tools today. The problems encountered with the implementation of expert systems include an inability to make them highly parallel, adaptable distributable or extendable. In addition, some tools are incapable of being embedded within other computer applications.

Most expert systems are not self-referential meaning they cannot self learn. This is a drawback because the knowledge base is not updated from experiences of the expert system. For example, if a set of data is input which is similar to a set of data input in the past, the expert system will draw the same conclusion. However, if an error was made in the first instance and the system is non selfreferential then it can make an erroneous recommendation in the second instance.

Knowledge engineering tools generally have trouble dealing with changes in the outside world. Since things change in the real world it is important to take these changes into consideration as the expert system performs. This is referred to as Non-monotonic reasoning. Most expert systems freeze a moment in time and analyze the problem at that moment. These systems do not take into account changes occurring due to the analytical steps they have taken.

Most knowledge engineering tools have trouble reasoning about events that occur at different times and inferring default conclusions based on the lack of information. This is referred to as Temporal Reasoning. Since most activities in the real world do involve events that operate over time and since most human reasoning operates upon incomplete information, systems that do not have effective Temporal Reasoning methods cannot easily handle many common problems.

Inference engines generally use forward chaining, backward chaining or some combination of both to select rules for processing. Some problems are more easily solved by one method or another and most inference engines contain methods that allow the developer to control the method the system will use to address portions of a problem. Few systems are able to automatically select the appropriate method without explicit control of the developer. Requiring the developer to explicitly control the method generally leads to less generality of the knowledge base and severely limits the ability of the system to optimize its operations and perform them in parallel.

Most knowledge engineering tools operate on one instance of a frame of data or require procedural rules to perform operations on more than one instance. Since many problems deal with sets of data rather than single instances, these systems require that the conceptual thinking of the expert or that procedural rules implement serial processes upon the sets of data. Systems engineering research has developed well-defined operations on sets that have a firm mathematical background. This is called relational algebra and the relational data model. The inventors previously developed an extension of the relational data model that encompasses temporal reasoning: it is referred to as the time relational data model. However, the inventors are unaware of any prior knowledge engineering tools based upon the relational algebra, the relational data model, or the time relational data model.

Other problems exhibited by knowledge engineering tools include uncontrollable default logic, asynchronous effects that make results dependent on the order in which operations are performed, and the coding of procedural statements.

Where procedural statements are used, parallel operation is hindered and flexibility in the growth of the knowledge base is limited.

SUMMARY OF THE INVENTION

In the vast majority of existing information processing systems, including rule-based or "production" systems, programs are resident in a processor and operate on data received from sources outside of the processor. The present invention reverses this traditional approach the data becomes resident in a processor and the programs, in the form of executable messages, move between the processors. This is an advantageous design for an inference engine.

According to the invention, a knowledge engineering tool includes a knowledge base containing "if-condition-then-action" rules, and an inference engine that includes an application interface, a plurality of object processors, a rule router and a target processor. Each object processor includes a data manager for accessing variables, and a rule interpreter for evaluating conditions in a rule and performing actions in a rule if the conditions are true. The target processor selects rules for processing. A rule is processed by routing it to the various object processors having access to the variables referenced in the rules conditions and actions.

The invention can operate efficiently on a single processor configuration, on multiple processors with shared memory, or on a network of processors having distributed memory. In a preferred embodiment, each object processor executes on its own processing unit and rules are passed among the processors as part of rule messages. Other components of the inference engine may also execute on separate processors responsive to control messages. The inference engine of this invention is thus able to exploit the performance advantages of existing and future parallel processing hardware with built-in message-passing protocols.

The advantages derived from this approach include: (1) the computational workload may be efficiently distributed among many processors operating independently and in parallel; (2) certain data synchronization requirements are eliminated that, in more conventional implementations, limit the amount of parallelism that can be achieved: and (3) it is unnecessary to load entire knowledge bases into the processors because the program instructions are dynamically configured and distributed among the processors on a problem-by-problem basis.

The architecture of this invention uses multiple levels of processing symmetry at the interface points within the system. The symmetry of messages between processors allows the combination of multiple interdependent knowledge bases into sessions in extremely varied ways while assuring that complex operations such as closure are consistently performed. It also allows the system to be progressively reduced or increased in scale to accommodate different processor configurations and different problems.

In the knowledge base of the present invention. rules are stored independently from each other and the interrelationships of rules are maintained through indexes. Due to the form of this data structure, the knowledge base can be updated while the system is in operation and the knowledge base can refer to and update itself. This capability allows inference processing to occur simultaneously with knowledge base updates. Since knowledge bases (both knowledge bases stored on external media and those that are part of the current session) are dynamically additive, the system can capture rules from related knowledge bases during processing. These "Foreign" rules provide a method of transporting both data and logic across a network and a method of dynamically distributing work.

BRIEF DESCRIPTION OF THE DRAWINGS

FIG. 22 is a listing of a set of rules as they appear in a sample session:

FIG. 23 is a listing of a set of assertions as they appear in a sample session:

FIG. 24 is a listing of the object definitions as they appear in a sample session;

FIG. 25 is a listing of the results as they appear after a sample session:

FIG. 26 is a listing of the rules from the knowledge base as they appear when they have been retrieved from the knowledge base;

FIG. 27 is a listing of the assertions in message format as they are received by the application inference interface in a sample session: and FIG. 28 is a listing illustrating each rule after it has been processed at an object processor.

Figure 1:
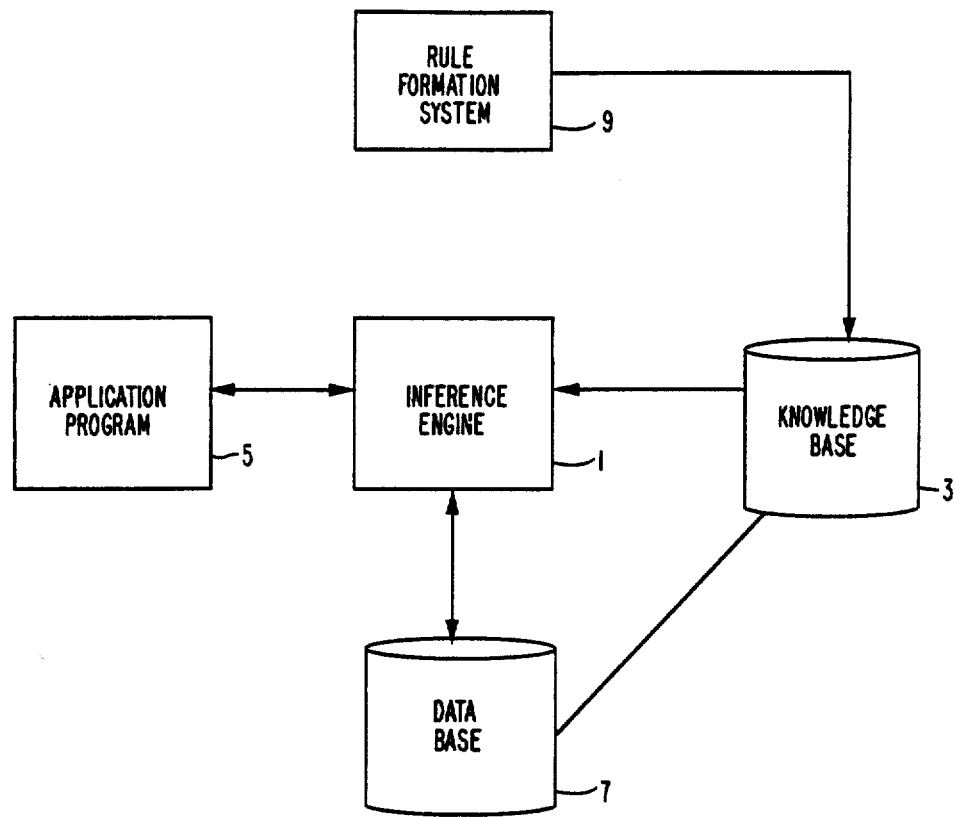
FIG. 1 is a functional block diagram of a system for implementing the present invention.

While the invention is susceptible to various modifications and alternative forms, a specific embodiment thereof has been shown by way of example in the drawings and will herein be described in detail. It should be understood, however, that it is not intended to limit the invention to the particular form disclosed but on the contrary, the intention is to cover all modifications. equivalents, and alternatives falling within the spirit and scope of the invention as defined by the claims.

DETAILED DESCRIPTION OF THE PREFERRED EMBODIMENTS INFERENCE PROCESSING

Turning now to the drawings. FIG. 1 is a functional block diagram of the preferred embodiment of an expert system used in the practice of the present invention. The Gnome Inference Engine is a rule processing system that may be part of a larger expert system (See Appendiz A for a description of the code used in the prototype. The prototype is written in the C programming language and executes on an IBM PS/2 computer). An inference engine (I/E) 1 is that part of an expert system that processes data (facts or assertions) and uses a knowledge base 3 to arrive at conclusions. The data upon which I/E 1 operates may be supplied by an application program 5 or by a data base 7 accessed by I/E 1. I/E 1 matches the data to rules in knowledge base 3 or searches for rules that provide answers to goals suggested by rules. These rules are provided to knowledge base 3 by a rule formation system 9. When the process is completed, results are provided to application program 5. Additionally. I/E 1 may update data in data base 7 as part of an inferencing session. Data base 7 upon which I/E 1 operates may be a knowledge base stored in data base 7 including knowledge base 3 used in the current session.

The rules, formed by rule formation system 9, in a Gnome Knowledge Base are based upon the Sartre Expert System Language (for an explanation of the language see "Sartre, Expert System Language for Relational Reasoning with Existential Functions". Appendix B). Of course, other expert system languages could be used to provide a basis for the rules in the system. Sartre is composed of rules with conditions and actions. Conditions and actions include variables and operators. Operators provide truth functions in conditions and variable values in actions. Rules in Sartre operate on objects. Objects are logical constructions consisting of data and operators. Within objects, data is logically identified by named variables. The contents and structure of data within an object is only determinable within the context of the object. Likewise operators are only determinable within the context of an object. The computer program that processes operations on data within an object is referred to as an object processor.

Figure 2:
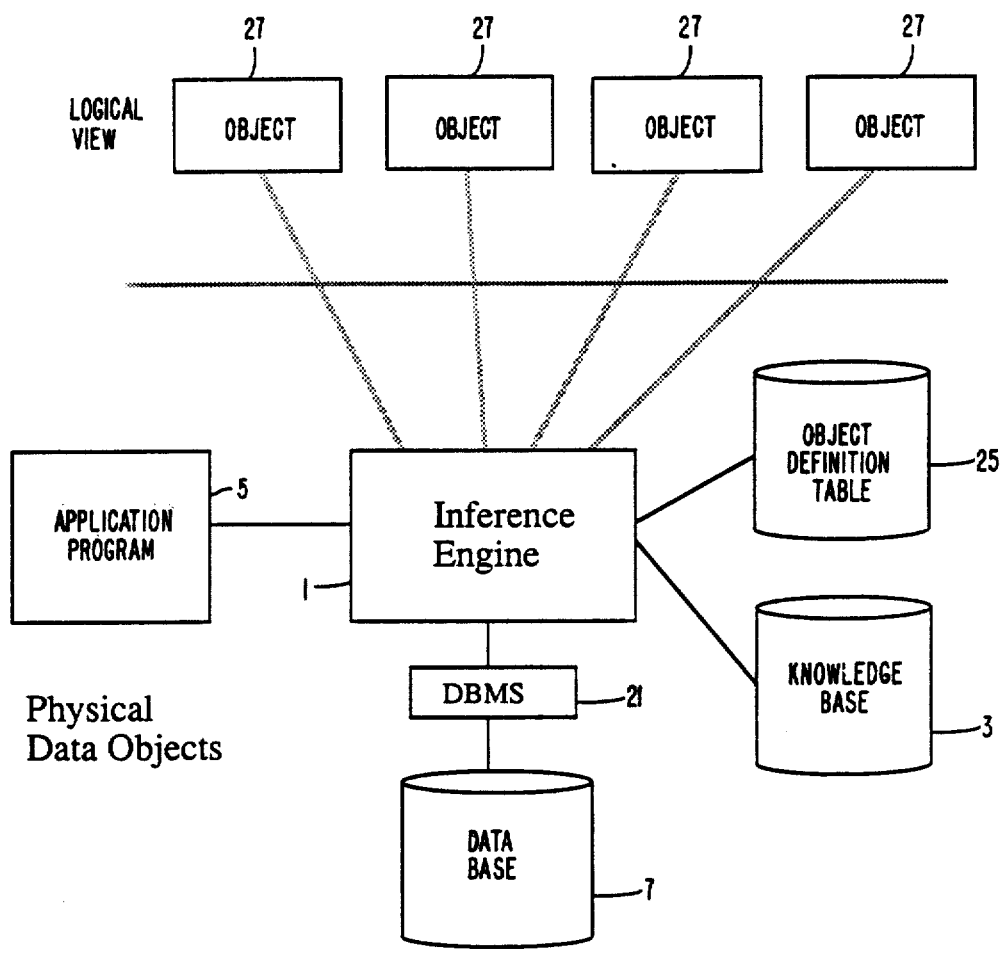
FIG. 2 is a functional block diagram illustrating the logical view of the objects by the expert system.

Referring now to FIG. 2, a block diagram is shown illustrating how objects are logically viewed with respect to the expert system. Objects may be internal data objects created during the inferencing session or may be external objects. External objects are objects where the data and the process to access the data are external to knowledge base 3. For example, such an object might be data base 7 accessed through a data base management system (DBMS) 21.

The definition of an object and the source of data for an object is provided by an object definition table (ODT) 25. The object definition table also defines the object processor, the program that will process conditions and actions on variables of an object. Object definition table 25, like knowledge base 3, exists outside I/E 1 and is brought into the session during processing. Objects 27 are referred to within Gnome by a relational metaphor, consequently the instances of object 27 may be viewed as relational tuples within a relational table. Select statements within Gnome provide projections of relational tables into other relational tables. All objects 27 have the same logical view, that of a relational tuple.

Figure 3:
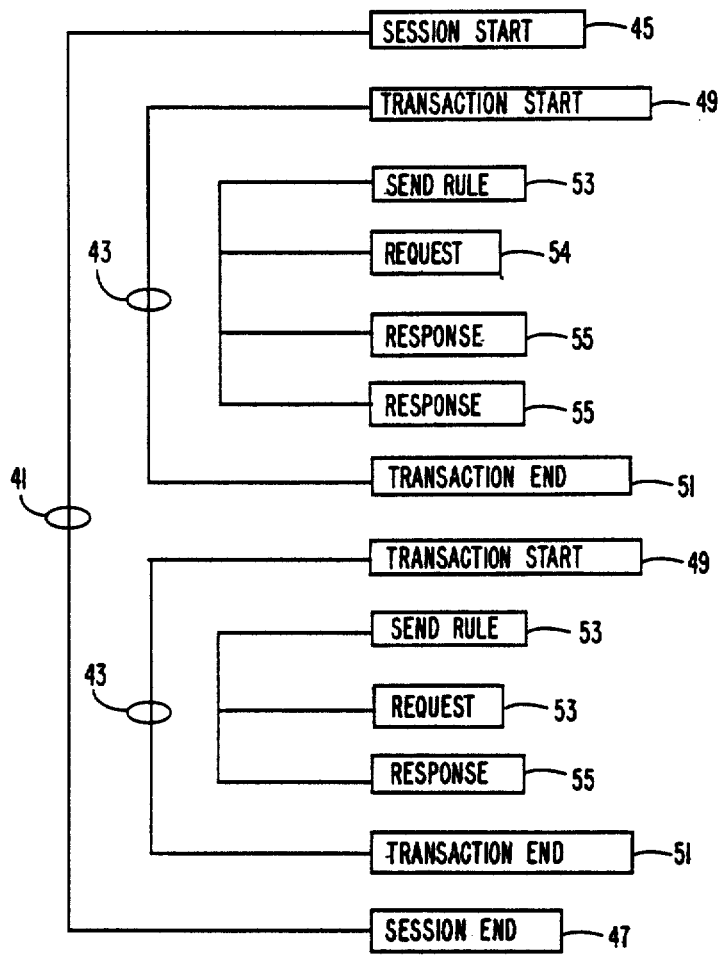
FIG. 3 is a diagram showing the application inference interface protocol for a preferred embodiment.

FIG. 3 illustrates the protocol of the application inference interface. In FIG. 2, the user of the Gnome system gains access to Gnome through application program 5. Application program 5 sends and receives command messages and rule messages to and from I/E 1. Requests for processing are made by application program 5 by sending rule messages that trigger processing of rules from knowledge base 3. Application program 5 may make requests of I/E 1 for data responses from objects. The application inference interface protocol (See Appendix C) contains commands that are issued to I/E 1 through command messages. These commands define a session 41, a transaction 43, and synchronizing and error events.

In FIG. 3 session 41 is the outermost layer of the protocol. It is bounded by session start 45 and session end 47 commands: it defines knowledge base 3, processing parameters, and object definition table 25. Transaction 43 is the next layer of the protocol. It is bounded by transaction start 49 and transaction end 51 commands; data objects usually remain intact throughout a transaction 43. At the end of transaction 43 all data objects except those defined as session objects are released. Within transaction 43 boundaries application program 5 may issue a send rule 53 and make a request 54. More than one send rule 53 and request 54 may be made within transaction 43 and more than one transaction may be made within session 41. More than one response 55 may be received for request 54. Provisions have been made within the protocol for synchronization of response 55 with application program 5, since application program 5 may not be able to process response 55 asynchronously.

Figure 4:
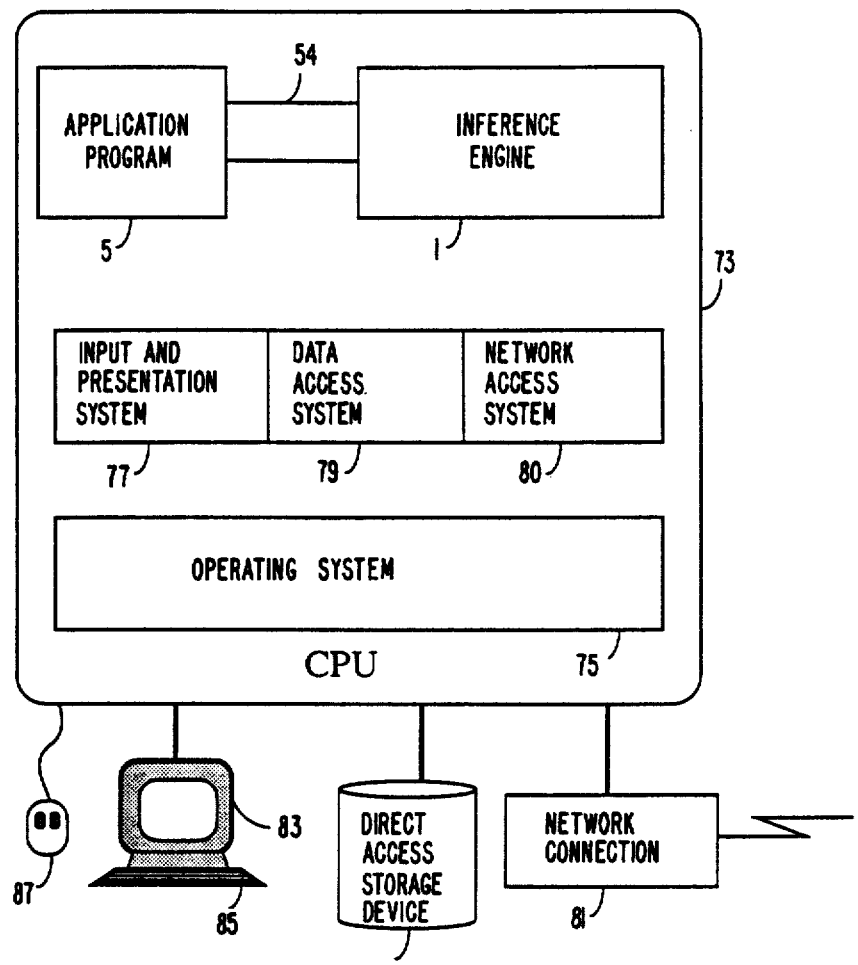
FIG. 4 is a diagram showing the processing context of a preferred embodiment.

FIG. 4 shows the processing in context by showing the expert system as it looks to the user. I/E 1 performs logic processing in response to request 54 from application program 5. I/E 1 operates as a stored program in a stored program computer 71, including a processing unit, memory. and input/output devices. I/E 1 is loaded into the central processing unit (CPU) 73 by application program 5 or an operating system 75. Application program 5 communicates to I/E 1 directly or indirectly through operating system 75. Application program 5 and I/E 1 depend on and use other software components such as an input and presentation system 77, a data access system 79, and a network access system 80 connected through network connection 81. Input and presentation system 77 communicates to devices such as a display screen 83, a keyboard 85, or a mouse 87. Data access system 79 communicates to a direct access storage device (DASD) 89 for storage of non-volatile data. Data access system 79 may be a simple file access system or a sophisticated data base management system 21 (FIG. 2). Components of I/E 1 provide the necessary translations of data and protocols to transport data to inference engine internal form if necessary.

The network access system 80 communicates to other computer systems through some form of network connection 81. Operating system 75, input and presentation system 77, data access system 79, and network access system 80 may take on a wide variety of forms. I/E 1 uses these systems to provide access to DASD 89 or networks but such components are not part of the system. Application program 5 may also use data access system 79 and network access system 80 and may use input and presentation system 77 to directly communicate with users. However, I/E 1 communicates to application program 5 through a structured protocol that allows application program 5 to take on various forms which can be used with I/E 1. Additionally, as will be shown later, this protocol allows operation of I/E 1 to be distributed over a network of computers. While the functions provided by operating system 75, input and presentation system 77, data access system 79, and network access system 80 are essential to the operation of I/E 1 and application program 5, they represent components common to most computer systems and will not be shown on subsequent drawings.

Figure 5:
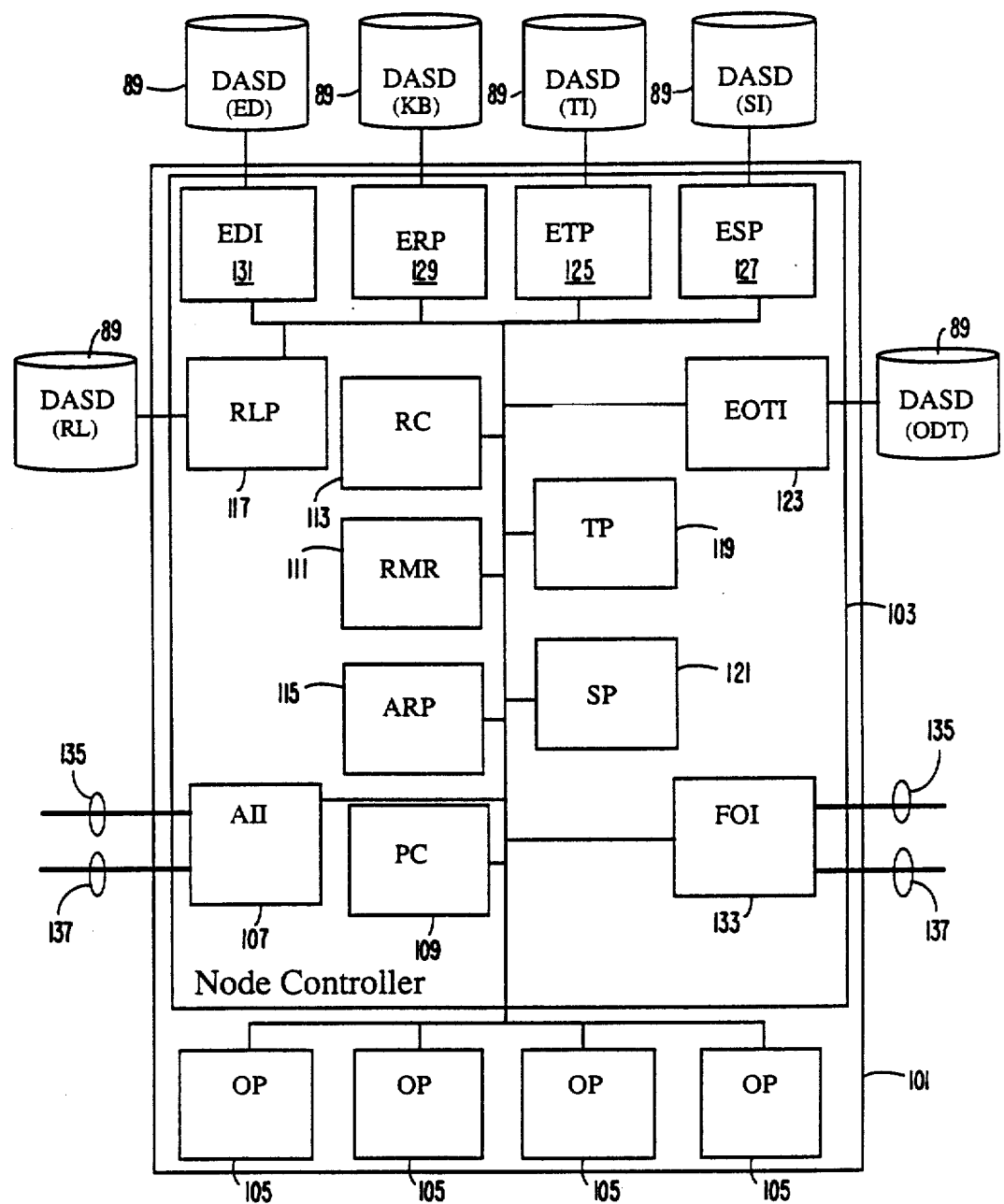
FIG. 5 is a functional block diagram showing the system components of the preferred embodiment of the inference engine.

FIG. 5 illustrates the configuration of the system components. The system components are arranged to form a processing node. Each processing node 101 is composed of a node controller 103 and one or more object processors 105. A node controller is composed of at least one application inference interface 107, a process controller 109, a rule message router 111, at least one rule cache 113, an active rule processor 115, a rule log processor 117, one or more target processors 119, one or more source processors 121, and an external object table interface 123. Also the following optional components are available: one or more external target processors 125, one or more external source processors 127, an external rule processor 129. one or more external data interfaces 131, and one or more foreign object interfaces 133 (note-knowledge base 3 may be composed of a single seed rule). In some configurations the rule log processor 117 and the external object table interface 123 are optional.

Application inference interface (AII) 107 receives command messages 135 and rule messages 137 from application program 5 using I/E 1. It also receives messages from the node components and object processors 105 and sends corresponding messages to application program 5.

Process controller (PC) 109 broadcasts session start 45 and session end 47 messages as well as transaction start 49 and transaction end 51 messages to object processors 105 and keeps track of activity in the system. Rules are accounted for by this component so that PC 109 can determine that all rules that have been requested have entered processing and that activity on object processor 105 is complete. PC 109 also determines system idle.

External rule messages enter processing at rule cache (RC) 113 from external rule processor 129, foreign object interface 133. or AII 107. Rules are cached for later retrieval and sent to source processor 121 and target processor 119 so they can build their indexes.

External rule processor (ERP) 129 retrieves rules from external knowledge base 3 and transforms them into rule messages.

Active rule processor (ARP) 115 keeps track of which rules are in the active session and what their status is. Rules might be active on object processor 105. completed, or suspended awaiting data.

Target processor (TP) 119 searches the conditions and actions of rule message 137 for variable names and enters them into the target list.

When a rule message 137 is received. source processor (SP) 121 searches the actions for variable names that are targets of actions and adds them to the source list.

External target processor (ETP) 125 searches the target index of knowledge base 3 for rules containing variable references and requests such rules.

External source processor (ESP) 127 searches the source index of knowledge base 3 for rules containing a variable as a target and requests such rules.

Rule message router (RMR) 111 examines rule messages 137 for unfilled routings and attempts to fill those routings from the active object list or to start object processor 105 for that object.

External object table interface (EOTI) 123 retrieves object definition table 25 from DASD 89 and sends it to rule message router 111.

External data interface (EDI) 131 retrieves data from external data bases or files and sends the data to the object processors 105 for the data.

Foreign object interface (FOI) 123 sends rule messages 137 and control messages 135 to any foreign processors that are forward in the inference process from the current node and receives rule messages 137 and control messages 135 back. It distributes messages received from the foreign processors.

Rule log processor (RLP) 117 writes rules to a rule log 118 which is typically held on DASD 89.

Messages may flow between the different processors in the system. Messages flowing between application program 5 and I/E 1 have previously been described as taking on two forms, command messages 135, and rule messages 137. Likewise I/E 1 communicates forward to other computers or to a network of processors by command messages 135, and rule messages 137. This symmetry of communication forward and backward from I/E 1 is critical to the operation of I/E 1 over a network of computers as will be shown later.

Figure 6:
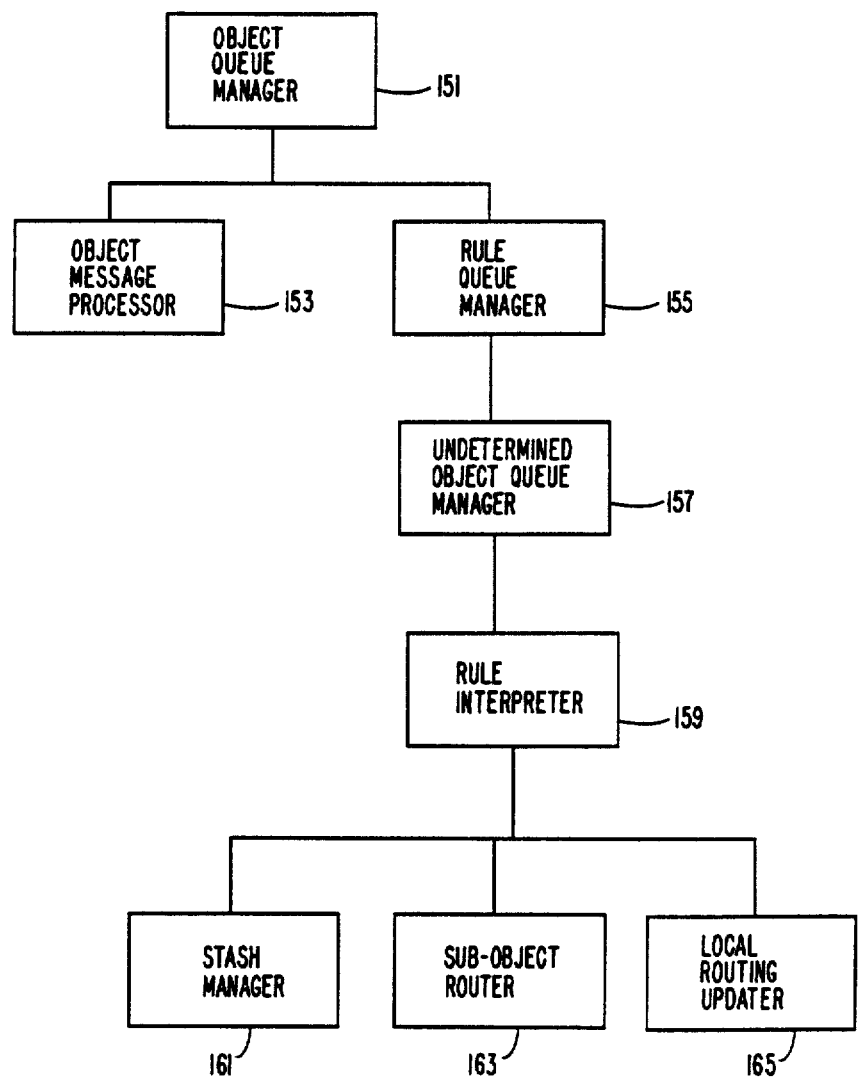
FIG. 6 is a functional block diagram of the components of the object processors shown in FIG. 5.

FIG. 6 is a functional block diagram illustrating the components making up each object processor 105. These components include an object queue manager 151, an object message processor 153, a rule queue manager 155, an undetermined object queue manager 157, a rule interpreter 159 a stash manager 161, a sub-object router 163, and a local routing updater 165. Object processor components are associated in the same processor and communicate by passing addresses or values.

The operation of object processor 105 will now be described. All messages received at object processor 105 are processed by object queue manager 151 or passed to its two subordinate message handling functions, object message processor 153 or rule queue manager 155. Three lists are maintained by object queue manager 151, object message processor 153, and rule queue manager 155. These three lists are the base object queue, the instance list, and the undetermined object queue. Objects are identified in the object control area as either base objects or instances. (This is set by the function that established the object with the object initialization message). Rule messages 137 are passed to rule queue manager 155 and object messages are passed to object message processor 153.

Object message processor 153 processes messages that relate to the object as a whole or to variables within the object. Messages processed by object message processor 153 include:

Session Start
Object Initialization
Instance Create
Variable Store
Variable Delete
Completeness Notice
Process Idle
Transaction End
Commit Process Stop.

Rule queue manager 155 maintains a queue of rules awaiting processing in shared memory processors and passes rules to be processed to the undetermined object queue manager 157. The rule queue manager 155 also maintains the spawn list of rules to be spawned for base objects.

The function of undetermined object queue manager 157 is to queue rules until the object instance is determined to be selected. If the object is false, rules marked false are sent to active rule processor 115, if the object is true the rules are passed to rule interpreter 159. When the rule reaches rule interpreter 159 the rule message is scanned for operations on the current object. Any operation found is attempted. First stash manager 161 is called to retrieve variables associated with the current object. Subsequently, the routines associated with the operation tokens are entered, passing the variables previously retrieved. Recursion of operation functions is avoided by organizing the operations as a reverse polish stack. Rule interpreter 159 determines the status (true. false, or undetermined) of each rule from the results of the individual operations.

If a rule is determined true, the operations in the action portion of the rule are attempted. Each operation function determines if adequate variables are present for the operation to be performed. Operations that complete are marked completed in the rule message.

Stash manager 161 retrieves variables from the object. It is entered from rule interpreter 159 if a variable is identified as belonging to the current object. The name of the variable is the input to this function. The result is a pointer to the variable if it is determined or zero if the variable is undetermined.

In the prototype (Appendix A). variables are attached to the object control area by a linked list. Each entry in the list is a variable control area. The linked list is managed by stash manager 161 through functions for search, store, and delete.

Sub-object router 163 examines routings for the current object to determine if they are for a sub-object. If so, the first such routing is updated in rule message 137 and all routings for the same sub-object are likewise updated for the routing to the sub-object processor.

Local routing updater 165 updates the rule message 137 for the next object routing and forwards the rule message 137 if it is not sent to a sub-object.

SYSTEM CONFIGURATIONS

I/E 1 is capable of operating in several configurations including: single processor, parallel processor, and distributed inference network. As will be shown, the same Gnome I/E architecture and message protocol are used in all of these configurations and in a mixture of these configurations.

The first configuration is the single processor configuration. This configuration has been developed in the prototype system called Gnome. This system contains the major processes but differs slightly from the description given. The prototype fully implements the Sartre language and all of the control mechanisms in this way the prototype provided a testing platform for the methods.

Figure 7:
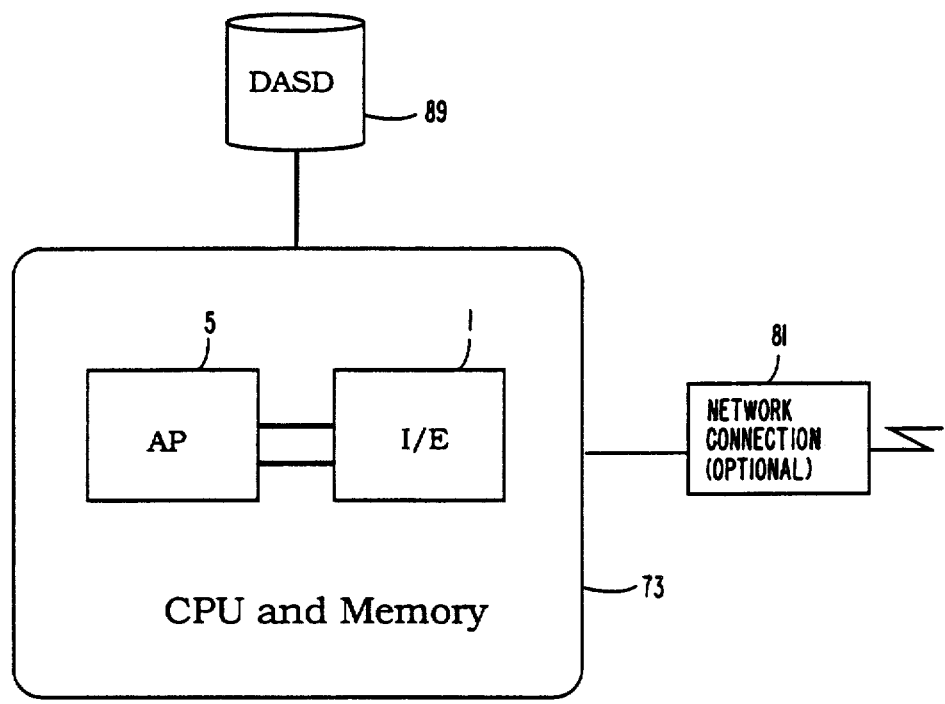
FIG. 7 is a functional block diagram of an embodiment of the present invention in a single processor inference node configuration

Referring to FIG. 7, a single processor configuration all of node controller components and object processors 105 share common memory and share control of CPU 73. AP 5 communicates with I/E 1 using command messages 135 and rule messages 137. Knowledge base, target index, source index, external data, and object definitions reside on DASD 89 locally attached to CPU 73 or optionally provided through network connection 81. Application program 5 accesses data or interacts with a user through input and output devices and then formulates a request to I/E 1. Command messages 135 from AP 5 to I/E 1 provide the ability to identify knowledge base 3, the target index, the source index, external data, and the object definitions. Rule messages 137 are passed from AP 5 to I/E 1 to determine variables or provide meta-rules to provide direction to the inference process. Additional command messages 135 provide transaction bracketing, end processing, and synchronize external data events.

I/E 1 passes command messages 135 to AP 5 for session idle or session error states and passes rule messages 137 with results or rule messages 137 targeted to objects managed by AP 5.

If the single processor is connected to a network and knowledge base 3 contains rules with references to foreign objects (objects that are known to reside on a processor that is forward in the network from the current node) then, when I/E 1 determines that the foreign object is relevant to the current inference session, the appropriate rules can be forwarded to I/E 1 containing knowledge about the foreign object.

Figure 8:
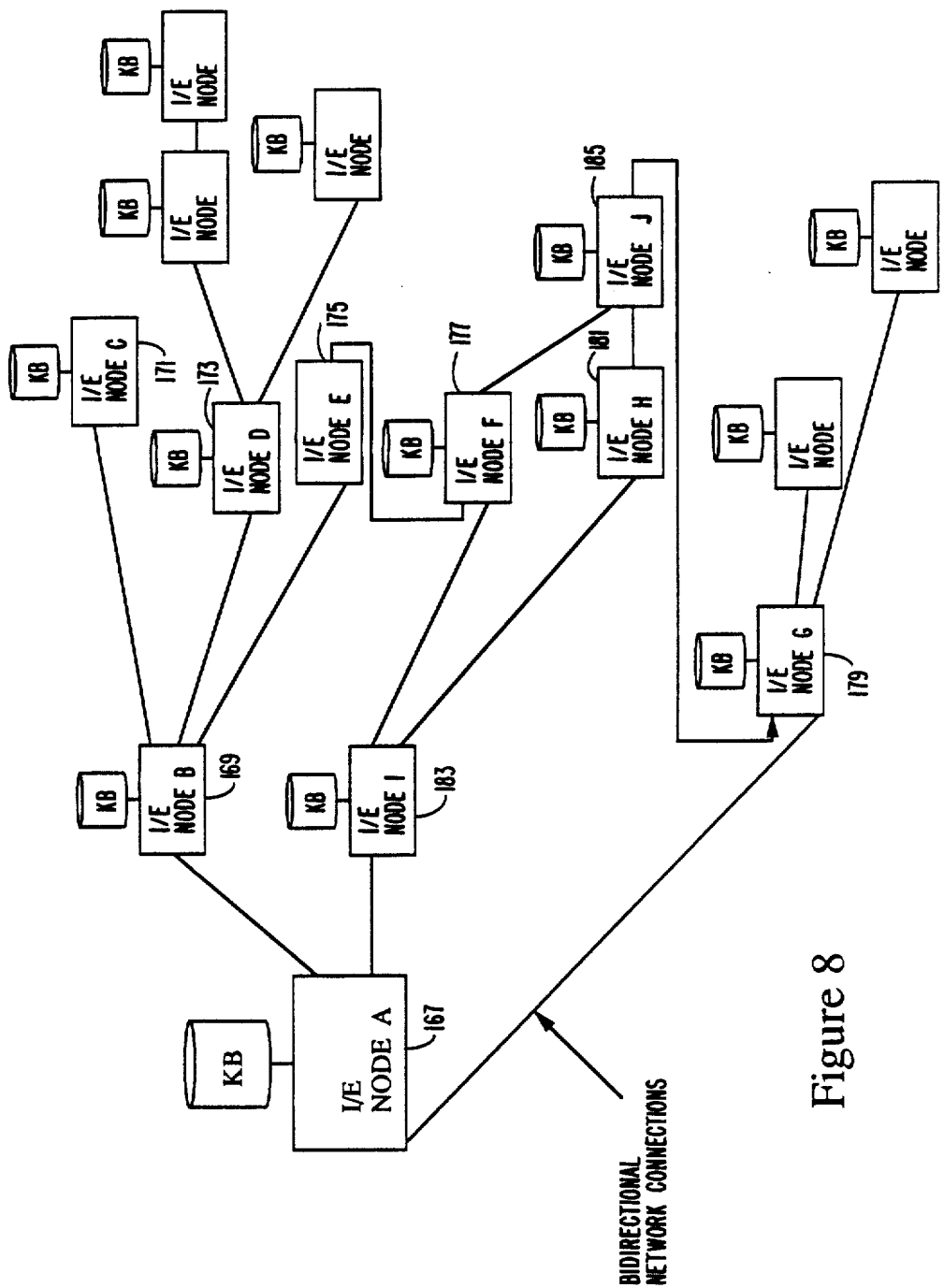
FIG. 8 is a functional block diagram of an embodiment of the present invention in a typical distributed inference network configuration.

The second configuration which may operate using the present invention is a distributed inference network. FIG. 8 shows a typical distributed inference network. Each I/E 1 in such a network could be either a single processor or a parallel processor. The symmetry of messages to and from foreign object interface 133 of I/E 1 and AII 107 of I/E 1 allows the inference process to proceed in a daisy chain fashion through as many I/E nodes as is practical based upon communications and processor speeds.

The asynchronous nature of the processing paradigm allows I/E node A 167 to simultaneously communicate to several I/E nodes, such as I/E node B 169 I/E node I 183. and I/E node G 179. Similarly, I/E node B 169 simultaneously communicates with forward I/E node C 171, I/E node D 173, and I/E node E 175. Likewise, the session and transaction bounding protocol and message routing method allows I/E node F 177 and I/E node G 179 to serve more than one role in an inferencing network. Both I/E node F 177 and I/E node G 179 are configured in parallel and in daisy chain fashion. I/E node F 177 is in parallel with I/E node H 181 for processing associated with I/E node I 183 and at the same time it is daisy chained to I/E node E 175. Similarly, I/E node G 179 is in parallel with I/E node B 169 and I/E node I 183 and at the same time it is daisy chained to I/E node J 185. The inference network may be dynamically reconfigured throughout a session or a transaction based upon the objects of relevance to the inferencing session.

Figure 9:
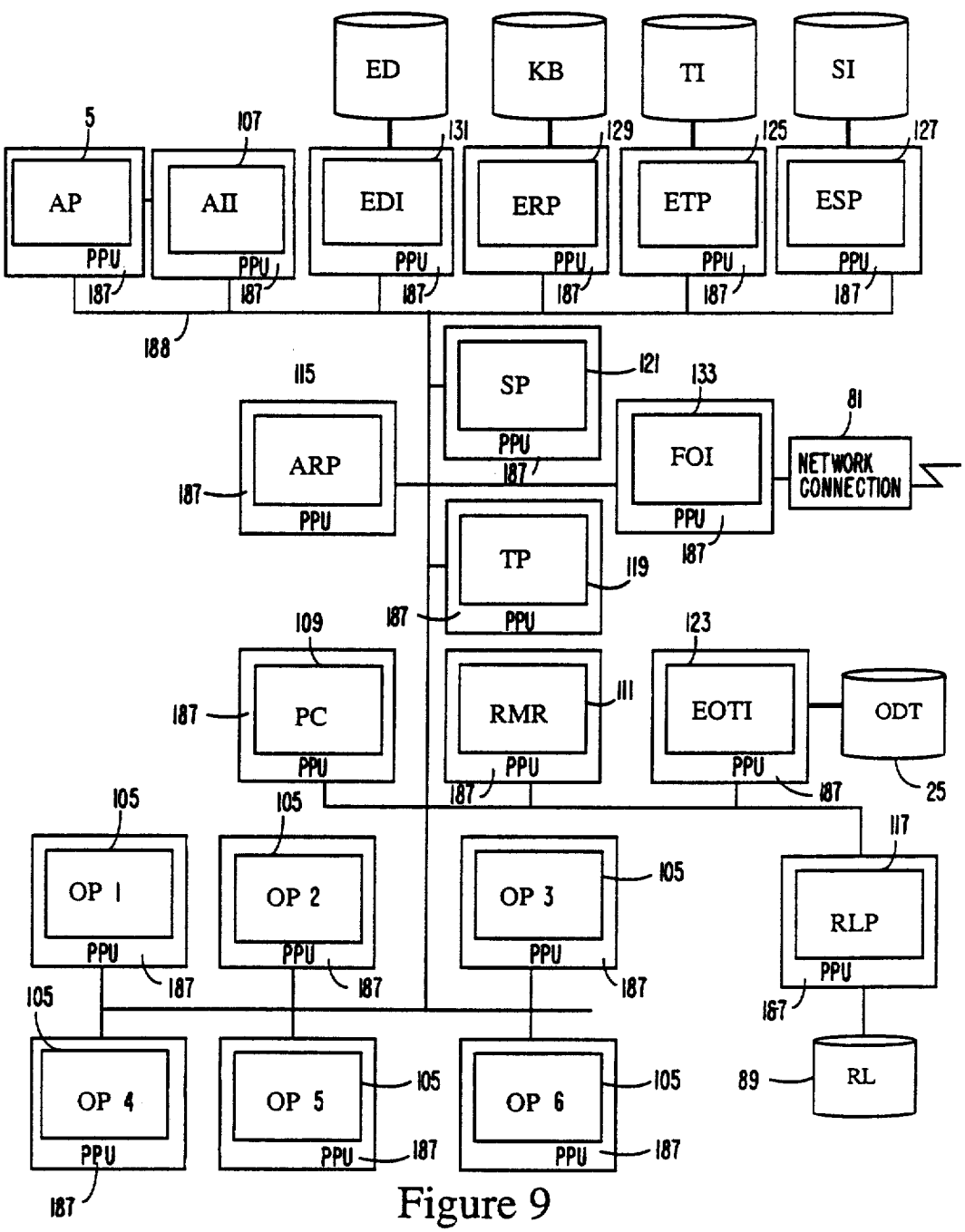
FIG. 9 is a functional block diagram of an embodiment the present invention in a parallel processor inference node configuration.

Another configuration which may implement the invention is the parallel processor inference node, shown in FIG. 9. When operating in a parallel machine, I/E 1 will normally occupy several parallel processing units 187. The processing units are connected together and pass messages between themselves via processor interconnect network 188. A typical processing unit used for this application is the Intel iPSC/2 system manufactured by Intel. Inc. of Santa Clara, Calif.

Each node component occupies a separate parallel processing unit 187 and each logical object and instance of an object occupies a different parallel processing unit 187. This configuration provides the maximum parallel operation, but it will generally create an unbalanced processor load. The number of messages targeted to an object is related to the number of references to that object in rules. Load balancing can be improved by assigning multiple objects to a single parallel processing unit 187 and multiprocessing each parallel processing unit 187.

The message traffic to various node components on processor interconnect network 188 may result in a bottleneck. This could happen if target processor 119 were overloaded. The node components can also be more finely divided by assigning separate nodes for the target search for each object. In this way the searches can be performed in parallel for each of the different objects. In the same fashion, source processor 121, active rule processor 115, foreign object interface 133, and all the external processors can be split over multiple processors. The process is still controlled by rule message router 111 which assigns objects to processors, and identifies target processor 119 and source processor 121 to each one when assigned.

Figure 10:
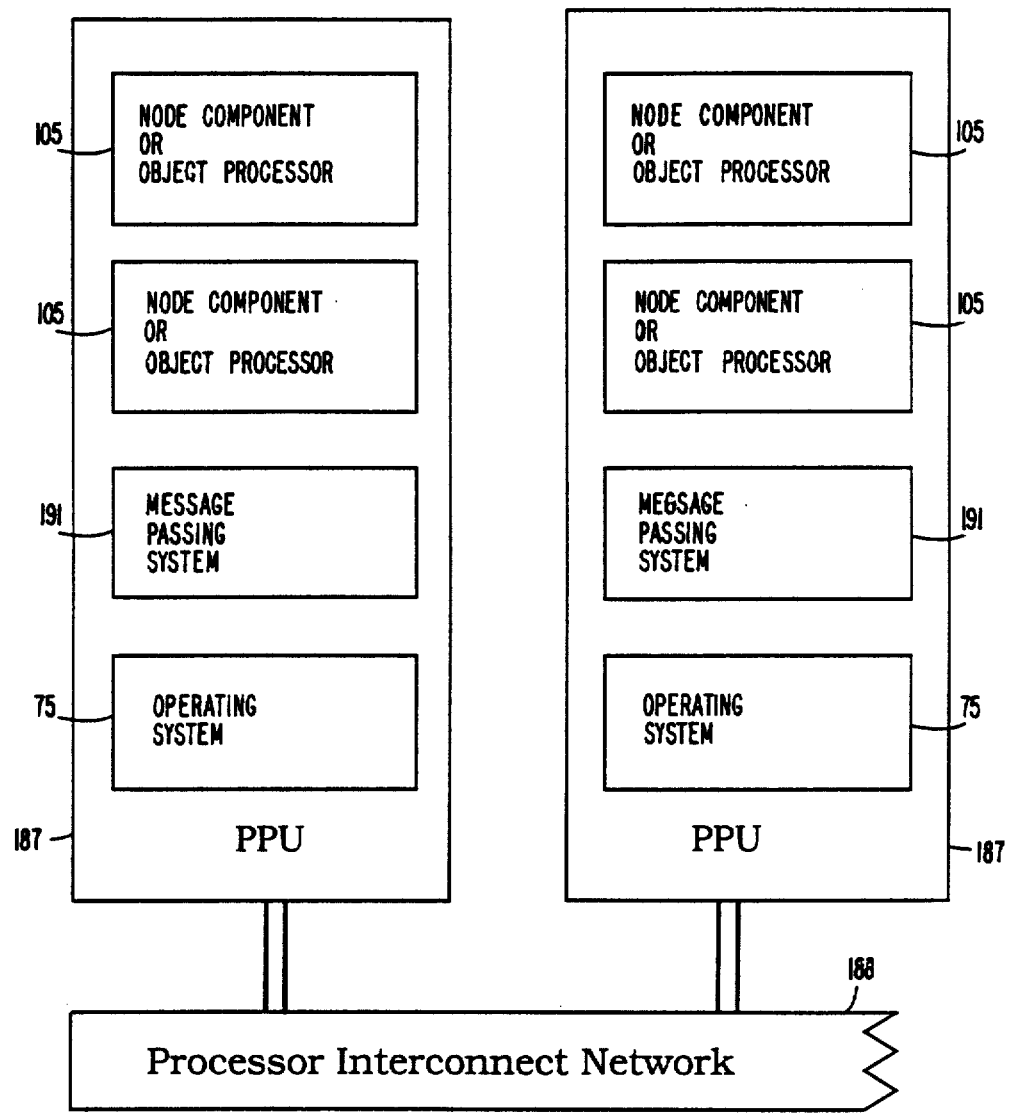
FIG. 10 is a functional block diagram of the components of the parallel processor configuration shown in FIG. 9.

FIG. 10 illustrates a parallel configuration where node components and object processing units share a parallel processing unit (PPU) 187. In a parallel processor configuration, like a single processor system, the individual PPUs 187 contain at least operating system 75, a message passing system 191, and one or more node components or object processors 105. PPU's 187 are connected by some form of processor interconnect network 188. Operating system 75 provides program loading, timing and other common functions of operating systems. If operating system 75 is of the multi-processing type, more than one node component or object processor 105 may occupy a single PPU 187. Message passing system 191 provides facilities to transfer messages between node components and object processors 105, either within PPU 187 or over the processor interconnect network 188 (the prototype uses a shared memory message passing system, for a description of this method see Appendix D). Several varieties of parallel processors are available, employing various message passing systems 191, operating systems 75, and processor interconnect networks 188. In this configuration, the various processes of an inferencing session are separated in a way that allows a high degree of parallel operation. The parallel operation of a single node in a distributed network may also occur in parallel with other processors (either single or parallel) in the network.

In a multi-processing parallel processor configuration, loads can be balanced by combining node and object processors in appropriate ways, but in such an environment, each node or object processor would occupy a logically independent processor so FIG. 9 is still logically correct.

I/E 1 uses these components, data access systems, and network access system components for processing within a parallel processor, but such components are not part of I/E 1 and consequently will be omitted from subsequent figures.

MESSAGE PASSING

When a rule is to be passed between various components or between more than one I/E 1, it must be formatted into message form. Messages are used to allow various components within an I/E node or more than one I/E 1 to communicate by passing messages between themselves. All messages have a message header which identifies a message type, a next routing, and a message length. The components assume that messages can be sent asychronously, that is without concern for the readiness of the receiver. Likewise queuing of messages, other than for internal synchronization of processes, is assumed to be the responsibility of the message delivery software. Likewise messages are not acknowledged nor are acknowledgements expected. Message receipt acknowledgements, if they are required for a message protocol, are treated herein as the responsibility of the message delivery software which is used by I/E 1.

The symmetry of messages between AP 5 and I/E 1 and between more than one I/E 1 in a network is maintained between the processors within a parallel processing configuration.

Node processors send command messages 135 and rule messages 137 to each other and to object processors 105. Object processors 105 also send command messages 135 and rule messages 137 to each other. Command messages 137 exchanged between AP 5 and I/E 1 or between more than one I/E 1 propagate into corresponding messages between the node processor and the object processors 105. In addition to the session, transaction, and synchronization messages, within the parallel processors, messages are sent for control of processes within the parallel processors.

An important characteristic of the message protocol, whether inter-processor or intra-processor, is the asynchronous processing method employed. This method allows any processor, upon sending a message, to continue processing without waiting for a response. This approach requires that different control processes be used than would otherwise be the case. In particular, the processes related to variable existence (default logic), variable completeness, and system idle are unique. The advantage of this method is that it allows separate threads of logic to be pursued simultaneously among the various processors.

This message passing technique is implemented in the prototype by simulating message passing through the use of recursive calls (See Appendix E for a more detailed explanation of this technique). Asynchronous message passing allows separate logic and control processing to be performed on various processors at the same time thereby increasing the work being performed in parallel. It also separates the various control processes so that separate processors can be used for different control processes and that individual control processes can be further distributed among separate processors.

Knowledge base 3 is composed of one or more rules (or productions). Each rule is composed of a condition part (left hand side, LHS) and an action part (right hand side, RHS). In order to be processed by I/E 1 each rule is made into a message. Knowledge base 3 may be stored as messages or in some other form, such as a relational table, and transformed into a message as the rule is retrieved for processing. The prototype operates in either processing mode.

Control messages 135 contain a message header and variable data dependent upon the message type. The message type contains a binary token identifying the message type. Appendix A contains a list of the types of messages.

Figure 11:
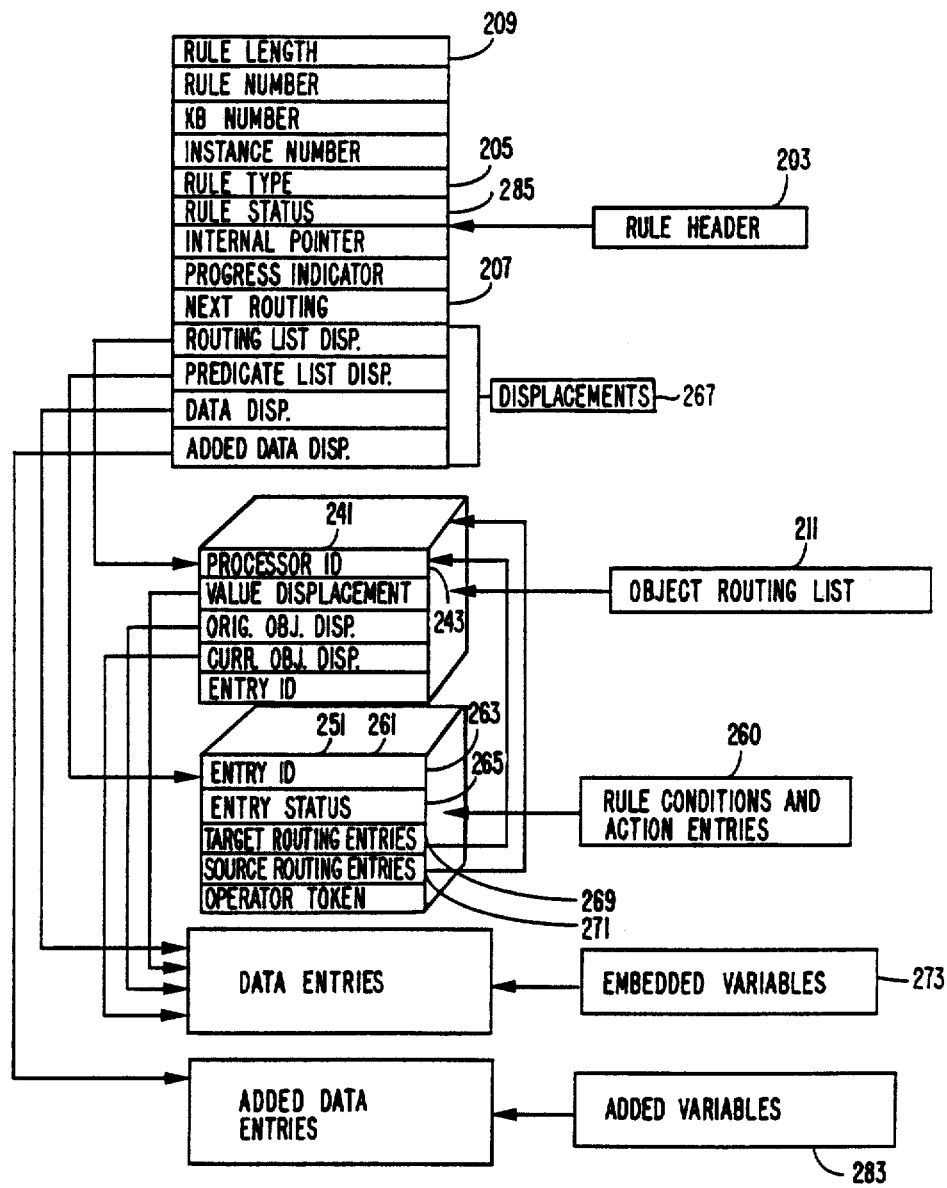
FIG. 11 is a diagram showing the format of a rule message.

The various parts of rule message 137 are shown in FIG. 11. Rule messages 137 contain the assembled portions of a rule formed into several parts which are organized to facilitate processing. The list sections contain displacements into the other parts so that the lists can be of fixed lengths to allow efficient list processing. These parts include a rule header 203, an object routing list 211. rule condition and action entries 260, embedded variables 273, and added variables 283.

The rule header 203 uniquely identifies a rule within knowledge base 3, uniquely identifies knowledge base 3 within a network, uniquely identifies an instance of a rule, may contain local processor control information, contains value displacements 268 for the other parts of the rule, and rule type 205 and rule status 285.

One section of rule message 137 is an object routing list 211. This is a list of the routings to the processors for this rule. These may be either parallel processors on the current node or processors on other nodes. An object routing entry 241 is an entry in object routing list 211. Object routing entry 241 that is not yet determined remains zero. Object routing list 211 is cleared before a rule is re-used in another transaction. Object routing list 1 may be ordered in any way e.g., in order to increase the probability of the rule being determined; in the prototype, object routing list 211 is in the order of occurrence in the rule.

Object routing list 211 contains status and routing information for each object, object qualifications, and variables referenced in the rule. The status information indicates whether object routing entry 241 is still active (i.e. variables or actions remain undetermined for that object). Object routing entry 241 may symbolically identify the object or may identify the specific processor assigned to the object. Object routing entry 241 uniquely identifies both the network node and one of object processors 105 within the node. The same routing method is used when only one object processor 105 is available on a network node, the individual object processor id s provide identification of the assigned objects within the shared memory.

A rule condition entry 261 contains variable-operator-variable triplets for each condition in the rule. Where a specific value, e.g., "TRUE", is referenced in a condition, that value appears in the entry by reference. For operators with only one variable, the second variable reference is empty (zero).

The variable reference in a condition element refers to object routing entry 241 for the variable. The operation is a binary token for an operation meaningful to object processor 105. Each element contains an entry identification 263 which doubles as a status tag. This element contains a 1 if the element is undetermined and contains a 4 if the element is determined. Each element also contains an entry status 265. This indicator is u if the element is undetermined, 't' if the condition has been determined true, and 'f' if the condition is determined false.

A rule action 261 contains target-operator-source triplets for each action in the rule. Where a specific value is referenced in an action, that value appears in the entry by reference. For action operators with only one variable, e.g., create object, the variable reference appears in a target routing entry 269 and a source routing entry 271 which is empty (zero).

Action elements are similar in form to condition elements. Source variables are input to an action function and target routing entry 269 is where the results of an action are stored. The actions are binary tokens meaningful to object processor 105. The entry ID 263 is a 2 for actions that remain uncompleted and 4 for actions that are completed. The entry status 265 contains a u if the action is uncompleted and a c if it is completed.

Embedded variables 273 that are contained in rules may be in a variety of forms. In the prototype, a default form is provided for null delimited string lists. This form is also used for variable names. Object routing entries 241 contain displacements that, when added to the beginning of the data section of a rule, give the beginning of a variable name or a data value.

When rule message 137 is constructed and rule condition 251 or rule action 267 contains a value (rather than a variable reference). the corresponding object routing entry 241 for that rule condition 251 or rule action 267 contains a displacement into embedded variables 273. When rule condition 251 or rule action 267 contains a variable reference, rule condition 251 or rule action 267 contains a pointer to the fully qualified variable name (object.qualifications.variable) which is stored as a list of character strings. If a variable is determined and will be required on another object processor 105, the variable value is moved to added variables 283 and the displacement to the value from the beginning of added variables 283 is placed in the corresponding object routing entry 241 for rule condition 251 or rule action 26>. In this way. subsequent references to the variable will be treated as references to values.

When rule condition 251 contains references for two different objects, the first object processor 105 that finds a determined value for a variable appends that value to the rule and inserts a pointer to that data in the corresponding object routing entry 241. When rule action 26' contains references in source field 271 for a different object than the target, when the rule is processed by the source object the source values are added to the rule data and a pointer to the value is inserted into the corresponding object routing entry 241 of the rule. In these two ways values are transported from one object to another, when required, in the rule to which they are relevant.

RULE PROCESSING

Once rule message 137 has entered the working set, the structure of rule message 137 allows it to be successively directed to the objects on the rule's object routing list 211. When rule message 137 is processed by object processor 105, rule conditions 251 that contain references to variables associated with that object are retrieved and operated upon by the object processor program. If the object processor program determines that the operation. e.g., equal, is true, that condition entry is marked true and the associated routing entry is marked used. When the result of any condition operation is false, the rule is determined to be false and immediately sent to active rule processor 115 where actions to end its processing are performed. This process continues until all rule conditions 251 that contain references to the object have been examined. If all rule conditions 251 for a rule are determined true, then the rule is marked true.

When a true rule is encountered, either because object processor 105 has found all conditions to be true or the rule was marked true by some previous processor, the operations for rule actions 261 that have targets on the current object are attempted.

Rules for which variables remain undetermined, hence leaving rule conditions 251 undetermined, may be either queued at object processor 105 until the variable is determined, sent to other object processors 105 on its routing, or sent to a repository. The prototype sends undetermined rules to a repository in active rule processor 115. Rules are reactivated by active rule processor 115 when referenced variables become determined, are forward fired, and the rule is requested again. This solution may be sub-optimal in some parallel processor machines, but optimizes the rule interpreting process in shared memory.

Rule routings may be changed or filled in after partial processing. References to sub-objects are changed by object processor 105 if the rule is true or remains undetermined. Each object processor 105 contains information as to all of its qualified projections (subobjects). Each rule is sent in sequence to each of the sub-objects to which it contains a reference. The process involves updating the routing at the object containing the qualifications and sending rule message 137 to the next routing. When the known routings for rule message 137 have been exhausted, rule message 137 is routed to rule message router 111 where additional objects may be reactivated or rule message 137 routed to foreign objects on other nodes.

Thus each rule message 137 contains a routing section which determines the path of that rule message 137 though object processors 105 and I/E nodes, a section of logic (conditions), and a section of actions. This structure is similar to stored program computer instructions where the computer instruction contains the next sequential instruction (such machines as the IBM 650, the CDC 6400, and some logic instructions of most sequential stored program machines). The difference is in the binding of the logic and action parts and the updatable routing. While updatable routing is not a requirement of the process, (and some processing could be more optimum if routings were predetermined) the updatable routing allows for dynamic optimization and allows independence between knowledge bases 3 and their target processors 119 as well as providing set operations not supported directly on the above stored program machines.

The process whereby conditions and actions flow to the appropriate processor in a parallel environment without the need for synchronizing actions between object processors 105 is believed to be an advantage over previous systems.

The process whereby the logic of the inferencing session spreads across the network (connecting the processors) by being contained in rule messages 137 rather than occurring due to interactions between processors is also believed to be an advantage over previous systems.

Most processes involving parallel processors that don't share memory store the instructions for processing and send data between the processors. The process described here is the inverse of that process. Data is resident in a processor that is the owner of that data. The object processor 105 also contains the data values and the relationships between that data and other data associated with an object, a set of objects, or other variables. Data flows to the objects where it is domiciled and propagated to its related data objects such as qualified objects. Rules contain the processing logic and actions and flow to the data that they reference. The inference instructions are resident in a processor only during the time the instructions are being processed. This process means that the size of the instruction set for a process can greatly exceed the addressable address space of the available processors.

A variable is a symbolic reference to something. e.g., a string value, or a graphic symbol. As is common with the object oriented programming metaphor, the meaning of variables and operations is local to object processor 105. The inference process is not affected by the type of variable a symbol represents, nor by the process represented by an operation. The inference process is the same whether the variable references a string within a string store or the variable references an area of pixels within a graphic image. The operation of Equal would be one process if the object were a string store and another process if the object were a graphic image.

The object programming metaphor is not unique to the Gnome Inference Engine but the concept of heterogenous object processors is central to the inferencing process. This ensures that the rule processes are independent from the object processes. A requirement of this process is that the type of a variable be sent with the variable when it is attached to rule message 137. This allows the receiving processor to perform any necessary transformations upon the received variable. The form of the negotiation of variable transformation is not specified in the design of Gnome. In the prototype, all variables are stored as string lists with numeric variables scanned for acceptable conversion. If multiple variable forms are to be supported by negotiation, the rule form of Gnome is still a usable form with the addition that rule variables of an unacceptable form could be removed, the proposed counter form inserted, and the rule routed to the originating processor.

The separation of relational tuples into separate processors is central to Gnome s approach to relational objects. A processor is assigned to all relational tables containing more than one relational tuple, referred to as the base processor. That processor controls the flow of rules that apply to the members of the set represented by the relational table. Additional processors are assigned to each tuple of the relation. Rules that operate on the set are replicated once for each member of the set. This process, referred to as spawning not only increases the parallelism of operations on sets, but also allows complex inter-relation operations to be contained in a single rule. The key process in the spawning of rules is that each rule is spawned at one time only for all like qualifications (qualifications are subsets of the basic set of tuples or of a subset). When the processing through one qualification is completed and the spawn of a rule is true or undetermined, it is routed back to the base processor where the spawn is again spawned for the next qualification.

Those operations on sets that require that the operation be performed on all tuples before the operation is considered complete, e.g., Sum, require a special process called completeness. The completeness process is triggered by the determination that a set of rules has come to an idle point. A set of rules is idle if all of the rules in the set are complete, determined true, or determined false and there are no further variables known that are referenced by the undetermined rules. A set of rules is complete when all rules referencing known variables are part of the active set, all rules referencing base objects are completely spawned, and all tuples of the base objects are known, i.e., the object is closed. All variables that have been operated on by operators requiring completeness are internally identified and Gnome checks that all rules that participate in the quantification of the variable are complete. If the variable is complete, the variable is forward fired and the rule set is active once again. If any such rules remain undetermined, the variable remains undetermined. If all rules in a session are idle and variables remain incomplete an error condition exists.

The completeness process is used for operations where the target variable is a combination of source variables from multiple tuples (Sum. Count. etc.) and the existence operations. For example, the target variable of the Sum operator can only be considered complete when all tuples referred to by source variables have been added to the target. When the rule containing the Sum operator is first spawned by the base processor the base object may not be closed yet it is desirable to begin processing as soon as possible. Consequently, the rules are spawned both when first reaching the base object and subsequently as new tuples are created. When idle is reached and the object is closed, the active rules are searched to see if any instances of the rule remain undetermined.

For the existence operators, the process is similar. If a variable is referenced in an active rule by the not exists operator, the variable is marked. When the idle point is reached, if all rules that could determine the variable are determined false, then the variable is determined to not exist. This implementation of the existence operators corresponds to the definition of the existence function in the relational model.

RULE RETRIEVAL

Rules enter the system from three points: Application inference interface 107, external rule processor 129, and foreign object interface 133.

Rules may be sent to I/E 1 by application program 5 through application inference interface 107. These rules may be assertions that are to be used only for the current transaction. Assertions are identified by negative rule numbers. They are not sent to rule cache 113 and are destroyed when the transaction ends. Assertions cannot contain condition variables or action source variables since they do not enter the target list and consequently will not forward fire. Any rules with positive rule numbers are sent to rule cache 113 and subsequently to source processor 121 and target processor 119. Such rules become part of the active rule set and may become part of a subsequent transaction.

Rules also enter the system through external rule processor 129. Rules entering the inferencing session from external rule processor 129 have been explicitly requested, usually the result of a target or source search. External rules may be stored in any of several forms. One such form is as relational tuples in a relational data base. Appendix D describes the prototype implementation of rules stored in a relational data base known as Oracle. Once rules are retrieved from external data storage, they are formed into rule messages 137 and then proceed to rule cache 113 and into the active rule set. Rules entered into rule cache 113 are also entered into the source and target lists and are available for local forward chaining and backward chaining.

Finally, rules may enter the system through foreign object interface 133. Rules enter from foreign object interface 133 because they are returning from processing on a forward processor or they have been sent backward from a forward processor. Foreign object interface 133 keeps a list of rules that are sent so that internal controls for a rule can be re-established when the rule returns. Returning rules reenter the active rule set. New rules are sent to rule cache 113 and hence to source processor 121 and target processor 119.

New rules entering the inferencing session that are part of the global knowledge base are captured by each node that they encounter. In this fashion the inferencing session has the opportunity to optimize its processing by a process of accumulating knowledge close to the locus of reference, the data objects.

Two types of chaining are available in the system. forward chaining and backward chaining. First forward chaining will be described and then backward chaining.

When a variable is determined, the variable name and the determined values are used to activate all rules that contain conditions referencing the variable. Forward chaining involves a two level look-up process. The first look-up occurs in target processor 119. Rules previously encountered in the session have been entered into an index. That index is searched and the rules activated through rule cache 113. In addition to target processor 119, which maintains its index in memory, external target processor 125 has access to the target index on DASD 89 for knowledge base 3. Target processor 119 sends the same information that it receives to external target processor 125 for a similar search on the external knowledge base on DASD 89.

Backward chaining is performed for completeness operations in the active rule set and for certain operators in the knowledge bases. As rules enter the active rule set their target variable references are entered into an index maintained by source processor 121. When completeness is required for a variable a list of rules with the variable as their target is assembled and sent to active rule processor 115 for investigation. When operators are goal operators, a search request is sent to source processor 121 with the name of the required variable. The active rule set is searched and a request is sent to the external source processor 127 which accesses the source index of the external knowledge base to retrieve a list of rule numbers. These rule numbers are sent to active rule processor 115 as a rule request. By limiting back chaining to explicitly stated operators rather than for all undetermined variables. the possibility of an unplanned saturation of the inferencing session is avoided. (Backchaining may be used to promote the priority of object formation in the same two tiered approach used for goal resolution; but this method has not been implemented in the prototype.)

PROCESSING DESCRIPTIONS

Figure 12:
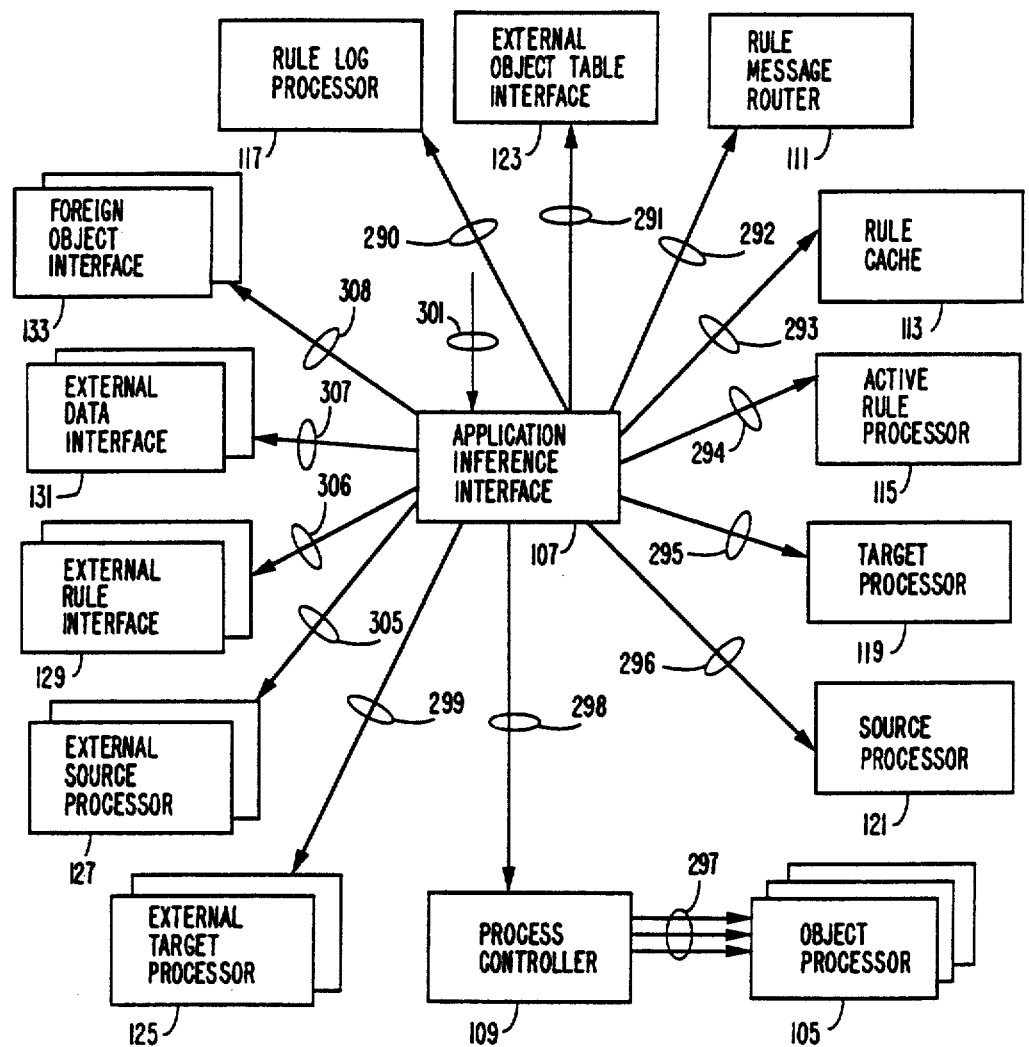
FIG. 12 is a functional block diagram showing the first phase of the startup process.

FIG. 12 illustrates the startup process by showing various messages as they move through the node components. Throughout this section of the description references to a code section in the prototype may be found in parentheses. This is the name of the function routine in the code of the prototype that performs the described function (See Appendix A). The first phase of the start up process assigns processors to components, loads the node components into the processors, and sends initialization messages to all the components.

Upon receipt of a session start command 301. application inference interface 107 assigns processors to the node components, loads the node processors with the node controller components, and loads object processors 105. If necessary. AII 107 sends a session start message 290, 291, 292, 293, 294, 295, 296, 298, 299, 305, 306, 307, and 308 with the processor id's of all of the node controller components to process controller 109 and the rest of the node component processors. (gtsess)

Upon receipt of session start message 290, 291, 292, 293, 294, 295, 296, 298, 299, 305, 306, 307, and 308, each node component stores the session parameters including the node routing table which is used to obtain the routing of messages to other node components. (various)

When session start message 298 is received by program counter 109, the processor id's of all of the node controller components are stored, and session start messages 97 are sent to each object processor 105, (gproinit)

Upon receipt of session start messages 297 each object processor 105 stores the node routing table and initializes for processing.

Figure 13:
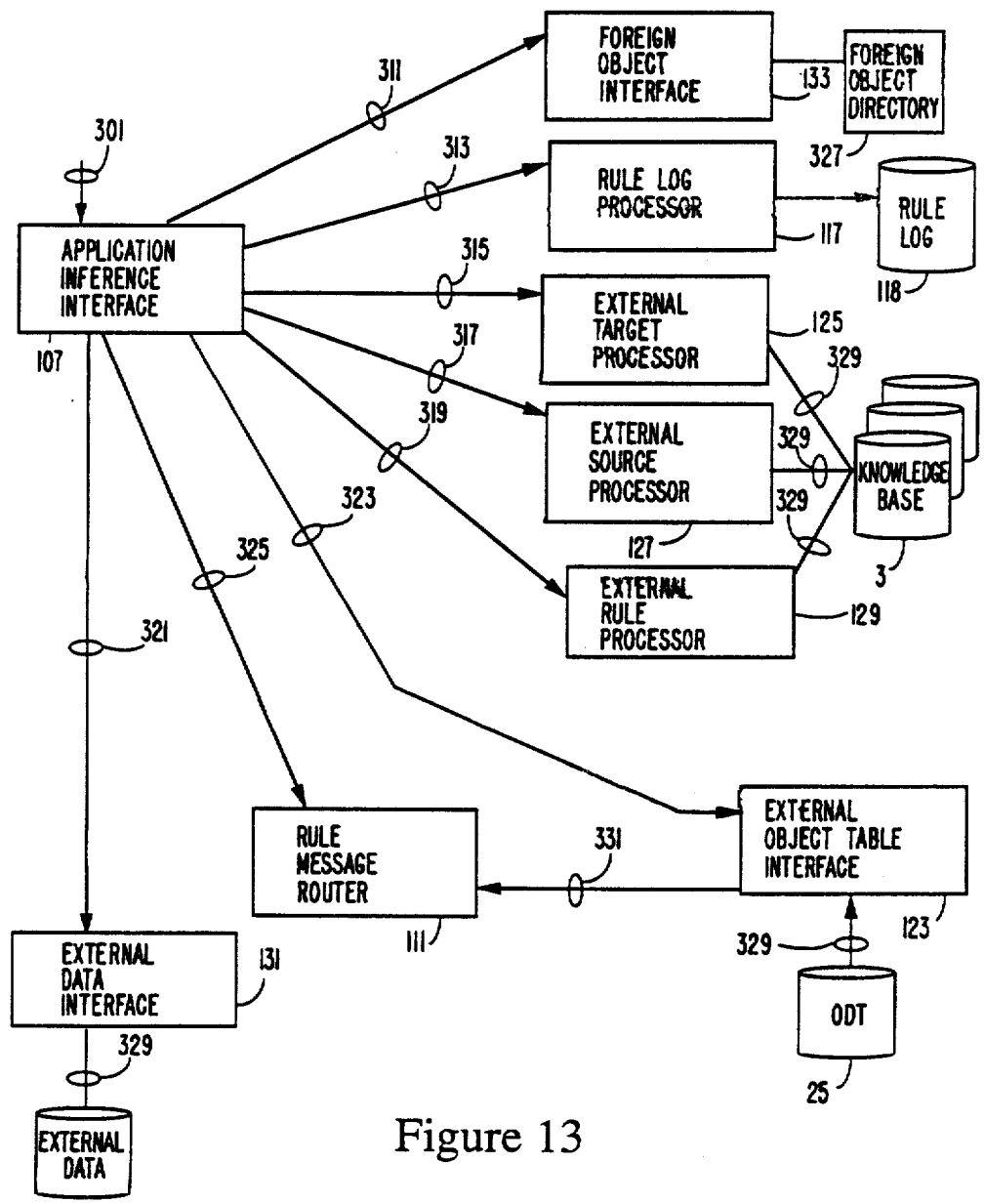
FIG. 13 is a functional block diagram showing the second phase of the startup process.

Referring now to FIG. 13, the second phase of the start up process initializes the connections between various node components and the external data sources. At the beginning of phase 2, application inference interface 107 sends a foreign object start message 311 to foreign object interface 133, an external log start message 313 to rule log processor 117, an external target start message 315 to external target processor 125, an external source start message 317 to external source processor 127, an external rule start message 319 to external rule processor 129, an external data start message 321 to external data interface 131, and an external definition start message 323 to external object table interface 123. Following the start messages, an external object request message 325 is sent to rule message router 111 for the session object. (gtsess)

When a foreign object start message 311 is received, foreign object interface 133 reads foreign object directory 327 into memory and establishes initial connection to the message passing system for the foreign messages (usually a communications channel).

When rule log processor 117 receives external log start message 313 it establishes a connection to rule log 18 or a data base processor. (guwrti)

When external target start message 315 is received, the external target processor 125 stores the identification of rule base 318 and establishes a connection 29 with the indicated data access system 79 to retrieve target index data from knowledge base 3.

When external source start message 317 is received, the external source processor stores the identification of rule base 318 and establishes a connection 329 with indicated data access system 79 to retrieve source index data from knowledge base 3.

When external rule start message 319 is received. external rule processor 129 stores the identification of knowledge base 3 and establishes a connection 329 with indicated data access system 79 to retrieve tuples from knowledge base 3.

When external data start message 321 is received. external data interface 131 stores the identification parameters and establishes a connection 329 to data access system 79 to retrieve data from relations in data bases 7.

When external definition start message 323 is received, external object table interface 123 establishes a connection 329 with data access system 79 and retrieves object definition table 25. Object table entries that define the object names used in knowledge base 3 and the usage of those objects in this session are sent to rule message router 111 by object table messages 331, (Note - it is an advantage of this system that object definitions are not a part of knowledge base 3 and that radically different behavior of the system can be effected for the same knowledge base 3 by changing object table 331 for a session e.g. in one session an object might be local and in another foreign.) (gexoc)

When external object request 325 for the session objects is received at rule message router 111, the session objects are established - see object create process below. (gto)

Figure 14:
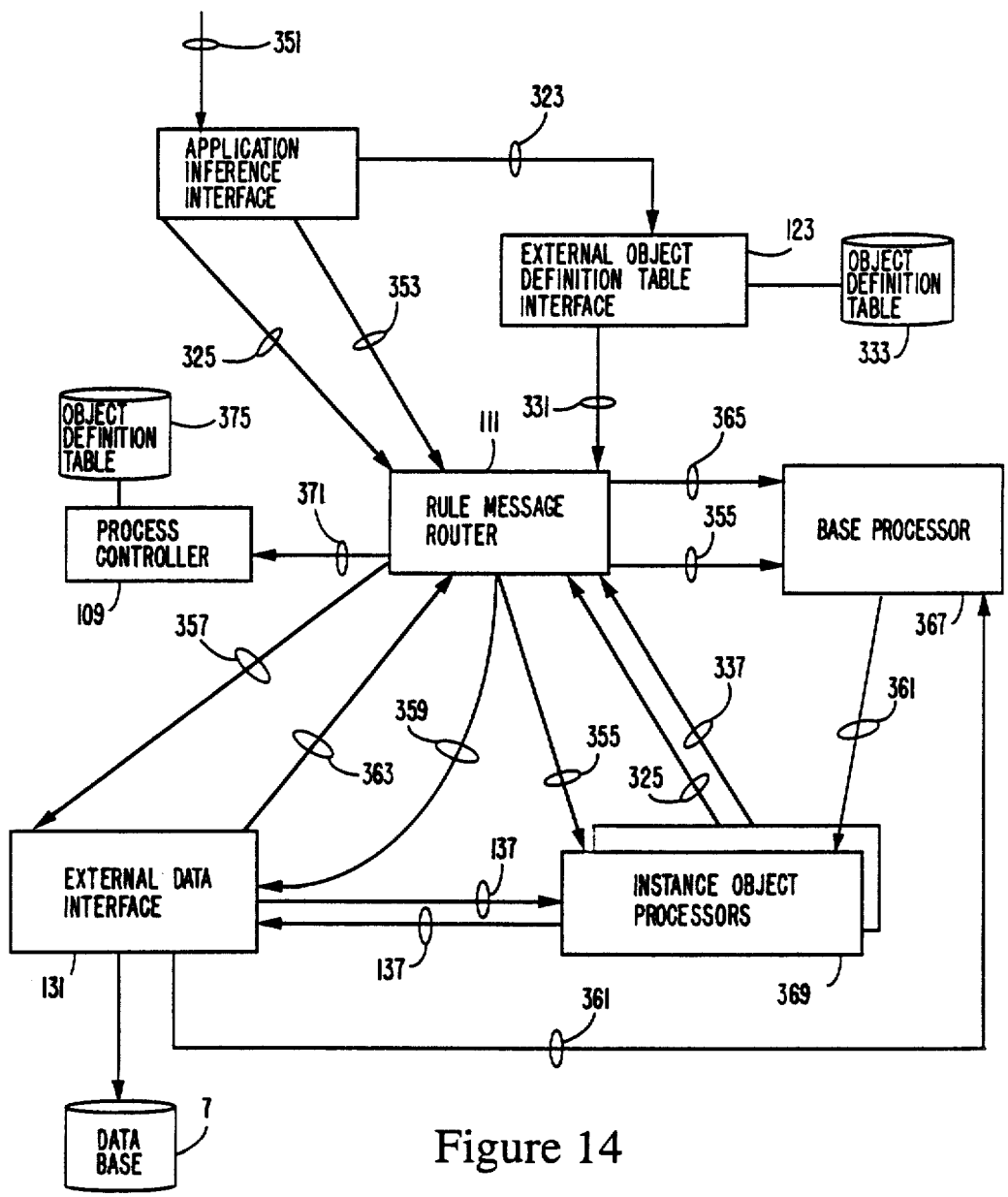
FIG. 14 is a functional block diagram illustrating the message flow in the object create process.

FIG. 14 illustrates the message flow in the object create process. The object create process begins with requests from application inference interface 107 to create objects, with implicit requests created by the references to objects in a rule, or by explicit requests to create objects in rule actions 267.

Upon receipt of a register object command 351 the application inference interface 107 sends a user instance request 353 to rule message router 111 with the processor id of an application data processor and the name of the object. AII 107 then stores the data and interface information associated with the request.

If an external object request message 325 or a user instance request message 353 is received by rule message router 111, a processor is assigned to the base object or the instance object (if the object is singular). the object is entered into the active object list and an object initialization message 355 is sent to object processor 105. If the object type is input or output, after a processor is assigned to the base object and the object is entered into the active object list, an object initialization message 355 is sent to base object processor 367 for the base object, and, if the object is input, the structured query language select statement to retrieve tuples from the external data base is assembled and sent in external data request message 357 to external data interface 131. (gto)

If a routing entry is empty in rule message 137 and the object is not in the active object list, the object name is looked up in object table 331 and, if the object type is internal, rule message router 111 assigns a processor to the object, enters the object into the active object list, and sends object initialization message 355 to base object processor 367. If the object type is external or foreign, the routing entry is left empty (zero). If the object type is foreign, a count is maintained of the requests by object. (gtoc)

External data interface 131 receives an external data request message 357 and retrieves tuples from data base 7. For each tuple, external data interface 131 first determines that the tuple is present and then sends external instance create message 363 to rule message router 111. External data interface 131 then retrieves data and waits for the receipt of external instance request 359 which contains the processor assigned by rule message router 111. This process repeats for each tuple. When the tuples are exhausted, external data interface 131 disconnects from data base 7 or the data base system, sends object closed message 361 to object processor 367, and waits for another external data request 357. (gsqla)

If external instance create message 363 or an internal instance create message 365 (resulting in a create object function being performed locally at rule message router 111) is received by rule message router 111, one of object processors 105 is assigned to the instance, instance create message 365 is sent to base object processor 367, the object is entered into the active object list, an object initialization message 355 (including the routing of the assigned external data interface 131) is sent to instance object processor 369, and, if the message was external instance create message 363, external instance request message 359 is sent to external data interface 131. (gexcn)

When external instance request 359 is received by external data interface 131 (it contains the process id of object processor 105 assigned to the instance), external data interface 131 sends the data from a tuple to instance object processor 369 for the instance in a rule message 137. (gsqltup)

If object processor 105 is assigned to an object by rule message router 111, a processor active message 371 is sent to process controller 109. (gtox)

When an insert or write action is performed by object processor 105, the indicated variables are assembled into rule message 137 and a tuple in the form of a rule message 137 is sent to external data interface 131.

When a rule message 137 containing a tuple is received by external data interface 131, the tuple is written to data base 7 for the object.

When processor active message 371 is received by program counter 109, the entry for that processor in a process control table is updated to show active status. (gprocps)

Object initialization message 355 causes object processor 105 to initialize the object control table with the object name, status, type and related data object queues. (sobjinit)

Instance create message 365 causes base object processor 367 to add the processor id of the new instance to the instance list and then make new rule messages 137 by copying each rule on the base object queue, adding an instance number to rule header 203, and updating the routing from the base routing to the instance routing. These new rule messages 137 are then sent to the active rule processor 115 for entry into the active rule list. (gexcnc)

When object closed message 361 is received at object processor 105, for each spawn rule in the spawn rule list, a spawn rule message is sent to active rule processor 115 with rule number 213 and instance of the spawn rule. The object control area is then marked closed. (sobjclos)

When rule actions 267 in a true rule are being processed by object processor 105, if rule action 267 is a structured query language (SQL) select, the SQL statement is assembled and external object request message 325 is sent to rule message router 111. (gasqlsel)

If a create object action is processed at object processor 105, the rule is marked as a create object rule message 377 and is sent to rule message router 111. (giry)

Figure 15:
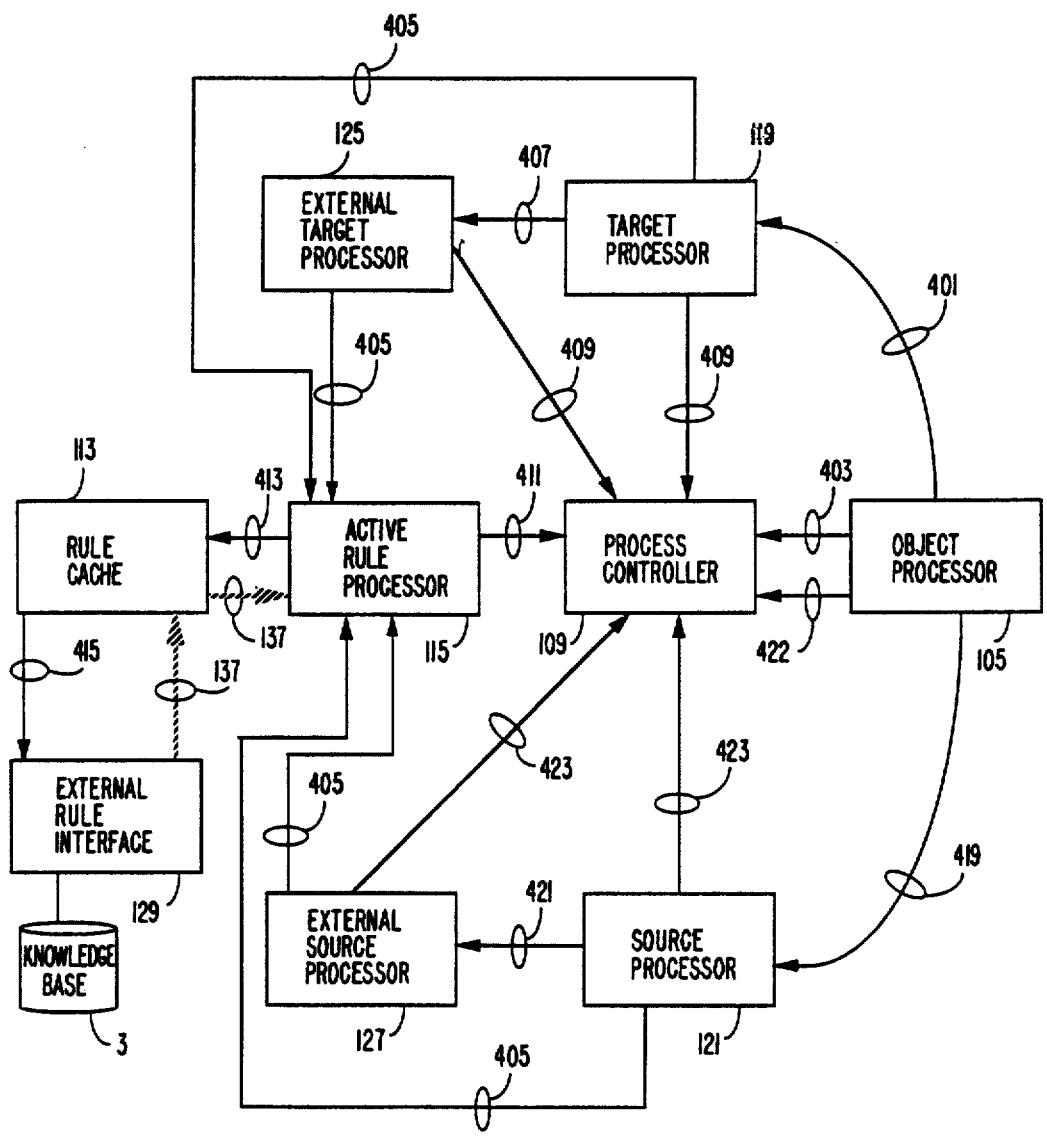
FIG. 15 is a functional block diagram of the message flow of the rule request process.

FIG. 15 shows the rule request process. This process implements forward or backward chaining and provides for the accounting of rule movement required to determine when all rules have been received and entered the inference process.

When a variable is stored at object processor 105. the type of store request is examined. If the request is a simple request and the object is the highest object in the sub-object chain, the variable is forward chained by sending a forward request message 401 to target processor 119 and a target notice 403 is sent to process controller 109. If the request is for a not-forward request, the variable is stored and the type of not-forward request is stored in the variable control area. (Types of not-forward requests are: 'e'-existence pending and 'r'-completion request pending.) (stshdat)

If forward request message 401 is received, target processor 119 searches the target list and sends a rule request message 405 to active rule processor 115 for each matching target list entry found and then sends an external forward request message 407 to external target processor 125. Target processor 119 then sends a target receipt message 409 with the count of the number of rule numbers found to process controller 109. (gtgtreq)

When external forward request 407 is received, the target index is searched in knowledge base 3 on DASD 89 and any rule numbers retrieved are added to the external target rule list along with the rule's condition count less one. If the rule number is already in the external target rule list, the condition count is decremented by one. When the condition count is decremented to zero, the rule number is sent in rule request message 405 to active rule processor 115. Following processing of external forward request 407. the number of rule request messages 405 sent is placed in target receipt message 409 and sent to process controller 109. (getta)

If rule request message 405 is received, active rule processor 115 searches the active rule list for a matching rule number. If an entry is found for a rule that is processing, the entry is marked with a request pending flag and a rule receipt message 411 is sent to process controller 109. If no entries are found, a cache rule request message 413 is sent to rule cache 113. (gnwtgreq)

When cache rule request message 413 is received by rule cache 113, the cache is examined for the presence of rule message 137. If the rule is present, rule message 137 is sent to active rule processor 115. If the rule is not present in rule cache 113, rule cache 113 sends external rule request 415 to external rule processor 129. (gtcruler)

When external rule request 415 is received, the requested rule is retrieved from knowledge base 3, prepared for processing, and sent to rule cache 113. (getru)

If rule message 137 is a new message, active rule processor 115 enters the rule into the active rule list, sends rule message 137 to rule message router 111, sends rule receipt message 411 to process controller 109, and adds one to the active count. If rule message 137 is an old message (this is determined by the presence of a rule list pointer in the message), active rule processor 115 determines whether the rule should be forwarded to the routing process or entered into an inactive state. This is done by examining the status of the rule and the progress flag of the rule, (Each rule contains a progress flag that is set by an object processor that is able to determine a condition or complete an action.) Rules determined to be false or determined true for which all actions are complete are marked complete in the active rule list. Rules determined true for which actions remain uncompleted and unexamined are forwarded to rule message router 111. Undetermined rules that have unexamined conditions are forwarded to rule message router 111. Undetermined or incomplete rules are examined to see if progress was made during the rule's last journey through object processors 5. If progress was made or there is a request pending for the rule in the active rule list, the rule's routing is reset to the front of object routing list 211 and the rule is forwarded to rule message router 111. Otherwise, it is marked suspended in the active rule list and stored. Rules forwarded to rule message router 111 are marked as processing in the active rule list. (gnwtg)

When a request is made for a variable, the linked list is searched and, if the variable name is found in the linked list, the variable is passed to rule interpreter 159. If the variable is not found, the type of request is examined. If the request was a backchain request, a backchain request message 419 is sent to source processor 121 and a source notice 422 is sent to process controller 109. (stshvar)

If backchain request message 419 is received by source processor 121, the source list is searched and, if any entries are found, rule request message 405 is sent to active rule processor 115; then an external backchain request 421 is sent to external source processor 127 and a source receipt message 423 with the count of the number of rule request messages 405 sent from this request is sent to process controller 109. (gsrc)

When external backchain request 421 is received by external source processor 127, the source index is searched in rule base 318, and any rule numbers retrieved cause rule request message 405 to be sent to active rule processor 115. Following processing of an external backchain request 421 the number of rule request messages 405 sent is placed in source receipt message 423 and sent to process controller 109. (getso)

When source notice message 422 or target notice message 403 is received by process controller 109, two is added to the source count or target count respectively. (gtptnote)

When source receipt message 423 or target receipt message 409 is received by process controller 109, one is subtracted from the source count or target count respectively and the message's rule count is added to the transit count. (gtptrecp)

When rule receipt message 411 is received by process controller 109, one is subtracted from the transit count. These counts are used to determine activity levels and idle point. (gtptrans)

Figure 16:
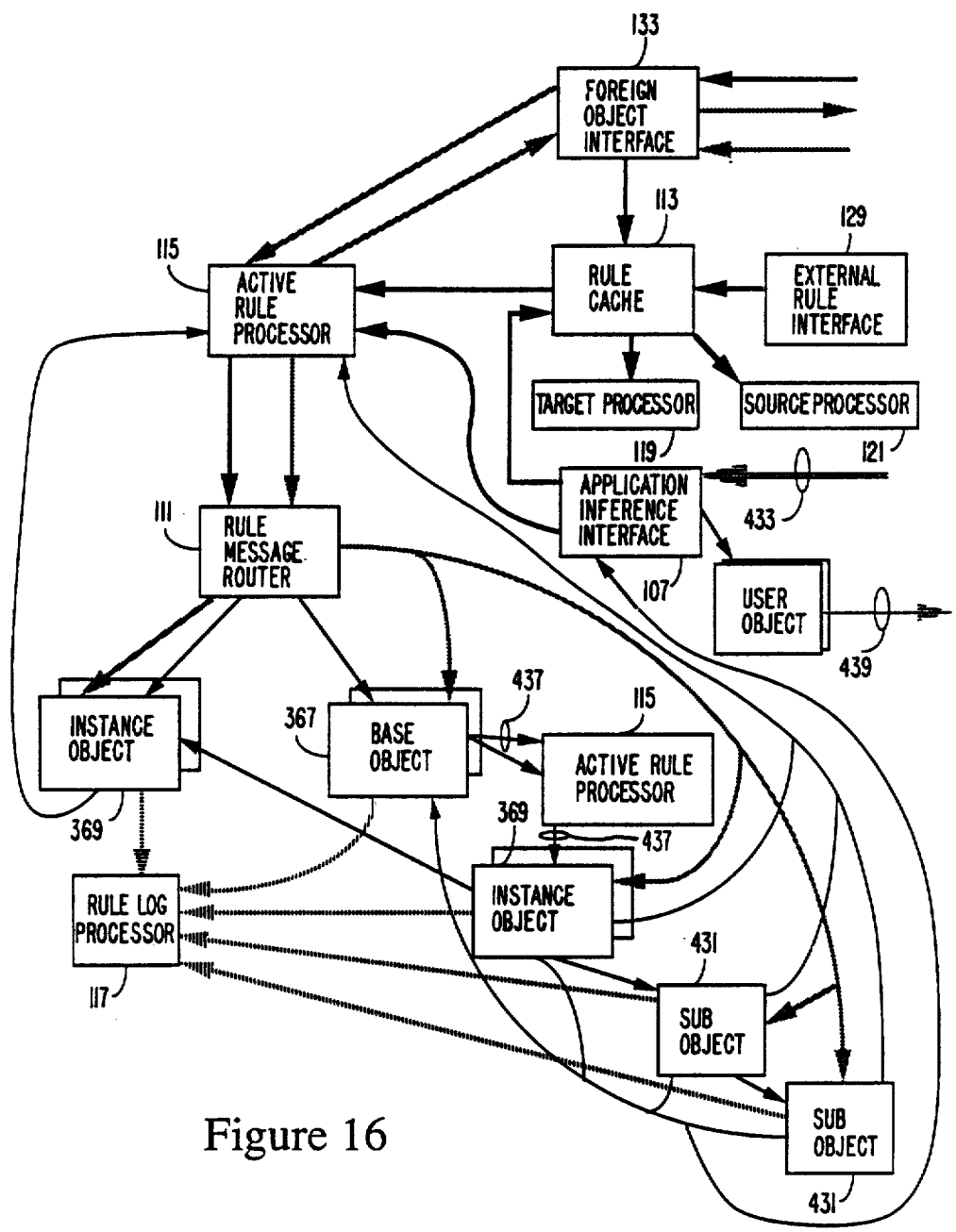
FIG. 16 is a functional block diagram of the rule message flow of the accounting and routing processes.

FIG. 16 shows the flow of messages beginning with their entry at application inference interface 107, external rule interface 129, or foreign object interface 133, and then proceeding through the routing process, the interpreting at object processors 105, and ending when the rule is completed or suspended at active rule processor 115 and optionally logged.

When external rule interface 129 receives a request for a rule in external rule request message 415 it retrieves the rule from knowledge base 3 and formats it into rule message 137, if necessary. (In the prototype rules are stored on knowledge base 3 as either rule messages 137 or as relational tables. If stored as relational tables, the rule must be transformed into a rule message 137 for processing.) After being retrieved, rule message 137 is sent to rule cache 113. (getta)

When rule message 137 is received, it is stored for subsequent use, and sent to target processor 119 and source processor 121. If the rule is a new external rule. it is sent to active rule processor 115. (gtcrule)

Rule messages 137 begin processing by being sent to active rule processor 115 by some other component. This other component may be application inference interface 107. in which case rule message 137 may be referred to as an assertion (generally assertions, or facts, are rules that are defined to be true and only have actions-internally in the prototype such rules are identified by negative rule numbers). If a suspended entry is found, the entry is marked processing and processing of rule message 137 is resumed by sending rule message 137 to rule message router 111. (gnwtg)

When rule message 137 is received, rule message router 111 first fills in any empty routings in the message by looking up the object name in the active object list. Then rule message router 111 fills in the destination from the next object processor 105 on object routing list 211. A next routing counter is incremented in rule message 137 and rule message 137 is forwarded to a destination object processor 105. This might be instance object processor 369 if the object is singly instanciated or base object processor 367 if the object has multiple instances. (gtoc)

When processed at instance object processor 369 by local routing updater 165, object routing list 211 is updated to the next routing. If object routing list 211 is exhausted, the rule is marked exhausted and the rule is forwarded to active rule processor 115. (gtob)

If rule message 137 arrives at base object processor 367 it is processed by rule queue manager 155 where rule message 137 is stored for later processing in the spawn rule list so that, when new instances are created, the rule can be spawned to instance object processor 369 related to base object processor 367. When a new instance for a base object is created, all stored rules are spawned to the new instance (see object create process, FIG. 14). When a rule is stored, a notice is sent to active rule processor 115 by copying the rule and marking the status as c, complete. In this way active rule processor 115 is notified that the rule has been captured at the base object and will no longer need to be considered for completeness processes. The new copy of the original rule (rule spawn 437) is also sent to active rule processor 115 so that completeness processing can consider that rule. The rule spawn 437 will be considered as a new rule by active rule processor 115 and processed as above. At this point, the base object routing has been updated to the routing of the related instance object processor 369 so the rule spawn 437 will be routed to the instance object processor 369 after processing by active rule processor 115. (girx)

If rule message 137 is determined to be false or is determined to be true and complete, then, following processing at instance object processor 369, rule message 137 is sent to active rule processor 115. This is done so the completion of the rule can be noted by active rule processor 115. (gtob)

Following processing at instance object processor 369 or sub-object processor 431, if the rule is determined true or is undetermined, the rule is processed by a subobject router 163, (gtob) where it is examined for the presence of sub-objects of the instance object. If sub-object routings are found, all like sub-object routings in the rule are updated with the routing from the sub-object list from the object control area, and the rule is passed to local routing updater 165. This will cause the rule to be routed to sub-object processor 431 for processing of conditions or actions referencing the sub-object processor 431. If object routing list 211 is exhausted, the rule is forwarded to active rule processor 115.

If rule logging was specified in object initialization message 355, a copy of rule message 137 is sent to rule log processor 117 after the rule is processed by rule interpreter 159. (giry)

Upon receipt of a user request command 435. application inference interface 107 constructs one or more rule messages 137 and sends them to active rule processor 115 (Note - all assertions for a user object that is controlled by the default object processor 105 must be contained in a single assertion rule otherwise UNKNOWN or existence processing will be subject to asynchronous effects leading to contradictions). (gtaiir)

Upon receipt of rule message 137 from a node component, application inference interface 107 returns result 439 to application program 5. If the message contained a goal or the function terminated processing. application inference interface 107 sends a control stop message to process controller 109 (see FIG. 21). If rule message 137 is routed to application program 5, rule message 137 is passed to the application processor by application inference interface 107.

When a rule spawn 437 message is received by active rule processor 115, the rule and instance are added to the active rule list and the rule is routed to the next object processor 105. When a queued rule message 137 is received, the rule and instance are searched for in the active rule list and the entry is marked completed. (gnwtg)

When active rule processor 115 receives a completed rule it marks the active rule list entry for that rule complete and one is subtracted from the active count. When the active count is reduced to zero, an active idle message is triggered (see FIG. 18). When a rule is incomplete and object routing list 211 is exhausted, the rule is marked suspended in the active rule list. (gnwtg)

When rule message 137 is received by rule log processor 117, it adds the transaction identification to rule message 137 and writes rule message 137 to rule log 118. (guwrt)

When rule message 137 is received at instance object processor 369 it is processed by rule queue manager 155. At rule queue manager 155, one is added to the object rule count. If the process stop flag is on, new rule messages 137 are ignored. Rules are first processed by undetermined object queue manager 157 (girx) where, if the object is undetermined and the rule is not a SQL rule targeted for this object, the rule is queued in the undetermined object queue and a queued rule message with the rule and instance number is sent to active rule processor 15. If the rule is a SQL rule targeted for this object. the rule is passed to rule interpreter 159 for evaluation. Following evaluation, if the object's status is true, the previously queued rules are passed singly to rule interpreter 159. If, following evaluation, the object's status is false, the queued rules are marked false and forwarded to active rule processor 115. (gtpy)

The last process that occurs on instance object 69 or sub-object 431 is performed by local routing updater 65. Here rule message 137 is searched to determine if any rule conditions 251 remain unexamined or, for rules already determined true, if any rule actions 267 remain incompleted. If such entries are found, then local routing updater 165 fills in the destination from the next object processor 105 on object routing list 211. A next routing counter is incremented in the rule and the rule is forwarded to next instant object 369, sub-object 431, or base object 367. (gtob)

Figure 17:
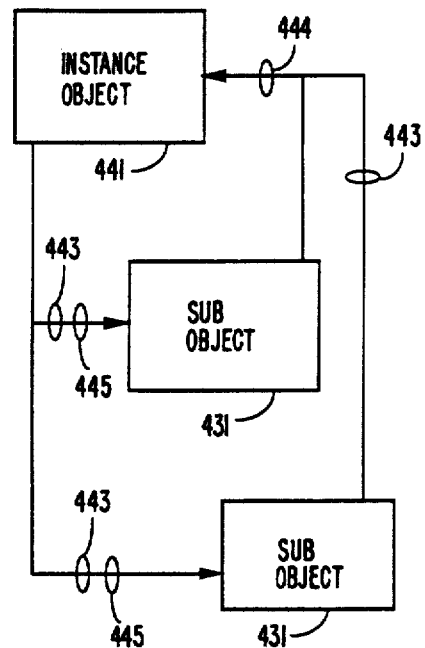
FIG. 17 is a functional block diagram of the data message flow through the object and sub-object processors.

FIG. 17 shows the flow of data from object processor 105 where a variable is determined to that tuple's instance object 441 and sub-object processors 431, and the flow of variable deletes.

Whenever a variable is stored by rule action 267, or a variable message is received (stshdatr), the variable control area is checked to see if the object is the highest level object in a sub-object chain. If it is, the store request is placed in store message 445 and store message 445 is sent to each sub-object processor 431 on the sub-object list, (stshdel, stshdelr) Likewise a delete request at the highest level object causes a delete message 443 to be sent to each sub-object processor 431 on the sub-object list. (stshdat)

If the object is not the highest level object and a store request is processed from an action, the variable is stored and the store request is placed in a variable message 444 and is sent to the highest level object, Likewise (shshdel), if a delete request is processed at sub-object processor 431 a delete message 443 is constructed and sent to the highest level object and the variable is deleted from sub-object processor 431. (stshdatx)

This process propagates variable updates through all the projections of an object. Forward firing occurs only at the highest level.

Figure 18:
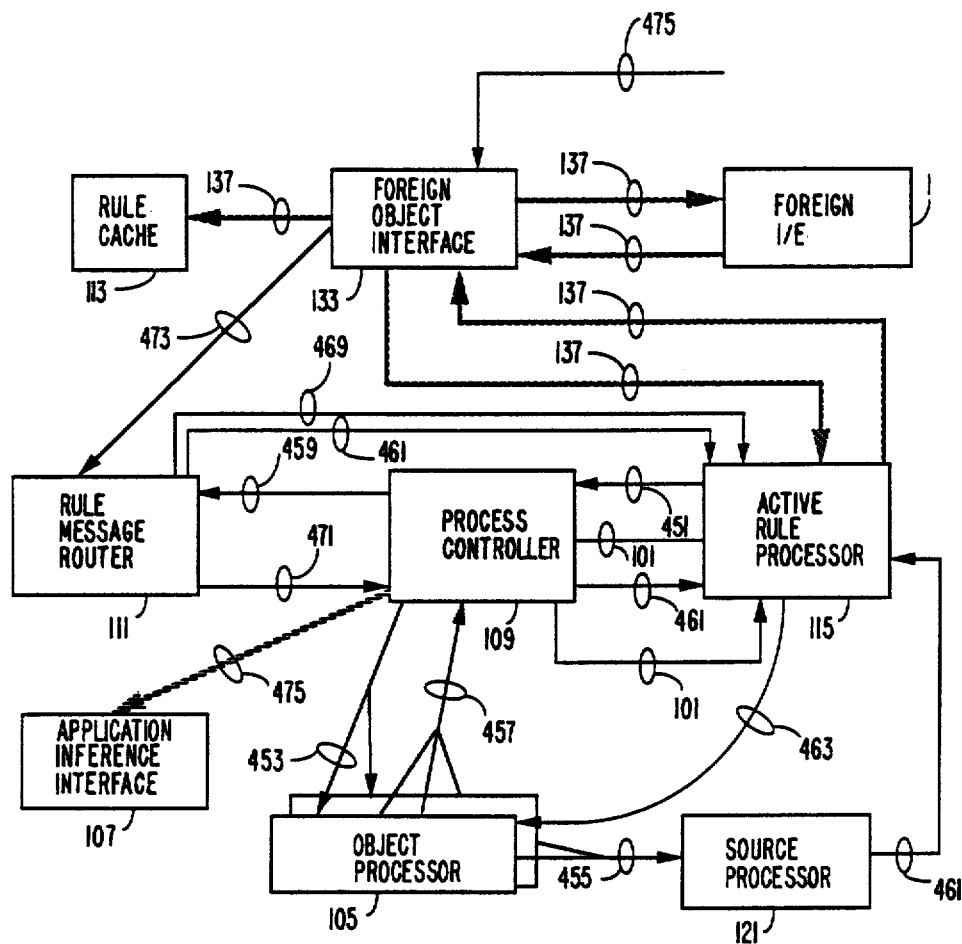
FIG. 18 is a functional block diagram of the message flow in the system completeness and system idle processes.

FIG. 18 shows the flow of messages beginning when process controller 109 first determines that the system may be becoming idle. First the queues and lists are interrogated to determine if the system is actually idle or if asynchronous processing caused the system to momentarily appear idle. Then process controller 109 attempts to exhaust its options to start the process moving again. Finally, when all options have been exhausted, the session is determined to be idle.

If while active rule processor 115 is processing rule message 137 that has returned to active rule processor 115 the active count becomes zero, an active idle message 451 is sent to process controller 109. (gnwtg)

When active idle message 451 is received at process controller 109 and the transit rule count, the source count, and the target count are all zero, a processor idle message 453 is sent to all object processors 105 and the corresponding entries in the process control table are marked as waiting. (gtpaidl)

If processor idle message 453 is received by object processor 105, the variable list is searched for variable entries marked existence pending or completeness requested. For each existence pending or completeness requested entry found, a completeness check message 455 is sent to source processor 121. Following the search of the variable list, an object status message 457, including the current value of the object rule count and the number of completeness check messages just sent, is sent to process controller 109. (gtpycnts)

When object status message 457 is received, the process control table entry for object processor 105 is accessed and updated to remove the waiting status and the completeness check count in the message is added to the completeness count. If object status messages 457 have been received from all the object processors 105 and the completeness count is zero and the transit rule count, the source count, and the target count are all zero, then a foreign request 459 is sent to rule message router 111. (gprostat)

When completeness check message 455 is received by source processor 121, for each rule number that is a source for the variable a completeness request message 461 is assembled from and forwarded to active rule processor 115. (gsrcexst)

If completeness request message 461 is received by active rule processor 115, all the rules with the same rule number in the message are searched for in the active rule list and the status of each instance of a rule is examined. If all rules in the request, and spawns of those rules, that apply to the object or the sub-objects of the object referred to in completeness request message 461 are complete, then the variable in the completeness request is considered complete and complete status is set in a completeness notice message 463, otherwise a not complete status is set in the completeness notice message 463. At this point, completeness notice message 463 is sent to object processor 105. (gnwtgexs)

If completeness notice message 463 is received and the message status is complete and all completeness notice messages 463 have been received for the variable, the variable s status is updated and a forward request message 401 is sent to target processor 119 to forward fire the variable. If the variable entry was marked completeness pending it is marked complete: if it was marked existence pending, it is marked not exists. Following processing of completeness notice 463, a completeness receipt message 465 is sent to process controller 109 containing the number of forward request messages issued. (stsobjet)

When completeness receipt message 465 is received, one is subtracted from the completeness count and the forward request count in the message, times two, is added to the target count. If, following the processing of all completeness receipt messages 465, the completeness count. and the target count are zero then no new variables were fired from completeness request messages 461, and foreign request message 459 is sent to rule message router 111 in order to trigger activation of a foreign processor.

If foreign request message 459 is received, rule message router 111 selects a foreign object from object table 331 and sends a foreign transmit message 469 to active rule processor 115. If no foreign objects are found, rule message router 111 sends a foreign end message 471 to process controller 109.

When foreign transmit message 469 is received, active rule processor 115 searches the active rule list for rules that have the same object name as the one in the message and that are suspended, For each active rule list entry found, active rule processor 115 sends the rule message 137 to foreign object interface 133, sends a copy of rule message 137 to rule log processor 117, and marks the active rule list as processing. (gnwtgdmp)

When rule message 137 is received at foreign object interface 133, a session is established with foreign I/E 1, if one is not already established, the transaction is initiated with foreign I/E 1, and rule message 137 is sent to foreign I/E 1. (guwrt)

If rule messages 137 are received from foreign I/E 1 and they are local to the current knowledge base, they are sent to active rule processor 115. If they are foreign to the current knowledge base, they are sent to rule cache 113 as a new external rule.

If system idle message 475 is received from foreign I/E 1, foreign complete message 473 is sent to rule message router 111 for foreign I/E 1.

If foreign complete message 473 is received by process controller 109, object table 331 is updated with the status and active request message 467 is sent to active rule processor 115. (gprocfem)

When an active request message 467 is received by active rule processor 115, the active rule list is searched for an entry marked processing. If no such entries are found, an active idle message 451 is sent to process controller 109. (gnwtgcnt)

When foreign end message 471 is received at process controller 109 it contains the count of the number of foreign transmit messages sent by rule message router 111. If that count is zero, a system idle message 475 is sent to application inference interface 107. (gprocfem)

Figure 19:
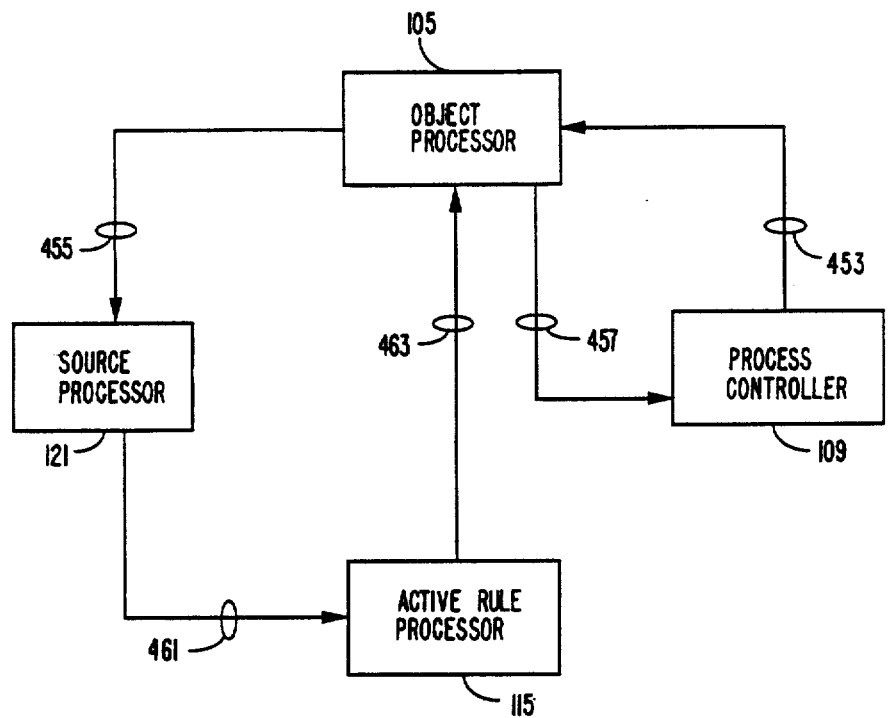
FIG. 19 is a functional block diagram of the message flow in the variable completeness process.

FIG. 19 shows the details of the process for determining that a variable that has been operated upon by an operator requiring completeness has been fully determined.

Once process controller 109 has determined that processing is quiescent on object processors 105 it sends a process idle message 481 to each object processor 105. (gtpaidl)

When object processor 105 receives process idle message 481, it sends completeness check message 455 to source processor 121 for each variable that requires completeness and adds one to a count of sent messages. (gtpycnts)

At source processor 121, when completeness check message 455 is received, the source index is searched for all rules containing the referenced variable as the target of a rule action 267. For all such rules a completeness request message 461 is sent to active rule processor 115. (gsrcexst)

When active rule processor 115 receives completeness request message 461, it looks the rule number up in the active rule list. If all rules with that rule number are complete, the resulting status is complete otherwise it is incomplete. The resulting status is placed in completeness notice message 463 and sent to object processor 105 that sent the associated completeness check message 455. (Note—the last completeness request message 461 contains the count of the number of messages for this variable which is forwarded in the completeness notice message 463. (gnwtgexs)

When completeness notice message 463 is received back at object processor 105, if the status is complete and all completeness notice messages 463 have been received, the status of the variable is updated and the variable is forward fired. The count of completeness check messages is reduced. If that count is zero an object status message 483 is sent to process controller 109 containing the number of forward firings due to completeness. (stsobjet)

Figure 20:
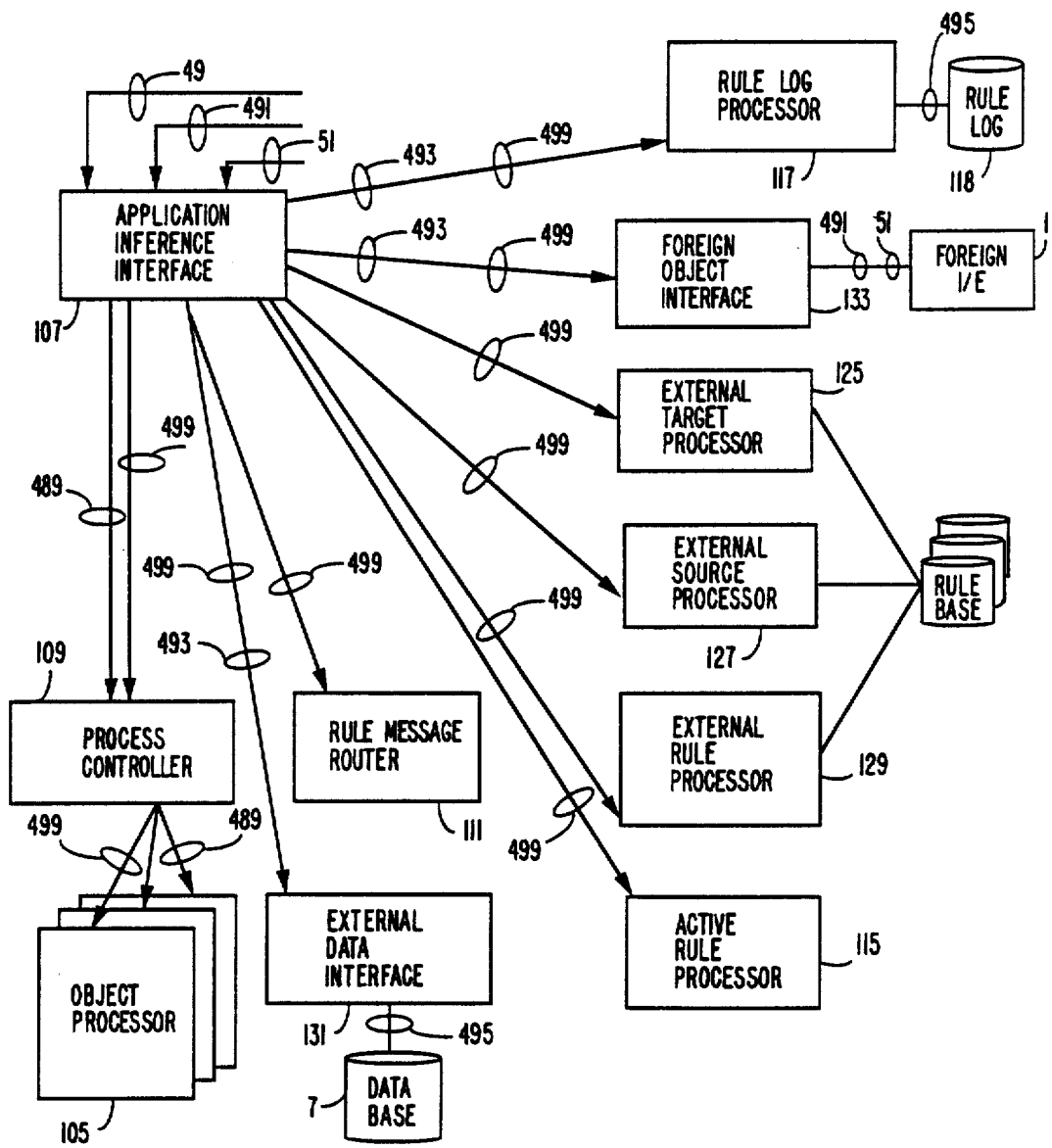
FIG. 20 is a functional block diagram of the message flow in the transaction bind, commit, and end processes.

The transaction bind process, commit process, and end process are shown in FIG. 20. These processes synchronize the internal events of the processors with the transaction bounding protocol as directed by application program 5.

Upon receipt of transaction start command 49 at AII 107, a transaction start message 489 is sent to process controller 109. (gtsproc)

When transaction start message 489 is received, the process control table is initialized, all counts and flags are reset, and transaction start message 489 is sent to all object processors 105. (gtproc)

When transaction start message 489 is received at object processor 105, all work areas are initialized and counters are reset.

Upon receipt of a synchpoint command 491 from application program 5, application inference interface 107 sends a commit message 493 to foreign object interface 133. rule log processor 117, and external data interface 131. (gtsynch)

When commit message 493 is received by foreign object interface 133, synchpoint command 491 is sent to active foreign I/E's 1.

When commit message 493 is received by external data interface 131, a commit command 495 is issued to external data processor for the data base.

When commit message 493 is received by rule log processor 117, commit command 495 is issued to rule log processor 117 for rule log 118.

Upon receipt of transaction end command 51, application inference interface 107 sends transaction end message 499 to each of the node controller components. (gtranend)

When transaction end message 499 is received at rule log processor 117, a transaction end record is written to the rule log 118 and a commit command is issued to the processor for rule log 118.

When transaction end message 499 is received at foreign object interface 133, transaction end command 51 is issued to active foreign I/E s 1.

When transaction end message 499 is received at external target processor 125, data retrievals in progress are interrupted, and external target rule list is freed and re-initialized.

When transaction end message 499 is received at external source processor 127, any data retrievals in progress are interrupted, and source target list is freed and re-initialized.

When transaction end message 499 is received at external rule processor 129, external rule processor 129 interrupts any retrievals in progress.

When active rule processor 115 receives transaction end message 499, it frees active rule list and all rules being held in suspended state.

When rule message router 111 receives transaction end message 499 it resets the foreign object controls and initializes object table.

When external data interface 131 receives transaction end message 499, it issues commit command 495 to data base management system 21 for data base 7.

When process controller 109 receives transaction end message 495 it issues transaction end messages 499 to object processors 105. (gprotend)

When object processor 105 receives transaction end message 499 it frees all spawn rules and any queued rules. initializes the object control areas, and all counts.

Figure 21:
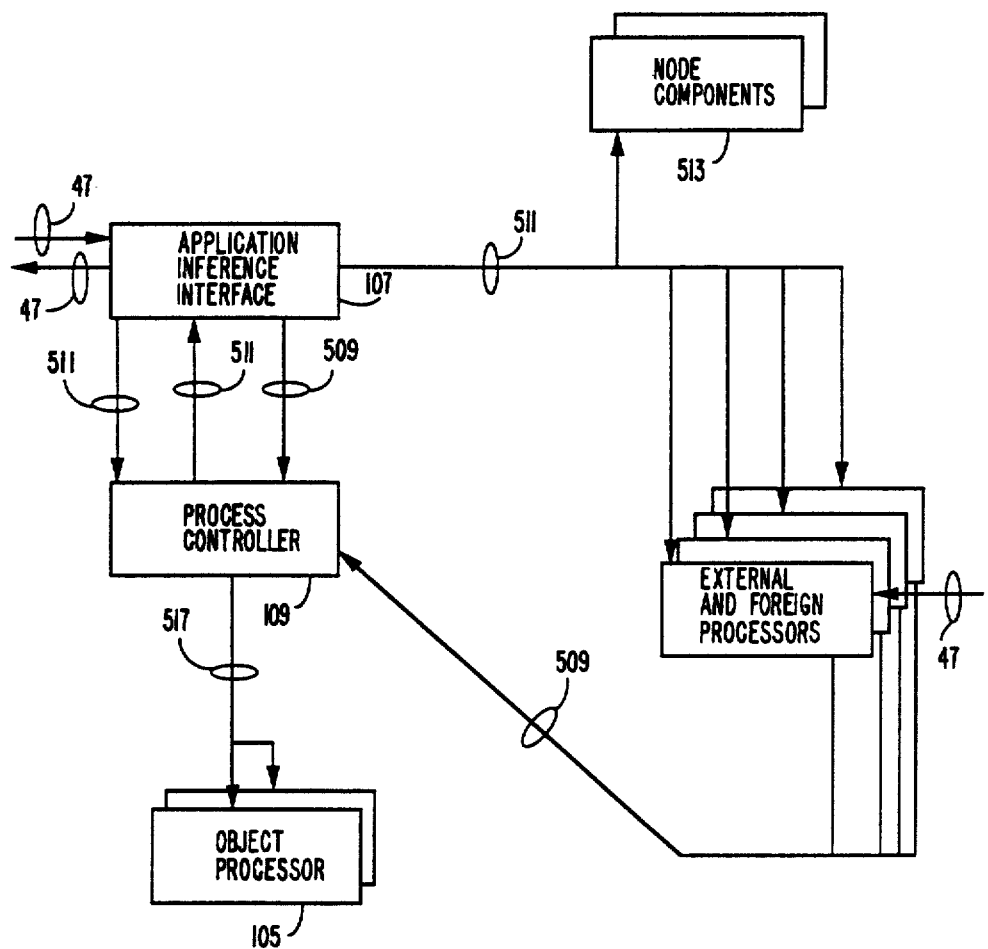
FIG. 21 is a functional block diagram of the message flow in the session end and system error processes.

FIG. 21 illustrates the session end and system error processes. Both of these processes stop processing in all the components and end the session.

When any component encounters an error that must terminate the session it sends a control stop message 509 to process controller 109. Control stop message 509 contains the error code and the identification of the component. That information is returned to application program 5.

Upon receipt of session end command 47 from application program 5, application inference interface 107 sends session end message 511 to each node component 513 and causes the node controller components and object processors 105 to be freed thereby terminating the session. (gtsesend)

When any node component receives session end message 511, it notifies its external interfaces of a termination and ends processing. (various)

When a control stop message 509 or session end message 511 is received at process controller 107, a process stop message 517 is sent to all active object processors 105 and session end message 511 containing the error code is sent to application inference interface 107.

Upon receipt of session end message 511. application inference interface sends session end message 511 to all node component processors, unless one has previously been sent, and returns the ending status to application program 5. (gtailerr)

If process stop message 517 is received by object processor 105, the process stop flag is set so that all further rule processing will be stopped.

If session end message 511 with an error code is received from foreign object processor 105, control stop message 509 is sent to process controller 109.

If an error occurs in application inference interface 107 or in the protocol with application program 5. application inference interface sends control stop message 509 to process controller 109.

ANNOTATED EXAMPLE

The previous descriptions of the various parts of the Gnome system illustrate the way the Gnome system works. Now, an example is presented to walk through the workings of the system. This example shows the flow of a set of rules through some of the Gnome processors. The example takes knowledge base 3 and a set of assertions and captures each rule as processing of that rule is completed on object processor 105. The example shows only the indirect effect of processing done at node components. The rule trace for the example is from rule log 118. A rule is only logged when it is leaving object processor 105.

Example knowledge base illustrates a simple case of temporal and default logic. In example knowledge base, a scene is created when an assertion is made for the variable JOEEMOTE. A second scene is created if the first scene exists. In any scene, if there is no evidence that John is dead then John is assumed to be alive. If John is alive, and Joe is mad, and Joe's gun is loaded then Joe will shoot If John is shot, he dies.

Example knowledge base consists of seven rules which are shown in Sartre format in FIG. 22. The first rule (Rule00001) creates the first scene when the variable SESSION.JOEEMOTE exists. Note that the use of the EXISTS operator in the single condition of this rule causes it to be true for any value of JOEEMOTE. The values of JOEEMOTE and GUNLOADED are transferred to the SCENE object created.

Rule00002 tests whether, in any scene, Joe is mad, the gun is loaded and John is alive, and, if all three conditions are true, sets JOHN SHOT to true.

Rule00003 queries whether there is any evidence that John is dead, and, if none is found, sets JOHNALIVE to true. This rule because it contains a EXISTS operation is required to have a positive condition. The variable OBJID exists for each object (it is internally assigned if not provided in the operation) and consequently is used in this rule to force it to be evaluated.

Rule00004 creates the second scene after the first scene is created.

Rule00005 this is the temporal rule that uses the fact that the object ids have been assigned sequentially and therefore the object id of one scene will be higher than its predecessor. This corresponds to a later moment in time. 20 The rule sets JOHNDEAD true if in the prior scene JOHNSHOT was true.

Rule00006 and Rule00007 are SQL rules for the subobjects ANY and OTHER. These rules make all instances of the object SCENE members of the sets SCENE.ANY and SCENE.OTHER. These rules are required because Rule00005 refers to two different instances of SCENE by the qualifications ANY and OTHER. These qualifications are required in order to make unambiguous which set the rule refers to. (see Sartre for a more complete explanation of the use of object qualifications.)

FIG. 23 shows the assertions that go into the example session of Gnome. Assertions are in the same form as rules except that they have a single condition which has the operation Assert (A), which is always true, and they 35 have a negative rule number. Rule-0001 sets JOEEMOTE to MAD, and Rule-0002 sets GUN-LOADED to TRUE. Note that these rules set their values into the SESSION object. The assertion could have directly created the SCENE object but crafting the rules in this way will illustrate the transport of variables between objects more clearly.

FIG. 24 shows the object definitions for the example session. Session is defined as a default type object, e.g., singly instanciated and automatically created by reference. Scene is defined as an output object; the base object is created upon reference and instances are created by explicit create object operations. Scene, any and Scene.other are defined as sub-objects.

FIG. 25 shows the results of the example session using the example knowledge base, assertions, and object definitions, Section (1) shows the loading of the seven rules from the example knowledge base, four definitions, and the two assertions. Section (2) shows the objects and their variables following the session. On the output, several values follow on the line identifying the object by name (3). Immediately following the object name in parenthesis, is the instance number. Then follow the object type: b base object, i instance. Following the type is the processor id (Proc), and the Status: t true, f false, u undetermined, The Hi parameter is the value of the higher object in the sub-object list, Following that is the Open or Closed status of the object and the Use: u user, blank undefined.

FIG. 26 shows the rules from the example knowledge base as they appear when they have been retrieved from the example knowledge base and transformed into rule messages 137. This listing shows the contents of the sections of rule message 137 and the meaning of each value. The value 00001.000 at (1) is the rule number and instance number for Rule00001. The instance number is zero because this is the base rule from the example knowledge base. The value at (2) is the previous instance number which only has significance for spawned rules. The type value at (3) and (4) is "r" for all rules except those containing SQL expressions in which case the type is "s". The status (5) is initially blank and becomes t when the rule is true and f when it is false. The progress flag (6) is initially set to n and changed to p by any object processor 105 that determines a condition or completes an action. The two values following the node-pid title (7) are the routing pointer and the current routing. The routing pointer is the number of the current routing (relative to 0): The current routing contains the processor node and processor id of the processor for the associated object: when the current routing is zero, the rule has no current routing. On the second and third lines of the listing (8) are displacement values for the offset into the rule for the routing list, the conditions and actions (predicate), the data portion of the rule (datadisp). and the variable addition section (var-disp).

The routing section of the rule (9) contains one entry for each variable or value in a condition or action. For each routing entry, four values are shown. Side is 01 if the routing entry is for a condition (LHS). 02 if the routing entry is for an action (RHS), or 04 if the entry is determined and no longer of interest. If valdisp contains a value, it is the displacement into the data section of the rule of the value. Proc is the value of the object processor 105 for the variable, if one has been assigned. otherwise the value is zero. Object name is the displacement into the data portion of the rule for the object name value. On the listing. to the right of the routing values is shown the value or the object name value from the data portion of the rule.

Rule condition 261 and rule action 267 portions of the rule (10) show the type: 01 condition (LHS), 02 action (RHS), 04 condition or action completed: the status of the entry, u undetermined or uncompleted, t true condition, f false condition, c completed action, The targ and srce values are the displacement (relative to 1) of the routing entry corresponding to the target and source variables in rule condition 261 or rule action 267. The oper value is the binary token assigned to the operator.

Beginning at the data displacement, the object names and variable values are placed serially, The listing (II) shows these values with a semicolon for unprintable characters.

FIG. 27 shows the assertions, in message format. as they are received by application inference interface in the example. The rule number (1), shown as −0001.00, negative for an assertion.

FIG. 28 shows each rule after it has been processed at object processor 105. The two assertions (1), are shown after processing at object processor 1 (3). The current routing of rule messages 137 is to processor 1. The routing entries shown (4) have been filled in by rule message router 111 for those entries that correspond to objects.

The storing of the variables from the two assertions causes rule 1 to be retrieved from rule cache 113 or the external rule processor 129. The rule (5) is shown after it has been updated with its routing and has been processed at processor 1. Note that the first condition and its corresponding routing (6) have been updated to the value 04 signifying that the entries have been used, and the status of the first condition has been updated to t signifying that the condition is true. Since this is the only condition, the rule status is updated to t, true, Since the rule contains a create object operation the rule is directed to rule message router 111 for creation of the object and completion of the routing. The present routing in the rule for object SCENE is for processor 2 (7): 2 is the base object for SCENE and is the initial routing assigned for routing to the instances of a multiply instanciated object.

The creation of an instance of SCENE causes rules 7, 6, 5, 4, and 3 to be triggered and to enter processing as a result of forward chaining. These rules are listed following rule 1 (8). Rule 7 is shown following processing at base object processor 367 for SCENE. There the rule was spawned to processor 3, the first instance of SCENE. The spawning caused the instance number (9) to be set and the routing to be updated (10). The first condition (11) remains undetermined since the variable references can only be determined at the instance object. Rules 6, 5, and 4 are also shown following processing at processor 2, each has been spawned and routed.

Only part of the routing in rule 5.3 has been updated from processor 2 to processor 3 (12). The first routing entry refers to object SCENE.ANY and the second entry refers to SCENE.OTHER. At this point, the first entry has been updated to the instance object. The second entry continues to refer to the base object. This will cause the rule to be processed at processor 3 then routed to processor 2 for another spawn.

Rule 4.5 (rule 4, instance 5), following processing at processor 3 (13), has been determined true and will be routed to rule message router 111 since it contains a create object operation. This causes creation of instance of SCENE and the spawning of rules 3.13, 4.6, 5.8, 6.9, and 7.10.

Rule 1 is shown following processing at processor 1 for the second time. The first action (14) is now complete having been completed at rule message router 111. The values of the variables JOEEMOTE and GUN LOADED have been added to the rule and the routing entries (15). This is indicated by the valdisp values being filled with the displacement into the data section (16).

Rule 7.1 (17) is shown following processing at processor 4. Processor 4 is the sub-object OTHER of instance 1, processor 3. Similarly, Rule 6.2 (18) is shown following processing at processor 5, sub-object ANY, instance 1, processor 3. Both of these rules are type s which allows them to be processed at objects that have status u, undetermined. These rules are the only rules that can be processed at undetermined objects. All other rules routed to these sub-objects prior to the processing of rules 7.1 and 6.2 would have been queued until the status is determined.

Rule 5.3 (19) is shown following processing at processor 3. The routing for processor 5 was set at processor 3 by the sub-object router 433 following interpreting. The object name displacement for the previous listing of this rule (20) has been updated (21) so that it points to the variable name rather than the qualification. In this way successive qualifications are eliminated until the pointer points to the variable name.

Rule 3.13 (22) is shown following processing at processor 6. The first condition has been determined true (23). The second condition cannot be determined since there is no value for JOHNDEAD, however, the completion request for the default existence variable has been established at processor 6.

Rule 4.6 (24) is shown having been determined false at processor 6. This rule, unlike instance 5 above. is determined false since it was crafted to only be true at instance 1.

Following processing at processor 3, rule 1 (25) is complete. It will be sent from processor 3 to active rule processor 115 for final wrap up.

Rule 5.4 (26) is the spawn of rule 5.3. It is shown following the processing of rule 5.3 at processor 2. The previous instance value of 3 (27) indicates that this is a spawn of rule 5.3. The second and sixth routing entries have been updated to processor 3 from 2 (28). Rule 5.7 is the second spawn of rule 5.3 (29): its routing has been updated to processor 6.

Rule 5.8 (30) is the second spawn of rule 5.0. It is first directed to processor 6, instance 2. And there it is updated to the sub-object ANY, at processor 8.

Rule 2.15 (31) is the first spawn of rule 2. It is shown following processing at processor 2. It has been routed to instance 2, processor 6. The second spawn, rule 2.16, is also shown after processor 2 (32).

When completeness is determined for the existence variable JOHNDEAD, the variable is determined to not exist and the variable is forward fired causing rules 3.13 (33) and 3.14 (34) to be reactivated by active rule processor 115. Rule 3.14 is shown following processor 3. The rule has been determined true and the variable JOHNALIVE stored with TRUE. This causes rules 2.16 (35) and 2.15 (36) to be reactivated.

Rule 3.14 (34) at processor 3 determines JOHN ALIVE to be true on instance 1. causing rule 2.15 (37) to be activated by forward chaining.

Rule 5.7 (38) is determined true at processor 5, instance 1, sub object ANY and then routed to processor 7, instance 2, sub-object OTHER. At processor 7 (39) JOHNDEAD is determined true.

In summary, the above-described embodiments of the present invention provide an improved approach to constructing a rule-based expert system, wherein rules stored in a knowledge base are selected and routed to the object processors having access to the data referenced in the rules. It will be understood, however, that the invention is not limited to the disclosed embodiments but is defined by the following claims.

Appendix A - Prototype Code and Source/Function Cross Reference

GNOME INFERENCE ENGINE

Module Directory and General Descriptions

Alphabetical Directory of Modules

```
GACT      C     Rule Interpreter - Action Function Interface
GAIO      C     Rule Interpreter - I/O Action Function Interface
GANUM     C     Rule Interpreter - Numeric Function Interface
GASQL     C     Rule Interpreter - SQL Action Interface
GCRUN     C     Convert rule tuples to polish strings
GDATE     C     Rule Interpreter - Date Function Interface
GDPROCL   C     Stub for Data Processor Loader
GETRU     PC    External Rule Processor - Oracle Forward Chain
GETSO     PC    External Source Processor - Fixed List Rule Form
GETTA     PC    External Target Processor - Oracle Forward Chain
GEXC      C     External Object Manager
GEXOB     C     External Object Table Interface
GFE       C     Rule Interpreter - Truth Binary Function Routines
GFL       C     Rule Interpreter - List Truth Binary Function Routines
GFTRUE    C     Rule Interpreter - Truth Binary Function Routines
GFUN      C     Rule Interpreter - Function Interface
```

| | | |
|---|---|---|
| GIRPRTS | C | Rule Interpreter - Print Rules - Short Form |
| GIRX | C | Undetermined Object Queue Manager |
| GIRY | C | Rule Interpreter - Fixed List Rule Form |
| GIRZ | C | Converter from polish string to Rule Message |
| GMSGP | C | Message Processor for Shared Memory Machines |
| GMSTUB | C | Monitor Stub for Gtctls |
| GNWTG | C | Active Rule Processor |
| GPROC | C | Process Controller |
| GPRTS | C | Printout Routines |
| GRWRT | C | Rule Log Processor |
| GSOBJ | C | Object Message Processor |
| GSQLB | C | External Data Interface for ASCII Objects |
| GSQLI | C | External Data Interface for SQL Object Manager |
| GSQLO | PC | External Data Interface - Oracle Interface |
| GSRC | C | Source Processor - Fixed List Rule Form |
| GSTRING | C | Rule Interpreter - String and List Functions |
| GSTSH | C | Stash Manager |
| GSTSHA | C | Stash Manager - Variable Retrieval Functions |
| GTAII | C | Application Inference Interface |
| GTCTLB | C | Application Program - model |
| GTERI | C | External Rule Interface - Session Routines |
| GTGT | C | Target Processor - Fixed List Rule Form |
| GTIDB | C | AII - Session Interface for PC |
| GTMSUBS | C | Utility Common Subroutines |
| GTO | C | Rule Message Router |
| GTOB | C | Sub-Object Router/Local Routing Updater |
| GTOQ | C | Object Queue Processor for Base Objects |
| GTPY | C | Rule Queue Manager |
| GTRDB | C | External Rule Processor Initialization |
| GTYAB | C | Application Program - model ASCII Form Assertion Input |
| GTYDBB | C | Rule Cache |
| GUWRT | C | Foreign Object Interface |
| | | |
| CSQL | H | In Memory SQL Simulation Macros |
| CSQLA | H | In Memory SQL Simulation Macros |
| EXOBJ | H | Object Instance List |
| GMSG | H | Inter-Process Message Definitions |
| GOBJQ | H | Object Queue Definition |
| GRULE | H | Rule Text Tupple |
| GRULMSG | H | Definition of Rule Message |
| GSRC | H | Rule Source List Tupple |
| GSTATS | H | Statistis Accumulators |
| GTGT | H | Rule Target List Tupple |
| OBDOBJ | H | Object Definition Table Definition |
| STSH | H | Stash Variables - Control Structures |

Tesseract Confidential

```
/****************************************************************/
/*                                                              */
/*      GACT.C                                                  */
/*                                                              */
/*      Gnome rule intrepreter                                  */
/*      action function interface                               */
/*                                                              */
/****************************************************************/
#include    "string.h"
#include  . "grulmsg.h"
#include    "gmsg.h"
#include    "stsh.h"

char gitrue();
int  gs(), gco(), ganull();
int  gsay(), gask(), gsel(), gcommitt(),
 gtype(), gaplseq(), gasqlsel(),
     gamineq(), gamlteq(), gadiveq(),
gdplseq(), gdmineq(), gddiff(), gasum(), gsapp(), gscat(), gstrintr(),
gstrunique(), gmin(), gmax(), gcountmem(), glmin(), glmax();
```

```
char *intact[] =
    (" ", "S", "SAY", "CO", "ASK", "SEL", "COMMIT", "TYPE",
     "+=", "-=", "*=", "/=", "D+=", "D-=", "DIFF", "SUM",
     "SQLSEL", "SAPP", "CONCAT", "STRINTER", "STRUNIQUE",
     "OBJMIN", "OBJMAX", "LCOUNT", "LMIN", "LMAX", "DO");

int  (*procact[])()  =
     (&ganull, &gs, &gsay, &gco, &gask,
  &gsel, &gcommitt, >ype, &gaplseq,
      &gamineq, &gamlteq, &gadiveq, &gdplseq,
  &gdmineq, &gddiff, &gasum,
      &gasqlsel, &gsapp, &gscat, &gstrintr, &gstrunique,
      &gmin, &gmax, &gcountmem, &glmin, &glmax, &ganull);

int actcnt = 27;

extern int ruletrce;
extern int PROCSTOP;
extern OBJ *Cobjcurr;
extern int ruleinst; extern char pbuffer[100];
char *gactp(n)      /* return pointer to action oper */
    int n;
  (return(intact[n]);)

gact(n, tgtptr, srcptr)       /* process action function */
    int n; struct gval *tgtptr, *srcptr;
   (int r = 4;
    /*printf("gfunct entered %s\n", parm);*/
    if (n < 0) return(r);
    if (n > actcnt)
        (printf("gfun woops - illegal token %d\n", n); return(r);)
    r = (*procact[n]) (tgtptr, srcptr);
    return(r);)

gs(tgtptr, srcptr)
    struct gval *tgtptr, *srcptr;
    (if (!tgtptr || !srcptr) return(2);
  /* consider missing items normal */
    stshrepl(Cobjcurr, tgtptr->val, srcptr);
    return(4);)

gse(tgtptr, srcptr)
    struct gval *tgtptr, *srcptr;
    (VAR *vptr;
     if (!tgtptr) return(2);
  /* consider missing items normal */
     if (srcptr)
         (stshrepl(Cobjcurr, tgtptr->val, srcptr);
           return(4);)
     else
        (if (vptr = stshvare(Cobjcurr, tgtptr->val))
            (if (vptr->status == 'e') return(2);
             else return(4);)
  /* check for prev marker */
         vptr = stshdatx(Cobjcurr, tgtptr->val, "\0\0\0", 'e');)
     return(2);)

gactt(parm)     /* tokenize action function */
    char *parm;
   (int i;
    for (i = 0; i < actcnt; i++)
        (if ( strcmp(parm, intact[i]) ) ;
         else break; )
    if ( i == actcnt )
        (printf("no action match for %s\n", parm);
         i = -1; )
    return(i); )

ganull()              /* null operation - compatability with gfun */
    (printf("gact null operation - error\n");
     return(4);)
```

```
/****************************************************************/
/*                                                              */
/*      GAIO.C                                                  */
/*                                                              */
/*      Gnome rule intrepreter                                  */
/*      I/O action function interface                           */
/*                                                              */
/****************************************************************/
#include    "string.h"
#include    "grulmsg.h"
#include    "gmsg.h"
#include    "stsh.h"

char gitrue();
extern int ruletrce;
extern int PROCSTOP;
extern OBJ *Cobjcurr;
extern int ruleinst; extern char pbuffer[500];
/****************************************************************/
/*    User Interface simulation functions                       */
/****************************************************************/
gsay(tgtptr, srcptr)
    struct gval *tgtptr, *srcptr;
    {char vardata[100];
    if (tgtptr)
        {gprts(tgtptr, vardata, ',');
         sprintf(pbuffer, "%s\n", vardata); gprintf();}
    if (srcptr)
        {gprts(srcptr, vardata, ',');
         sprintf(pbuffer, "%s\n", vardata); gprintf();}
    PROCSTOP = 1;
    return(4);} gask(tgtptr, srcptr)
    struct gval *tgtptr, *srcptr;
    {char vardata[100], indata[100], *cp;
    if (tgtptr)
        gprts(tgtptr, vardata, ',');
    if (srcptr)
        {printf("%s", srcptr->val);}
    else printf("\nWhat is the value of %s? ", vardata);
    gets(indata + 2); printf("\n");
    *(cp = indata) = '\0'; *(++cp) = '\0';
    while (*cp != '\n' && cp < indata + 99) ++cp; *cp = '\0';
    stshrepl(Cobjcurr, tgtptr->val, indata);
    return(4);} gtype(tgtptr, srcptr)
    struct gval *tgtptr, *srcptr;
    {char vardata[100];
    if (tgtptr)
        {gprts(tgtptr, vardata, ',');
         sprintf(pbuffer, "%s\n", vardata); gprintf();}
    if (srcptr)
        {gprts(srcptr, vardata, ',');
         sprintf(pbuffer, "%s\n", vardata); gprintf();}
    return(4);}

/****************************************************************/
/*    SQL interface and operations                              */
/****************************************************************/
gcommitt(tgtptr, srcptr)        /* close set   */
    struct gval *tgtptr, *srcptr;
    {if (!tgtptr) return(0);
    sobjclos(Cobjcurr);
    return(4);} gsel(tgtptr, srcptr)        /* select valid instance (tuple)   */
    struct gval *tgtptr, *srcptr;
    {if (!tgtptr) return(0);
    sobjstat(Cobjcurr, 't');
    return(4);}
```

```
/****************************************************************/
/*                                                              */
/*        GANUM.C                                               */
/*                                                              */
/*        Gnome rule intrepreter                                */
/*        NUMERIC function interface                            */
/*                                                              */
/****************************************************************/
#include    "string.h"
#include    "grulmsg.h"
#include    "grule.h"
#include    "gmsg.h"
#include    "stsh.h"

long int gflnum();

char gitrue();
extern int ruletrce;
extern int PROCSTOP;
extern OBJ *Cobjcurr;
extern int ruleinst; extern char pbuffer[100];

/* target pointer points to variable name;
  source pointer points to data */
gaplseq(tgtptr, srcptr)
    struct gval *tgtptr, *srcptr;
   {long int ls, lt; char cans[20];
    int td = 0, sd = 0;
    if (gasetnm(tgtptr, srcptr, <, &ls, &td, &sd))
        return(2);   /* consider missing items normal */
    td = gapad(<, &ls, td, sd);
    gadecbak(lt + ls, td, cans);
    ganmstsh(tgtptr->val, cans);
    return(4);}

/* target pointer points to variable name;
  source pointer points to data */
gamineq(tgtptr, srcptr)
    struct gval *tgtptr, *srcptr;
   {long int ls, lt; char cans[20];
    int td = 0, sd = 0;
    if (gasetnm(tgtptr, srcptr, <, &ls, &td, &sd))
        return(2);   /* consider missing items normal */
    td = gapad(<, &ls, td, sd);
    gadecbak(lt - ls, td, cans);
    ganmstsh(tgtptr->val, cans);
    return(4);}

/* target pointer points to variable name;
  source pointer points to data */
gamlteq(tgtptr, srcptr)
    struct gval *tgtptr, *srcptr;
   {long int ls, lt; char cans[20];
    int td = 0, sd = 0;
    if (gasetnm(tgtptr, srcptr, <, &ls, &td, &sd))
        return(2);   /* consider missing items normal */
    td = td + sd;
    gadecbak(lt * ls, td, cans);
    ganmstsh(tgtptr->val, cans);
    return(4);}

/* target pointer points to variable name;
  source pointer points to data */
gadiveq(tgtptr, srcptr)
    struct gval *tgtptr, *srcptr;
   {long int ls, lt; char cans[20];
    int td = 0, sd = 0;
    if (gasetnm(tgtptr, srcptr, <, &ls, &td, &sd))
        return(2);   /* consider missing items normal */
```

```
    if (ls == 0)
        {cans[0] = '0'; cans[1] = '\0';
         ganmstsh(tgtptr->val, cans);
         return(4);}
    if (td < sd)
        td = gapad(<, &ls, td, sd);
    td = td - sd + 2;
    lt = lt * 100;
    gadecbak(lt / ls, td, cans);
    ganmstsh(tgtptr->val, cans);
    return(4);}

/* target pointer points to variable name;
 source pointer points to data */
gasetnm(tgtptr, srcptr, lt, ls, td, sd)
    struct gval *tgtptr, *srcptr;
    long int *lt, *ls;
    int *td, *sd;
    {struct gval *tgtvar;
    if (!tgtptr || !srcptr) return(2);   /* consider missing items normal */
    if (!(tgtvar = stshvar(Cobjcurr, tgtptr->val, 0)))
        return(2);
    *lt = gflnum(tgtvar->val);
    *td = galdec(tgtvar->val);
    *sd = galdec(srcptr->val);
    *ls = gflnum(srcptr->val);
    return(0);} ganmstsh(tgtptr, cans)
    char *tgtptr, cans[20];
    {char ans[20];
    ans[0] = '\0'; ans[1] = '\0';
    sprintf(ans+2, "%s", cans);
    stshrepl(Cobjcurr, tgtptr, ans);
    return;} gapad(lt, ls, td, sd)
    long int *lt, *ls;
    int td, sd;
    {if (td == sd) return(sd);
    if (td > sd)
        {while (td != sd++)
            *ls = *ls * 10;
        return(td);}
    else
        {while (sd != td++)
            *lt = *lt * 10;
        return(sd);}}

/* galdec returns the number of places after the decimal point */
galdec(ptr)
    char *ptr;
    {int d = 0;
    while ((*ptr) && (*ptr != '.')) ++ptr;
    if (*ptr++ == '.')
        while (*ptr++) ++d;
    return(d);}

/* gadecbak fills a string with the decimal point inserted*/
gadecbak(ans, d, cans)
    long int ans;
    int d;
    char cans[20];
    {char *cp, *cq, *cd;
    if (ans < 0)
        {cans[0] = '-';
         ans = ans * -1;
         sprintf(cans+1, "0%*ld", d, ans);}
```

```
    else
        sprintf(cans, "0%*ld", d, ans);
    if (d == 0) return;
    cp = cans;
    while (*cp) ++cp;
    cd = cp - d;
    cq = cp + 1;
    while (cq != cd)
        *cq-- = *cp--;
    *cd = '.';
    return;}
```

```
/****************************************************************/
/*                                                              */
/*      GASQL.C                                                 */
/*                                                              */
/*      Gnome rule intrepreter                                  */
/*      SQL action interface                                    */
/*                                                              */
/****************************************************************/
#include     "string.h"
#include     "grulmsg.h"
#include     "gmsg.h"
#include     "stsh.h"

long int gflnum();

char gitrue();
long gexcn();        /* create a subobject   */
extern int ruletrce;
extern int PROCSTOP;
extern OBJ *Cobjcurr;
extern int ruleinst; extern char pbuffer[100];
extern short giryrule, giryinst;
extern struct grulmsg *giryrptr;
long gexcnc();

/* target pointer points to variable name; source pointer points to data */
gasum(tgtptr, srcptr)
    struct gval *tgtptr, *srcptr;
    {long int ls = 0, lt = 0; char cans[20];
     int td = 0, sd = 0;
     if (gasqnm(tgtptr, srcptr, <, &ls, &td, &sd))
         return(2);  /* consider missing items normal */
     td = gapad(<, &ls, td, sd);
     cans[0] = '\0'; cans[1] = '\0';
     gadecbak(lt + ls, td, cans + 2);
     gasqstsh(tgtptr->val, cans);
     return(4);} gasqstsh(tgtptr, ans)
    char *tgtptr; struct gval *ans;
    {/*printf("gasqstsh tgt %s ans %s\n", tgtptr, ans->val);*/
     if (gnwtgexg(giryrule, Cobjcurr->procid, giryinst, 0))
         stshrepx(Cobjcurr, tgtptr, ans, 'r');
     else stshrepl(Cobjcurr, tgtptr, ans);
     return;}

/* target pointer points to variable name; source pointer points to data */
gasqnm(tgtptr, srcptr, lt, ls, td, sd)
    struct gval *tgtptr, *srcptr;
    long int *lt, *ls;
    int *td, *sd;
    {struct gval *tgtval; struct var *tgtvar;
     if (!tgtptr || !srcptr) return(2);
  /* consider missing items normal */
     if (tgtvar = stshvare(Cobjcurr, tgtptr->val, 0, 0))
         {tgtval = &tgtvar->v;
          *lt = gflnum(tgtval->val);
          *td = galdec(tgtval->val);}
     else {*lt = *td = 0;}
     *sd = galdec(srcptr->val);
     *ls = gflnum(srcptr->val);
     return(0);}
```

```c
gasqlsel(tgtptr, srcptr)        /* create object instance   */
    struct gval *tgtptr, *srcptr;
   {char stmt[200];
    if (!tgtptr || !srcptr) return(2);
 /* consider missing items normal */
    strcpy(stmt, tgtptr->val);
    strcat(stmt, "'"); strcat(stmt, srcptr->val); strcat(stmt, "'");
    gexosql(stmt);
    return(4);}

/*******************************************************************/
/*
/* gcrun.c
/*
/* Build polish string from rule tuples
/*
/*******************************************************************/
#include "stdio.h"
#include "ctype.h"
#include "io.h"
#include "grfdef.h"
#include "grftup.h"

extern TargetItem ItemS [MAX_ITEMS], OperS [MAX_OPERS], *ItPtr, *OpPtr;
extern R_tuple tupleS [MAX_ITEMS], *tuPtr, *WPtr, Wtuple;

gcrun(Pstring)
char *Pstring;
 {char Part, *cp;
  static char Say[]    = "say@";
  static char SQLsel[] = "sqlsel@";

Part = LEFT_PART;
  cp = Pstring;
  *cp++ = ':';
  for (WPtr = tupleS; WPtr <= tuPtr; ++WPtr)
     {if (Part == LEFT_PART && WPtr->R_Part != Part)
    {*cp++ = ':'; Part = RIGHT_PART; }
      if (WPtr->R_Sub2 == NULL && WPtr->R_Oper == NULL)
   {cp+= sprintf(cp,"%s", WPtr->R_Sub1);
    *cp++ = '%';
    continue; }
      if ( (strcmp(WPtr->R_Oper,Say)==0)||(strcmp(WPtr->R_Oper,SQLsel)==0))
   {cp+= (WPtr->R_Sub1) ? sprintf(cp,"%s", WPtr->R_Sub1) : 0;
    if ((WPtr->R_Sub1) && (WPtr->R_Sub1[0] != '\'')) *cp++ = '#';
    cp+= (WPtr->R_Sub2) ? sprintf(cp,"%s", WPtr->R_Sub2) : 0;
    if ((WPtr->R_Sub2) && (WPtr->R_Sub2[0] != '\'')) *cp++ = UNSTASH;
    cp+= sprintf(cp,"%s", WPtr->R_Oper);
    continue; }
      cp+= (WPtr->R_Sub2) ? sprintf(cp,"%s", WPtr->R_Sub2) : 0;
      if ((WPtr->R_Sub2) && (WPtr->R_Sub2[0] != '\'')) *cp++ = UNSTASH;
      cp+= (WPtr->R_Sub1) ? sprintf(cp,"%s", WPtr->R_Sub1) : 0;
      if ((WPtr->R_Sub1) && (WPtr->R_Sub1[0] != '\'')) *cp++ = '%';
      cp+= (WPtr->R_Oper) ? sprintf(cp,"%s", WPtr->R_Oper) : 0; }
  *cp = '\0';
  return(1); }

/*******************************************************************/
/*                                                                 */
/*      GDATE.C                                                    */
/*                                                                 */
/*      Gnome rule intrepreter                                     */
/*      DATE function interface                                    */
/*                                                                 */
/*******************************************************************/
#include    "string.h"
#include    "grulmsg.h"
#include    "gmsg.h"
#include    "stsh.h"
```

```c
#define GOOD_DATE 0
#define BAD_DATE  1
#define COMP_YR   1980
#define COMP_MO   01
define COMP_DA   01 char gitrue();
extern int ruletrce;
extern int PROCSTOP;
extern OBJ *Cobjcurr;
extern int ruleinst; extern char pbuffer[500];

static int day_tbl[0][12] = {
      {31, 28, 31, 30, 31, 30, 31, 30, 31, 30, 31, 31}};

/* target pointer points to variable name; source pointer points to data */
gdplseq(tgtptr, srcptr)
      struct gval *tgtptr, *srcptr;
   {int days = 0;
      char ans[9], ls[9], lt[9];
      if (gdsetnm(tgtptr, srcptr, lt, ls)) return(2);

days = gdays(lt) + atoi(ls);
      gdgreg(days, ans);
      ganmstsh(tgtptr->val, ans);
      return(4);}

/* target pointer points to variable name; source pointer points to data */
gdmineq(tgtptr, srcptr)
      struct gval *tgtptr, *srcptr;
   {int days = 0;
      char ans[9], ls[9], lt[9];
      if (gdsetnm(tgtptr, srcptr, lt, ls)) return(2);
      days = gdays(lt) - atoi(ls);
      gdgreg(days, ans);
      ganmstsh(tgtptr->val, ans);
      return(4);}

/* target pointer points to variable name; source pointer points to data */
gddiff(tgtptr, srcptr)
      struct gval *tgtptr, *srcptr;
   {int tdays = 0, sdays = 0, diffda = 0;
      char ans[9], ls[9], lt[9];
      if (gdsetnm(tgtptr, srcptr, lt, ls)) return(2);
      diffda = gdays(ls) - gdays(lt);
      sprintf(ans, "%d", diffda);
      ganmstsh(tgtptr->val, ans);
      return(4);}

/* target pointer points to variable name; source pointer points to data */
gdsetnm(tgtptr, srcptr, lt, ls)
      struct gval *tgtptr, *srcptr;
      char lt[9], ls[9];
   {struct gval *tgtvar;
      if (!tgtptr || !srcptr) return(2);  /* consider missing items normal */
      if (tgtvar = stshvar(Cobjcurr, tgtptr->val, 0))
          strcpy(lt, tgtvar->val);
      else
          return(2);
      strcpy(ls, srcptr->val);
      return(0);} gdays(ptr)
      char ptr[9];
   {int yr, mo, da;
      if (gdparse(ptr, &yr, &mo, &da))
          return(0);
      if (gdedit(yr, mo, da))
          return(0);
      return(gdaycalc(&yr, &mo, &da));}
```

```
gdaycalc(yr, mo, da)
    int *yr, *mo, *da;
    {int i = 0, con = 0, days = 0;
 con = COMP_YR;
 while (*yr < con) {
     days -= 365;
     con -= 1;
     if (gdlpyr(con))
         days -= 1;}
 while (*yr > con) {
     days += 365;
     if (gdlpyr(con))
         days += 1;
     con += 1;}
 if (gdlpyr(*yr))
     day_tbl[0][1] = 29;
 con = COMP_MO;
 while (*mo > con) {
     days += day_tbl[0][con-1];
     con++;}
 days += *da - COMP_DA;
 day_tbl[0][1] = 28;
 return(days);} gdgreg(days, ans)
 int days;
 char ans[9];
 {int i = 0, yr = 0, mo = 0, da = 0;
 yr = COMP_YR;
 if (days < 0)
     days -= 1;
 else
     days +=1;
 while (days > 365) {
     days -= 365;
     if (gdlpyr(yr))
         days -= 1;
     yr += 1;}
 while (days <= 0) {
     days += 365;
     yr -= 1;
     if (gdlpyr(yr))
         days += 1;}
 if (gdlpyr(yr))
     day_tbl[0][1] = 29;
 while (i < 11 && days > day_tbl[0][i])
     days -= day_tbl[0][i++];
 mo = i + 1;
 da = days;
 day_tbl[0][1] = 28;
 if (yr < 0 || mo < 0 || da < 0)
     sprintf(ans, "00000000");
 else
     sprintf(ans, "%04d%02d%02d", yr, mo, da);
 return(0);} gdlpyr(yr)
    int yr;
    {if (yr == ((yr / 4) * 4))
        return(1);
     return(0);} gdparse(ptr, yr, mo, da)
 char ptr[9]; int *yr, *mo, *da;
 {char *cp, temp[5]; int i = 0;
 cp = ptr;
 while (*cp++)
     ++i;
 if (i == 8)
     {temp[0] = ptr[0]; temp[1] = ptr[1]; temp[2] = ptr[2];
      temp[3] = ptr[3]; temp[4] = '\0';
      *yr = atoi(temp);
      temp[0] = ptr[4]; temp[1] = ptr[5]; temp[2] = '\0';
```

```
            *mo = atoi(temp);
            temp[0] = ptr[6]; temp[1] = ptr[7]; temp[2] = '\0';
            *da = atoi(temp);
            return(GOOD_DATE);}
     if (i == 6)
            {temp[0] = ptr[0]; temp[1] = ptr[1]; temp[2] = '\0';
            *yr = atoi(temp);
            if (*yr > 5)
                 *yr += 1900;
            else
                 *yr += 2000;
            temp[0] = ptr[2]; temp[1] = ptr[3]; temp[2] = '\0';
            *mo = atoi(temp);
            temp[0] = ptr[4]; temp[1] = ptr[5]; temp[2] = '\0';
            *da = atoi(temp);
            return(GOOD_DATE);}
     return(BAD_DATE);} gdedit(yr, mo, da)
     int yr, mo, da;
     {int temp = 0;
      if (yr < 0 || yr > 9999) return(BAD_DATE);
      if (mo < 1 || mo > 12) return(BAD_DATE);
      if (da < 1 || da > 31) return(BAD_DATE);
      if (da == 31 &&
          (mo == 2  ||
           mo == 4  ||
           mo == 6  ||
           mo == 9  ||
           mo == 11)) return(BAD_DATE);
      if (mo != 2) return(GOOD_DATE);
      if (da > 29) return(BAD_DATE);
      if (da < 29) return(GOOD_DATE);
      if (yr == ((yr / 4) * 4)) return(GOOD_DATE);
      return(BAD_DATE);}

/*********************************************------*****
/*      gdprocl.c
/*
/*      Stub for data processor loader; on the mainframe
/*      this is replaced by an assembly language program
/*      that does LOAD EP=epname...
/*
/**********************************************************/ int gdprocl(epname, epa)
     char *epname; int (*epa)();
     /* data processor loader; not functional on PC */
     {epa = 0;
      return 0; }

/**************************************************************/
/**/
/*GETRU.PC*/
/**/
/*External Rule Processor */
/* Oracle based forward chaining RDBMS processor*/
/**/
/**************************************************************/
#include "ctype.h"
include "stdio.h"
#include "grfdef.h"
#include "grftup.h"
#include "gmsg.h"
#include "grule.h"
#include "gstats.h"
#include "grulmsg.h"
#include "stsh.h"

EXEC SQL BEGIN DECLARE SECTION;
charSelStmt[200];
```

```
shortRuleName;
charSeqNo[3];
charRulePart;
VARCHAR Subject1[40];
shortSubject1I;
VARCHAR Subject2[255];
shortSubject2I;
VARCHAR Action[16];
shortActionI;
EXEC SQL END DECLARE SECTION;
EXEC SQL INCLUDE SQLCA;

extern int   ruletrce;
extern char dbname[];
R_tuple tupleS [MAX_ITEMS], *tuPtr, *WPtr;
char *galloc(), *gir();
char wkrule[1560];
char testrule[1560];
char Part;

char *getru(r_name)
    short r_name;
    {int l, lo;
     char *cp;
     struct rule *rpp; struct grulmsg *G; char *C;
     static char Targeter[]= "%";
     static char Sel_1[] =
"SELECT RULENAME, SEQNO, RULEPART, SUBJECT1, SUBJECT2, ACTION FROM ";
     static char Sel_2[] = " WHERE RULENAME = ";
     static char Sel_3[] = " ORDER BY RULENAME, SEQNO";

EXEC SQL WHENEVER SQLERROR GOTO errexit;
     sprintf(SelStmt,"%s%s%s%04d%s",Sel_1, dbname, Sel_2, r_name, Sel_3);
     EXEC SQL PREPARE RLIST FROM :SelStmt;
     EXEC SQL DECLARE RCRS CURSOR FOR RLIST;
     EXEC SQL OPEN RCRS;
     for (tuPtr = tupleS; sqlca.sqlcode != 1403; tuPtr++)
(EXEC SQL FETCH RCRS INTO
  :RuleName,
  :SeqNo,
  :RulePart,
  :Subject1:Subject1I,
  :Subject2:Subject2I,
  :Action:ActionI;
 if (sqlca.sqlcode == 1403) break;
 gs_tuples++;
 tuPtr->R_Name = RuleName;
 strncpy(tuPtr->R_SeqNo, SeqNo, sizeof SeqNo);
 tuPtr->R_SeqNo [sizeof SeqNo] = '\0';
 tuPtr->R_Part = RulePart;
 if ((tuPtr->R_Sub1 = (Subject1I == -1) ?
    NULL : (char *)galloc(Subject1.len + 1)) != NULL)
    (strncpy(tuPtr->R_Sub1, Subject1.arr, Subject1.len);
     tuPtr->R_Sub1[Subject1.len] = '\0'; }
 if ((tuPtr->R_Sub2 = (Subject2I == -1) ?
    NULL : (char *)galloc(Subject2.len + 1)) != NULL)
    (strncpy(tuPtr->R_Sub2, Subject2.arr, Subject2.len);
     tuPtr->R_Sub2[Subject2.len] = '\0'; }
 if ((tuPtr->R_Oper = (ActionI == -1) ?
    NULL : (char *)galloc(Action.len + 1)) != NULL)
    (strncpy(tuPtr->R_Oper, Action.arr, Action.len);
     tuPtr->R_Oper[Action.len] = '\0'; } )

EXEC SQL CLOSE RCRS;
     if (tuPtr == tupleS) return(NULL);   /* no such rule.  */
     if (ruletrce) printf("\n\nRule%04d retrieved from rule base\n", r_name);
     gs_fetches++;   /* keep stats */
     --tuPtr;
     /*gptup();  /*print the tuples.   */
     gcrun(testrule);   /* make a reverse Polish string*/
     (char *) rpp = &wkrule[0];
     strcpy(rpp->rtxt, testrule);
     if ( ruletrce ) printf("%s\n", testrule);
```

```
    rpp->ruleno = tuPtr->R_Name;
    rpp->rulepart = 0;
    C = gir(rpp);
    (char *) G = C;
    l = G->rulelen;
    cp = (char *)galloc(l + 100); /*** how much ?? check w/GLD ***/
    for (lo = 0; lo <= l; lo++) *(cp + lo) = *C++;
    FreeTS();
    gMSGr(cp, gRC, gtcache);
    return(cp);

errexit:
    EXEC SQL WHENEVER SQLERROR CONTINUE;
    EXEC SQL ROLLBACK WORK RELEASE;
    printf("%.70s (%d)\n", sqlca.sqlerrm.sqlerrmc, -sqlca.sqlcode);
    return(NULL);
    )

FreeTS()
    {for (WPtr = tupleS; WPtr <= tuPtr; ++WPtr)
  {WPtr->R_Part = NO_PART;
   WPtr->R_Name = 0;
   if ( WPtr->R_Sub1 != NULL ) {gfree(WPtr->R_Sub1); WPtr->R_Sub1=NULL;}
   if ( WPtr->R_Sub2 != NULL ) {gfree(WPtr->R_Sub2); WPtr->R_Sub2=NULL;}
   if ( WPtr->R_Oper != NULL ) {gfree(WPtr->R_Oper); WPtr->R_Oper=NULL;}}
    tuPtr= tupleS; }

/****************************************************************/
/**/
/*GETSO.PC*/
/**/
/*External Source Processor*/
/* fixed list rule form  - source processor*/
/**/
/****************************************************************/ include    "csql.h"
include    "grulmsg.h"
#include    "gmsg.h"
#include    "grule.h"
#include    "gsrc.h"
#include    "gstats.h"
#include    "ctype.h"
#include    "stdio.h"

EXEC SQL BEGIN DECLARE SECTION;
shortRuleNum;
charSelSrc[200];
EXEC SQL END DECLARE SECTION;
EXEC SQL INCLUDE SQLCA;

char *malloc();
extern char vardata[100], dbname[];
extern int ruletrce;
extern int RDBMSopn;   /* Flag indicating Rule input from RDBMS*/ getso(v_name)
    char *v_name;
    {static char Sel_1[] = "SELECT DISTINCT RULENUM FROM ";
     static char Sel_2[] = " WHERE BASENAME = ";
     short WRule;
     int i, backcnt = 0;

if (!RDBMSopn || (*v_name == NULL)) return 0;
     EXEC SQL WHENEVER SQLERROR GOTO errexit;

for (i = 0; i < sizeof(SelSrc); i++) SelSrc[i] = '\0';
     sprintf(SelSrc,"%s%s_src%s'%s'", Sel_1, dbname, Sel_2, v_name);

EXEC SQL PREPARE SLIST FROM :SelSrc;
     EXEC SQL DECLARE SCRS CURSOR FOR SLIST;
     EXEC SQL OPEN SCRS;
```

```
    /*if (ruletrce)*/ printf("backchaining for '%s'\n", v_name);
    while (1==1)
EXEC SQL FETCH SCRS INTO :RuleNum;
if (sqlca.sqlcode == 1403) break;
gs_backwards++;
gs_tuples++;
WRule = RuleNum;
if (ruletrce) printf("Rule%04d selected for backchaining\n", WRule);
backcnt++;
/*gnwtgreq(WRule, NWTG_CREQ);*/}

EXEC SQL CLOSE SCRS;
    return (backcnt);

rrexit:
    EXEC SQL WHENEVER SQLERROR CONTINUE;
    EXEC SQL ROLLBACK WORK RELEASE;
    printf("getso: %.70s (%d)\n", sqlca.sqlerrm.sqlerrmc, -sqlca.sqlcode);
    return 0; }

/****************************************************************/
**/
*GETTA.PC*/
**/
*External Target Processor*/
* Oracle based forward chaining RDBMS processor*/
**/
/****************************************************************/
* NOTE:  This version uses array fetches.*/
*   Also note that SELECT stmt doesn't bother to search  */
*   for predicates wherein the target vbl name is the*/
*   right-hand operand (i.e. Subject2).There is a*/
*   version in this library that does so.*/
/****************************************************************/
include "ctype.h"
include "stdio.h"
include "gmsg.h"
include "gstats.h"

har *galloc();
XEC SQL BEGIN DECLARE SECTION;
nt  RuleList[1000];
nt  VarCount[1000];
har SelTar[500];
XEC SQL END DECLARE SECTION;
XEC SQL INCLUDE SQLCA;

xtern int RDBMSopn;  /* Flag indicating Rule input from RDBMS*/
xtern int  ruletrce;
xtern char dbname[];

getta(v_name, v_value)
    char *v_name, *v_value;
    {static char Sel_1[] = "SELECT DISTINCT RULENUM, VARCOUNT FROM ";
     static char Sel_2[] = "_TGT WHERE BASENAME = '";
     static char Sel_3[] =
" AND (RULETYPE = 3 OR ((RULETYPE = 1 AND TGTVALUE = '''";
     static char Sel_4[] = "''';') OR (RULETYPE = 2 AND TGTVALUE != '''";
     static char Sel_5[] = "''';')))";
     long i, j;
     if (!RDBMSopn) return(0);
     v_value += 2;
     /*printf("getta saw %s opn = %d\n", v_value, RDBMSopn);*/
     EXEC SQL WHENEVER SQLERROR GOTO errexit;
     strnset(SelTar, '\0', sizeof(SelTar));
     sprintf(SelTar,"%s%s%s%s%s%s%s%s",
     Sel_1,dbname,Sel_2,v_name,Sel_3,v_value,Sel_4,v_value,Sel_5);
     if (ruletrce) printf("%s\n",SelTar);
     EXEC SQL PREPARE TLIST FROM :SelTar;
     EXEC SQL DECLARE TCRS CURSOR FOR TLIST;
     EXEC SQL OPEN TCRS;
```

```
      while (1==1)
 (EXEC SQL FETCH TCRS INTO :RuleList,
   :VarCount;
   j = sqlca.sqlerrd[2];
   if (j < 1) break;
   if (j > 1000)
       {printf("getta.c:   target list overflow on %s\n", v_name);
        break; }
   gs_forwards+= j;
   gs_tuples+= j;
   for (i = 0; i < j; i++)
       (if (ruletrce) printf("Rule%04d selected\n", RuleList[i]);
        if (gtrig(RuleList[i], VarCount[i]))
     gnwtgreq(RuleList[i], NWTG_CREQ);;}
   break; }

EXEC SQL CLOSE TCRS;
     return 1;

errexit:
     EXEC SQL WHENEVER SQLERROR CONTINUE;
     if ( sqlca.sqlcode == -1012 ) return 0;
     EXEC SQL ROLLBACK WORK RELEASE;
     printf("getta: %.70s (%d)\n", sqlca.sqlerrm.sqlerrmc, -sqlca.sqlcode);
     return 0; } gtrig(rule, tcnt)
     int rule, tcnt;
     (typedef struct TrigCnt {
      struct TrigCnt *T_Next;
      int   T_Rule;
      int   T_Cnt;      } TrigCnt;
      static struct TrigCnt T_hook = {NULL, 0, 0};
      TrigCnt *tp, *wp;

if (--tcnt < 1) return(1);
      for (tp = wp = &T_hook; tp != NULL; tp = tp->T_Next)
 {if (tp->T_Rule == rule)
      if (--tp->T_Cnt == 0)
  {wp->T_Next = tp->T_Next;
   gfree(tp);
   return(1); }
      else
   return(0);
   else
       wp = tp; }
      wp->T_Next = tp = (struct TrigCnt *)galloc(sizeof(struct TrigCnt));
      tp->T_Next = NULL;
      tp->T_Rule = rule;
      tp->T_Cnt= tcnt;
      return(0); }

/**************************************************/
/*
/*    gexc.c
/*
/*    Module of Rule Message Router (RMR)
/*
/*    Object manager for external objects
/*
/**************************************************/
#include "string.h"
#include "stdio.h"
include "gmsg.h"
#include "csql.h"
#include "grulmsg.h"
#include "stsh.h"
#include "exobj.h"

SQL_db(exobjl, exobjldb);
long gtox();
extern int ruletrce; extern char pbuffer[500];
```

```
/****************************************************************/
/* This routine is entered when a new external object is requested. */
/* The processor Id for the high level object has been deterined and */
/* is passed. */
/* This routine calls the SQL routine to read the tuples if the type */
/* is input. */
/* If the type is output, Create Object will cause the instances to */
/* be created below the base object. */
/****************************************************************/
gexc(objname, procname, filename, sql, baseproc, type)
    char *objname, *procname, *filename, *sql; long baseproc; char type;
  {struct exobjl *E; long objptr;
    objptr = baseproc;
    if (ruletrce)
        {sprintf(pbuffer,"gexc:    External object start for %s using %s\n"
            objname, sql);
         gprintf(); }
    E = (struct exobjl *) galloc(sizeof(struct exobjl));
    E->node_pid = baseproc;
    E->objrulqs = 0; E->subobjl = 0; E->next = 0;
    E->objtype = type;
    SQL_write(exobjldb, E);  /* add to active list */
    if (type == 'I' || type == 'E')
        gMSGsssssl(gExternalDataReq, gEDI, gsqli,
            objname, procname, filename, sql, baseproc);
    return(0);} struct exobjl *gexcl(baseproc) /* look up entry for a base object */
    long baseproc;
  {SQL_sels(exobjldb, node_pid, baseproc);
   return(exobjldb.dbSEL);} long gexcnc(objname, baseproc, aobjid)    /* create a subobject   */
    char *objname; long baseproc; VAL *aobjid;
  {long procid; int i; struct exobjl *baseptr; struct procq *subptr;
   OBJ *objptr; char objstr[10];
    if (baseptr = gexcl(baseproc))
        {if (baseptr->subobjl) i = baseptr->subobjl->instance;
         else i = 0;
         procid = gtox(objname, ++i);
         objptr = Cobjptr(procid);
         subptr = (struct procq *) galloc(sizeof(struct procq));
         subptr->node_pid = procid;
         subptr->instance = i;
         objptr->inst = i;
         objptr->type = 'i';
         subptr->next = baseptr->subobjl;
         baseptr->subobjl = subptr;
         if (ruletrce) {sprintf(pbuffer,"gexcnc:    Instance\
%d of %s created\n", i, objname); gprintf(); }
         gexs(objname, SUBO_NEW, procid, i);
         gtoq(baseptr, OBJQ_OBJ);
         if (!aobjid)
             {sprintf(objstr + 2, "%05d", i); objstr[0] = '\0';
              objstr[1] = '\0';
              aobjid = objstr;}
         stshdata(Cobjptr(procid), "OBJID", aobjid);
         return(procid);}
    else {sprintf(pbuffer,"gexcn:    invalid base object procid %lx\n",
            baseproc); gprintf(); }
    return(0);}

.ong gexcn(objname, baseproc, objid)     /* create a subobject   */
    char *objname; long baseproc; int objid;
  {char aobjid[10];
    sprintf(aobjid + 2, "%05d", objid); *aobjid = '\0';
    *(aobjid+1) = '\0';
    /* create the subobject   */
    return(gexcnc(objname, baseproc, aobjid));} gexcdel(node_pid)        /* delete an object instance list */
    long node_pid;
  {struct procq *pp, *px; struct exobjl *prevex;
    prevex = 0;
```

```
    exobjldb.dbSEL = exobjldb.dbSTRT;
    while ( exobjldb.dbSEL )
        {if ( exobjldb.dbSEL->node_pid != node_pid )
            {prevex = exobjldb.dbSEL;
             exobjldb.dbSEL = exobjldb.dbSEL->next;
             continue;}
         for (pp= exobjldb.dbSEL->subobjl; pp; pp= px)
             {px= pp->next;
              gfree(pp);}
         if ( prevex )          /* fix chain up */
             prevex->next = exobjldb.dbSEL->next;
         if ( exobjldb.dbSEL = exobjldb.dbSTRT )
             exobjldb.dbSTRT = exobjldb.dbSTRT->next;
         gfree(exobjldb.dbSEL);
         break; }
    return 0;}

/****************************************************
 *   gexob.c
 *
 *   External Object Table Interface
 *   message passing model of inference engine
 *
 *   Loads the external ASCII form object table into an
 *   internal table for lookups during processing.
 ****************************************************/
#include "string.h"
#include "ctype.h"
include "stdio.h"
include "gmsg.h"
#include "grule.h"
#include "csql.h"
#include "grulmsg.h"
#include "stsh.h"
#include "obdobj.h"

SQL_db(exobj, exobjdb);
char exobjuse;

char *notwhite();       /* point to first non-blank character */
extern int ruletrce, PROCDUMP; extern char pbuffer[500];

gexs(cp, msgtype, subproc, inst)
  /* create subobjects from an instance   */
  char *cp; int msgtype; long subproc; int inst;
 {struct subobj *subptr; int n; OBJ *objptr;
  n = strlen(cp);
  if (ruletrce)
      {sprintf(pbuffer,"gexs sub-object create for %s from %s\n",
               cp, Cobjptr(subproc)->varname);
       gprintf(); }
  SQL_opncurn(exobjdb, objname, cp, n);
  SQL_selcur(exobjdb)

{if (SQLptr->objname[n] != '\0' && SQLptr->objname[n] == '.'
            && !strchr(&SQLptr->objname[n + 1], '.'))
          {if (ruletrce)
              {sprintf(pbuffer,"gexs sub-obj created for %s %s %s\n",
                       cp, SQLptr->objname, SQLptr->objdef);
               gprintf(); }
           subptr = (struct subobj *) galloc(sizeof(struct subobj));
           subptr->next = Cobjptr(subproc)->sub;
           strcpy(subptr->subobjnm, SQLptr->objname);
           subptr->node_pid =
               gtox(&SQLptr->objname[n + 1], inst);
           Cobjptr(subptr->node_pid)->use  = Cobjptr(subproc)->use;
           objptr = Cobjptr(subptr->node_pid);
           objptr->type = 'i';
           Cobjptr(subptr->node_pid)->higher = subproc;
           sobjstat(Cobjptr(subptr->node_pid), 'u'); /* undetermined? */
           Cobjptr(subptr->node_pid)->inst = inst;
           Cobjptr(subproc)->sub = subptr;
           gexc(SQLptr->objname, SQLptr->procname, SQLptr->filename,
```

```
                    SQLptr->objdef, subptr->node_pid, SQLptr->objtype);
            gexs(SQLptr->objname, msgtype, subptr->node_pid, inst);})
    SQL_clscur(exobjdb);
    return(0);}
gexo(cp, msgtype, baseproc)    /* instanciate an external object        */
    char *cp; int msgtype; long baseproc;
    {long procid;
    if (ruletrce)
        (sprintf(pbuffer,"gexo External object create for %s\n", cp);
         gprintf(); }
    SQL_sel(exobjdb, objname, cp);
    if (exobjdb.dbSEL)
            {if (ruletrce)
                (sprintf(pbuffer,"gexo External obj found for %s %s\n",
                        cp, exobjdb.dbSEL->objdef);
                gprintf(); }
            if (exobjdb.dbSEL->objtype == 'F') return('b');
            if (exobjdb.dbSEL->objtype == 'E') return('b');
            procid = gexc(cp, exobjdb.dbSEL->procname,
                        exobjdb.dbSEL->filename,
                        exobjdb.dbSEL->objdef,
                        baseproc, exobjdb.dbSEL->objtype);}
        else procid = gexc(cp, "   ", "   ", "   ", baseproc, 'S');
    if (exobjdb.dbSEL)
        if (exobjdb.dbSEL->objtype == ' ') return('i');
                /* default object */
    return('b');} gexolu(cp, msgtype, baseproc)  /* lookup an external object             */
    char *cp; int msgtype; long baseproc;
    {long procid;
    exobjuse = ' ';
    if (ruletrce)
        (sprintf(pbuffer,"gexolu External object lookup for %s\n", cp);
         gprintf(); }
    SQL_sel(exobjdb, objname, cp);
    if (exobjdb.dbSEL)
            {if (exobjdb.dbSEL->objtype == 'F') return(0);
            if (exobjdb.dbSEL->objtype == 'E') return(0);
            exobjuse = exobjdb.dbSEL->objuse;
            return(exobjdb.dbSEL->objtype);}
    sprintf(pbuffer, "gexolu Unknown Object %s", cp); gprintf();
    return(0);} stoupper(cp)   /* Uppercase string conversion and cleanup     */
    char *cp;
    {while (*cp)
        (if (*cp == '\n') *cp = '\0';
        if (isspace(*cp)) *cp = ' ';
        else *cp = toupper(*cp);
        ++cp;}
        return(0);;} char *notwhite(cp)         /* point to first non-white space character */
    char *cp;
    {if (cp == NULL) return(cp);
    while (*cp)
        {if (*cp != ' ') return(cp);
        ++cp;}
    return(cp);;} gexosql(sqlstmt)   /* lookup an external object for sql build    */
    char *sqlstmt;
    {long baseproc; OBJ *objptr; char tablename[44], *cp, *selstmt, *cx;
    cp = strchr(sqlstmt, ' ');
    if (!cp) return(0);
    *cp++ = '\0';
    strcpy(tablename, sqlstmt);
    if (ruletrce)
        (sprintf(pbuffer,"gexo SQL External obj %s sql = '%s'\n",
                        tablename, sqlstmt);
            gprintf(); }
```

```
        SQL_sel(exobjdb, objname, tablename);
            if (exobjdb.dbSEL)
                {if (exobjdb.dbSEL->objtype != 'E') return(0);
                 if (exobjdb.dbSEL->objdef == NULL) return(0);
                 selstmt = galloc(strlen(cp)
                                + 2 + strlen(&exobjdb.dbSEL->objdef));
                 strcpy(selstmt, &exobjdb.dbSEL->objdef);
                 if (cx = strchr(selstmt, '\\')) *cx = '\0';
                 strcat(selstmt, " ");
                 strcat(selstmt, cp);
                 if (cx = strchr(exobjdb.dbSEL->objdef, '\\'))
                      strcat(selstmt, cx + 1);
                 baseproc = gtox(tablename, 0);
                 objptr = Cobjptr(baseproc); objptr->type = 'b';
                 gexc(tablename, exobjdb.dbSEL->procname,
                      exobjdb.dbSEL->filename,
                      selstmt, baseproc, exobjdb.dbSEL->objtype);
                 return(baseproc);}
        sprintf(pbuffer, "gexosql Unknown Object %s", sqlstmt); gprintf();
        return(0);}

/***************************************************************/
/* Temporarily the external object definitions reside in a text
/* file.
/*
/* Object types are:
/*     I Input , S Sub-object, O Output, U User, F Forward
/***************************************************************/

/* define object definition keywords    */
#define OBJ_OBJECT     1
#define OBJ_TYPE       2
#define OBJ_FILE       3
#define OBJ_PROC       4
#define OBJ_USE        5
#define OBJ_SQL        6
#define OBJ_SESSION    7
#define OBJ_DATAPROC   8
#define OBJ_ERROR      100

/* define possible states of OBD parser */
#define KEYWORD        1
#define EQUALSIGN      2
#define LITERAL        3
#define SQL_STMT       4
#define END_OF_STMT    5

/* load object definition  data base       */
grMSGs(gExternalDefinitionStart, gEOTI, gexoc, filename)
    {FILE *F; char *cp, *Cursor; struct exobj *M;
    char *record, *sqlstmt; int i, lo, mystate, key_word, firstime;

M = 0;
    SQL_open(exobjdb);
    if ( PROCDUMP )
        {sprintf(pbuffer,"\nObject file is '%s'\n", filename);
     gprintf();
     sprintf(pbuffer,"\n ** Object definitions for current session **\
     gprintf(); }
record= galloc(500);
firstime= 1;
mystate= KEYWORD;

if (F = fopen(filename, "r"))
    while ( readrec(F, record) )
        {Cursor= record;
         while ( *Cursor ) {
            switch ( mystate ) {
              case KEYWORD   :
                if ( !(Cursor= notwhite(Cursor)) )   break;
                if ( !strncmp(Cursor, "OBJECT", 6) )
                   {key_word= OBJ_OBJECT;
                    Cursor+= 6;}
```

```
    else if ( !strncmp(Cursor, "TYPE", 4) )
        {key_word= OBJ_TYPE;
         Cursor+= 4;}
    else if ( !strncmp(Cursor, "FILENAME", 8) )
        {key_word= OBJ_FILE;
         Cursor+= 8;}
    else if ( !strncmp(Cursor, "FILE", 4) )
        {key_word= OBJ_FILE;
         Cursor+= 4;}
    else if ( !strncmp(Cursor, "DATAPROC", 8) )
        {key_word= OBJ_DATAPROC;
         Cursor+= 8;}
    else if ( !strncmp(Cursor, "PROCESSOR", 9) )
        {key_word= OBJ_PROC;
         Cursor+= 9;}
    else if ( !strncmp(Cursor, "PROCNAME", 8) )
        {key_word= OBJ_PROC;
         Cursor+= 8;}
    else if ( !strncmp(Cursor, "PROC", 4) )
        {key_word= OBJ_PROC;
         Cursor+= 4;}
    else if ( !strncmp(Cursor, "USE", 3) )
        {key_word= OBJ_USE;
         Cursor+= 3;}
    else if ( !strncmp(Cursor, "SQL", 3) )
        {key_word= OBJ_SQL;
         Cursor+= 3;}
    else if ( !strncmp(Cursor, "SESSION", 7) )
        {key_word= OBJ_SESSION;
         Cursor+= 7;}
    else
        key_word= OBJ_ERROR;

switch ( key_word ) {
        case OBJ_OBJECT   :
          if ( !firstime )
             {if ( PROCDUMP ) OBDprt(M);
              SQL_write(exobjdb, M);}
          else firstime= 0;
          (char *)M= galloc(sizeof (struct exobj));
          for (i= 0; i < sizeof(M->objname); i++)
              M->objname[i]= '\0';
          for (i= 0; i < sizeof(M->filename); i++)
              M->filename[i]= '\0';
          for (i= 0; i < sizeof(M->procname); i++)
              M->procname[i]= '\0';
          for (i= 0; i < sizeof(M->dataproc); i++)
              M->dataproc[i]= '\0';
          M->objtype = 'S';
          M->objuse  = ' ';
          M->objxtran= 'N';
          M->objdef  = NULL;
        case OBJ_TYPE     :
        case OBJ_FILE     :
        case OBJ_PROC     :
        case OBJ_DATAPROC :
        case OBJ_USE      :
        case OBJ_SQL      :
        case OBJ_SESSION  :
          mystate= EQUALSIGN;
          continue;
        case OBJ_ERROR    :
        default           :
          sprintf(pbuffer,"gexoc: buuuuuuurrrrppppp... <%s>\n
                 Cursor);
          gprintf();
          exit(16); }
case EQUALSIGN   :
  if ( !(Cursor= notwhite(Cursor)) )  break;
  mystate= (key_word == OBJ_SQL) ? SQL_STMT : LITERAL;
  if ( *Cursor == '=' || *Cursor == ':') ++Cursor;
  continue;
case LITERAL     :
```

```
                    if ( !(Cursor= notwhite(Cursor)) )
                       break;
                    if ( !(cp= strchr(Cursor, ' ')) )
                       cp= strchr(Cursor, '\0');
                    if ( *cp ) *cp++ = '\0';
                    switch ( key_word ) {
                       case OBJ_OBJECT :
                          strcpy(M->objname, Cursor); break;
                       case OBJ_TYPE   :
                          M->objtype= (*Cursor == 'D' ? ' ' : *Cursor);
                          break;
                       case OBJ_FILE   :
                          strcpy(M->filename, Cursor); break;
                       case OBJ_PROC   :
                          strcpy(M->procname, Cursor); break;
                       case OBJ_DATAPROC   :
                          strcpy(M->dataproc, Cursor);
                          for (i= 0; i < sizeof(M->dataproc); i++)
                             if (M->dataproc[i] == '\0')
                                M->dataproc[i] = ' ';
                          break;
                       case OBJ_USE    :
                          M->objuse= *Cursor; break;
                       case OBJ_SESSION:
                          M->objxtran= *Cursor; break;
                       default         :
                          sprintf(pbuffer,"gexoc: unrecoverable error 3\n");
                          gprintf();
                          exit(16); }
                    mystate= KEYWORD;
                    if ( Cursor= cp ) continue;
                    break;
                 case SQL_STMT   :
                    if ( !(Cursor= notwhite(Cursor)) ) break;
                    if ( *Cursor != '(' )
                       {sprintf(pbuffer,"gexoc: expected '('; found '%s'.\n",
                               Cursor);
                       gprintf();
                       exit(12); }
                    sqlstmt= galloc(500);
                    for (i= 0; i < 500; i++) sqlstmt[i]= '\0';
                    mystate= END_OF_STMT;
                    cp= sqlstmt;
                                         /* fall thru... */
                 case END_OF_STMT :
                    while ( *(++Cursor) )
                       if ( *Cursor == ')' )
                          {mystate= KEYWORD;
                          M->objdef= galloc(strlen(sqlstmt) + 1);
                          strcpy(M->objdef, sqlstmt);
                          gfree(sqlstmt);
                          ++Cursor;
                          break; }
                       else
                          {*cp++ = *Cursor;
                           continue; }
                    continue;
                 default          :
                    sprintf(pbuffer,"gexoc: unrecoverable error 1\n");
                    gprintf();
                    exit(16); } } }

/* if here, EOF was reached on OBD file */
      switch ( mystate ) {
         case EQUALSIGN  :
         case LITERAL    :
         case SQL_STMT   :
         case END_OF_STMT :
            sprintf(pbuffer,"gexoc:   unexpected end-of-file on %s\n",
                    filename);
            gprintf();
            exit(12);    }
```

```
            if ( M )
                if ( M->objname[0] )
                    {if ( PROCDUMP ) OBDprt(M);
                     SQL_write(exobjdb, M);} sprintf(pbuffer,"  \n");
            gprintf();
            gfree(record);
            if (!F)
                {sprintf(pbuffer,"open failed for %s\n",filename);
                 gprintf();
                 return(0); } fclose(F);
    return(0);}} static readrec(F, buffer)
    FILE *F; char *buffer;
    {int i;
     for (i= 0; i < 500; i++) buffer[i]= '\0';
     while (1)
         {fgets(buffer, 500, F);
          if ( feof(F) ) return(0);
          stoupper(buffer);
          if ( *(notwhite(buffer)) ) break; }
     return(1); } static OBDprt(M)
    struct exobj *M;
    {static int oc= 1;
     sprintf(pbuffer,"  \n");
     gprintf();
     sprintf(pbuffer," (%02d) Object:    <%s>\n",  oc++, M->objname);
     gprintf();
     sprintf(pbuffer,"      Type:      <%c>\n",  M->objtype);
     gprintf();
     if ( M->procname[0] )
         {sprintf(pbuffer,"      Processor: <%s>\n", M->procname);
          gprintf(); }
     if ( M->dataproc[0] )
         {sprintf(pbuffer,"      Data Proc: <%s>\n", M->dataproc);
          gprintf(); }
     if ( M->filename[0] )
         {sprintf(pbuffer,"      Filename:  <%s>\n", M->filename);
          gprintf(); }
     if ( M->objuse != ' ' )
         {sprintf(pbuffer,"      User:      <%c>\n", M->objuse);
          gprintf();
          sprintf(pbuffer,"      Session:   <%c>\n", M->objxtran);
          gprintf(); }
     if ( M->objdef )
         {sprintf(pbuffer,"      SQL:       <%s>\n", M->objdef);
          gprintf(); } } char *gexolud(cp)   /* lookup an external object data processor */
    char *cp;
    {SQL_sel(exobjdb, objname, cp);
     if (exobjdb.dbSEL)
         return(exobjdb.dbSEL->dataproc);
     return( (char *)0 );} char gexolux(cp)   /* lookup an external object duration */
    char *cp;
    {SQL_sel(exobjdb, objname, cp);
     if (exobjdb.dbSEL)
         return(exobjdb.dbSEL->objxtran);
     return( 0 );}
```

```
/***************************************************************/
/*                                                             */
/*        GFE.C                                                */
/*                                                             */
/*        Gnome rule intrepreter                               */
/*        Truth Binary Function Routines                       */
/*                                                             */
/*        Four types of functions exist:                       */
/*            1. truth  unary - input is stack or varptr       */
/*                             output is truth value           */
/*                             eg., true, false                */
/*            2. truth binary - input is two stacks or varptrs */
/*                             output is truth value           */
/*                             eg., ==, <, >, includes         */
/*            3. unary  input is stack or varptr               */
/*                             output is varptr                */
/*                             eg., sum, count                 */
/*            4. binary input is two stacks or varptrs         */
/*                             output is varptr                */
/*                             eg., merge, create              */
/***************************************************************/
#include  "grulmsg.h"
#include   "stsh.h"
#include "ctype.h"
#include "math.h"
#include <stdio.h>
include <string.h> extern struct gval True, False;
extern int giryrule;

long atol();
char *index();
extern OBJ *Cobjcurr;
extern int ruletrce;

char *gfmin(tmpptr)
    VAL *tmpptr;
 {char *minstr, *aPtr;
  if (!tmpptr) return(0);
  minstr = tmpptr->val;
  while (tmpptr->len)
     {if (gfcmp(tmpptr->val, minstr) < 0) {
         minstr = tmpptr->val;
         tmpptr = aPtr= (char *)tmpptr+((struct gval *)tmpptr)->len;}
      tmpptr = aPtr= (char *)tmpptr+((struct gval *)tmpptr)->len;}
  if (gfcmp(tmpptr->val, minstr) < 0)
         minstr = tmpptr->val;
  return(minstr);} char *gfmax(tmpptr)
    VAL *tmpptr;
 {char *maxstr, *aPtr;
  if (!tmpptr) return(0);
  maxstr = tmpptr->val;
  while (tmpptr->len)
     {if (gfcmp(tmpptr->val, maxstr) > 0) {
         maxstr = tmpptr->val;
         tmpptr= aPtr= (char *)tmpptr+((struct gval *)tmpptr)->len;}
      tmpptr= aPtr= (char *)tmpptr+((struct gval *)tmpptr)->len;}
  if (gfcmp(tmpptr->val, maxstr) > 0)
         maxstr = tmpptr->val;
  return(maxstr);} char gfne(tgtptr, srcptr)     /* not equal function          */
                              /* return codes - t true,      */
                              /*                f false      */
                              /*                0 undetermined */
    VAL *tgtptr, *srcptr;
 {char r;
  if (!tgtptr || !srcptr) return(0);
  r = (gfx(tgtptr, srcptr));
  if (r) return('t');
  return('f');}
```

```c
char gfe(tgtptr, srcptr)            /* determine true for two variables */
                                    /* - two binary truth variables     */
                                    /* return codes - t true,           */
                                    /*                f false           */
                                    /*                0 undetermined    */
    VAL *tgtptr, *srcptr;
    {int r;
     if (!tgtptr || !srcptr) return(0);
     r = (gfx(tgtptr, srcptr));
     if (r) return('f');
     return('t');} char gflt(tgtptr, srcptr)       /* determine less than stack variables*/
                                /* return codes - t true,           */
                                /*                f false           */
                                /*                0 undetermined */
    VAL *tgtptr, *srcptr;
    {int r = 0;
     if (!tgtptr || !srcptr) return(0);
     r = gfcmp(gfmax(tgtptr), gfmin(srcptr));
     if (r < 0) return('t');
     return('f');} char gfgt(tgtptr, srcptr)       /* determine greater than stack variables*/
                                /* return codes - t true,           */
                                /*                f false           */
                                /*                0 undetermined */
    VAL *tgtptr, *srcptr;
    {int r = 0;
     if (!tgtptr || !srcptr) return(0);
     r = gfcmp(gfmin(tgtptr), gfmax(srcptr));
     if (r > 0) return('t');
     return('f');} char gfle(tgtptr, srcptr)       /* determine less than stack variables*/
                                /* return codes - t true,           */
                                /*                f false           */
                                /*                0 undetermined */
    VAL *tgtptr, *srcptr;
    {int r = 0;
     if (!tgtptr || !srcptr) return(0);
     r = gfcmp(gfmax(tgtptr), gfmin(srcptr));
     if (r <= 0) return('t');
     return('f');} char gfge(tgtptr, srcptr)       /* determine less than stack variables*/
                                /* return codes - t true,           */
                                /*                f false           */
                                /*                0 undetermined */
    VAL *tgtptr, *srcptr;
    {int r = 0;
     if (!tgtptr || !srcptr) return(0);
     r = gfcmp(gfmin(tgtptr), gfmax(srcptr));
     if (r >= 0) return('t');
     return('f');}

/*******************************************************************/ glike(tgtptr, srcptr)
 VAL *tgtptr, *srcptr;
(
char *tPtr, *tgtsve;
char *sPtr, *srcsve;
int Wildcard = 0;

if (!tgtptr || !srcptr)
    return(0);
```

```
tgtsve = tPtr = tgtptr->val;
srcsve = sPtr = srcptr->val;

while (*tPtr != '\0' || *sPtr != '\0')
   {if (*tPtr == '?') {
       ++Wildcard;
       tgtsve = tPtr++;
       if (*sPtr == '\0')
           break;
       srcsve = sPtr;}
     else if (*tPtr == '_') {
       if (*sPtr == '\0' && !Wildcard)
           break;
       if (*sPtr == '\0' && Wildcard) {
           tPtr = tgtsve;
           if (srcsve != '\0')
               srcsve++;
           sPtr = srcsve;}
       else {
           ++tPtr;
           if (*sPtr != '\0')
               ++sPtr;}}
     else if (*tPtr == *sPtr) {
       if (*tPtr != '\0')
           ++tPtr;
       if (*sPtr != '\0')
           ++sPtr;}
     else if (Wildcard) {
       tPtr = tgtsve;
       if (srcsve != '\0')
           srcsve++;
       sPtr = srcsve;}
     else
       break;}
if (*tPtr == '\0' && *sPtr == '\0')
    return('t');
return('f');}

/****************************************************************/
gfx(tgtptr, srcptr)    /* compare between stack variables*/
    VAL *tgtptr, *srcptr;
   {int lt, ls, r; char *aPtr;
    while (tgtptr->len)
       {lt = tgtptr->len; ls = srcptr->len;
        if (r = gfcmp(tgtptr->val, srcptr->val)) return(r);
        tgtptr= aPtr= (char *)tgtptr + lt;
        srcptr= aPtr= (char *)srcptr + ls;
        /*(char *) tgtptr += lt; (char *) srcptr += ls;*/}
    return(gfcmp(tgtptr->val, srcptr->val));} gfex(tgtptr, srcptr) /* determine true for equality between stack variables*
                    /* return codes - t true   */
                    /*                f false  */
                    /*                0 undetermined */
    VAL *tgtptr, *srcptr;
   {if (!tgtptr || !srcptr) return(0);
    if (gfx(tgtptr, srcptr)) return('f');
    return('t');} long gflnum(ptr)
    char *ptr;
   {char tempcopy[50], *cp, *cx;
    strcpy(tempcopy, ptr);
    cp = tempcopy;
    cx = 0;
    while (*cp)
       {if (cx) *cx++ = *cp;
        else if (*cp == '.') cx = cp;
        cp++;}
    if (cx) *cx = '\0';
    return(atol(tempcopy));}
```

```
gfcmp(tgtptr, srcptr) /* compare two strings (numeric or character) */
    char *tgtptr, *srcptr;
    {long r;
     if (gfnum(tgtptr) && gfnum(srcptr))
        {r = gflnum(tgtptr) - gflnum(srcptr);
         if (!r) return(r);
         if (r > 0) return(1);
         return(-1);}
     else
        return(strcmp(tgtptr, srcptr));} gfnum(cp)                        /* test for numeric string */
            /* return codes - 0 true,   */
            /*                1 false   */
    char *cp;
    {char *chp;
     chp = cp;
     while (*chp)
        {if (isdigit(*chp) || (*chp == '.') || (*chp == '-')) chp++;
         else return(0);}
     return(1);}

/****************************************************************/
        /*                                                              */
        /*    GFL.C                                                     */
        /*                                                              */
        /*    Gnome rule intrepreter                                    */
        /*    List Truth Binary Function Routines                       */
        /*                                                              */
        /*    Four types of functions exist:                            */
        /*        1. truth   unary - input is stack or varptr           */
        /*                   output is truth value                      */
        /*                   eg., true, false                           */
        /*        2. truth binary - input is two stacks or varptrs      */
        /*                   output is truth value                      */
        /*                   eg., ==, <, >, includes                    */
        /*        3. unary input is stack or varptr                     */
        /*                   output is varptr                           */
        /*                   eg., sum, count                            */
        /*        4. binary input is two stacks or varptrs              */
        /*                   output is varptr                           */
        /*                   eg., merge, create                         */
        /****************************************************************/
    #include "string.h"
    #include "ctype.h"
    #include "math.h"
    #include "grulmsg.h"
    #include "gmsg.h"
    #include "stsh.h"

extern struct gval True, False;
extern OBJ *Cobjcurr, *Cobjptr();
extern int Gtpytarg;
extern int ruletrce;

char gflex(), *gfmin(), *gfmax();
char gflninc(tgtptr, srcptr)      /* not includes function       */
                         /* return codes - t true,       */
                         /*                f false       */
                         /*                0 undetermined */
    VAL *tgtptr, *srcptr;
    {char r;
     r = (gflex(tgtptr, srcptr));
     if (r == 'f') return('t');
     if (r == 't') return('f');
     return(r);} char gflinc(tgtptr, srcptr)         /* includes for two variables    */
                   /*  - two binary truth variables        */
                   /* return codes - t true,               */
```

```
                                    /*           f false         */
                                    /*           0 undetermined  */
    VAL *tgtptr, *srcptr;
    {return(gflex(tgtptr, srcptr));} char gfllt(tgtptr, srcptr)    /* determine less than stack variables*/
                                /* return codes - t true,       */
                                /*                f false       */
                                /*                0 undetermined */
    VAL *tgtptr, *srcptr;
    {int r;
     r = (int)gflex(tgtptr, srcptr);
     if (r < 0) return('t');
     return('f');} char gflgt(tgtptr, srcptr)    /* determine greater than stack variables*/
                                /* return codes - t true,       */
                                /*                f false       */
                                /*                0 undetermined */
    VAL *tgtptr, *srcptr;
    {if ((int)gflex(tgtptr, srcptr) > 0) return('t');
     return('f');}

/*****************************************************************/
gflx(tgtptr, srcptr)     /* compare between stack variables*/
    VAL *tgtptr, *srcptr;
    {int r; char *aPtr;
     while (tgtptr->len)
          {if (r = gflxinner(tgtptr, srcptr)) return(r);
     tgtptr= aPtr= (char *)tgtptr + ((struct gval *)tgtptr)->len;
          /*(char *) tgtptr += tgtptr->len;*/}
     return(gflxinner(tgtptr, srcptr));} gflxinner(tgtptr, tmpptr)
    VAL *tgtptr, *tmpptr;
    {int r, ls, lt; char *aPtr;
     while (tmpptr->len)
          {ls = tmpptr->len;
           if (!(r = gfcmp(tgtptr->val, tmpptr->val))) return(r);
           tmpptr= aPtr= (char *)tmpptr + ls;
          /*(char *) tmpptr += ls;*/}
     return(gfcmp(tgtptr->val, tmpptr->val));} char gflex(tgtptr, srcptr)
     /* determine true for equality between stack variables*/
                                    /* return codes - t true  */
                                    /*                f false */
                                    /*                0 undetermined */
    VAL *tgtptr, *srcptr;
    {if (!tgtptr || !srcptr) return(0);
     if (gflx(tgtptr, srcptr)) return('f');
     return('t');}

/*****************************************************************/

/* target pointer points to variable name; source pointer points to data */
gsapp(tgtptr, srcptr)
struct gval *tgtptr, *srcptr;
{
struct gval *ValPtr, *TemPtr; struct var *tgtvar;
char *aPtr;
int i = 0;
if (!tgtptr || !srcptr) return(2);
if (!(tgtvar = stshvare(Cobjcurr, tgtptr->val, 0, 0))) {
    gasqstsh(tgtptr->val, srcptr);
    return(4);}
TemPtr = (struct gval *) galloc(stshlen(srcptr) + stshlen(&tgtvar->v)+20);
ValPtr = TemPtr;
stshcpy(TemPtr, &tgtvar->v);         /* copy stash variable        */
while (TemPtr->len)
     TemPtr = aPtr = (char *) TemPtr + ((struct gval *) TemPtr)->len;
TemPtr->len = strlen(TemPtr->val) + 3;
```

```
TemPtr = aPtr = (char *) TemPtr + ((struct gval *) TemPtr)->len;
stshcpy(TemPtr, srcptr);      /* copy stash variable           */
gasqstsh(tgtptr->val, ValPtr);
gfree(ValPtr);
return(4);}
/****************************************************************/

/* target pointer points to variable name; source pointer points to data */
gflint(tgtptr, srcptr)
struct gval *tgtptr, *srcptr;
{
char *aPtr;
int r = 0;
if (!tgtptr || !srcptr) return(0);
while (tgtptr->len)
   {if (!(gflxinner(tgtptr, srcptr)))
       return('t');
    tgtptr= aPtr= (char *)tgtptr + ((struct gval *)tgtptr)->len;}
if (!(gflxinner(tgtptr, srcptr)))
    return('t');
return('f');}

/* target pointer points to variable name; source pointer points to data */
gmin(tgtptr, srcptr)
struct gval *tgtptr, *srcptr;
{
struct gval *ValPtr; struct var *tgtvar;
if (!tgtptr || !srcptr) return(2);
if (!(tgtvar = stshvare(Cobjcurr, tgtptr->val, 0, 0))) {
    gasqstsh(tgtptr->val, srcptr);
    return(4);}
ValPtr = &tgtvar->v;
if ((gfcmp(gfmax(ValPtr), gfmax(srcptr))) > 0)
    gasqstsh(tgtptr->val, srcptr);
return(4);}
/****************************************************************/

/* target pointer points to variable name; source pointer points to data */
gmax(tgtptr, srcptr)
struct gval *tgtptr, *srcptr;
{
struct gval *ValPtr; struct var *tgtvar;
if (!tgtptr || !srcptr) return(2);
if (!(tgtvar = stshvare(Cobjcurr, tgtptr->val, 0, 0))) {
    gasqstsh(tgtptr->val, srcptr);
    return(4);}
ValPtr = &tgtvar->v;
if ((gfcmp(gfmax(ValPtr), gfmax(srcptr))) < 0)
    gasqstsh(tgtptr->val, srcptr);
return(4);}
/****************************************************************/
/****************************************************************/
/*                                                              */
/*      GFTRUE.C                                                */
/*                                                              */
/*      Gnome rule intrepreter                                  */
/*      Truth Binary Function Routines                          */
/*                                                              */
/*      Four types of functions exist:                          */
/*         1. truth  unary - input is stack or varptr           */
/*                   output is truth value                      */
/*                   eg., true, false                           */
/*         2. truth binary - input is two stacks or varptrs     */
/*                   output is truth value                      */
/*                   eg., ==, <, >, includes                    */
/*         3. unary input is stack or varptr                    */
/*                   output is varptr                           */
/*                   eg., sum, count                            */
/*         4. binary input is two stacks or varptrs             */
/*                   output is varptr                           */
```

```c
/*                      eg., merge, create                      */
/****************************************************************/
#include    "grulmsg.h"
#include    "stsh.h"
#include    "ctype.h"

extern struct gval True, False;

char *index();
char gftrue(tgtptr, srcptr)              /* determine true */
    VAL *tgtptr, *srcptr;
    {char r;
     r = gfex(tgtptr, &True);
     return(r);} char gfntrue(tgtptr, srcptr)             /* not true function        */
    VAL *tgtptr, *srcptr;
    {char r;
     if (!tgtptr) return(0);
     r = gfex(tgtptr, &True);
     return(r);} char gffalse(tgtptr, srcptr)             /* not true function        */
    VAL *tgtptr, *srcptr;
    {return(gfntrue(tgtptr, srcptr));}

/****************************************************************/
/*                                                              */
/*      GFUN.C                                                  */
/*                                                              */
/*      Gnome rule intrepreter                                  */
/*      function interface                                      */
/*                                                              */
/****************************************************************/
#include    "string.h"
#include    "grulmsg.h"
#include    "gmsg.h"
#include    "stsh.h"

char gdatemin(), gdatepls(), gstrue(), gsfalse(), ga(), gco();
char gftrue(), gffalse(), gfntrue(), gfe(), gfne(), gtrue();
char gfge(), gfle(), glike();
char gflt(), gfgt(), gfnull(), gfexists(),
     gfnexist(), gflinc(), gflninc(), gflint();

/****************************************************************
/* Function list for access and tokens                          */
/* always add to the end of this list                           */
/****************************************************************/
char *intfunct[] =
    { " ", "TRUE", "FALSE", "A", "=", "^=", "GT", "LT",
      "^TRUE", "EXISTS", "^EXISTS", "INCL", "^INCL",
      "GE", "LE", "LIKE", "INTER" };

char ctlfunct[] = {0, 0, 0, 0, 0, 0+FUNCT_NEG, 0, 0,
                   0, 0+FUNCT_EXISTS, 0+FUNCT_EXISTS,
                   0, 0+FUNCT_NEG, 0, 0, 0, 0};

char (*procfunc[])() =
      {&gfnull, &gftrue, &gffalse, &ga, &gfe, &gfne, &gfgt, &gflt,
       &gfntrue, &gfexists, &gfnexist, &gflinc, &gflninc, &gfge, &gfle,
       &glike, &gflint};

int funcnt = 17;

extern char *intfunct[];
extern int funcnt;
extern int ruletrce; extern char pbuffer[500];
extern int PROCSTOP;
char True[] = "\0\0TRUE";
char False[] = "\0\0FALSE";
extern OBJ *Cobjcurr;
```

```
char *gfunp(n)  /* return pointer to function oper  */
    int n;
    {return(intfunct[n]);} char gfun(n, tgtptr, srcptr)        /* process predicate function */
    int n; struct gval *tgtptr, *srcptr;
    {char r = '\0';
     if (n < 0) return('t');
     if (n > funcnt)
         {sprintf(pbuffer,"gfun woops - illegal token %d\n", n);
          gprintf();
          return('f');}
     r = (*procfunc[n]) (tgtptr, srcptr);
     return(r);} char ga(tgtptr, srcptr)
    struct gval *tgtptr, *srcptr;
    {return('t');} gfunt(oper)        /* return token for predicate function */
    char *oper;
    {int i;
     for (i = 0; i < funcnt; i++)
         {if (strcmp(oper, intfunct[i])) ;
          else
             {
              break;}}
     if (i == funcnt)
         {sprintf(pbuffer,"no function match for %s\n", oper);
          gprintf();
          return(-1);}
     return(i);} char gfnull(tgtptr, srcptr)
    struct gval *tgtptr, *srcptr;
    {if (srcptr)
         {sprintf(pbuffer,"gfnull invalid null oper\n");
          gprintf();
          return('f');}
     if (!tgtptr) return(0);
     return(gtrue(tgtptr));} char gtrue(val)    /* determine true for entry*/
    struct gval *val;
    {if (!val) return('u');
     if (strcmp(val->val, "TRUE")) return('f');
     return('t');}

VAR *gfunexst(objet, varname, oper)  /* setup variable for existance test */
    OBJ *objet; char *varname; int oper;
    {VAR *vptr;
     static char NULLVAR[] = "\0\0\0";
     if (isEXISTS(oper))
         {if (vptr = stshvare(objet, varname)) return(vptr);
/*  check for prev marker  */
          vptr = stshdatx(objet, varname, NULLVAR, 'e');}
/*  don't forward fire this  */
     return(0);} char gfexist(oper, tgtvar)   /* real entry for exists functions */
    VAR *tgtvar; char oper;
    {if (oper == 9) return(gfexists(tgtvar));
     else if (oper == 10) return(gfnexist(tgtvar));
     return(0);} char gfexists(tgtvar)   /* existance function   */
    VAR *tgtvar;
    {if (!tgtvar) return('u');
     if (tgtvar->status == 'n') return('f');  /* known to not exist  */
     if (tgtvar->status != 'e') return('t');  /* not existance pending */
     return('u');}
```

```
char gfnexist(tgtvar)         /*  non-existance function    */
   VAR *tgtvar;
   {if (!tgtvar) return('u');
    if (tgtvar->status == 'n') return('t');
    if (tgtvar->status == ' ') return('f');
    return('u');}

/****************************************************************/
/*                                                              */
/*      GIRprts.C                                               */
/*                                                              */
/*      Gnome rule intrepreter                                  */
/*      Print rules - short form                                */
/*                                                              */
/****************************************************************/
#include   "string.h"
#include   "stdlib.h"
#include   "grulmsg.h"
#include   "gmsg.h"

extern char pbuffer[500];
char *gactp(), *gfunp();
char vardata[300];
int ruleindex = 0, prtsort = 0;

girprt(grule)         /* print output rule    */
   struct grulmsg *grule;
   {int i, j, intvar; struct gval *vp; struct grulobj *obj, *objend, *objs;
    struct grulsubj *sub, *subend;  char *C, *D, *R, *S, buffer[100];
    char side; char linestrt[12]; int line = 0; long thisproc;
    sprintf(linestrt, "%04d%03d%03d",
           grule->ruleno, grule->ruleinst, ++ruleindex);
    if (!prtsort) linestrt[0] = '\0';
    C = (char *) grule;

sprintf(pbuffer, "%s%02d  Rule: %04d.%03d\
   type=%c    stat=%c    prog=%c",
              linestrt, line++,
              grule->ruleno, grule->ruleinst, grule->ruletype,
              grule->rulestat, grule->ruleprog); gprintr();

R = C + grule->rulerout;  D = C + grule->ruledata;
    objs = objend = obj = (struct grulobj *) R;
    intvar = grule->rulepred - grule->rulerout;
    (char *) objend = (char *) objend + intvar;

S = C + grule->rulepred;
    sub = (struct grulsubj *) S;
    intvar = grule->ruledata - grule->rulepred;
    (char *) subend = (char *) sub + intvar;
    while (sub < subend)
       {side = 'p';
        if (sub->next == 2 || sub->status == 'c') side = 'a';
        {sprintf(pbuffer, "%s%02d %c %c", linestrt, line++,
              side, sub->status); gprintrn();} if (sub->targ)
           {thisproc = (objs+(sub->targ - 1))->node_pid;
            if (grule->node_pid
               && grule->node_pid == thisproc)
                  {sprintf(pbuffer, "  *"); gprintrn();}
                else {sprintf(pbuffer, "   "); gprintrn();} if ((objs + sub->targ - 1)->origobj)
               {gprts(D + (objs+(sub->targ - 1))->origobj, vardata, '.');
                sprintf(pbuffer, "%s", vardata); gprintrn();} if ((objs + sub->targ - 1)->val)
               (gprtsl(D + (objs+(sub->targ - 1))->val, vardata, ',');

if ((objs + sub->targ - 1)->origobj)
                {sprintf(pbuffer, "="); gprintrn();}
            sprintf(pbuffer, "%s", vardata); gprintrn();}}
```

```
        else {sprintf(pbuffer, "    <>   "); gprintrn();} if (sub->subj)
        {thisproc = (objs+(sub->subj - 1))->node_pid;
         if (grule->node_pid
              && grule->node_pid == thisproc)
                 {sprintf(pbuffer, "    *"); gprintrn();}
         else {sprintf(pbuffer, "     "); gprintrn();}
         if ((objs + sub->subj - 1)->origobj)
             {gprts(D + (objs + (sub->subj - 1))->origobj, vardata, '.'
              sprintf(pbuffer, "%s", vardata); gprintrn();} if ((objs + sub->subj - 1)->val)
             {gprtsl(D + (objs + (sub->subj - 1))->val, vardata, ',');
              if ((objs + sub->subj - 1)->origobj)
                  {sprintf(pbuffer, "="); gprintrn();}
              sprintf(pbuffer, "%s", vardata); gprintrn();}} if (sub->oper < 256)
         {sprintf(pbuffer, "    opr:%s", (sub->next == 1
               || (sub->status == 't' || sub->status == 'f'))
               ? gfunp(sub->oper) : gactp(sub->oper)); gprintr();}
    else {sprintf(pbuffer, " "); gprintr();}
    sub++;}
sprintf(pbuffer, "%s%02d", linestrt, line); gprintr();
return(0);}

/****************************************************************/
/*                                                              */
/*      GIRX.C                                                  */
/*                                                              */
/*      Undetermined Object Queue Manager                       */
/*      Fixed list rule form                                    */
/*                                                              */
/****************************************************************/
#include     "string.h"
#include     "grulmsg.h"
#include     "gmsg.h"
#include     "stsh.h"

extern int ruletrce; extern char pbuffer[500];
extern struct gval True, False;
struct gval *gfun();
struct gval *gfnull();
char gitrue();

girx(grule)             /* sub-object pre processor     */
    struct grulmsg *grule;
   {OBJ *objptr; struct ruleq *qptr; struct grulmsg *qrule;
    objptr = Cobjptr(grule->node_pid);

/* queue rules for undetermined tuples  */
    if (objptr->status == 'u' && girxsel(grule))
        {if (ruletrce)
             {sprintf(pbuffer,"girx suspend %04d.%03d type %c\n",
                  grule->ruleno, grule->ruleinst, grule->ruletype);
              gprintf(); }
         qptr = (struct ruleq *) galloc(sizeof(struct ruleq));
         qptr->rpt = grule;
         qptr->next = objptr->rptr;
         objptr->rptr = qptr;
         return(0);}

/* drop rules for unqualified tuples    */
    if (objptr->status == 'f')
        {grule->rulestat = 'f'; gnwtg(grule); return(0);}

/* Determine truth of SQL rule and update queue accordingly
    or simply send the rule to the intrepreter.                 */ if (grule->ruletype == 's')        /* It's a SQL rule */
        {char sqlstat; int ruleno, ruleinst;
```

```
               ruleno = grule->ruleno; ruleinst = grule->ruleinst;
               sqlstat = giry(grule);
                           /* dequeue rules following SQL determination */
               if (objptr->status == 'u') objptr->status = sqlstat;
               if (objptr->status != 'u')
                   {qptr = objptr->rptr;
                    if (ruletrce) {
         sprintf(pbuffer,"girx SQL rule %04d.%03d determined %c objptr %lx rptr %lx\
                        ruleno, ruleinst,
                        sqlstat, objptr, objptr->rptr);
                        gprintf(); }
                    while (qptr)
                        {qrule = qptr->rpt;
                         if (objptr->status == 'f')
                             {qrule->rulestat = 'f';
                              gnwtg(qptr->rpt);}
                         else giry(qptr->rpt);
                         if (ruletrce)
                             {sprintf(pbuffer,"girx dequeing %04d.%03d\n",
                                     qrule->ruleno, qrule->ruleinst);
                              gprintf(); }
                         objptr->rptr = qptr->next; free(qptr);
                         qptr = objptr->rptr;}})

else  giry(grule);

return(0);} girxsel(grule)      /* DETERMINE IF SQLRULE APPLIES TO THIS OBJECT  */
     struct grulmsg *grule;
    {struct grulobj  *objend, *objs; int intvar;
     char *C, *D, *R, *S; struct grulsubj *sub, *subend;
     if (grule->ruletype != 's') return(1);    /* true    */
     C = (char *) grule;
     R = C + grule->rulerout;   S = C + grule->rulepred;
     objs = (struct grulobj *) R;

/* loop through each action  */
     sub = (struct grulsubj *) S;
     intvar = grule->ruledata - grule->rulepred;
     (char *) subend = (((char *) sub) + intvar);
     intvar = grule->ruledata - grule->rulepred;
     (char *) subend = (((char *) sub) + intvar);
     while (sub < subend)
          {if (sub->next == 2)
              {if (sub->oper == 5)       /* select operator */
                  {
                   if ((objs + sub->targ - 1)->node_pid == grule->node_pid)
                          return(0);}}
           sub++;}
     return(1);}

/*****************************************************************/
/*                                                               */
/*      GIRY.C                                                   */
/*                                                               */
/*      Gnome rule intrepreter                                   */
/*      Fixed list rule form                                     */
/*                                                               */
/*****************************************************************/
#include    "string.h"
#include    "grulmsg.h"
#include    "gmsg.h"
#include    "stsh.h"

extern char pbuffer[500];
char gitrue();
char gfun();
VAL *gfnull(), *girstsh();

int ruletrce, ruleprt = 0;
extern OBJ *Cobjcurr;
extern VAL True, False;
```

```
long gs_backwards     = 0;   /* statistics accumulators  */
                             /* nbr/rules selected backwardly     */
long gs_forwards      = 0;   /* nbr/rules selected forwardly      */
long gs_completions   = 0;   /* nbr/rules triggered & fired       */
long gs_curcount      = 0;   /* nbr of rules currently in system  */
long gs_maxcount      = 0;   /* hiwatermark of rules in system    */
long gs_refused       = 0;   /* number of refusal incidents       */
long gs_fetches       = 0;   /* number of rule retrievals         */
long gs_true          = 0;   /* number of TRUE conclusions        */
long gs_false         = 0;   /* number of FALSE conclusions       */
long gs_tuples        = 0;   /* number of data base tuples fetched*/
long gs_routes        = 0;   /* number of rule dispatches         */
long gs_suspensions   = 0;   /* number of rule suspensions        */
long gs_resends       = 0;   /* number of rule resends            */
long gs_pends         = 0;   /* number of rule pends              */
long gs_requeues      = 0;   /* number of rule requeues           */ short girykbid = 0, giryrule = 0, giryinst = 0;
struct grulmsg *giryrptr;

giry(grule)              /* fixed list form intrepreter   */
    struct grulmsg *grule;
   {struct grulobj *objs; int sdispl, tdispl, backchain;
    int rhs = 0, complete = 1; char true = 0; long node_pid;
    struct grulsubj *sub, *subend;
    char *C, *D, *R, *S, *V;  int intvar;
    char vardata[500]; /*  temporary - prevents recursion garbage */
    char stkl[50], *stk, *stkstrt; int objflag = 0;
    VAL *srcptr, *tgtptr; VAR *tgtvar;

giryrule = grule->ruleno;
    giryinst = grule->ruleinst;  giryrptr = grule;
    node_pid = grule->node_pid;
    stk = stkstrt = &stkl[0];
    C = (char *) grule;
    if (grule->rulestat == 't') {rhs = 1; true = 't';} if (ruletrce)
  {sprintf(pbuffer," =>rule%04d inst %03d stat %c, node %04ld Cobjcurr %lx\n
              grule->ruleno, grule->ruleinst,
              grule->rulestat, grule->node_pid, Cobjcurr);
       gprintf(); }

R = C + grule->rulerout;  D = C + grule->ruledata;
    objs = (struct grulobj *) R;

S = C + grule->rulepred;  V = C + grule->rulevars;
    sub = (struct grulsubj *) S;
    intvar = grule->ruledata - grule->rulepred;
    (char *) subend = (((char *) sub) + intvar);
       /* if rule is true find first action  */
    if (rhs) while (sub < subend) {if (sub->next == 2) break; sub++;} while (sub < subend)
      {srcptr = tgtptr = 0; tgtvar = 0;
       if (sub->next != 4)
         {if (sub->next == 1)
             {backchain = isNEG(sub->oper);}
          else backchain = rhs;
          if (sub->subj)
             {if (sdispl = (objs + sub->subj - 1)->val)
                 {(char *) srcptr =  D + sdispl;}
              else
              if ((sdispl = (objs + sub->subj - 1)->objname)
                  && node_pid == (objs + sub->subj - 1)->node_pid
                  && !((VAL *) (D + sdispl))->len)
                 {gprts(D + sdispl, vardata, '.');
                  if ( !(srcptr = girststh(Cobjcurr, vardata, 0))
                      && gnwtgsusp(grule) ) return(0);
              }} if (sub->targ && sub->next != 4)
             {if (tdispl = (objs + sub->targ - 1)->val)
```

```
                ((char *) tgtptr = D + tdispl;}
            else
            if ((tdispl = (objs + sub->targ - 1)->objname)
                    && node_pid == (objs + sub->targ - 1)->node_pid
                    && !((VAL *) (D + tdispl))->len)
                (gprts(D + tdispl, vardata, '.');
                 if (sub->next == 1)
                    {tgtptr= girstsh(Cobjcurr, vardata,isEXISTS(sub->oper
                     tgtvar= gfunexst(Cobjcurr, vardata,sub->oper);}
                else
                    (char *)tgtptr = D + tdispl;}}

/* add intermediate variable to message  */
    if (Cobjcurr->status == 't')
       {if (sub->oper)
           {if (srcptr && !tgtptr && sub->targ
                && !(objs + sub->subj - 1)->val
                && node_pid == (objs + sub->subj - 1)->node_pid)
                 {(objs + sub->subj -1)->val = V - D;
                  stshcpy(V, srcptr);
                  V += sdispl = stshlen(srcptr);
                  grule->rulelen += sdispl;
                  grule->rulevars += sdispl;
                  grule->ruleprog = 'p';
                  /*grwrt(grule);*/} if (!srcptr && tgtptr && sub->subj && sub->next == 1
                && !(objs + sub->targ - 1)->val
                && node_pid == (objs + sub->targ - 1)->node_pid)
                  {
                   (objs + sub->targ -1)->val = V - D;
                   stshcpy(V, tgtptr);
                   V += tdispl = stshlen(tgtptr);
                   grule->rulevars += tdispl;
                   grule->ruleprog = 'p';
                   grule->rulelen += tdispl;}} if (ruletrce) {sprintf(pbuffer,"side %d opr=%d backchain %d\n"
                sub->next, sub->oper, backchain); gprintf();}}
        else if (ruletrce) {sprintf(pbuffer,"\n"); gprintf();} if (sub->next == 2 && sub->oper == 3)
/* stop actions if create  */
            (objflag = 1; break;} if (sub->next == 1 && !rhs)
            {*stk = (isEXISTS(sub->oper))
                         ? gfexist(sub->oper, tgtvar)
                         : gfun(sub->oper, tgtptr, srcptr);
             if (!*stk)
                 *stk = 'u';      /* the operation is undetermined */
             if ((sub->status = *stk++) != 'u')
                 sub->next = 4;} if (sub->next == 2 && rhs && tgtptr && true == 't')
            {sub->next = gact(sub->oper, tgtptr, srcptr);
             if (sub->next == 4) sub->status = 'c';} if (sub->next == 4)             /* mark used routings */
            {if (sub->targ) (objs + sub->targ - 1)->next = 4;
             if (sub->subj) (objs + sub->subj - 1)->next = 4;
             /*  mark rule to indicate progress was made */
             grule->ruleprog = 'p';}} sub++;

/************* End of LHS ************/
    if (!rhs && sub->next == 2)
        {while (stkstrt < stk)
            {true = *stkstrt;
             if (true == 'u') complete = 0;
             if (true == 'f')
                  {grule->rulestat = true;
```

```
            if (ruleprt) /*grwrt(grule);*/
                {gMSGr(grule, gRLP, grwrt);}
                gtob(grule); return(true);}
            stkstrt++;}
        if (!complete) {true = 'u';}
        grule->rulestat = true;
        rhs = 1;}}
    grule->rulestat = true;
    if (ruletrce) {sprintf(pbuffer,"giry rule%04d.%03d status=%c\n",
                    grule->ruleno, grule->ruleinst, true);
                gprintf();}
    if (ruleprt)
        gMSGr(grule, gRLP, grwrt);

if (objflag && true == 't')  /* send to Rule Router    */
        {gMSGr(grule, gRMR, gtocrule);}
    else
        gtob(grule);            /* send to next object    */
    return(true);}

/***************************************************************/
/*   General data fetch                                          */
/***************************************************************/
VAL *girstsh(Cobj, varname, exists)
    OBJ *Cobj; char *varname; int exists;
{static struct { short len; char val[100]; } Agval; int i;
 int (*fp)(); char fixname[20];
 if ( !Cobj->dprocfn ) /* check for presence of external data processor
    return( stshvar(Cobj, varname, exists) );
 Agval.len= 0;
 for (i= 0; i < sizeof(Agval.val); i++) Agval.val[i]= '\0';
 for (i= 0; i < sizeof(fixname);   i++) fixname[i]= ' ';
 strcpy(fixname, varname); fixname[strlen(varname)]= ' ';
 (*(fp= &Cobj->dprocfn))(varname, Cobj->ddata, &Agval);
 return( &Agval ); }

/****************************************************************/
/**/
/* GIRZ.C*/
/**/
/* Converter from reverse polish to fixed list rule message*/
/**/
/****************************************************************/
#include    "grulmsg.h"
#include    "gmsg.h"
#include    "grule.h"
#include    "stdio.h"
#include    "stsh.h"

#define    varinit *(varptr = pp) = '\0'; \
       *(varptr + 1) = '\0'; pp = varptr + 2 define    subjinit csubj->next = colons; \
       (++csubj)->next = 0; csubj->targ = 0; \
       csubj->status = 'u'; csubj->subj = 0; csubj->oper = 0 define    routinit crout->next = colons; \
       (++crout)->val = 0; crout->node_pid = 0;\
     crout->objname = 0; crout->origobj = 0; crout->next = 255 char *malloc(), *index();
struct grulmsg rulehdr;
char ruledata[1000], *varstrt;
char rulerout[400];
char ruleopr[400];
char outdata[2000];

char *gir(rule)
    struct rule *rule;   /* rule to be intrepreted */
 {char c, *cp, *pp, *varptr, *strstrt;  int length;
  int intvar;
  struct grulobj *rout, *crout; struct grulsubj *subj, *csubj;
  int colons = 0;
```

```
        cp = &rule->rtxt[0];
        if (*cp != ':')  return(0);

rulehdr.ruleno = rule->ruleno;
        rulehdr.node_pid = 0;
        rulehdr.ruleIntl = 0;
        rulehdr.rulestat = ' ';
        rulehdr.rulestrt = 0; rulehdr.ruleend = 999999;
        rulehdr.rulestat = ' '; rulehdr.ruleprog = 'n';
        rulehdr.ruletype = 'r';
        rulehdr.rulercur = 0;
        crout = rout = (struct grulobj *) &rulerout[0];
        csubj = subj = (struct grulsubj *) &ruleopr[0];
        varstrt = &ruledata[0];
        pp = varptr = &ruledata[1];
        varinit;
        crout->val = 0; crout->node_pid = 0;
        crout->objname = 0; crout->origobj = 0; crout->next = 255;
        csubj->targ = 0;
        csubj->status = 'u'; csubj->subj = 0; csubj->oper = 0;

while (*cp)

{if (*cp == ',')                  /* end of list element */
        {++cp; ++pp;
         gstorlen(varptr, pp - varptr);
         if (!crout->val) crout->val = varptr - varstrt;
         varinit;} if (*cp == ';')                  /* end of list variable */
        {++cp; ++pp;
         if (!crout->val) crout->val = varptr - varstrt;
         varinit;
         if (csubj->subj && csubj->targ)
       {subjinit;}
         if (csubj->targ)
       {subjinit;}
         if (csubj->subj) csubj->targ = crout - rout + 1;
         else    csubj->subj = crout - rout + 1;
         routinit;} if (*cp == '.')                  /* end of name element */
        {++cp; ++pp;
         gstorlen(varptr, pp - varptr);
         if (!crout->objname)
      crout->origobj = crout->objname = varptr - varstrt;
         varinit;} if (*cp == '%')                  /* end of target variable name */
        {++cp; ++pp;
         if (!crout->objname)
      crout->origobj = crout->objname = varptr - varstrt;
         varinit;
         if (csubj->targ)
       {subjinit;}
         csubj->targ = crout - rout + 1;
         routinit;} if (*cp == '#')                  /* data retrieval operation */
        {cp++; ++pp;
         if (!crout->objname)
      crout->origobj = crout->objname = varptr - varstrt;
         varinit;
         if (csubj->subj && csubj->targ)
       {subjinit;}
         if (csubj->targ)
       {subjinit;}
         if (csubj->subj) csubj->targ = crout - rout + 1;
         else    csubj->subj = crout - rout + 1;
         routinit;} if (*cp == '@')                  /* function action marker */
        {cp++; pp = varptr;
```

```
        csubj->oper = gopert(colons, varptr + 2); /* tokenize oper */
        if (colons == 2 && !strcmp(varptr + 2, "SEL"))
    rulehdr.ruletype = 's';
        varinit;
        subjinit;} if (*cp == '!')   /* check out pre-conditions        */
       {cp++; ++pp;
        if (!crout->objname)
   crout->origobj = crout->objname = varptr - varstrt;
varinit;
csubj->subj = crout - rout + 1;
csubj->oper = 256;
routinit;
subjinit;} if (*cp == ':')  /* check for end of section */
      {*pp = '\0'; cp++;
       if (csubj->subj || csubj->targ)
   {subjinit;}
       switch (++colons)
       (case 1: continue;     /* begining colon */
        case 2: continue;})   /* end of LHS     */ if (*cp == '\n') *cp= '\0';
  if (*cp == '\0')         /* end */
      {
       rulehdr.rulerout = sizeof rulehdr;
       rulehdr.rulepred = (crout - rout) * sizeof(struct grulobj)
   + rulehdr.rulerout;
       rulehdr.ruledata = (csubj - subj) * sizeof(struct grulsubj)
   + rulehdr.rulepred;
       intvar = varptr - varstrt;
       rulehdr.rulevars = intvar + rulehdr.ruledata;
       glencpy(rulehdr.rulelen = sizeof rulehdr, outdata, &rulehdr);
       glencpy(length = rulehdr.rulepred - rulehdr.rulerout,
         outdata + rulehdr.rulelen, rulerout);
       rulehdr.rulelen += length;
       glencpy(length = rulehdr.ruledata - rulehdr.rulepred,
         outdata + rulehdr.rulelen, ruleopr);
       rulehdr.rulelen += length;
       glencpy(length = rulehdr.rulevars - rulehdr.ruledata,
         outdata + rulehdr.rulelen, ruledata);
       rulehdr.rulelen += length;
       glencpy(2, outdata, &rulehdr);
       /*girprt(&outdata);*/ break;} if (*cp == '\'' || *cp == '"')   /* check for delimited variable */
     {strstrt = cp;
      c = *cp++;
      while ((*cp) && (*cp != c)) *pp++ = *cp++;
      *pp++ = '\0'; cp++;
      if (!*cp) {printf("Unterminated string %s\n", strstrt);
  --cp;}} else *pp++ = toupper(*cp++);
   *pp = '\0';}
     return(outdata);} glencpy(len, x, y)  /* copy fixed length segment  */
     int len; char *x, *y;
     {
     while (len--) *x++ = *y++;} gstorlen(cptr, len)    /*  store length into string  */
     struct gval *cptr; int len;
     {cptr->len = len; return(0);} gstrcpy(x, y)  /*  length controlled move  */
     struct gval *x, *y;
     {int i;
     i = gstrlen(y);
     while (i) *x++ = *y++;
     return(0);}
```

```
gstrlen(val)    /* get length from structure */
    struct gval *val;
    {return(val->len);} giobjadd(displ, varptr, varend)         /* add variable to object list */
    int displ; char *varptr, *varend;
    {if (!displ) displ = varptr - (char *) varstrt;
        printf("\n(7) varptr-varstrt=%d",varptr-varstrt);
    return(displ);} gopert(side, varptr) /* tokenize the operators on each side */
    int side;   char *varptr;
    {if (side == 1) return(gfunt(varptr));
    return(gactt(varptr));}

/***************************************************
/*      gmsgp.c
/*
/*      Message Processor
 *
 *      This module emulates message passing for messages other
 *      than rule messages.  Options control FIFO or LIFO.
/*
/***************************************************/
#include "gmsg.h"

struct msg {int len; long node_pid; int msgtype;};
struct amsgq {struct amsgq *next; struct amsgq *prev;
            struct msg *msgptr; char (*procptr)();};
extern int ruletrce; extern char pbuffer[500]; extern int PRCSTRAT;
int qsize = 0, qmax = 0;

/********************** process message ********************************/
/* This routine receives messages from the processors queues them and   */
/* and involkes the requested processor   */
/***********************************************************************/
gmsgp(mp, target, pp)
    struct msg *mp; int (*pp)(); int target;
    {struct amsgq *np, *act;
    static struct amsgq *activmq = 0, *activmql = 0;
    /*gprocvct(target);   /* account for message targets */
        (*pp) (mp);
        gfree(mp);
        return(0);   /***************/
    act = activmq;
/***if (ruletrce)
        {sprintf(pbuffer,"gmsgp Queuing msg %d len %d target %d\n",
        mp->msgtype, mp->len, target);
            gprintf(); }***/
    if ( ++qsize > qmax )
        {qmax=qsize;
         printf("                                     msg queue:   %d\n",qmax np = (struct amsgq *) galloc(sizeof(struct amsgq));
    np->msgptr = mp; np->procptr = pp;
    np->next = 0; np->prev = 0;

if (PRCSTRAT)
        {np->next = activmq;
         if (activmq) activmq->prev = np;
         activmq = np;}                     /* enque msg at front */
    else
        (if (activmql)
            {np->next = activmql->next;
                activmql->next = np;}     /* enqueue msg at end */
            np->prev = activmql;
            activmql = np;}
    if (!activmq) activmq = np;
    if (!activmql) activmql = np;
    /* if (ruletrce)
        (sprintf(pbuffer,"gmsgp return act %lx\n", act);
            gprintf(); }*/
    if (act) return(0);
```

```
   /* if (ruletrce)
       (sprintf(pbuffer,"gmsg message processing active\n"); gprintf(); }*/
   np = activmq;    /* dequeue initial rule   */
   while (np)
       {/*if (ruletrce) printf("gmsgp dequeing %d\n", np->msgptr->msgtype);
        (*np->procptr) (np->msgptr);   /* send message to processor */
        if (!np->prev) {activmq= np->next; if (activmq) activmq->prev= 0;}
        else  np->prev->next = np->next;
        if (np->next) np->next->prev = np->prev;
        if (activmql == np) activmql = np->next;
        gfree(np->msgptr);
        gfree(np);
        np = activmq;}             /* contine with next */
   activmql = 0;
   return(0);}

/******************* macro test *******************/
gmtest()
   {int message; char (*routine)(); int target;
   gMSG(gExternalDefinitionStart, gOP, gnwtg);
   /*  {struct gMSGS *m;
        m = (struct gMSGS *) galloc(sizeof(struct gMSGS));
        m->len = sizeof(struct gMSGS); m->msgtype = message;
        gmsgp(&m, routine);
        gprocvct(target);}  */
   return(0);}

/*******************************************************************/
/*
/*       Gmstub.c
/*
/*       Monitor stub for Gtctls
/*******************************************************************/
#include <grulmsg.h>
int GMONON = 0;
int Gmoncnt = 0;
char pbuffer[100];

gmoni()   /*  Initialize monitor interface     */
   {GMONON = 1;
    return(0);} gmon(rule)     /*  Monitor polled interface         */
    struct grulmsg *rule;
    {++Gmoncnt;
     return(0);} gmonend()      /*  Monitor shutdown            */
    {printf("Monitor entered %d times\n", Gmoncnt);
     return(0);} gprintr() {printf("%s\n", pbuffer);}
gprintf() {printf("%s", pbuffer);}
gprintrn() {gprintf();}
gmonrlst() {}
gmonvar() {}
gmonsc() {}
gmonstrt() {}

/*****=*********************************************
/*    gnwtg.c
/*
/*    Module of Active Rule Processor (APR)
/*
/*    No where to go functions.
/*
/****************************************************/
#include "string.h"
#include "stdio.h"
include "gmsg.h"
#include "     .h"
```

```c
#include "msg.h"
#include "grulmsg.h"
#include "gobjq.h"
#include "stsh.h"
#include "gstats.h"
```

BEST AVAILABLE COPY

BEST AVAILABLE COPY

```c
struct nwtgq {struct nwtgq *next, *prev; short ruleno; short ruleinst;
              struct grulmsg *rpt; char reqpend; char procstat;};
SQL_db(nwtgq, nwtgque);
extern int PROCTRCE, GMONON, ruletrce;
extern char pbuffer[500];
int rulecncl = 0, nwtgactv = 0, nwtgfrst = 0;

/***************** No Where To Go ******************************/
/* Primary functions are performed by this set of routines:    */
/* 1. New rules are entered into the Active Rule List.         */
/* 2. Completed rules are noted and disposed of.               */
/* 3. Incomplete rules are suspended for variables or objects. */
/* 4. Rules are dequed when requested.                         */
/***************************************************************/
/* The following array is the Active Rule List.  It is         */
/* a list of address pointers that are each the begining of    */
/* a linked list of nwtgq structures.  Each nwtgq is forward   */
/* and backward linked with the next and prior entries in the  */
/* list.  New entries are added at the front.  Deleted entries */
/* reforge the links through the cross pointers.               */
/* The begining of the linked list that will contain a rule is */
/* the nth entry, where n is the rule number modulo the        */
/* number of entries in the list.  All instances of a rule are */
/* chained from the same list entry.                           */
/***************************************************************/
struct nwtgq *nwtglst[1000]; int nwtgents = 1000;

/***************************************************************/
/*                                                             */
/*   Initialize the Active Rule List                           */
/*                                                             */
/***************************************************************/
grMSG(gSessionStart, gARP, gnwtgint)
    /*  Initialize Active Rule Processor  */
    {int i = 0;
     while (i < nwtgents) nwtglst[i++] = 0;
     return(0);}

/***************************************************************/
/*                                                             */
/*   Active Rule Processor Entry                               */
/*                                                             */
/*   Seperate the rules by their current status and process.   */
/*                                                             */
/*   Rules are considered complete when determined false       */
/*   or when determined true and all action parts have been    */
/*   processed.                                                */
/*                                                             */
/*   Rules enter here from the rule processor.  The may have statuses
/*   of t, determined true, f, determined false, or u, undetermined.
/*   The rule progress flag may indicate p, progress made on the last
/*   journey, n, no progress made on the last journey.
/***************************************************************/
struct nwtgq *gnwtgl(ruleno, inst)     /* add an entry to Active Rule List
    short ruleno, inst;
    {register struct nwtgq *nwtgptr; register int r;
     struct nwtgq *nwtgl;
     nwtgptr = (struct nwtgq *) galloc(sizeof(struct nwtgq));
     ++nwtgactv;
     nwtgptr->rpt = 0;
     nwtgptr->ruleno = ruleno;
     nwtgptr->ruleinst = inst;
     nwtgptr->procstat = 'q';
     nwtgptr->reqpend = ' ';
     if (ruleno > 0)
         r = ruleno % nwtgents;
```

```
        else
            r = 0;
        nwtgl = nwtglst[r];
        nwtgptr->next = nwtgl;
        if (nwtgl) nwtgl->prev = nwtgptr;        BEST AVAILABLE COPY
        nwtgptr->prev = 0;
        nwtglst[r] = nwtgptr;
        return(nwtgptr);} struct nwtgq *gnwtglu(ruleno, inst) /* look up rule entry in Active Rule Li
    short ruleno, inst;
    {struct nwtgq *nwtgptr; register int r;
    if (ruleno > 0)
        r = ruleno % nwtgents;
    else
        r = 0;
    nwtgptr = nwtglst[r];
    while (nwtgptr)
        {if (nwtgptr->ruleno == ruleno && nwtgptr->ruleinst == inst) break;
         else nwtgptr = nwtgptr->next;}
    return(nwtgptr);} gnwtg(grule, msgtype)
    struct grulmsg *grule; int msgtype;
    {struct nwtgq *nwtgptr; char pstat, rstat; int r;
    pstat = 'p'; rstat = grule->rulestat;
    if (PROCTRCE) {sprintf(pbuffer,
                "nwtg Rule%04d inst %03drstat %c prog %c\n",
                grule->ruleno,
                grule->ruleinst, rstat, grule->ruleprog);
                gprintf();}
    (long *) nwtgptr = grule->ruleintl;

if (!nwtgptr)
        {if (!(nwtgptr = gnwtglu(grule->ruleno, grule->ruleinst)))
            nwtgptr = gnwtgl(grule->ruleno, grule->ruleinst);
         nwtgptr->rpt = grule;
         nwtgptr->procstat = pstat;
         grule->ruleintl = (long *) nwtgptr;
         grule->ruleprog = 'p';} /* provide for missing pend on spawn */ if (rstat == 'a')          /* New input message   */
        {grule->ruleprog = 'n';
         grule->rulestat = 'u';
         gMSGr(grule, gRMR, gtoc);
         return(0);} if (rstat == 'C')          /* Cache input message  */
        {grule->ruleprog = 'n';
         grule->rulestat = 'a';
         (gRuleReceipt, gPC, gtptrans);
         Gr(grule, gRMR, gtoc);
         return(0);} if (rstat == 'x')
        {grule->rulestat = 'u'; gs_suspensions++; pstat = 's';} if (rstat == 'u')
        {if (PROCTRCE) {sprintf(pbuffer,
                    "nwtg rstat u Rule%04d.%03d prog %c req %c\n",
                    grule->ruleno, grule->ruleinst,
                    grule->ruleprog, nwtgptr->reqpend); gprintf();}
         if (gnwtgu(grule) == 'r')
            {nwtgptr->procstat = 'p'; /* set active on processor */
             gMSGr(grule, gRMR, gtoroute);
             return(0);}
         else
                    /* check for progress last trip */
            if (grule->ruleprog == 'p' || nwtgptr->reqpend == 'p')
                {grule->node_pid = 0;   /* restart list */
                 grule->ruleprog = 'n';  /* reset progress indicator */
                 nwtgptr->reqpend = ' '; /* reset request pend flag */
                 nwtgptr->procstat = 'p'; /* set active on processor */
```

```
                    gMSGr(grule, gRMR, gtoc);
                    return(0);}
             if (PROCTRCE) {sprintf(pbuffer,
                    "nwtg suspend rstat u Rule%04d.%03d prog %c req %c\n",
                    grule->ruleno, grule->ruleinst,
                    grule->ruleprog, nwtgptr->reqpend); gprintf();}
        gs_suspensions++;
        pstat = 's';}     /* suspend rule until further notice   */ if (rstat == 'f') {gs_false++; pstat = 'c'; }
   if (rstat == 't')               /* check for complete actions */
         {if (gnwtgdet(grule) == 'r')
             (if (grule->ruleprog == 'p' || nwtgptr->reqpend == 'p')
                 {grule->ruleprog = 'n';
                  if (nwtgptr->reqpend == 'p') grule->node_pid = 0;
                  nwtgptr->reqpend = ' ';   /* reset request pend flag */
                  nwtgptr->procstat = 'p';  /* set active on processor  */
                  gMSGr(grule, gRMR, gtoc);
                  return(0);}
              else {gs_suspensions++; pstat = 's';}} /* try again later   */
         else pstat = 'c';}

/* Rule is complete or has no where to go: leave in Active Rule List for
   later reactivation.                                  */ if (PROCTRCE) {sprintf(pbuffer,
                "nwtg.b Rule%04d %04d inst %03d pstat %c\n",
                nwtgptr->ruleno, grule->ruleno,
                nwtgptr->ruleinst, pstat);
                gprintf();}
     if (pstat == 'c' && rulecncl)
         {sprintf(pbuffer,
                "concl=>%lx Rule%04d inst %02d rulestat %c pstat %c\n",
                grule, grule->ruleno,
                grule->ruleinst, grule->rulestat, pstat);
          gprintf();}
     if (pstat == 'c') gmonsc(grule->rulestat);
     if (pstat == 'c' && grule->rulestat == 't' && grule->ruleno > 0)
         gs_true++;
     if (pstat == 'c' && grule->ruleno > 0) /* i.e. not an assertion   */
         {gs_completions++; gs_curcount--; } nwtgptr->procstat = pstat;

/*    For instances, free the rule
      and the nwtg queue entry once the rule is
      completed unless the windows
      routines need the instance for display.   */ if (pstat == 'c' && !GMONON && grule->ruleinst)
          {if (nwtgptr->prev)  nwtgptr->prev->next = nwtgptr->next;
           else                          /* Top of the stack   */
             {if (grule->ruleno > 0)
                  r = grule->ruleno % nwtgents;
              else
                  r = 0;
              nwtglst[r] = nwtgptr->next;}
           if (nwtgptr->next)  nwtgptr->next->prev = nwtgptr->prev;
           gfree(grule);
           gfree(nwtgptr);}
     if (!--nwtgactv)
          gMSG(gActiveIdle, gPC, gtpaidl);
     return(0);}

/*************************************************************/
/*            determine if true rule is complete           */
/*
/*    If the rule contains any unprocessed actions it is still
/*    incomplete.
/*************************************       ***************************/
gnwtgdet(grule)
    struct grulmsg *grule;
   {struct grulobj   *objend, *objs;
```

```
                char *C, *D, *R, *S;  struct gval *val;

C = (char *) grule;
                R = C + grule->ruleout;
                D = C + grule->ruledata;
                S = C + grule->rulepred;
                objs = (struct grulobj *) R;  objend = (struct grulobj *) S;

while (objs < objend)
                    {if (objs->next == 2)        /* find unprocessed action */
                            return('r');
                     objs++;}
                return('c');}

/***************************************************************/
/******            Rule Request           ***********************/
/*  Rules may be requested from forward or back chaining.
/*  If the rule is complete the request is ignored; otherwise it is
/*  rescheduled through the rule processor.
/***************************************************************/
grMSGi(gRuleRequest, gARP, gnwtgreq, ruleno)
    {struct nwtgq *cnwtgq; int found = 0; register int r;
    /*printf("gnwtgreq ruleno %d\n", ruleno);*/
    if (ruleno > 0)
            r = ruleno % nwtgents;
    else
            r = 0;
    nwtgque.dbSTRT = nwtglst[r];
    {SQL *SQLptr; SQLptr = nwtgque.dbSTRT;
        while (SQLptr)
            {if (SQLptr->ruleno != ruleno)
                    {SQLptr = SQLptr->next; continue;} if (cnwtgq = SQLptr)
                {if (PROCTRCE)
                    {sprintf(pbuffer,
                        "nwtgreq SEL for Rule%04d inst %03d pstat %c\n",
                            cnwtgq->ruleno,
                            cnwtgq->ruleinst, cnwtgq->procstat); gprintf();}
                found++;
                if (cnwtgq->procstat == 'c' || cnwtgq->procstat == 'p')
                    {if (cnwtgq->procstat == 'c')
                        {if (ruletrce)
                            {sprintf(pbuffer,
                    "gnwtgreq req refused Rule%04d.%03d stat %c\n",
                        cnwtgq->ruleno, cnwtgq->ruleinst, cnwtgq->procstat);
                                    gprintf();}}
                            else if (cnwtgq->procstat == 'p')
                                {gs_pends++;
                                 if (ruletrce)
                                    {sprintf(pbuffer,
                    "gnwtgreq req pended Rule%04d.%03d stat %c\n",
                        cnwtgq->ruleno, cnwtgq->ruleinst, cnwtgq->procstat);
                                        gprintf();}
                                 cnwtgq->reqpend = 'p';}}
                        else
                            {if (cnwtgq->procstat != 'q')
                                {if (!cnwtgq->rpt )
                                    {printf("OOPS %04d.%03d%c\n",
                                        cnwtgq->ruleno, cnwtgq->ruleinst,
                                        cnwtgq->procstat); getchar(); exit(1);}
                                 if (PROCTRCE)
                                    {sprintf(pbuffer,
                    "nwtgreq requeing %04d.%03d pstat %c\n",
                                        cnwtgq->ruleno, cnwtgq->ruleinst,
                                        cnwtgq->procstat);
                                    gprintf();}
                                gs_requeues++;
                                cnwtgq->procstat = 'p';
                                    /* mark processor active for rule*/
                                nwtgactv++;
                                cnwtgq->rpt->node_pid = 0;  /* restart list*/
                                gMSGr(cnwtgq->rpt, gRMR, gtoc);}}}
```

```
    SQLptr = SQLptr->next;}} if (!found && !gnwtglu(ruleno, 0))
        {gnwtgl(ruleno, 0);
         gMSGi(gCacheRuleReq, gRC, gtcruler, ruleno);
         if (++gs_curcount > gs_maxcount)
             gs_maxcount = gs_curcount;}
    else
        {gs_refused++;
         gMSG(gRuleReceipt, gPC, gtptrans);} return(0);}}

/*************************************************************/
/* determine if undetermined rule can be sent on    */
/*************************************************************/
gnwtgu(grule)
    struct grulmsg *grule;
    {struct grulobj *objend, *objs, *objet;
     char *C, *D, *R, *S;  struct gval *val;

C = (char *) grule;
    if (PROCTRCE) {sprintf(pbuffer,
                  " nwtgu undetermined=>Rule%04d  \n",
                  grule->ruleno); gprintf();}

R = C + grule->rulerout;
    D = C + grule->ruledata;
    S = C + grule->rulepred;
    objet = (struct grulobj *) R;  objend = (struct grulobj *) S;
    objs = objet + grule->rulercur;

/* find unprocessed predicate*/
    while (objs < objend)
        {if (objs->next == 2) return('u');
         if (objs->next == 1 && (!objs->val) && objs->node_pid)
            {if (PROCTRCE) {sprintf(pbuffer,
                           "nwtg resending Rule%04d\n",
                           grule->ruleno); gprintf();}
             gs_resends++;
             return('r');}  /* indicate resend */
         objs++;}
    return('u');}

/*****************************************************/
/*           Dump undetermined rules                */
/*****************************************************/
gnwtgdmp()
    {struct nwtgq *cnwtgq; int ruleno = 0;

while (ruleno < nwtgents)
        {nwtgque.dbSTRT = nwtglst[ruleno++];
            {SQL *SQLptr; SQLptr = nwtgque.dbSTRT;
             while (SQLptr)
                {if (SQLptr->procstat != 's')
                    {SQLptr = SQLptr->next; continue;}
                 SQL_selcur(nwtgque);

cnwtgq = SQLptr;
                 if (PROCTRCE)
                    {sprintf(pbuffer,
                            "nwtgdmp SEL for Rule%04d inst %03d pstat %c\n",
                            cnwtgq->ruleno, cnwtgq->ruleinst, cnwtgq->procstat)
                     gprintf();}
                 guwrt(cnwtgq->rpt, OBJQ_RULE);

SQLptr = SQLptr->next;}}}
    gMSG(gForeignEnd, gPC, gprocfem);
    return(0);}

/*****************************************************************/
/*           free Active Rule List                             */
/*                                                             */
```

```
/*Free the entries chained from the Active Rule List; if the rule */
/*is an instance, free the rule message.                          */
/****************************************************************/
gnwtgrel()
    {struct nwtgq *c, *n; int i = 0;

while (i < nwtgents)
        {n = nwtglst[i];
         while (n)
             {c = n;
              n = c->next;
              if (c->rpt->ruleinst) gfree(c->rpt);
              else if (c->rpt->ruleno < 0) gfree(c->rpt);
              gfree(c);}
         nwtglst[i++] = 0;}
    return(0);}

/****************************************************************/
/*    Force Complete Status                                     */
/*                                                              */
/*    When rules are capture by base objects the remain there and */
/*    will never be seen again so they are marked complete so they */
/*    will not interfere with the compleness process.           */
/****************************************************************/
gnwtgcmp(rptr)       /* make nwtg entry complete for spawners   */
    struct grulmsg *rptr;
    {struct nwtgq *nwtgptr;
    (long *) nwtgptr = rptr->ruleintl;
    nwtgactv--;
    nwtgptr->procstat = 'c';
    return(0);}

/****************************************************************/
/**              Rule Lookup for Existance test              **/
/*  See if there are any rules that could determine a variable **/
/*  remaining.                                                 **/
/****************************************************************/
gnwtgexs(ruleno, procid)
    int ruleno; long procid;
    {static char gnwtgexst = 0;
    if (!gnwtgexst) gnwtgexst = gfunt("^EXISTS");
    return(gnwtgexg(ruleno, procid, -1, gnwtgexst));}

/****************************************************************/
/**   Rule Lookup for Closure test                           **/
/*                                                           **/
/****************************************************************/
gnwtgexc(ruleno, procid)
    int ruleno; long procid;
    {return(gnwtgexg(ruleno, procid, -1, 1));}

/****************************************************************/
/**        general Rule Lookup for Closure tests        ******/
/****************************************************************/
gnwtgexg(ruleno, procid, inst, oper)
    int ruleno, inst; long procid; char oper;
    {struct nwtgq *cnwtgq; int found = 0;
    if (ruleno > 0)
        nwtgque.dbSTRT = nwtglst[ruleno % nwtgents];
    else
        nwtgque.dbSTRT = nwtglst[0];

{SQL *SQLptr; SQLptr = nwtgque.dbSTRT;
    while (SQLptr)
        {if (SQLptr->ruleno != ruleno)
            {SQLptr = SQLptr->next; continue;} cnwtgq = SQLptr;

if (cnwtgq->procstat != 'c' &&
             gnwtgfnd(cnwtgq->rpt, procid, oper))
```

```
          (/*printf("gnwtgex found rule %d inst %d\n", cnwtgq->rpt->rul
                    cnwtgq->rpt->ruleinst);*/
          if (inst == -1)
                found++;
          else
                (if (cnwtgq->ruleinst != inst) found++;}
          if (!cnwtgq->rpt) {printf("OOPS %04d.%03d%c\n",
                              cnwtgq->ruleno, cnwtgq->ruleinst,
                              cnwtgq->procstat); getchar(); exit(1);}
          if (found)
                return(found); }

SQLptr = SQLptr->next;})
  return(found);}
/****************************************************************/
/*      Find object in rule                                     */
/****************************************************************/
gnwtgfnd(rptr, procid, oper)
  /* Find object in rule */
    struct grulmsg *rptr; long procid; char oper;
  {struct grulobj *objend, *objs, *objet; OBJ *objptr; int found = 0;
   char *C, *D, *R, *S; struct subobj *subptr;
   if (!oper) return(1);
   C = (char *) rptr;

R = C + rptr->rulerout;
   D = C + rptr->ruledata; S = C + rptr->rulepred;
   objet = (struct grulobj *) R;  objend = (struct grulobj *) S;
   objs = objet + rptr->rulercur;
   objptr = Cobjptr(procid);

while (objs < objend)
       {                     /* find target action   */
        if (objs->next == 2 && (!objs->val) && objs->node_pid)
           {
            if (objs->node_pid == procid) {found = 1; break;}
            subptr = objptr->sub;
            while (subptr)    /* look through sub objs    */
                {
                 if (subptr->node_pid == objs->node_pid)
                     (if (PROCTRCE)
                         {printf("nwtgfnd procid found \
                                  for Rule%04d.%03d\n",
                                  rptr->ruleno, rptr->ruleinst);})
                     {found = 1; break;}}
                 subptr = subptr->next;}}
        objs++;}
    return(found);}

/****************************************************************/
/***   Count Rules still active on processors             ****/
/****************************************************************/
grMSG(gProcessorIdle, gARP, gnwtgcnt)
    {struct nwtgq *cnwtgq; int count = 0; int ruleno = 0;
     if (!nwtgactv)
        gMSG(gActiveIdle, gPC, gtpaidl);
     return(0);}

/*  suspend a rule    */
gnwtgsusp(grule)
 struct grulmsg *grule;
(struct nwtgq *cnwtgq;
 gs_suspensions++;
 (cnwtgq = (struct nwtgq *)grule->ruleintl)->procstat = 's';
 if (!--nwtgactv)
      gMSG(gActiveIdle, gPC, gtpaidl);
 return(1) ;
}
```

```
/*******************************************************************/
/*                                                                 */
/*      Gproc.c                                                    */
/*                                                                 */
/*      Process Controller                                         */
/*                                                                 */
/*******************************************************************/
#define Maxproc 256
#include "stdio.h"
#include "string.h"
#include "gmsg.h"
#include "grulmsg.h"
#include "stsh.h"

int gsopen = 0;
struct Cmsg {int Cmsglen; long Cnode_pid;
  int Cmsgtype; char Cmsgdata[1];};
struct Cmsgque {struct Cmsgque *next; struct Cmsg *msgptr;}
     *Cquestrt = 0, *Cqueend = 0;

/*******************************************************************/
/*  processors are identified by a long variable and aa obj type control */
/*  block.  The long variable corresponds to the short, short variables  */
/*  corresponding to node, pid in the intel Cube Manager.                */
/*  The above define is the dimension of  processors in this simulation. */
/*  Messages are routed based on the node, pid. Once at the object, the  */
/*  obj pointer is used as the control block at the object.              */
/*******************************************************************/

OBJ *proctabl[Maxproc];
int procsttp[Maxproc + 1];
#define ProcStatActive 1
#define ProcStatRequest 2
int Savepid = 0;
int PROCSTOP = 0;
int procrecr  = 0;
extern FILE *GSQLfile;
extern int ruletrce, PROCDUMP; extern char pbuffer[500];
extern short girykbid, giryrule, giryinst ;
extern long objdeflt;
extern char True[];
int gTargCnt = 0, gSrcCnt = 0, gTranCnt = 0, gTargRpl = 0, gSrcRpl = 0,
    gCmplCnt = 0, gRuleCnt = 0, gSysIdle = 0;

Cubedim() {return(Maxproc);} long Cnextpid()
    {static char *module = "Cnextpid"; int i = 0;
     while ( ++i < Maxproc )
         if ( !proctabl[i-1] )
             {procsttp[i] = 0;
              return(Savepid = i);}
     gerrmsg(2, module, Maxproc);} long Cmypid(objptr)
    OBJ *objptr;
    {proctabl[Savepid - 1] = objptr;
     return(Savepid);}

Csvpid(objptr, node_pid)
    OBJ *objptr; long node_pid;
    {proctabl[node_pid - 1] = objptr;
     return(0);}

OBJ *Cobjptr(node_pid)
    long node_pid;
    {static char *module = "Cobjptr";
     if (!node_pid) return(0);
     if (node_pid > Maxproc) gerrmsg(1, module, node_pid);
     if ( !proctabl[node_pid - 1] )
    {sprintf(pbuffer,"Cobjptr: null OBJ ptr found for node_pid %ld\n",node_pid)
      gprintf(); }
        return(proctabl[node_pid - 1]);}
```

```
Cprt()          /* print object vars from processor list    */
    (long i;
      if ( !PROCDUMP ) return(0);
      for (i = 1; i <= Maxproc; i++)
           (if (procsttp[i] & ProcStatActive)
                 stshp(Cobjptr(i));}
      return(0);}
```

/****************************************************************/
/*                                                              */
/*      Session Start                                           */
/*                                                              */
/****************************************************************/

```
        /* Initialize Process Controller   */
grMSG(gSessionStart, gPC, gproinit)
    (int i;
      /*while (gtypulse()) ;*/
      for (i = 0; i <= Maxproc; i++)
           (procsttp[i] = 0;
             proctabl[i] = 0;}
      procsttp[i] = 0;}
   /* Drain Rule Cache messages for windows implem. */
```

/****************************************************************/
/*                                                              */
/*      Transaction Start                                       */
/*                                                              */
/****************************************************************/

```
gtproc()         /* Handle Transaction Start Message   */
    (int options = 0;
      gTargCnt = 0, gSrcCnt = 0, gTranCnt = 0;
      gTargRpl = 0, gSrcRpl = 0;
      gCmplCnt = 0, gRuleCnt = 0, gSysIdle = 0;
      gMSGi(gTransactionStart, gOP, gtprulei, options);
      if (!PROCSTOP && objdeflt)
           (gMSGi(gTransactionStart, gOP, gtprulei, options);}
      return(0);}
```

/****************************************************************/
/*                                                              */
/*      Target Notice                                           */
/*                                                              */
/****************************************************************/

```
grMSG(gTargetNotice, gPC, gtptnote)      /* Target Notice message       */
    (++gTargCnt;
      if (!(gTranCnt && gTargCnt)) gMSG(gProcessorIdle, gARP, gnwtgcnt);
      /*printf("gtpt targ notice gTarg %d gTran %d\n", gTargCnt, gTranCnt);*/
      return(0);}
```

/****************************************************************/
/*                                                              */
/*      Target Receipt                                          */
/*                                                              */
/****************************************************************/

```
grMSGi(gTargetReceipt, gPC, gtptrecp, count)
    (--gTargCnt;
      /*printf("gtpt targrec cnt %d gTarg %d\n", count, gTargCnt);*/
      gTranCnt += count;
      if (!(gTranCnt && gTargCnt)) gMSG(gProcessorIdle, gARP, gnwtgcnt);
      return(0);})
```

/****************************************************************/
/*                                                              */
/*      Rule Receipt                                            */
/*                                                              */
/****************************************************************/

```
/*gtptrans()           /* Transit - Rule Receipt message receipt     */
grMSG(gRuleReceipt, gPC, gtptrans)
    (if (!(--gTranCnt && gTargCnt)) gMSG(gProcessorIdle, gARP, gnwtgcnt);
      return(0);}
```

```
/*****************************************************************/
*                                                               */
*       Active Idle                                             */
*                                                               */
*       The Active Rule Processor has determined that it is idle. */
*       See if the rest of the system is also idle.             */
*                                                               */
/*****************************************************************/
tpaidl()       /* Active Idle Message from ARP */
   {long i; char *cp; int activecnt = 0;
    /* The following code stops recursions caused by Active Idle being */
    /* generated by activity following from the idle followup routines. */
    /* This code is inoperative in a parallel processor since recursion */
    /* cannot occur at the message level.                               */
    if (procrecr++) return(0);

/* The following code applies to shared memory machines where memory */
    /* availability has gone critical. The External Data Interface is    */
    /* activated for another tuple only when the idle point is reached.  */ if (GSQLfile)
       {gsqltup();
        procrecr = 0;
        return(0);}

/* The following section only applies to shared memory            */
    /* implementations running with memory critical. The External Rule */
    /* Interface is operated in single thread mode and pulsed at the   */
    /* idle point.                                                     */ if (gtypulse())      /* pulse rule processor */
       {procrecr = 0;
        return(0);}

/*printf("gproc active idle %d %d %d\n", gTranCnt, gSrcCnt, gTargCnt);*/
    /* notify the Object Processors that the active rules are complete and*/
    /* existance rule processing should begin.                            */
    girykbid = giryrule = giryinst = 0 ;
    gsopen = 0;
    if (gTranCnt || gSrcCnt || gTargCnt)
        {procrecr = 0;
         return(0);}
    else
         {if (ruletrce)
                 {sprintf(pbuffer, "gtpaidl idle check\n"); gprintf();}
          gTargRpl = gSrcRpl = 0; gCmplCnt = 0;
          for (i = 1; i <= Maxproc; i++)
                {if (procsttp[i] & ProcStatActive)
                      {procsttp[i] |= ProcStatRequest;
                       ++activecnt;
                       gMSGl(gProcessorIdle, gOP, gtpycnts, i);}}}
     if (!activecnt) gMSGi(gSystemError, gAII, gtaiierr, 10);
     procrecr = 0;
     return(0);}

/*****************************************************************/
/*                                                             */
/*    Object Status Message                                    */
/*                                                             */
/*    See if all the object processors have responded.         */
/*    If so, notify the RMR to start the foreign processes.    */
/*                                                             */
/*****************************************************************/
grMSGliii(gObjectStatus, gPC, gprostat, node_pid, rule, cmpl, opens)
     {gRuleCnt = rule;
      gCmplCnt += cmpl;
      gsopen += opens;
      procsttp[node_pid] &= (255 - ProcStatRequest);
      if (node_pid != Savepid) return(0);
      /**gMSG(gForeignTransmit, gARP, gnwtgdmp); ** MOVE TO GTAII **/}
```

```
/********************************************************************/
/*                                                                  */
/*      Foreign End Message                                         */
/*                                                                  */
/*                                                                  */
/********************************************************************/
grMSG(gForeignEnd, gPC, gprocfem)
    {if (!gCmplCnt && gsopen)
            gMSGi(gSystemNError, gAII, gtaiiner, gsopen);
     if (gSysIdle) return(0);
     if (!gCmplCnt)
            (stshrepl(Cobjptr(objdeflt), "SYSIDLE", True); gSysIdle = 1;}
     return(0);} gprocvct(target)            /*    update message counters   */
        {CompVector[target]++;}

/********************************************************************/
/*                                                                  */
/*      Session End                                                 */
/*                                                                  */
/********************************************************************/
grMSG(gSessionEnd, gPC, gcsesend)
    {}

/********************************************************************/
/*                                                                  */
/*      Transaction End                                             */
/*                                                                  */
/********************************************************************/
grMSG(gTransactionEnd, gPC, gprotend)
    {long i;
     for (i = 1; i <= Maxproc; i++)
         {gMSGl(gTransactionEnd, gOP, gtpytend, i);}
     return(0);}

/********************************************************************/
/*                                                                  */
/*      Processor Active                                            */
/*                                                                  */
/********************************************************************/
grMSGl(gProcessorActive, gPC, gprocps, node_pid)
    {procsttp[node_pid] |= ProcStatActive;
     return(0);}

/********************************************************************/
/*                                                                  */
/*      Processor Delete                                            */
/*                                                                  */
/********************************************************************/
grMSGl(gProcessorDelete, gPC, gprocdel, node_pid)
    {procsttp[node_pid] = 0;
     proctabl[node_pid - 1] = 0;
     return(0);} gproctst()
   {printf("gproctst gTran %d\n", gTranCnt);}

/********************************************************************/
/*                                                                  */
/*      gprts.c                                                     */
/*                                                                  */
/*      Printout routines                                           */
/*                                                                  */
/********************************************************************/
#include    "string.h"
#include    "grulmsg.h"
#include    "gmsg.h"

char *gactp(), *gfunp();

gprts(lp, cp, c)       /* reformat list form of data   */
     struct gval *lp; char *cp, c;
```

```
    {char *aPtr;
     while(lp->len)
         {strcpy(cp, lp->val); cp += lp->len - 3; *cp++ = c;
          lp= aPtr= (char *)lp + ((struct gval *)lp)->len;
         }
     strcpy(cp, lp->val);
     return(0);} gprtsq(lp, cp, c)      /*  reformat list form of data  */
    struct gval *lp; char *cp, c;
    {char *aPtr;
     while(lp->len)
         {*cp = '\'';
          strcpy(cp + 1, lp->val);
          cp += lp->len - 2; *cp++= '\''; *cp++ = c;
          lp= aPtr= (char *)lp + ((struct gval *)lp)->len;
         }
     *cp = '\'';
     strcpy(cp + 1, lp->val);
     strcat(cp, "';");
     return(0);} gprtsl(lp, cp)     /*  printout list form of data  */
    struct gval *lp; char *cp;
    {char *aPtr;
     *cp++ = '\'';
     while(lp->len)
         {strcpy(cp, lp->val); cp += lp->len; cp -= 4;
          *cp++ = '\''; *cp++ = ','; *cp++ = '\'';
          lp= aPtr= (char *)lp + ((struct gval *)lp)->len;
         }
     strcpy(cp, lp->val);
     strcat(cp, "'");
     return(0);}
/*****************************************************
/*    grwrt.c /*    Rule Log Processor

*    Writes rule messages to rule log
/*****************************************************/
#include <string.h>
#include <stdio.h>
#include <fcntl.h>
#include <gmsg.h>
include <grulmsg.h> extern char pbuffer[500];
FILE *RULWRT = 0;
char *RULELOG = "RULELOG";

grwrt(grule)     /*  write rules to log  */
    struct grulmsg *grule;     /*  rule to be written */
    {char *C; int l, lo;
     if (!RULWRT) return(0);
     C = (char *) grule;
     l = grule->rulelen;
     for (lo = 0; lo <= l; lo++) putc(*C++, RULWRT);
     return(0);} grwrti()    /*  initialize rule log  */
    {if (RULWRT = fopen(RULELOG, "wb"))
         {sprintf(pbuffer,"Logging to %s\n", RULELOG); gprintf(); }
     return(0);} grwrtc()
    {if ( RULWRT ) fclose(RULWRT);}
```

```
/****************************************************************/
/*                                                              */
/*      gsobj.C                                                 */
/*                                                              */
/*      Object Message Processor                                */
/*                                                              */
/*      Object functions                                        */
/*                                                              */
/****************************************************************/
#include "string.h"
#include "grulmsg.h"
#include "stsh.h"
#include "gmsg.h"

int gsobcfnd = 0;
extern int ruletrce; extern char pbuffer[500];
long Cmypid(); char *gexolud();
VAR *stshlvar();
struct gval *gstmpval();   /*   move variable to a temporary area   */ sobjhi(vptr, objname)   /*  build up varname  */
    OBJ *vptr; char *objname;
    {if (vptr)
        {sobjhi(Cobjptr(vptr->higher), objname);
          strcat(objname, vptr->varname); strcat(objname, ".");}
     else *objname = '\0';
     return(0);} grMSGs(gObjectInit, gOP, sobjinit, objname)
    {long node_pid; node_pid = msg->node_pid;
     /*gsoinit(objname, node_pid);*/}} gsoinit(objname, node_pid)
    char *objname; long node_pid;
    {OBJ *objstart; long l; char *cp;
     objstart = (OBJ *) galloc(sizeof(OBJ) + strlen(objname) + 4);
     l = sobji(objstart, node_pid);
     Csvpid(objstart, node_pid);
     strncpy(objstart->varname, objname, 19);
     if ( cp= gexolud(objname) )   /* lookup data processor name if any */
         if ( *cp )
             {strcpy(objstart->dprocnm, cp);
              gdprocl(objstart->dprocnm, &objstart->dprocfn);} /* load it */
     gMSGl(gProcessorActive, gPC, gprocps, 1);
     return(0);} sobji(v, node_pid)          /*   initialize a new node    */
    OBJ *v; long node_pid;
    {v->vnext = VARNULL;
     v->higher     = 0;
     v->sub        = 0;
     v->rptr       = 0;
     v->status     = 't';
     v->clostatus  = ' ';
     v->type       = ' ';
     v->use        = ' ';
     v->procid     = node_pid;
     v->dprocnm[0] = '\0';
     v->dprocfn    = 0;
     v->ddata      = 0;
     v->inst       = 0;
     v->objtrap    = 0;
     return(v->procid);} stshp(vp)       /* print out a node   */
    OBJ *vp;
    {stshpx(vp, 2); return(0);} stshpx(vp, n)      /* print out an object */
    OBJ *vp; int n;
    {VAR *vx, *vpx; char spaces[100], drule[20]; int i; char objname[44];
     struct gval *valpt; struct varrule *aRule;
```

```
objname[0] = '\0'; sobjhi(vp, objname);
sprintf(pbuffer,"%s(%d) Type:%c Proc:%03ld Status:%c Hi:%04ld %s Use:%c\
        objname, vp->inst, vp->type, vp->procid, vp->status, vp->higher,
        (vp->clostatus == 'c') ? "Closed" : "Open", vp->use);
gprintf();
if (!(vx = vp->vnext)) return(0);

while (vx)
    {i = n; spaces[i] = '\0'; while (i) {spaces[--i] = ' ';}
    valpt = &vx->v;
    if (vx->status == ' ')
        {sprintf(pbuffer,"%s%-15s=> ", spaces, vx->varname); gprintf()
         stshpv(valpt); }
    else
        {if (vx->status == 'e')
            {sprintf(pbuffer,"%s%-15s=> {existence pending}",
                    spaces, vx->varname);
             gprintf(); }
        else if (vx->status == 'n')
            {sprintf(pbuffer,"%s%-15s=> {not exists}",
                    spaces, vx->varname);
             gprintf(); }
        else if (vx->status == 'r')
            {sprintf(pbuffer,"%s%-15s{closure pending}=> ",
                    spaces, vx->varname);
             gprintf(); }
        else
            {sprintf(pbuffer,"%-15s%s{?%c}=> ", spaces,
                    vx->varname, vx->status);
             gprintf(); }
         stshpv(valpt); }
    if ( aRule = vx->vr )
        {sprintf(pbuffer,"\trule(s): ");
         while ( aRule )
            {sprintf(drule,"%d.%d ", aRule->ruleno, aRule->ruleinst);
             strcat(pbuffer, drule);
             aRule = aRule->vnext; }
         strcat(pbuffer,"\n");
         gprintf();}
    vx = vx->vnext;}
return(0);} stshpv(valpt)
    struct gval *valpt;
{char *aPtr;
 if (!valpt) return(0);
 while (valpt->len)
    {sprintf(pbuffer,"'%s', ", valpt->val); gprintf();
     valpt= aPtr= (char *)valpt + ((struct gval *)valpt)->len; }
 sprintf(pbuffer,"'%s'", valpt->val);
 gprintf();
 return(0);}
sobjstat(v, c)     /* set instance status    */
    VAR *v; char c;
{v->status = c; return(0);} sobjclos(v)     /*  set closed status    */
    OBJ *v;
{v->clostatus = 'c'; return(0);} stsobjet(v)    /*  trigger existance  */
    OBJ *v;
{VAR *vs; char tvarname[45]; VAR *r;
 int found = 0; struct gval *val;
 static char NULLVAL[] = "\0\0\0";
 if (v->higher) return(0);
 vs = v->vnext;  /*  start with variables  */
 while (vs)     /*  look through list    */
    {strcpy(tvarname, vs->varname);
     if (vs->status == 'e')
        {gsobcfnd++;
         if (gsrcexst(v->varname, tvarname, v->procid))
            {vs = vs->vnext; continue;}
```

```
                    ++found;
                    r = stshrepx(v, tvarname, NULLVAL, 'n');
                    vs = v->vnext;}    /* repair broken chain */
            else
                if (vs->status == 'r')
                    {gsobcfnd++;
                     if (gsrcexsc(v->varname, tvarname, v->procid))
                            {vs = vs->vnext; continue;}
                     ++found;
                     val = gstmpval(&vs->v);
/****** CHECK NEXT LINE...'v' is struct obj **********************/
                     r = stshrepx(v, tvarname, val, ' '); /* replace */
                     gfree(val);} vs = vs->vnext;}
    return(found);} gsobjdel(node_pid)    /*  delete object  */
    long node_pid;
    {OBJ *v; VAR *vs, *vx; struct subobj *sp, *sx; struct varrule *vr1, *vr2;
     if ( !(v = Cobjptr(node_pid)) ) return(0);
     vs= v->vnext;    /* start with variables    */
     while (vs)             /* free variable list   */
         {vx= vs->vnext;
          vr1 = vs->vr;
          while ( vr1 )    /* free determining rule list */
                {vr2 = vr1->vnext;
                 gfree(vr1);
                 vr1 = vr2;}
          gfree(vs);
          vs= vx;}
     sp= v->sub;
     while (sp)             /* free instance list   */
         {sx= sp->next;
          gfree(sp);
          sp= sx;}
     gfree(v);               /* free base */
     gMSG1(gProcessorDelete, gPC, gprocdel, node_pid);
     return(0);}

/********************************************************/
/*   gsqlb.c
 *
/*    External Data Interface for ASCII objects
 *
/********************************************************/
#include "string.h"
#include "stdio.h"
include "gmsg.h"
#include "csql.h"
#include "grulmsg.h"
#include "stsh.h"

extern int PROCMCRI;
FILE *GSQLfile = 0; int GSQLinst = 0; char GSQLobjn[44]; long GSQLbase;
extern int ruletrce; extern char pbuffer[500];

gsqla(objname, filename, sqlstmt, baseproc)     /*  process data base  */
    char *objname, *filename, *sqlstmt; long baseproc;
    {char *cp, *C, *rch;  struct exobj *M; int i = 0;
     GSQLinst = 0; GSQLbase = baseproc;
     strncpy(GSQLobjn, objname, 44);
     sprintf(pbuffer,"Processing db file %s\n", filename); gprintf();
     GSQLfile = fopen(filename, "r");
     if (!GSQLfile)
         {sprintf(pbuffer,"open failed for %s\n",filename); gprintf();
          return(0);}
     while (gsqltup())         /* load and process tuples */
         {i++;
          if (PROCMCRI) return(0);} if (ruletrce) {sprintf(pbuffer,"%d tuples loaded \n", i); gprintf(); }
     return(0);}
```

```c
gsqltup()       /* read a tuple   */
    {int inst = 1; char *cp, *C, record[200], data[50];
    struct gval *G; long procid;
    C = data; G = (struct gval *) C;
    while (1)
        {fgets(record, 160, GSQLfile);
         if (feof(GSQLfile))
            {fclose(GSQLfile);
             GSQLfile = 0;
             stshclos(Cobjptr(GSQLbase));
             return(0);}
         if (inst)
            {inst = 0;          /* make a new object */
             procid = gexcn(GSQLobjn, GSQLbase, ++GSQLinst);}
         C = record;
                        /* find blank or %$&# delimiter after name */
         while (*C != ' ' && *C != '\n' && *C != '\t') ++C;
         if (*C == ' ' || *C == '\t') *C++ = '\0';
         if (cp = strchr(C, '\n')) *cp = '\0';
         else
            {sprintf(pbuffer,"gsql no end of record found:%s\n", record);
             gprintf();
             continue;}
         if (!strcmp(record, "END")) {return(1);}
         if (record[0] == '\'') continue;
         while (*C == ' ') C++;
         if (*C == '_') *C = ' ';       /* convert _ to blank */
         G->len = 0; strcpy(G->val, C);
         stoupper(record);
         if (ruletrce)
            {sprintf(pbuffer,"procid = %ld sqlin %s=", procid, record, C);
             gprintf();
             stshpv(G); sprintf(pbuffer,"\n"); gprintf();} stshdata(Cobjptr(procid), record, G);}}
/****************************************************
/*   gsqli.c
/*   Object manager for external sql objects
/*   message passing model of inference engine       */
/****************************************************/
#include "string.h"
#include "stdio.h"
include "gmsg.h"
#include "grule.h"
#include "csql.h"
#include "grulmsg.h"
#include "stsh.h"

extern int ruletrce; extern char pbuffer[500];
char *notwhite();
char SQLuser[44];
/****************************************************************/
grMSGs(gExternalDataStart, gEDI, gsqlstrt, user)
    {strncpy(SQLuser, user, 44);}} gsqli(objname, procname, filename, sqlstmt, baseproc)
    /* interface to sql object processors   */
    char *objname, *procname, *filename, *sqlstmt; long baseproc;
    {
    if (!strcmp(procname, "ASCII"))
 {gsqla(objname, filename, sqlstmt, baseproc); return(0);}
        if (!strcmp(procname, "ORACLE"))
 {gsqlo(objname, sqlstmt, baseproc); return(0);}
    sprintf(pbuffer,"gsqli Unknown SQL processor, %s\n", procname);
    gprintf();
    return(0);}
```

```
/******************************************************************/
/*         */
/*    gsglic       */
/*         */
/*    Commit for external data interface      */
/******************************************************************/
grMSG(gCommit, gEDI, gsqlic)
   {}

/**********************************************************************/
/*
/*    gsqlo.pc
/*
/*    External Data Interface
/*    Dynamic SQL interface for data input from Oracle
/*
/**********************************************************************/
#include "stdio.h"
#include "stdlib.h"
#include "ctype.h"
#include "memory.h"
#include "orastd.h"
#include "sqlca.h"
#include "sqlda.h"
#undef T
#undef F
#define     CR    13
char *galloc();

EXEC SQL BEGIN DECLARE SECTION;
char  *stmt;
EXEC SQL END DECLARE SECTION;

SQLDA *bdp ;        /* -> Descriptor used for BIND vars   */
SQLDA *sdp ;        /* -> Descriptor used for SELECT vars    */
short *sdt = 0;     /* -> array of original DESCRIBE'd types */
int    sdtl;        /* nbr of entries in sdt[]     */
char  *vars = 0;    /* -> area used to hold Bind vars     */
int    bdSize = 5;  /* size of Bind variable descriptor   */
int    bvSize = 10; /* max nbr of chars in Bind Var name   */
int    sdSize = 5;  /* size of select list descriptor    */
int    svSize = 80; /* max nbr chars in select list colnames  */
int    autoCom = FALSE; /* Perform automatic commits? */ extern char *sqlald();  /*  allocate descriptor   */
extern VOID mufwrn();   /*  issue SQLWARNING err msg   */
extern int ruletrce;
long *Cobjptr();
/******************************************************************/
gsqlo(objname, sqlstmt, baseproc)   /*process data base*/
    char *objname, *sqlstmt; long baseproc;
{int  i;

/* Allocate storage for the various descriptors and strings */
/* which will be used, and get the first command string     */ stmt = sqlstmt;
/*if (ruletrce)*/ printf("gsqlo stmt='%s'\n", stmt);

gconn();
 EXEC SQL WHENEVER SQLERROR STOP;

bdp = sqlald(bdSize, bvSize, 10);
 if (bdp == NULL)
     {puts("MU FAIL: bdp = sqlald(bdSize, bvSize, 10);");
      exit(EX_FTL); } sdp = sqlald(sdSize, svSize, 0); /* Allocate a new descriptor    */
 if (sdp == NULL)
     {puts("MU FAIL: sdp = sqlald(sdSize, svSize, 0);");
      exit(EX_FTL); }
```

```
sdp->N = 0;   /* init in case exit before DESCRIBE */
EXEC SQL WHENEVER SQLERROR GOTO CHECKERR;
EXEC SQL PREPARE S FROM :stmt;
if (sqlca.sqlwarn[0] == 'W')
    Warning();  /* issue SQLWARNING err msg   */

EXEC SQL DECLARE C CURSOR FOR S;

/* describe the bind variables into the descriptor bdp */
bdp->N = bdSize;
descBind();

EXEC SQL OPEN C USING DESCRIPTOR bdp;
sdp->N = sdSize;
descSel();/* Describe the select list variables  */
if (sdp->F != 0) fillSelDesc();
if (sdp->N != 0) Fetcher(objname, baseproc);

if (ruletrce) printf("%u rows processed.\n", sqlca.sqlerrd[2]);
if (autoCom) commitWork();

EXEC SQL CLOSE C;
if (sdp->N != 0) freeSelVars();
if (vars != 0) {gfree(vars); vars = 0;}
gcomm();
return(0);

CHECKERR:
 reptError();
 EXEC SQL WHENEVER SQLERROR CONTINUE;
 EXEC SQL ROLLBACK WORK RELEASE;
 sqlca.sqlcode = 0;
 cleanUp();
 return(1);
}

/** Warning : Issue SQLWARNING Msg.
*/
VOID Warning()
{/* begin Warning */

EXEC SQL WHENEVER SQLERROR STOP;
EXEC SQL WHENEVER SQLWARNING CONTINUE;
EXEC SQL WHENEVER NOT FOUND CONTINUE;

if( sqlca.sqlwarn[1] == 'W' )
   printf("SQLWARNING: Column was truncated.");
else if ( sqlca.sqlwarn[2] == 'W' )
   printf("SQLWARNING: Null values in aggregate (MAX, SUM) function.");
else if ( sqlca.sqlwarn[3] == 'W' )
   printf("SQLWARNING: INTO var count not equal column count.");
else if ( sqlca.sqlwarn[4] == 'W' )
   printf("SQLWARNING: Update or Delete without Where clause.");
else if ( sqlca.sqlwarn[5] == 'W' )
   printf("SQLWARNING: ???.");
else if ( sqlca.sqlwarn[6] == 'W' )
   printf("SQLWARNING: Rollback required.");
else if ( sqlca.sqlwarn[7] == 'W' )
   printf("SQLWARNING: Change after query start on Select For Update.");

/* end Warning */
} cleanUp()
{ if (sdp->N != 0) freeSelVars();
  if (vars != 0) {gfree(vars); vars = 0;}
  sqlclu(bdp);   /* Free the bind variables descriptor  */
  sqlclu(sdp);   /* Free the select list descriptor   */
}

Stasher(dp, procid)
SQLDA *dp; long procid;
```

```
{ int  i = 1, *vp, colnamel;
  char colname[100];
  short  *ip;

for (i = 0; i < dp->N; i++)
  {char tempvar[100];
   colnamel = min(sdp->C[i], sizeof(colname)-1);
   memcpy(colname,sdp->S[i],colnamel);
   colname[colnamel] = '\0';
   if (ruletrce) printf("gsqlo:  colname='%s'",colname);
   tempvar[0] = '\0';
   tempvar[1] = '\0';
   if (ruletrce) {printf(", value='%s'",dp->V[i]);
  printf(", length='%d'",dp->L[i]);
  printf(", type='%d'\n",dp->T[i]); }
   strcpy(tempvar+2, dp->V[i]);
   stshdata(Cobjptr(procid), colname, tempvar);} }

/**  Fetcher()

Do the fetches, and call stasher
    for each row found.Print count found.
*/
Fetcher(objname, baseproc)
  char *objname; long baseproc;
{ int cnt;
   int i = 0; long procid;
EXEC SQL WHENEVER NOT FOUND GOTO NOT_FND;
EXEC SQL WHENEVER SQLERROR GOTO CHECKERR;
for (cnt=0; ; cnt++)
   {
    EXEC SQL FETCH C USING DESCRIPTOR sdp;
    i++; procid = gexcn(objname, baseproc, i);
    Stasher(sdp, procid);     /* stash the results of the fetch */
   }
NOT_FND: printf("\n%u row(s) selected\n", cnt); return(0);
EXEC SQL WHENEVER NOT FOUND CONTINUE;

CHECKERR:
 reptError();
 EXEC SQL WHENEVER SQLERROR CONTINUE;
 EXEC SQL ROLLBACK WORK RELEASE;
 sqlca.sqlcode = 0;
 cleanUp();
 return(1);
} descBind()
{
 EXEC SQL WHENEVER SQLERROR GOTO CHECKERR;
 EXEC SQL DESCRIBE BIND VARIABLES FOR S INTO bdp;
  if (bdp->F < 0)     /* Descriptor not large enough*/
    {
     bdSize = -(bdp->F);
     sqlclu(bdp);      /* Get rid of current descriptor  */
     bdp = sqlald(bdSize, 10, 0);    /*Allocate right size */
     EXEC SQL DESCRIBE BIND VARIABLES FOR S INTO bdp;
    }
   bdp->N = bdp->F; return(0);

CHECKERR:
 reptError();
 EXEC SQL WHENEVER SQLERROR CONTINUE;
 EXEC SQL ROLLBACK WORK RELEASE;
 sqlca.sqlcode = 0;
 cleanUp();
 return(1);
} descSel()
/* Describe the select list variables into sdp, expanding if   */
/* necessary.  Set desc. size to number of columns found.      */
```

```
{
   EXEC SQL WHENEVER SQLERROR GOTO CHECKERR;
   EXEC SQL DESCRIBE SELECT LIST FOR S INTO sdp;
   if (sdp->F < 0)    /* descriptor wasn't big enough */
     {
      sdSize = -(sdp->F);     /* save correct size      */
      sqlclu(sdp);     /* Free small descriptor */
      sdp = sqlald(sdSize, 10, 0);      /* Alloc. correct size  */
      EXEC SQL DESCRIBE SELECT LIST FOR S INTO sdp;
     }
   sdp->N = sdp->F;
   return(0);

CHECKERR:
 reptError();
 EXEC SQL WHENEVER SQLERROR CONTINUE;
 EXEC SQL ROLLBACK WORK RELEASE;
 sqlca.sqlcode = 0;
 cleanUp();
 return(1);
}

/**fillSelDesc : Fill SELECT Descriptor.

Allocate storage for each of the select list vars, and
   allocate storage for an indicator variable for each column
*/
fillSelDesc()
{  int   i;
   unsigned char prec;
   char    scale;

/* begin fillSelDesc */ if ( !sdt )
   {/* Haven't allocated sdt[] yet. */
   sdt = (short *)galloc(sizeof(short) * sdp->N);
   }
else if ( sdtl < sdp->N )
   {/* Need to reallocate saved type array. */
   sdt = (short *)realloc(sdt,sizeof(short) * sdp->N);
   } sdtl = sdp->N;

for (i = 0; i < sdp->N; i++)
   {
   /* Save original type; and clear possible NULL
      high-order bit.
   */
   sdp->T[i] &=0x7FFF;
   sdt[i]    = sdp->T[i];

if ( sdp->T[i] == 2 )
      {/* Have NUMBER.  Need to get precision and scale. */
      prec = (unsigned char)(sdp->L[i] >> 8);
      scale = (char)sdp->L[i];

if ( prec == 0 )
         {/* No precision. User default. */
         prec = 26;
         }
      sdp->L[i] = prec;

if ( scale < 0 )
         {/* Have -scale. Need to add trailing zeros. */
         sdp->L[i] += -scale;
         }
      sdp->L[i] += 2;   /* +2 for possible sign and decimal pt */
      }
```

```
      else if ( sdp->T[i] == 12 )
        {/* Have DATE. Need to set default len for DD-MON-YY. */
        sdp->L[i] = 9;
        }

/* Coerce to CHAR, with max len = 240. */ sdp->T[i] = 5;  / formerly = 1  /
      sdp->L[i] = min(sdp->L[i],240);
      (sdp->L[i])++;  /** gotta do this for type 5!! **/
      sdp->V[i] = galloc(sdp->L[i]);
      sdp->I[i] = galloc(sizeof(short));
      }

/* end fillSelDesc */
  } freeSelVars()
  /* Free the storage allocated to hold fetched values   */
  { int i;

for (i = 0; i < sdp->N; i++)
      {gfree(sdp->V[i]);
       gfree(sdp->I[i]); }
    sdp->N = 0;  /* set to "have free ()'d fetched-val storage"  */
   } rollBackWork() {EXEC SQL ROLLBACK WORK;} commitWork() {EXEC SQL COMMIT WORK;} reptError() {printf("%.70s\n", sqlca.sqlerrm.sqlerrmc);}
/***************************************************************/
/*                                                             */
/*       GSRC.C                                                */
/*                                                             */
 *      Source Processor
 *
/*      fixed list rule form                                   */
/*                                                             */
/***************************************************************/
#include    <string.h>
#include    <grulmsg.h>
#include    <gmsg.h>
#include    <gsrc.h>
include    <csql.h> extern char pbuffer[500];
char *tgtvsep();  /* seperate target variable name */
extern int ruletrce, giryrule;
SQL_db(src, srclst); SQL *Sptr, *Sptrp;
struct back {struct back *next; short ruleno;
char backstat; char varname[1];};
int srcfrst = 0;

gtsrc(grule)      /* load source list   */
    struct grulmsg *grule;
  {struct grulobj *objs; struct src *srcpt;  int intvar, cnt = 0;
   struct grulsubj *sub, *subend;
   char *C, *D, *R, *S, *objptr, *objptr2;
   char vardata[100]; int displ;
   if (!srcfrst++) {SQL_open(srclst);/* SQL_open(backlist);*/}
   C = (char *) grule;

D = C + grule->ruledata; R = C + grule->ruleout;
   objs = (struct grulobj *) R;

S = C + grule->rulepred;
   sub = (struct grulsubj *) S;
   intvar = grule->ruledata - grule->rulepred;
   (char *) subend = (char *) sub + intvar;
```

```
          while (sub < subend)
              {if (sub->targ)
                  {if (sub->next == 2 &&
                       (displ = (objs + sub->targ - 1)->objname))
                      {objptr = D + displ; objptr2 = tgtvsep(objptr);
                       objptr += 2;
                       if (objptr == objptr2) objptr = "SESSION";
                       strcpy(vardata, objptr); strcat(vardata, ".");
                       strcat(vardata, objptr2);
                       srcpt = (struct src *) galloc(sizeof(struct src) +
                                   strlen(vardata) + 1);
                       srcpt->ruleno  = grule->ruleno;
                       strcpy(srcpt->srcvar, vardata);    cnt++;
                       srcpt->srcstat = 'i';
                       SQL_writeo(srclst, srcpt, srcvar);}} sub++;}}

/***** trigger rules from source list **************************/
/* This routine reads the srclst DB with the key of the variable name
/* and sends a rule request to the rule cache for each equal tuple.
/*******************************************************************/ gsrc(ch, backchain)
    char *ch; int backchain;
    {struct src *tp; int backcnt = 0;
    if (backchain &&ruletrce)
         {sprintf(pbuffer,"backtracking for %s Rule%04d bc = %d\n", ch,
                giryrule, backchain);
          gprintf(); }

SQL_opncuro(srclst, srcvar, ch);

SQL_selcur(srclst)

backcnt++;
                    if (backchain) gsrcl(ch, SQLptr->ruleno);

SQL_clscur(srclst);

if (backchain || !backcnt)
           backcnt += getso(ch);     /* backchain rules from data base */ if (!backcnt)
        {if (ruletrce)
            {sprintf(pbuffer,"variable %s is UNKNOWN\n", ch);
             gprintf(); }
         return(1);} return(0);}
/*******************************************************************/
gsrcl(src, ruleno)     /* maintain list of backtracks   */
    char *src; short ruleno;
    {struct back *backptr;

return(0);}

/*******************************************************************/
/* Exhaustive backtrack control.
/*******************************************************************/
gsrcunkn(ruleno, c)
    short *ruleno;
    {
    return(0);} gsrcsrch(cp)    /* search source list for variable entries */
    char *cp;   /* and pass each one to the monitor list routine */
    {struct src *tlst; int r;
    tlst = srclst.dbSTRT;
                /* the following is the equivalent of a SELECT */
    while (tlst)        /* start search at first high */
         {if (strcmp(cp, tlst->srcvar) > 0) tlst = tlst->next;
          else break;}
```

```
    while (tlst)   /* the following is the equivalent of a CURSOR   */
        (if (r = gmonrlst(tlst->ruleno, tlst->srcvar)) return(r);
         tlst = tlst->next;}
    return(0);} gsrcexst(objname, varname, procid)    /*  look up existance variables   */
    char *objname, *varname; long procid;
    (struct src *tp; int backcnt = 0; char fullname[44];
     strcpy(fullname, objname);
     strcat(fullname, "."); strcat(fullname, varname);
     if (ruletrce)
         (sprintf(pbuffer,"gsrcexst checking for %s at %ld\n",
                 fullname, procid);
          gprintf(); }

SQL_opncuro(srclst, srcvar, fullname);

SQL_selcur(srclst)

if(gnwtgexs(SQLptr->ruleno, procid)) return(1);

SQL_clscur(srclst);

return(0);} gsrcexsc(objname, varname, procid)
    char *objname, *varname; long procid;
    (struct src *tp; int backcnt = 0; char fullname[44];
     strcpy(fullname, objname); strcat(fullname, ".");
     strcat(fullname, varname);
     if (ruletrce)
         (sprintf(pbuffer,"gsrcexst checking for %s at %ld\n",
                 fullname, procid);
          gprintf(); }

SQL_opncuro(srclst, srcvar, fullname);

SQL_selcur(srclst)

if(gnwtgexc(SQLptr->ruleno, procid)) return(1);

SQL_clscur(srclst);

return(0);}

/****************************************************************/
    /*                                                              */
    /*      GSTRING.C                                               */
    /*                                                              */
    /*      Gnome rule intrepreter                                  */
    /*      String and list functions                               */
    /*                                                              */
    /*          1. string concatenation                             */
    /*                                                              */
    /*          2. build intersection of two lists                  */
    /*                                                              */
    /*          3. build unique members of a list                   */
    /*                                                              */
    /****************************************************************/
    #include "stdlib.h"          /* for itoa(), ref in gcountmem()  */
    #include "string.h"
    #include "ctype.h"
    #include "grulmsg.h"
    #include "gmsg.h"
    #include  "stsh.h"

extern struct gval True, False;
extern OBJ *Cobjcurr, *Cobjptr();
extern int Gtpytarg;
extern int ruletrce;
char *gfmin(), *gfmax();
```

```c
/* target pointer points to variable name; source pointer points to data */
gscat(tgtptr, srcptr)
struct gval *tgtptr, *srcptr;
{
struct gval *ValPtr, *TemPtr; struct var *tgtvar;
if (!tgtptr || !srcptr) return(2);
if (!(tgtvar = stshvare(Cobjcurr, tgtptr->val, 0, 0)))
    return(2);
ValPtr = &tgtvar->v;
TemPtr = (VAL *)galloc(stshlen(ValPtr) + stshlen(srcptr) + 1);
TemPtr->len = 0;
strcpy(TemPtr->val, ValPtr->val);
strcat(TemPtr->val, srcptr->val);
stshrepl(Cobjcurr, tgtptr->val, TemPtr);
gfree(TemPtr);
return(4);}

/*****************************************************************/
/*                      Store Intersection                       */
/*****************************************************************/
gstrintr(tgtptr, srcptr)
struct gval *tgtptr, *srcptr;
{
struct var *tgtvar;
struct gval *set1ptr, *set2ptr, *intersect;
extern OBJ *Cobjcurr;
short offset1;
int i;
char *value1, *value2, *matchval;
char *findmatch ();
                            /* make sure valid pointers, or quit  */
if (!tgtptr || !srcptr)
    return(2);
                    /* make sure data name in tgt exists or quit */
          /* stshvare gets address to the variable of interest  */
          /* this is address to struct type var                 */
if (!(tgtvar = stshvare(Cobjcurr, tgtptr->val, 0, 0 )))
       return(2);
                    /* stshlen gets the length of its argument    */
                    /* here, the argument is the head of the struct */
                    /* tgtptr, for first data length segment      */
                      /* the address &tgtvar->v is to top of the  */
                      /* struct type gval                         */
set1ptr = (struct gval *) galloc(stshlen(&tgtvar->v));
set2ptr = (struct gval *) galloc(stshlen(srcptr));
intersect = (struct gval *) galloc(250);
value1 = (char *) galloc(20);
matchval = (char *) galloc(20);
stshcpy(set1ptr, &tgtvar->v);      /* copy the starting addresses */
stshcpy(set2ptr, srcptr);          /* into working copies         */
intersect->len = 0;                /* initialize intersect list   */
intersect->val[0] = '\0';
while (set1ptr->len)               /* while an offset exists in list1 */
    {
        strcpy(value1, set1ptr->val);
        matchval = findmatch(value1, set2ptr);
        if (*matchval != '\0')
            buildset(matchval, intersect);
        (char *) set1ptr = (char *) set1ptr + set1ptr->len;
    }
strcpy(value1, set1ptr->val);
matchval = findmatch(value1, set2ptr);
if (*matchval != '\0')
   buildset(matchval, intersect);
stshrepl(Cobjcurr, tgtptr->val, intersect);   /* update the object */
gfree(intersect);
gfree(set1ptr);
gfree(set2ptr);
return(4);
}
/****            look for matches on set2           ****/
char *findmatch(value1, set2ptr)
char *value1;
```

```
struct gval *set2ptr;
{
int match = 1;
int i;
char *value2, *aPtr;
value2 = (char *) galloc(20);
while (set2ptr->len)
        {
        strcpy(value2, set2ptr->val);
        match = (strcmpi(value1, value2));
        if (match == 0)                 /* if match exists, stick null  */
                {                       /* into set2, so same match     */
                set2ptr->val[0] = '\0'; /* won't occur again            */
                return(value1);
                }
                                        /* increment pointer to next ->len */
        set2ptr =aPtr= (char *) set2ptr + ((struct gval *) set2ptr)->len;
        }
strcpy(value2, set2ptr->val);                           /* last chance... */
match = (strcmpi(value1, value2));
if (match == 0)
        {
        set2ptr->val[0] = '\0';
        return(value1);
        }
*value2 = '\0';                 /* if no match in set2, return '\0' */
return(value2);
}
/*****    add new member to set under construction        *****/
buildset(newmember, newset)
char *newmember;
struct gval *newset;
{
char *aPtr;
int i;
                        /* if this is first addition to intersect set */
if (newset->val[0] == '\0')             /* the intiialized value... */
        {
        strcpy(newset->val, newmember);
        return(0);
        }
                        /* for second and subsequent entries...    */
while (newset->len)
    newset =aPtr= (char *) newset + ((struct gval *) newset)->len;
                        /* stuff true ->len into what was last ->  */
newset->len = strlen(newset->val)+3;
newset =aPtr= (char *) newset + ((struct gval *) newset)->len;
newset->len = 0;
strcpy(newset->val, newmember);
return(0);
}

/****************************************************************/
/*              Unique Members of a List                        */
/****************************************************************/ gstrunique(tgtptr, srcptr)
struct gval *tgtptr, *srcptr;
{
struct gval *unique;
extern OBJ *Cobjcurr;
char *aPtr;
if (!tgtptr || !srcptr)
        return(2);
unique = (struct gval *) galloc(stshlen(srcptr));
unique->len = 0;                        /* initialize unique list */
unique->val[0] = '\0';

while (srcptr->len)
    {
    if (!(findunique(srcptr->val, unique)))
        buildset(srcptr->val, unique);
    srcptr =aPtr= (char *) srcptr + ((struct gval *) srcptr)->len;
```

```
    )
if (!(findunique(srcptr->val, unique)))
    buildset(srcptr->val, unique);
stshrepl(Cobjcurr, tgtptr->val, unique);        /* update the object */
gfree(unique);
return(4);
)

findunique(value1, set2ptr)
char *value1;
struct gval *set2ptr;
{
char *aPtr;
while (set2ptr->len)
    {
    if (!(strcmpi(value1, set2ptr->val)))
        return(1);
    set2ptr =aPtr= (char *) set2ptr + ((struct gval *) set2ptr)->len;
    }
if (!(strcmpi(value1, set2ptr->val)))
    return(1);
return(0);.
)

/****************************************************************/
/*                  Count Members of a List                     */
/****************************************************************/ gcountmem(tgtptr, srcptr)
struct gval *tgtptr, *srcptr;
{
struct gval *memcount;
extern OBJ *Cobjcurr;
char *aPtr;
int count=0;
if (!tgtptr || !srcptr)
        return(2);
memcount = (struct gval *) galloc(stshlen(srcptr));
memcount->len = 0;      /* initialize memcount list */
memcount->val[0] = '\0';
while (srcptr->len)
    {
    ++count;
    srcptr =aPtr= (char *) srcptr + ((struct gval *) srcptr)->len;
    }
++count;
sprintf(memcount->val, "%d", count);

stshrepl(Cobjcurr, tgtptr->val, memcount);      /* update the object */
gfree(memcount);
return(4);
}

/****************************************************************/
/*                  Find Max member of a list                   */
/****************************************************************/ glmax(tgtptr, srcptr)
struct gval *tgtptr, *srcptr;
{
struct gval *maxmem;
extern OBJ *Cobjcurr;

if (!tgtptr || !srcptr)
        return(2);
maxmem = (struct gval *) galloc(stshlen(srcptr));
maxmem->len = 0;
strcpy(maxmem->val, gfmax(srcptr));
stshrepl(Cobjcurr, tgtptr->val, maxmem);
gfree(maxmem);
return(4);
}
```

```c
glmin(tgtptr, srcptr)
struct gval *tgtptr, *srcptr;
{
struct gval *minmem;
extern OBJ *Cobjcurr;

if (!tgtptr || !srcptr)
        return(2);
minmem = (struct gval *) galloc(stshlen(srcptr));
minmem->len = 0;
strcpy(minmem->val, gfmin(srcptr));
stshrepl(Cobjcurr, tgtptr->val, minmem);
gfree(minmem);
return(4);
}

/***************************************************************/
/*                                                             */
/*      GSTSH.C                                                */
/*                                                             */
/*              Stash functions                                */
/*                                                             */
/*                                                             */
/***************************************************************/
#include "string.h"
#include "gmsg.h"
#include "grulmsg.h"
#include "stsh.h"

extern short girykbid, giryrule, giryinst;
extern OBJ *Cobjcurr, *Cobjptr();
extern int Gtpytarg;
extern int ruletrce; extern char pbuffer[500];
VAR *stshlvar();

gerr(msg, msgvar)
    char *msg, *msgvar;
    {fprintf(pbuffer, msg, msgvar); gprintf(); return(0);}

VAR *stshrepl(v, name, data)            /* replace variable value */
    VAR *v; char *name, *data;
    {VAR *aVAR; struct varrule *aRule;
    aRule = 0;
    if ( aVAR = stshvare(v, name) )
        {aRule = aVAR->vr;   /* save determining rule list across delete */
         stshdel(v, name);}
    aVAR = stshdata(v, name, data);
    if ( aRule )
        if ( aVAR->vr )
            if ( aRule->kbid    == aVAR->vr->kbid    &&
                 aRule->ruleno  == aVAR->vr->ruleno  &&
                 aRule->ruleinst == aVAR->vr->ruleinst )
                {gfree( aVAR->vr );
                 aVAR->vr = aRule; }
            else
                aVAR->vr->vnext = aRule ;
        else
            aVAR->vr = aRule ;
    return aVAR ;
    }

VAR *stshrepx(v, name, data, notfwd)    /* replace variable value */
    VAR *v; char *name, *data; char notfwd;
    {VAR *aVAR; struct varrule *aRule;
    aRule = 0;
    if ( aVAR = stshvare(v, name) )
        {aRule = aVAR->vr;
         stshdel(v, name);}
    aVAR = stshdatx(v, name, data, notfwd) ;
    if ( aRule )
        if ( aVAR->vr )
            if ( aRule->kbid    == aVAR->vr->kbid    &&
                 aRule->ruleno  == aVAR->vr->ruleno  &&
                 aRule->ruleinst == aVAR->vr->ruleinst )
```

```
                {gfree( aVAR->vr );
                 aVAR->vr = aRule; }
            else
                aVAR->vr->vnext = aRule ;
        else
            aVAR->vr = aRule ;
    return aVAR ;
    }

VAR *stsha(name, data)           /* add a variable to varstart   */
    char *name; struct gval *data;
    {return(stshdata(Cobjcurr, name, data));}

VAR *stshdat(v, name, data, notfwd)
        /* add a variable to obj and all lower */
        OBJ *v; struct gval *data; char *name; char notfwd;
       {VAR *vs, *vh; struct subobj *subptr; char o_name[100];
        vs = (VAR *)galloc(sizeof(struct var) + stshlen(data) + 2);
        stshvi(vs);
        strncpy(vs->varname, name, 19); vs->varname[19] = '\0';
        stshcpy(&vs->v, data);
        vs->vnext = v->vnext;         /*    insert in chain    */
        v->vnext = vs;
        if ( giryrule )
            {vs->vr = (struct varrule *)galloc( sizeof(struct varrule) ) ;
             vs->vr->kbid    = girykbid;     /* note determining rule   */
             vs->vr->ruleno  = giryrule;
             vs->vr->ruleinst = giryinst;
             vs->vr->vnext   = 0 ; }
        else
             vs->vr = 0 ;
        sobjhi( v, o_name ) ;         /* build object name */
        sprintf(pbuffer,"%s(%d).%s = <%s>",
                o_name, v->inst, vs->varname, vs->v.val);
        gmonvar();                    /* notify presentation innerface */
        if (notfwd) vs->status = notfwd;
                                      /*   Update all sub objects   */
        subptr = v->sub;
        while (subptr)                /* store data to sub objs */
          {gMSGlsvc(gStore, gOP, stshdatr,
                    subptr->node_pid, name, data, notfwd);
           subptr = subptr->next;} if (notfwd != 'e' && !v->higher)
            stshfwd(v, vs);
    /* forward fire only at highest level    */
        return(vs);} grMSGlsvc(gStore, gOP, stshdatr, node_pid, name, data, notfwd)
    {
    stshdat(Cobjptr(node_pid), name, data, notfwd);} stshfwd(v, vs)            /*   forward fire variable    */
    OBJ *v; VAR *vs;
    {char varname[100];
    strcpy(varname, v->varname); strcat(varname, ".");
    strcat(varname, vs->varname);
    gMSG(gTargetNotice, gPC, gtptnote);
    Gtpytarg++;
    gMSGsv(gForwardRequest, gTP, gtgt, varname, &vs->v);
    return(0);}

VAR *stshdatx(v, name, data, notfwd)
    /* add variable at highest obj */
    OBJ *v; struct gval *data; char *name; char notfwd;
    {VAR *vs, *vh; char varname[50]; struct subobj *subptr;
    if (v->higher)
     /*{gMSGlsvc(gVariable, gOP, stshdaxr, v->higher, name, data, notfwd);
        vs = stshdatx(Cobjptr(v->higher), name, data, notfwd);
    else
        vs = stshdat(v, name, data, notfwd);
    return(vs);}
```

```c
grMSG1svc(gVariable, gOP, stshdaxr, node_pid, name, data, notfwd)
    {stshdatx(Cobjptr(node_pid), name, data, notfwd);}

VAR *stshdata(v, name, data)    /* add a variable with forward firing */
    OBJ *v; struct gval *data; char *name;
    {return(stshdatx(v, name, data, 0));}

VAR *stshvi(v)              /* initialize a new variable */
    VAR *v;
    {v->vnext = VARNULL;
     v->status = ' ';
     return(v);} stshclos(v)     /* set closed status */
    OBJ *v;
    {v->clostatus = 'c'; return(0);}

/******************************************************************/
/*                                                                */
/*      GSTSHA.C                                                  */
/*                                                                */
/*      Stash functions:                                          */
/*                                                                */
/*      Variable Retrieval Functions                              */
/******************************************************************/
#include "string.h"
#include "gmsg.h"
#include "grulmsg.h"
#include "stsh.h"

VAR *stshlvar();
extern int giryrule, giryinst; extern char pbuffer[500];

/* return pointer to variable with backchain */
VAL *stshvar(vpt, varname, exists)
    char *varname; OBJ *vpt; int exists;
    {OBJ *vsp; VAL *r;
     vsp = vpt;
     if (r = stshvarx(vpt, varname)) return(r);  /* find variable */
     if (exists) return(0);
            /* if USER object, then stash '\UNKNOWN' */
     if (vpt->use == 'U')
         {stshrepl(vpt, varname, "\0\0\\UNKNOWN");}
     return(VNULL);}

VAL *stshvarx(vpt, varname)
    /* return pointer to variable without backchain*/
    char *varname; VAR *vpt;
    {VAR *vsp;
     vpt = vpt->vnext;   /* step past object name... */
     while (vpt)         /* loop thru chain of vars */
         {if (!strncmp(varname, vpt->varname, 19) && vpt->status == ' ')
              return(&vpt->v);
          vpt = vpt->vnext;}
     return(VARNULL);}

VAR *stshvare(vpt, varname)    /* return pointer to variable struct */
    char *varname; VAR *vpt;
    {VAR *vsp;
     vpt = vpt->vnext;   /* bypass compare of object name */
     while (vpt)
         {if (!strncmp(varname, vpt->varname, 19))
              return(vpt);
          vpt = vpt->vnext;}
     return(VARNULL);} stshdel(vpt, varname)     /* delete variable entry from object set*/
    char *varname; OBJ *vpt;    /* begin at highest object */
    {if (vpt->higher)
         {gMSGls(gDelete, gOP, stshdelr, vpt->higher, varname);}
     else stshdelx(vpt, varname);
     return(0);}
```

```
grMSGls(gDelete, gOP, stshdelr, node_pid, varname)
   {stshdel(Cobjptr(node_pid), varname);} stshdelx(vpt, varname)        /* delete variable entry */
     char *varname; VAR *vpt;
  {VAR *vprev; OBJ *vpobj; struct subobj *subptr;
  vprev = vpobj = vpt;
  vpt = vpt->vnext;    /* start at first variable */
  while (vpt)
      {if (!strncmp(varname, vpt->varname, 19))
           {vprev->vnext = vpt->vnext;
            if (vpt->status == 'n' && !vpobj->higher)
               {sprintf(pbuffer,"stshdel EXISTENCE\
CONTRADICTION Rule%04d.%03d %s\n",
                           giryrule, giryinst, varname);
                gprintf(); }
            gfree(vpt);
            break;}
       vprev = vpt; vpt = vpt->vnext;}
  subptr = vpobj->sub;
  while (subptr)     /* delete data from sub objs    */
     {stshdelx(Cobjptr(subptr->node_pid), varname);
      subptr = subptr->next;}
  return(0);}

/*********************************************************
/*    gtaii.c
/*
/*    Application Inference Interface                 */
/*********************************************************/
#include "string.h"
#include "grulmsg.h"
#include "gmsg.h"
#include "stsh.h"
#include "grule.h"
#include "gstats.h"

char USER[40], USERPROC[40];
int CompVector[20];
int gforeign = 0;
int gaiierr = 0;
extern long objdeflt;
extern char True[];
extern int PROCSTOP;
extern struct grulmsg *ruleptrs[1000];
extern int rulemax, ruleprt, ruletrce;
extern int PSTAT, gNODE = 0;
extern char pbuffer[500];
extern int nwtgactv;

/*********************************************************/
/*      gtsess
/*
/*      Session Initialization Interface
/*********************************************************/
gtsess(name, user, userproc, objfile)
     char *name, *user, *userproc, *objfile;
  {char *cp, *cx;
   char procname[40], tablename[40];
   cp = USER; while (*user) *cp++ = toupper(*user++);
   cp = USERPROC; while (*userproc) *cp++ = toupper(*userproc++);

gMSG(gSessionStart, gPC, gproinit);

gMSG(gSessionStart, gRC, gtyinit);  /* Initialize Rule Cache */ gMSGsss(gExternalRuleStart, gERI, gtsessdb, name, user, userproc);

if (gforeign)
       gMSGs(gForeignObjectStart, gFOI, guwrti, user);

gmonstrt(name);   /* notify monitor for screen    */
```

```
    gMSGs(gExternalDefinitionStart, gEOTI, gexoc, objfile);

gMSGi(gExternalObjectStart, gRMR, gtoinit, gNODE);

gMSGs(gExternalObjectReq, gRMR, gtoex, "SESSION");

gMSG(gSessionStart, gARP, gnwtgint);

gMSGs(gExternalDataStart, gEDI, gsqlstrt, user);

return(0);}

/***************************************************************/
/*      gtsproc
/*
/*      Transaction Start
/*
/***************************************************************/
gtsproc()
    {int dummy = 0;

gMSGi(gTransactionStart, gPC, gtproc, dummy);

return(0);}

/***************************************************************/
/*      gtsesend
/*
/*      Session End Interface
/***************************************************************/
gtsesend()
    {                           /* dump uncomplete file */
    gMSG(gSessionEnd, gPC, gcsesend);  /* Notify Process Controller */
                                /* close undetermined file */
    gMSG(gSessionEnd, gFOI, guwrtc);
                                /* close rule print */
    gMSG(gSessionEnd, gRLP, grwrtc);
                                /* release data base */
    gMSG(gSessionEnd, gERI, gcomm);

if (!PSTAT) return(0);
    printf("\n Message Traffic\n");
    printf("    AII  %d\n", CompVector[gAII]);
    printf("    PC   %d\n", CompVector[gPC]);
    printf("    RC   %d\n", CompVector[gRC]);
    printf("    ERI  %d\n", CompVector[gERI]);
    printf("    ARP  %d\n", CompVector[gARP]);
    printf("    RMR  %d\n", CompVector[gRMR]);
    printf("    TP   %d\n", CompVector[gTP]);
    printf("    SP   %d\n", CompVector[gSP]);
    printf("    ETP  %d\n", CompVector[gETP]);
    printf("    ESP  %d\n", CompVector[gESP]);
    printf("    EOTI %d\n", CompVector[gEOTI]);
    printf("    EDI  %d\n", CompVector[gEDI]);
    printf("    FOI  %d\n", CompVector[gFOI]);
    printf("    RLP  %d\n", CompVector[gRLP]);
    printf("    OP   %d\n", CompVector[gOP]);
    return(nwtgactv);}

/***************************************************************/
/*      gtranend
/*
/*      Transaction End Interface
/***************************************************************/
gtranend()      /*  End of transaction clean up         */
    {                           /* free nwtg table            */
    if (ruletrce)
    {sprintf(pbuffer,"start transaction-end processing\n"); gprintf();};
    gMSG(gForeignTransmit, gARP, gnwtgdmp); /* dump undetermined rules */
    gMSG(gTransactionEnd, gARP, gnwtgrel);
    gMSG(gTransactionEnd, gRMR, gtotend);
    gMSG(gTransactionEnd, gPC,  gprotend);
```

```
    return((gaiierr) ? 101 : 0);}

/****************************************************/
/*      gtsynch
/*
/*      Synchpoint Interface
/****************************************************/
gtsynch()    /*  Synchpoint        */
    {                    /*              */ gMSG(gCommit, gFOI, guwrtcm);
    gMSG(gCommit, gEDI, gsqlic);

return(0);}

/****************************************************/
/*      gtaiir
/*
/*      Application Interface - Rule Message Input
/****************************************************/
gtaiir(R)
    struct grulmsg *R;
    {                    /*       */
            gtyar(R);   /* clean up rule*/ gMSGr(R, gARP, gnwtg);

return(0);}

/****************************************************/
/*      gtaiierr
/*
/*      Application Interface - System Error
/****************************************************/
grMSGi(gSystemError, gAII, gtaiierr, errno)
    {exit(errno);}}

/****************************************************/
/*      gtaiierrn
/*
/*      Application Interface - Non-fatal System Error
/****************************************************/
grMSGi(gSystemNError, gAII, gtaiiner, errno)
    {gaiierr = errno;}}

/*********************:*******************************
/*   gtctlbc
/*
/*   Main Operating System interface for
/*   message passing model of inference engine        */
/*
/*   Establishes environment, operating parameters, and
/*   invokes inference engine through Application
/*   Inference Interface.
/****************************************************/
#include <string.h>
#include <stdlib.h>
#include <time.h>
#include <grulmsg.h>
#include <gmsg.h>
#include <stsh.h>
include <csql.h>
include <gstats.h> char dbname[31];
extern int ruletrce, ruleprt, rulecncl; extern char pbuffer[500];
double start_time = 0; /* start time */
double stop_time  = 0; /* elapsed time */
double infer      = 0; /* inference time   */
int PROCTRCE = 0;
extern long PROCMEM, PROCMMAX, PROCHWM, PROCDUMP, PROCDEEP;
extern int PROCSTOP, PRCSTRAT;
int PSTAT = 0;
```

```c
extern int gforeign;
extern char True[];
extern long objdeflt;
extern long qmax, maxmem;
extern char ASSRTfil[];
long atol();

main(n,stp)
    int n; char *stp[];
    {int i = 0; int mon = 0;
    sprintf(pbuffer,"Gnome Expert System\n\Copyright Tesseract Corp 1988\n")
    gprintf();
    sprintf(pbuffer,"  Intelligibility of the code strictly prohibited!\n");
    gprintf();
    if (*stp[1] == '?') {gtctlh(); return(0);}
    while (++i < n)
        {if (*stp[i] == '/' && toupper(*(stp[i]+1)) == 'T')
            {sprintf(pbuffer,"Trace active\n"); gprintf();
             ruletrce++; PROCTRCE = 1;}
         if (*stp[i] == '/' && toupper(*(stp[i]+1)) == 'O')
            {sprintf(pbuffer,"Object dump requested\n");
             gprintf();
             PROCDUMP = 1;}
         if (*stp[i] == '/' && toupper(*(stp[i]+1)) == 'B')
            {sprintf(pbuffer,"Strategy = deep\n"); gprintf(); PRCSTRAT++;}
         if (*stp[i] == '/' && toupper(*(stp[i]+1)) == 'S')
            {PSTAT++;}
         if (*stp[i] == '/' && toupper(*(stp[i]+1)) == 'L')
            {sprintf(pbuffer,"Rule Print active\n");
             gprintf();
             grwrti(); ruleprt++;}
         if (*stp[i] == '/' && toupper(*(stp[i]+1)) == 'U')
            {sprintf(pbuffer,"Uncompleted file active\n");
             gprintf();
             gforeign = 1;}
         if (*stp[i] == '/' && toupper(*(stp[i]+1)) == 'M')
            {sprintf(pbuffer,"Monitor active\n"); gprintf(); mon = 1;}
         if (*stp[i] == '/' && toupper(*(stp[i]+1)) == 'Z')
            {PROCMMAX = atol(stp[i]+2);
             sprintf(pbuffer,"Memory threshold at %ld\n", PROCMMAX);
             gprintf();}
         if (*stp[i] == '/' && toupper(*(stp[i]+1)) == 'C')
            {sprintf(pbuffer,"Conclusions active\n"); gprintf(); rulecncl++
    if (n > 2) strcpy(ASSRTfil, stp[2]);
    if (*stp[2] == '/') ASSRTfil[0] = '\0';
    start_time = clock();
    gtidb(n, stp);     /* set up input and load rules and object defs */
    infer = clock();
    if (mon) gmoni();
    else {gtya(); /*  get assertions from ascii source   */
          gtsproc();}
    if (!PROCSTOP) {sprintf(pbuffer, "Session ended idle"); gprintf();}
    stop_time= clock();
    if (mon) gmonend();   /*  close monitor interface */
    if (!mon)  Cprt();
    sprintf(pbuffer,"\n   %f elapsed time.", (stop_time - start_time)/1000);
    gprintf();
    sprintf(pbuffer,"   %f inference time.\n", (stop_time - infer)/1000);
    gprintf();
    sprintf(pbuffer,"   Rule iterations:  %ld\n", PROCDEEP);
    gprintf();
    sprintf(pbuffer,"   Maximum memory used:  %ld\n", maxmem);
    gprintf();
    if ( qmax )
        {sprintf(pbuffer,"   Highest message population: %ld\n", qmax);
         gprintf();}
    if (PSTAT) gpstats();    /* print stats  */
    if (i = gtranend())      /* Transaction end   */
        printf("Transaction ended in error %d\n", i);
    if (i = gtsesend())      /* Session end   */
        printf("Session ended in error %d\n", i);
    return(0);}
```

```c
gtctlh()        /* command line explanation  */
    {printf("I/E command line arguments:\n");
     printf("    rule_process:rule_table assertions object_defs\n");
     printf("    /m run with monitor windows\n");
     printf("    /t trace on\n");
     printf("    /o object dump at tran end\n");
     printf("    /l print capture to RULELOG.KB\n");
     printf("    /u uncompleted rules to UNCMPLTD.KB\n");
     printf("    /b breadth strategy\n");
     printf("    /z memory threshold\n");
     printf("    /s statistics\n");
     printf("    /c conclusions output\n");
     return(0);}

/*******************************************************/
/*    gteri.c
/*
/*    External Rule Interface                          */
/*    Session Routines
/*******************************************************/
#include "string.h"
#include "gmsg.h"
include "gstats.h"

extern char pbuffer[500];

/*******************************************************/
/*        gtsessdb
/*
/*        Session Interface to rule data base
/*******************************************************/
gtsessdb(name, user, userproc)
    char *name, *user, *userproc;
   {char *cp, *cx;
    char procname[40], tablename[40];
    cp = procname; cx = name;
    while (*cx)
        {if (*cx == ':') break;
         *cp++ = toupper(*cx++);}
    *cp = '\0'; cx++;
    if (strchr(name, ':')) {
        cp = tablename;
        while (*cx) *cp++ = toupper(*cx++);
        *cp = '\0';}
    if (!strchr(name, ':'))
        {gMSGs(gExternalRuleStart, gERI, gtydb, procname);
         return(0);}
    else
        {if (!strcmp(procname, "ASCII"))
            {gMSGs(gExternalRuleStart, gERI, gtydb, tablename);
             return(0);}
         if (!strcmp(procname, "ORACLE"))
            {gMSGs(gExternalRuleStart, gERI, gtrdb, tablename);
             return(0);}} sprintf(pbuffer,"gtidb Unknown rule base processor - %s\n", procname);
    gprintf();
    exit(1);}

/*******************************************************/
/*                                                    */
/*     GTGT.C                                         */
/*                                                    */
 *      Target Processor
/*                                                    */
/*         fixed list rule form                       */
/*******************************************************/
#include    "string.h"
#include    "grulmsg.h"
#include    "gmsg.h"
#include    "gtgt.h"
#include    "csql.h"
```

```c
#include     "gstats.h"
#include     "stsh.h"

struct tgtrlst {struct tgtrlst *next; VAL *varptr; char varname[1];}
    *tgtrlist = 0, *tgtrlast = 0;
struct tgtv
    {struct tgtv *next;
     struct tgtr *rlist;
     char tgtvar[1];};
struct tgtr
    {struct tgtr *next;
     short ruleno;
     char side;};
struct tgto
    {struct tgto *next;
     struct tgtv *vlist;
     char tgtobj[1];} *tgtop = 0;
extern int ruletrce;
SQL_db(tgt, tgtlst);
int tgtfrst = 0;

struct gval *gstmpval();        /*   move variable to a temporary area  */
char *tgtvsep();    /* seperate target variable name */ gtgtreq(varname, varptr)
    char *varname; VAL *varptr;
    {static char module[] = "gtgtreq";
    struct tgto *opt; struct tgtv *vpt; struct tgtr *rpt; int found = 0;
    char objname[44], *cp; int reqtype, cmpr;

strcpy(objname, varname); cp = strchr(objname, '.');
    *cp++ = '\0'; vpt = 0;

opt = tgtop;
    while (opt)
        {if ((cmpr = strcmp(opt->tgtobj, objname)) >= 0) break;
         opt = opt->next;}
    if (!opt || cmpr) ;
    else
        {vpt = opt->vlist;
         while (vpt)
            {if ((cmpr = strcmp(vpt->tgtvar, cp)) >= 0) break;
             vpt = vpt->next;}} if (!vpt || cmpr) ;
    else
        {rpt = vpt->rlist;
         while (rpt)
            {reqtype = (rpt->side == 1) ? NWTG_CREQ : NWTG_IREQ;
            gtrceMSGsii(module, "forward firing for ",\
 varname, rpt->ruleno, 0);

++found;
            /*gnwtgreq(rpt->ruleno, reqtype);*/
            gMSGi(gRuleRequest, gARP, gnwtgreq, rpt->ruleno);
            gs_forwards++;
            rpt = rpt->next;}} gMSGi(gTargetReceipt, gPC, gtptrecp, found);

gtrceMSGss(module, "to oracle for", varname, varptr->val);
    getta(varname, varptr);
    return(0);} gtgty(grule)            /* collect targets    */
    struct grulmsg *grule;
    {struct grulobj *obj, *objend, *objs; struct tgt *tgtpt;
     struct grulsubj *sub, *subend; char *C, *D, *R, *S, *objptr;
     char vardata[100];
     int displ, intvar;
     if (!tgtfrst++) SQL_open(tgtlst);
     C = (char *) grule;
     D = C + grule->ruledata; R = C + grule->ruleout;
```

```
    objs = (struct grulobj *) R;

S = C + grule->rulepred;
    sub = (struct grulsubj *) S;
    intvar = grule->ruledata - grule->rulepred;
    (char *) subend = (char *) sub + intvar;

while (sub < subend)
        {if (sub->targ)
            {if (sub->next == 1 &&
                (displ = (objs + sub->targ - 1)->objname))
                {objptr = D + displ;
                 gtgtent(objptr + 2, tgtvsep(objptr),
                        grule->ruleno, sub->next);}} if (sub->subj)
            {if ((displ = (objs + sub->subj - 1)->objname))
                {objptr = D + displ;
                 gtgtent(objptr + 2, tgtvsep(objptr),
                        grule->ruleno, sub->next);}} sub++;} return(0);} gtgtent(objname, lvarname, ruleno, side)  /* make entry in target list */
    char *objname, *lvarname; int ruleno; int side;
    {struct tgto *tgtopt, *tgtoptp; char *objcp; int cmpr, loop;
     struct tgtv *tgtvpt, *tgtvptp; struct tgtr *tgtrpt;
     char varname[20];
     if (objname == lvarname) objcp = "SESSION";
     else objcp = objname;
     strncpy(varname, lvarname, 19); varname[19] = '\0';
     tgtopt = tgtop; tgtoptp = 0; cmpr = 1; loop = 0;
     while (tgtopt)
        {
         if ((cmpr = strcmp(tgtopt->tgtobj, objcp)) >= 0) break;
         tgtoptp = tgtopt;
         tgtopt = tgtopt->next;}
     if (cmpr)        /* add object name to list */
        {tgtopt = (struct tgto *) galloc(sizeof(struct tgto) +
                        strlen(objcp) + 2);
         strcpy(tgtopt->tgtobj, objcp);
         tgtopt->vlist = 0;
         if (tgtoptp) {tgtopt->next = tgtoptp->next;
                      tgtoptp->next = tgtopt;}
         else         {tgtopt->next = tgtop; tgtop = tgtopt;}} tgtvpt = tgtopt->vlist; tgtvptp = 0; cmpr = 1; loop = 0;

while(tgtvpt)
        {if ((cmpr = strcmp(tgtvpt->tgtvar, varname)) >= 0) break;
         tgtvptp = tgtvpt;
         tgtvpt = tgtvpt->next;} if (cmpr)
        {tgtvpt = (struct tgtv *) galloc(sizeof(struct tgtv) +
                        strlen(varname) + 2);
         strcpy(tgtvpt->tgtvar, varname);
         tgtvpt->rlist = 0;
         if (tgtvptp) {tgtvpt->next = tgtvptp->next;
                      tgtvptp->next = tgtvpt;}
         else  (tgtvpt->next = tgtopt->vlist; tgtopt->vlist = tgtvpt;}} tgtrpt = (struct tgtr *) galloc(sizeof(struct tgtr));
    tgtrpt->ruleno = ruleno; tgtrpt->side = side;
    tgtrpt->next = tgtvpt->rlist; tgtvpt->rlist = tgtrpt;
    return(0);} tgtvar(val, cp)   /* configure target variable name */
    struct gval *val; char *cp;
    {char *D, *aPtr;
     strcpy(cp, val->val);
     if (!val->len) return(0);
```

```
    strcat(cp, ".");
    while (val->len)
        val= aPtr= (char *)val + ((struct gval *)val)->len;
    strcat(cp, val->val);
    return(0);} tgtses(varname)              /*  fixup session var names    */
    char *varname;
    {char session[100];
    if (strchr(varname, '.')) return(0);
    strcpy(session, "SESSION.");
    strcat(session, varname);
    strcpy(varname, session);
    return(0);}

/*************** trigger rules from target list ***************************
/*  This routine reads the tgtlst DB with the key of the variable name
/*  and sends a rule request to the rule cache for each equal tuple.
/**************************************************************************** grMSGsv(gForwardReq, gTP, gtgt, ch, varptr)
    {struct tgt *tp; register struct tgtrlst *list, *listact;
    int reqtype;
    listact = tgtrlist;
    (char *)list = galloc(sizeof(struct tgtrlst) + strlen(ch) + 2);
    list->next = 0;
    strcpy(list->varname, ch);
    list->varptr = gstmpval(varptr); /* copy and save variable value */
    if (!tgtrlist) tgtrlist = list;
    if (tgtrlast) tgtrlast->next = list;
    tgtrlast = list;
    if (listact) return(0);
    while (tgtrlist)
        {list = tgtrlist;
/**printf("gtgt:    gtgtreq(%s, %s)\n", list->varname, list->varptr->val);*
        gtgtreq(list->varname, list->varptr);
/printf("         retn from gtgtreq\n");/
        tgtrlist = tgtrlist->next; gfree(list->varptr); gfree(list);}
    tgtrlast = 0;
    return(0);} gtgtsrch(varname)
    char *varname;
    {struct tgto *opt; struct tgtv *vpt; struct tgtr *rpt; int r;
    char objname[44], *cp; int reqtype, cmpr; char foundname[44];
    strcpy(objname, varname); cp = strchr(objname, '.');
    if (cp) *cp++ = '\0';
    else cp = "\0";
    opt = tgtop;
    while (opt)
        {if ((cmpr = strcmp(opt->tgtobj, objname)) >= 0)
            {vpt = opt->vlist;
            while (vpt)
                {if ((cmpr = strcmp(vpt->tgtvar, cp)) >= 0)
                    {rpt = vpt->rlist;
                    while (rpt)
                {strcpy(foundname, opt->tgtobj); strcat(foundname, ".");
                 strcat(foundname, vpt->tgtvar);
                 if (r = gmonrlst(rpt->ruleno, foundname)) return(r);
                 rpt = rpt->next;}}
                vpt = vpt->next;}}
        opt = opt->next;} return(0);}

/*****************************************************/
/*   gtidb.c
/*
/*   Establish session for pc user interface          */
/*****************************************************/
#include "string.h"
#include "stdio.h"
```

```
#include "grulmsg.h"
#include "gmsg.h"
#include "stsh.h"
#include "csql.h"
#include "gstats.h"

extern char USER[40], USERPROC[40];

/****************************************************************/
extern char rulefile[44];
gtidb(n,stp)
    int n; char *stp[];
   {char name[40], objfile[44];
    name[0] = '\0';
    if (n > 1) strcpy(name, stp[1]);
    if (*stp[1] == '/') name[0] = '\0';
    if (!name[0])
        {printf("Enter rule base(proc:table): ");
         gets(name); printf("\n");}
    objfile[0] = '\0';
    if (n > 3) strcpy(objfile, stp[3]);
    if (*stp[3] == '/') objfile[0] = '\0';
    if (!objfile[0])
        {printf("Enter Object def data base: ");
         gets(objfile); printf("\n");
         if (objfile[0] == '\0') return(0);}
    gtsess(name, "GTCTL", "IBMPC", objfile);
    return(0);}

/*********************************************************
/*       gtmsubs.c
/*
/*       Utility common subroutines
/*
/**********************************************************/
#include "string.h"
#include "stdlib.h"
#include "stdio.h"
include "gmsg.h"
#include "grulmsg.h"

extern int ruletrce; extern char pbuffer[500];
long PROCMEM = 0, PROCMMAX = 200000, PROCHWM = 0;
int  PROCMCRI = 0, PROCDUMP = 0;
long memuse = 0, maxmem = 0;

char *galloc(l)    /* generalized getmain with error check */
    {char *cp;
     if ( (memuse += l) > maxmem )
         {maxmem = memuse;
          /*printf("memory:  %ld\n",maxmem);*/}
     cp = malloc(l);
     if (cp) return(cp);
     sprintf(pbuffer,"galloc out of memory, request = %d\n", l);
     gprintf();
     exit(1);} gfree(mp)     /* generalized freemain with accounting    */
     char *mp;
    {if ( mp ) {memuse -= _fmsize( mp ) ; /* NB: not portable to mainframe */
     free(mp); }
     mp= NULL;}

/****************************************************************/
/*                                                              */
/*       Gtyar                                                  */
/*                                                              */
/*       Rule cleaner-upper                                     */
/****************************************************************/
gtyar(grule)         /* input is rule in message form   */
     struct grulmsg *grule;
    {int i, j, intvar; struct gval *vp;
     struct grulobj *obj, *objend, *objs;
```

```
        struct grulsubj *sub, *subend;
        char *C, *R, *S;   int minvar;

C = (char *) grule;
        R = C + grule->rulerout;
        objs = objend = obj = (struct grulobj *) R;
        intvar = grule->rulepred - grule->rulerout;
        (char *) objend = (char *) objend + intvar;

S = C + grule->rulepred;
        sub = (struct grulsubj *) S;
        intvar = grule->ruledata - grule->rulepred;
        (char *) subend = (((char *) sub) + intvar);

while (sub < subend)
           {if (sub->status != 'u')
              {if (sub->status == 't' || sub->status == 'f')
                   sub->next = 1;
                else  sub->next = 2;
                sub->status = 'u';}
            if (sub->targ) (obj + sub->targ - 1)->next = sub->next;
            if (sub->subj) (obj + sub->subj - 1)->next = sub->next;
            sub++; } minvar = grule->rulevars - grule->ruledata;
        while (obj < objend)
            {obj->node_pid = 0;
             obj->objname = obj->origobj;
             if (obj->objname && obj->val)
                  {if ( obj->val < minvar ) minvar = obj->val;
                   obj->val = 0;}
             obj++;}
        grule->rulelen  = grule->rulevars = grule->ruledata + minvar;
        grule->node_pid = 0;
        grule->ruleintl = 0;
        grule->rulercur = 0;
        grule->ruleprog = 'p';
        if (grule->rulestat == ' ') grule->rulestat = 'a';
        return(0);} gerrmsg(terror, module, intdata)   /*  standard error message output  */
     int terror, intdata; char *module;
     {sprintf(pbuffer,"PROCESSING ERROR %d module %s data %d\n",
             terror, module, intdata);
      gprintf();
      exit(1);} struct gval *gstmpval(val) /*   move variable to a temporary area   */
     struct gval *val;
     {struct gval *r;
      r = (struct gval *) galloc(stshlen(val) + 2);
      stshcpy(r, val);
      return(r);} stshcpy(targ, data)       /* copy stash variable       */
     struct gval *targ, *data;
     {char *aPtr;
      while (data->len)
          {targ->len = data->len; strcpy(targ->val, data->val);
           data= aPtr= (char *)data + ((struct gval *)data)->len;
           targ= aPtr= (char *)targ + ((struct gval *)targ)->len;}
      targ->len = data->len; strcpy(targ->val, data->val);
      return(0);} stshlen(data)      /* length of variable         */
     struct gval *data;
     {int len = 0; char *aPtr;
      while (data->len)
          {len += data->len;
           data= aPtr= (char *)data + ((struct gval *)data)->len;}
      return(len += strlen(data->val) + 3);} char *tgtvsep(val)   /* seperate target variable name */
```

```
        struct gval *val;
    {char *D, *aPtr;
     while (val->len)
            val= aPtr= (char *)val + ((struct gval *)val)->len;
     return(val->val);}

/***************************************************************/
/*    gto.c                                                     */
/*    Object manager for                                        */
/*    message passing model of inference engine          */
/***************************************************************/
#include "string.h"
#include "stdio.h"
#include "grulmsg.h"
#include "stsh.h"
#include "gmsg.h"
#include "grule.h"
#include "csql.h"
#include "gobjq.h"
#include "gstats.h"

SQL_db(objq, objque);
struct node_pidl ( int pid; int node; };

char gexolux();
long gobjfill(), gco(), Cnextpid();
extern int ruletrce; extern char pbuffer[500];
extern int ruleinst;
extern char exobjuse;
long objdeflt = 0;
int gtoNODE = 0; int gCREATE = 0, gDELETE = 0;

/***************** Object Manager *************************/
/* Two primary functions are performed by this set of routines:*/
/* 1. New objects are created when needed                      */
/* 2. Object routing is filled into rules and they are routed  */
/*    to their next object.                                    */
/***************************************************************/
/* New objects are created when the system exhausts the active  */
/* rule queue and there remain rules that have been enabled but */
/* are queued for uninstantiated objects or when a new subobject*/
/* is received for an SQL type object.                          */
/***************************************************************/
/* These routines assign a new object to a processor.           */
/***************************************************************/
grMSGi(gExternalObjectStart, gRMR, gtoinit, node)
    {gtoNODE = node;}} gtonpid(node_pid, node)       /* combine node and pid  */
    struct node_pidl *node_pid; int node;
    {node_pid->node = node;} long gtox(fullname, inst)
    char *fullname; int inst;
    {struct objq *objptr; int l; int n;
     objptr = (struct objq *)galloc(sizeof(struct objq)+strlen(fullname));
     objptr->instance = inst;
     objptr->node_pid = Cnextpid();
     gtonpid(&objptr->node_pid, gtoNODE);

gsoinit(fullname, objptr->node_pid);
     gMSGs(gObjectInit, n = objptr->node_pid, sobjinit, fullname);

strcpy(objptr->objname, fullname);
     if (ruletrce)
          {sprintf(pbuffer,"gtox Object created %s(%d) %04ld\n",
                  objptr->objname, objptr->instance, objptr->node_pid);
           gprintf(); }

SQL_write(objque, objptr);
     if ( !objdeflt ) objdeflt = objptr->node_pid;
     return(objptr->node_pid);}
```

```
long gtoo(mp, msgtype, hiobj)   /* create instance 0 */
    char *mp, *hiobj; int msgtype;
   {long baseproc; int l; OBJ *objptr;
    char fullname[44];
    l = strlen(hiobj); fullname[0] = '\0';
    if (l) {strcpy(fullname, hiobj); fullname[l] = '.';
         fullname[l+1] = '\0'; strcat(fullname, mp);}
       else strcpy(fullname, mp);
    if (gexolu(fullname))
        {
         baseproc = gtox(fullname, 0, "\0\0");
         objptr = Cobjptr(baseproc);
         objptr->use = exobjuse;
         objptr->type = gexo(fullname, OBJ_CREATE, baseproc);
         return(baseproc);}
       else return(0);} long gto(mp, msgtype)
    char *mp; int msgtype;
   {return(gtoo(mp, msgtype, ""));} grMSGs(gExternalObjectReq, gRMR, gtoex, objname)
    gto(objname, msgtype);}

/**************************************************************/
/* This routine completes the object routing, if possible.
/* Objfill provides the lookup for already existing objects.
/**************************************************************/
gtoc(grule, msgtype)       /* process rules for objects */
    struct grulmsg *grule;
   {struct grulobj *objend, *objs;
    char *C, *D, *R, *S;  struct gval *val;

C = (char *) grule;
    if (ruletrce)
        {sprintf(pbuffer," objproc =>Rule%04d\n", grule->ruleno);
         gprintf(); }

R = C + grule->rulerout;
    D = C + grule->ruledata;
    S = C + grule->rulepred;
    objs = (struct grulobj *) R;
    objend = (struct grulobj *) S;

/* loop through each routing entry and fill emptys */ while (objs < objend)
        {if ((!objs->val) && (!objs->node_pid))
            {(char *) val = D + objs->objname;
             if (val->len)
                 {if (objs->node_pid = gobjfill(val))
                     objs->objname += val->len;}
               else objs->node_pid = objdeflt;}
          objs++;}
    gtoroute(grule, msgtype);
    return(0);} gtoroute(grule, msgtype)  /* route rules to objects */
    struct grulmsg *grule;
   {struct grulobj *objend, *objs, *objet;
    char *C, *D, *R, *S;  struct gval *val;

gs_routes++;
    C = (char *) grule;
    if (ruletrce)
        {sprintf(pbuffer," objroute =>%lx Rule%04d inst %03d rcur %d\n",
                 grule, grule->ruleno, grule->ruleinst,
                 grule->rulercur);
         gprintf(); }
    R = C + grule->rulerout;
    D = C + grule->ruledata; S = C + grule->rulepred;
    objs = objet = (struct grulobj *) R;  objend = (struct grulobj *) S;
    if (grule->node_pid) objs++;  /* use next on rerouting */
```

```
        else grule->rulercur = 0;      /* ensure first of list is used */
    objs += grule->rulercur;
    if (objs == objend) {grule->rulercur = 0; objs = objet;}
                            /**** find next object to send message to ***/
    while (objs < objend)
        {if ((!objs->val) && objs->node_pid && objs->next != 4)
            {grule->node_pid = objs->node_pid;
             grule->rulercur = objs - objet;
             /*gtoq(grule, OBJQ_RULE);*/
             gMSGr(grule, gOP, gtoq);
             return(0);}
         objs++;}
    grule->rulestat = 'x';
    gMSGr(grule, gARP, gnwtg);
    return(0);} long gofillup(objval)
    struct gval *objval;
    {char *cp;
     cp = objval->val;

SQL_opncur(objque, objname, cp)
    SQL_selcur(objque);

if (!SQLptr->instance)      /*  find instance 0    */
        return(SQLptr->node_pid);

SQL_clscur(objque);

return(0);} long gobjfill(objval)
    struct gval *objval;
    {char *cp; long r;
     cp = objval->val;
     if (r = gofillup(objval)) return(r);
     r = gto(cp, 1);
     if (ruletrce)
         {sprintf(pbuffer,"objfill for %s rout %04ld\n", cp, r);
          gprintf(); }
     return(r);} long gdo(node_pid)       /*  delete object instance   */
    long node_pid;
    {return(node_pid);} gtocrule(grule)      /*  process create instance rules    */
    struct grulmsg *grule;
    {struct grulobj *objet, *objs, *objend, *objn; int sdispl, tdispl;
     struct grulsubj *sub, *subend;  char *C, *D, *R, *S, *V;  int intvar;
     struct gval *srcptr, *tgtptr; long node_pid;
     if (!gCREATE) gCREATE = gactt("CO");
     if (!gDELETE) gDELETE = gactt("DO");
     C = (char *) grule;
     R = C + grule->rulerout;
     D = C + grule->ruledata;
     S = C + grule->rulepred;
     objs = (struct grulobj *) R; objend = (struct grulobj *) S;

S = C + grule->rulepred;  V = C + grule->rulevars;
     sub = (struct grulsubj *) S;
     intvar = grule->ruledata - grule->rulepred;
     (char *) subend = (((char *) sub) + intvar);
     while (sub < subend)
                                /* find creates and deletes */
         {if (sub->next == 2)
             {if (sub->oper == gCREATE || sub->oper == gDELETE)
                 {if (sub->subj)
                     {sdispl = (objs + sub->subj - 1)->val;
                      (char *) srcptr =  D + sdispl;}
                  else srcptr = 0;
                  if (sub->targ)
                     {tdispl = (objet = objs + sub->targ - 1)->objname;
```

```
                    (char *) tgtptr = D + tdispl;} /* send varname to fun*/
                else tgtptr = 0;
                if (grule->node_pid = node_pid =
                        (sub->oper == gCREATE) ? gco(tgtptr, srcptr) :
                        gdo(node_pid))
                    {sub->next = 4;
                    sub->status = 'c';
                    if (sub->targ) (objs + sub->targ - 1)->next = 4;
                    if (sub->subj) (objs + sub->subj - 1)->next = 4;
                    /*  mark rule to indicate progress was made */
                    grule->ruleprog = 'p';
                    objn = objet + 1;
                    while (objn < objend)
                          {if (!strcmp(D + (objn->origobj) + 2,
                                       D + (objet->origobj) + 2))
                                objn->node_pid = node_pid;
                           objn++;}}}
                else break;}
            sub++;}
    gMSGr(grule, gOP, gtob);   /*** fix this later ************/
    return(0);} long gco(tgtptr, srcptr)       /*  create object instance  */
    struct gval *tgtptr, *srcptr;
    {int objid; long gobjfill(), procid;
    if (!tgtptr) return(0);
    if (!(procid = gobjfill(tgtptr))) gerrmsg(23, "GCO", 0);
/* must tolerate missing obj */
                    /* find or create base object */
    return(gexcnc(tgtptr->val, procid, srcptr));} gobjinst(procid)   /*  return instance value for this proc id */
    long procid;
    {char *cp;

SQL_sels(objque, node_pid, procid);
        return(objque.dbSEL->instance);

sprintf(pbuffer,"gobjinst invalid procid %04ld\n", procid); gprintf();
    return(0);} grMSG(gTransactionEnd, gRMR, gtotend)   /* free objs at transaction end */
    {struct objq *prevobj, *op;
    objque.dbSEL = objque.dbSTRT;
    prevobj = 0;
    while ( objque.dbSEL )
        {
        op = objque.dbSEL->next;
        if ( gexolux(objque.dbSEL->objname) != 'Y' )
            {
            gexcdel(objque.dbSEL->node_pid);
            gMSGl(gObjectDelete, gOP, gsobjdel, objque.dbSEL->node_pid);
            if ( prevobj )
                prevobj->next = op;   /* repair chain     */
            else
                objque.dbSTRT = op;   /* deleting dbSTRT */
            gfree(objque.dbSEL); }
        else
            . prevobj = objque.dbSEL;
        objque.dbSEL = op;
        }
    return(0);} gpstats()
   {printf("\n G N O M E execution statistics:\n\n");
    printf("   %06ld rulenames selected for forward-chaining.\n", gs_forwards);
    printf("   %06ld rulenames selected for back-chaining.\n", gs_backwards);
    printf("   %06ld rules retrieved.\n", gs_fetches);
    printf("   %06ld rules completed.\n", gs_completions);
    printf("   %06ld rules concluded TRUE.\n", gs_true);
    printf("   %06ld rules concluded FALSE.\n", gs_false);
    printf("   %06ld rule dispatches.\n", gs_routes);
    printf("   %06ld rule refusals.\n", gs_refused);
```

```
    printf("    %06ld rule suspensions.\n", gs_suspensions);
    printf("    %06ld rule resends.\n", gs_resends);
    printf("    %06ld rule requeues.\n", gs_requeues);
    printf("    %06ld rule pends.\n", gs_pends);
    printf("    %06ld total data base fetches.\n", gs_tuples);
    printf("    %06ld was highest rule population.\n\n", gs_maxcount);
    return(0);}

/***************************************************************/
/*   gtob.c

/*   Sub-Object Router

/***************************************************************/
#include "string.h"
#include "gmsg.h"
#include "grulmsg.h"
#include "csql.h"
#include "exobj.h"
#include "stsh.h"

extern OBJ *Cobjcurr;
extern int ruletrce; extern char pbuffer[500];

/***************************************************************/
/*   Sub-Base object processor.
/*   This routine examines the sub-object indicator (not end of list in the
/*   object name) and fills in the updated routing.  This process is performe
/*   on rules that have been processed by the intrepreter and remain undeterm
/***************************************************************/ gtob(grule, msgtype)         /*   rule input for subobject         */
    struct grulmsg *grule; int msgtype;
    {struct subobj *subptr; long currobj; char objname[44]; int found;
    struct grulobj *objend, *objs, *objn, *objx;
    char *C, *D, *R, *S;  struct gval *val;

gmon(grule);
    C = (char *) grule; currobj = grule->node_pid;
    if (ruletrce)
        (sprintf(pbuffer,"gtob subobjproc =>Rule%04d node %04d\n",
                grule->ruleno, grule->node_pid);
         gprintf(); )

R = C + grule->rulerout;
    D = C + grule->ruledata; S = C + grule->rulepred;
    objn = objs = (struct grulobj *) R;
    objend = (struct grulobj *) S;

if (grule->rulestat == 'f')
        {gMSGr(grule, gARP, gnwtg);
         return(0);}

/* loop through each routing entry */
    found = 0;
    while (objs < objend)
        {val = (struct gval *) (D + objs->objname);
         if (objs->node_pid == currobj && val->len)
            {found = 0;
             subptr = Cobjcurr->sub;
             objname[0] = '\0'; sobjhi(Cobjcurr, objname);
             strcat(objname, val->val);
             while (subptr)
                {if (!strcmp(objname, subptr->subobjnm))
                    {if (!found) grule->node_pid = subptr->node_pid;
                     found = 1;
                     objs->node_pid = subptr->node_pid;
                     objs->objname += val->len;}
                 subptr = subptr->next;}
             if (found)
                 grule->ruleprog = 'p';
             if (!found)
                 {sprintf(pbuffer,"gtob Rule%04d.%03d Unknown Object %s at
```

```
                grule->ruleno, grule->ruleinst, objname, currobj)
            gprintf(); } }
    objs++;}
 if (found)
        {gMSGr(grule, gOP, gtprule);}   /* send on to sub-object */
 else
        gtobrout(grule);
 return(0);} gtobrout(grule)   /* route rules to following objects */
    struct grulmsg *grule;
   {struct grulobj *objend, *objs, *objet;
    char *C, *R, *S;  struct gval *val;

C = (char *) grule;
    if (ruletrce)
        {sprintf(pbuffer," gtobobjroute =>%lx Rule%04d inst %03d rcur %d\n",
                    grule, grule->ruleno, grule->ruleinst,
                    grule->rulercur);
         gprintf(); }
    R = C + grule->ruleout; S = C + grule->rulepred;
    objs = objet = (struct grulobj *) R;  objend = (struct grulobj *) S;
    objs++;  /* use next on rerouting */
    objs += grule->rulercur;

/**** find next object to send message to ***/
    while (objs < objend)
            /* don't send undetermined rules to actions */
      {if (grule->rulestat != 't' && objs->next == 2) break;
       if ((!objs->val) && objs->node_pid && objs->next != 4
                && objs->node_pid != grule->node_pid)
          {grule->node_pid = objs->node_pid;
           grule->rulercur = objs - objet;
           /*gtoq(grule, OBJQ_RULE);*/
           gMSGr(grule, gOP, gtoq);
           return(0);}
       objs++;}

/*gnwtg(grule);*/
    gMSGr(grule, gARP, gnwtg);
    return(0);}

/********************.********************************/
/*   gtoq.c
 *
/*   Rule Queue Processor for Base Objects
 *
 *   Part of Rule Queue Manager.
/******************************************************/
#include "string.h"
#include "gmsg.h"
#include "grulmsg.h"
#include "csql.h"
#include "exobj.h"
#include "stsh.h"

extern int ruletrce; extern char pbuffer[500];
int ruleinst = 0;

/************* ************* ****************************/
/* Object message list maintenance.
/* When a rule is routed to a base object, this routine captures the rule
/* and routes it to all of the existing sub-objects. When a new sub-object
/* is created, all rules presently in the list for the object are routed to
/* the new sub-object.
/* Note, rules may reappear, hence duplicates (including instance) must be
/* eliminated.
/*********************************************************************/
gtoq(cp, msgtype)   /* message directing module   */
    char *cp; int msgtype;
   {if (msgtype == gRuleMessage) gtoqp(cp, msgtype);
    else if (msgtype == OBJQ_OBJ) gtoqo(cp, msgtype);
        else {sprintf(pbuffer,"gtoq Unknown message type %d\n", msgtype);
```

```
              gprintf(); }
    return(0);;} gtoqo(baseptr, msgtype)       /* spawn known rules to new sub-object  */
    struct exobjl *baseptr;
    {struct ruleq *rqptr; struct grulmsg *spawn, *baserule; int i;
     register char *cx, *cy; long baseproc;
     struct grulobj *objend, *objs, *objn;
     char *C, *R, *S, *D; VAL *selectobj, *testobj;
     rqptr = baseptr->objrulqs;
     while (rqptr)
         {baserule = rqptr->rpt;
          selectobj = 0;
          spawn = (struct grulmsg *) galloc((i= baserule->rulelen)+150);
          cx = (char *) baserule; cy = (char *) spawn;
          while (i--) *cy++ = *cx++;
          spawn->rulepint = spawn->ruleinst;
          spawn->ruleinst = ++ruleinst;
          if (ruletrce)
              {sprintf(pbuffer,"gtoqo Rule %04d inst %02d  spawned,\
                  inst %02d to obj %04ld from %04ld\n",
                  baserule->ruleno, baserule->ruleinst,
                  spawn->ruleinst, baseptr->subobjl->node_pid, spawn->node_pid)
                  gprintf(); }
          C = (char *) spawn;
          R = C + spawn->rulerout;
          S = C + spawn->rulepred;
          D = C + spawn->ruledata;
          objs = (struct grulobj *) R;  objend = (struct grulobj *) S;
          objn = objs;
          baseproc = spawn->node_pid;
          /* loop through each routing entry and change routing
             for those with the same sub object           */
          while (objn < objend)
              {if (objn->node_pid == baseproc)
                   {if (selectobj)
                       {(char *) testobj = D + objn->objname;
                        if (gtoqcmp(selectobj, testobj))
                            objn->node_pid =
                    baseptr->subobjl->node_pid;}
                    else {(char *) selectobj = D + objn->objname;
                        objn->node_pid = baseptr->subobjl->node_pid;}}
               objn++;}
          spawn->node_pid = baseptr->subobjl->node_pid;
          if (ruletrce) {
              sprintf(pbuffer,"gtoqo Rule %d inst %02d routed \
to obj %04ld stat %c\n",
                  spawn->ruleno, spawn->ruleinst,
                  spawn->node_pid, spawn->rulestat);
              gprintf(); }
          spawn->ruleintl = 0;
          spawn->node_pid = 0;       /* restart list   */
          spawn->ruleprog = 'p';     /* force nwtg to re-schedule   */
          /* gtprule(spawn, PROC_NEW);*/
          gMSGr(spawn, gARP, gnwtg);
          rqptr = rqptr->next;}
     return(0);} gtoqcmp(a, b)                 /* compare sub objects names       */
    VAL *a, *b;
    {char *aPtr;
     while (a->len && b->len)
         {if (!strcmp(a->val, b->val))
              {a= aPtr= (char *)a + ((struct gval *)a)->len;
               b= aPtr= (char *)b + ((struct gval *)b)->len;
               /**(char *) a += a->len;
               (char *) b += b->len;**/}
          else return(0);;}
     if (a->len || b->len) return(0);
     return(1);;} gtoqs(rptr, exptr)    /* send a rule to all sub-objects  */
    struct grulmsg *rptr; struct exobjl *exptr;
```

```
{register int i; register char *cx, *cy;
 struct procq *pqptr; struct grulmsg *spawn;
 pqptr = exptr->subobjl;
 while (pqptr)  /* loop through sub-object list */
     {spawn = (struct grulmsg *) galloc((i = rptr->rulelen) + 150);
      cx = (char *) rptr; cy = (char *) spawn;
      while (i--) *cy++ = *cx++;
      spawn->rulepint = spawn->ruleinst;
      spawn->ruleinst = ++ruleinst;
      if (ruletrce) {
           sprintf(pbuffer,"gtoqs Rule %04d inst %02d spawned,\
 inst %02d to obj %04ld from %04ld stat %c\n",
                 rptr->ruleno, rptr->ruleinst, spawn->ruleinst,
                 pqptr->node_pid, spawn->node_pid, spawn->rulestat);
           gprintf(); }
      gtoqsi(spawn, pqptr->node_pid);
      spawn->ruleintl = 0;
      spawn->node_pid = 0;        /* restart list */
      spawn->ruleprog = 'p';      /* force nwtg to re-schedule  */
      gMSGr(spawn, gARP, gnwtg);
      pqptr = pqptr->next;}
 return(0);} gtoqsi(spawn, procid)          /* change routing for sub objects */
    struct grulmsg *spawn; long procid;
   {char *C, *R, *S, *D; VAL *selectobj = 0, *testobj;
    struct grulobj *objend, *objs, *objn;
    long baseproc;
    C = (char *) spawn;
    R = C + spawn->rulerout; S = C + spawn->rulepred;
    D = C + spawn->ruledata;
    objs = (struct grulobj *) R;  objend = (struct grulobj *) S;
    objn = objs;
    baseproc = spawn->node_pid;
           /* loop through each routing entry and change routing */
    while (objn < objend)
         {if (objn->node_pid == baseproc)
             {if (selectobj)
                  {(char *) testobj = D + objn->objname;
                   if (gtoqcmp(selectobj, testobj))
                       objn->node_pid = procid;}
              else {(char *) selectobj = D + objn->objname;
                    objn->node_pid = procid;}}
          objn++;}
    spawn->node_pid = procid;
    if (ruletrce) {
         sprintf(pbuffer,"gtoqs Rule %d inst %02d rerouted to obj\
 %04ld base %04ld\n",
                spawn->ruleno, spawn->ruleinst,\
 spawn->node_pid, baseproc);
         gprintf(); }
    return(0);} gtoqp(rptr, msgtype)   /* Process a new rule to base object */
    struct grulmsg *rptr;  int msgtype;
   {struct ruleq *qsptr, *qptr; long baseproc; struct exobjl *exptr;

baseproc = rptr->node_pid;
    if (ruletrce)
        {sprintf(pbuffer,"gtoqp Spawning for Rule%04d.%03d\n",
         rptr->ruleno, rptr->ruleinst);
         gprintf(); }
                /* look up entry for a base object    */
    if (!(exptr = gexcl(baseproc))) {gtprule(rptr, PROC_NEW); return(0);}
    qptr = qsptr = exptr->objrulqs;
          /* bypass spawning for single instance objects */
    if (exptr->objtype == ' ' || exptr->objtype == 'S')
         {gtprule(rptr, PROC_NEW); return(0);}
         if (ruletrce)
             {sprintf(pbuffer,"gtoqp Obj queue, msg %lx  msg\
 type %d Rule%04d inst %02d for %04ld\n",
                  rptr, msgtype, rptr->ruleno,\
```

```
                      rptr->ruleinst, rptr->node_pid);
              gprintf(); }
    while (qptr)
         {if (qptr->rpt->ruleno == rptr->ruleno
               && qptr->rpt->ruleinst == rptr->ruleinst)
                  {gtprule(rptr, PROC_NEW);
                    return(0);}
          qptr = qptr->next;} qptr = (struct ruleq *) galloc(sizeof(struct ruleq));
         qptr->rpt = rptr;
         qptr->next = qsptr;
         exptr->objrulqs = qptr;
         if (ruletrce)
              {sprintf(pbuffer,"gtoqp rule %04d inst %02d queued for %04ld\n"
                    rptr->ruleno, rptr->ruleinst, baseproc);
               gprintf(); }
         gtoqs(rptr, exptr);
         gnwtgcmp(rptr);        /* make stud rule complete  */
    return(0);}

/********************************************************/
/*      gtpy.c
/*
/*      Rule Queue Manager
/*
/*      Module of Object Processor  (OP)
/*
 *      Contains message passing emulation for rule
 *      messages for shared memory model
/********************************************************/
#include "stdlib.h"
#include "string.h"
#include "stdio.h"
include "gmsg.h"
#include "grulmsg.h"
#include "csql.h"
#include "stsh.h"

struct aruleq {struct aruleq *next; struct aruleq *prev;
              struct grulmsg *rpt;}
             *activq = 0, *activql = 0;
int detrmine = 0;
int procactv = 0, quescan = 0, procpass = 0;
int PROCSTART = 0;
extern int PROCSTOP;
int Gtpyrule = 0, Gtpytarg = 0, Gtpysrc = 0, Gtpycmpl = 0;
int PRCSTRAT = 0; long PROCDEEP = 0;
OBJ *Cobjptr();
OBJ *Cobjcurr;
extern int ruletrce; extern char pbuffer[500];
extern FILE *GSQLfile;
extern int  PROCMCRI;
extern int gsobcfnd;

/******************* process rule  **********************/
/* This routine receives rule messages from the rule cache that have   */
/* been determined to be interesting by some other processor.          */
/* If the rule is an assertion, it is queued at the front of the queue */
/* otherwise it is  enqueued at the end of the queue.                  */
/********************************************************/
gtprule(cp, msgtype)   /* message directing module   */
    char *cp; int msgtype;
   {gtpnew(cp, msgtype);
    return(0);}

/* message directing module for int type  */
grMSGi(gTransactionStart, gOP, gtprulei, options);
    gtpnew(msg, msgtype);
    return(0);} gtpnew(rpp, msgtype)
      struct grulmsg *rpp;  int msgtype;
```

```
       {int sent = 1, k = 0;   struct aruleq *np, *rqp, *rqpl, *act;
        act = activq;
        if (msgtype != gTransactionStart)
            {if (ruletrce)
    {sprintf(pbuffer,"gtpnew Queuing msg %lx  msg type %d\
    Rule%04d, inst %03d node %04ld stat %c\n",
    rpp, msgtype, rpp->ruleno, rpp->ruleinst, rpp->node_pid, rpp->rulestat);
    gprintf(); }

Gtpyrule++;
            np = (struct aruleq *) galloc(sizeof(struct aruleq));
            np->rpt = rpp;
            np->next = 0; np->prev = 0;

if (PRCSTRAT && PROCDEEP)
                {np->next = activq;
                 if (activq) activq->prev = np;
                 activq = np;}              /* enque rule at front  */
            else
                {if (activql)
                    {np->next = activql->next;
                     activql->next = np;}   /* enqueue new rule at end */
                 np->prev = activql;
                 activql = np;}
            if (!activq) activq = np;
            if (!activql) activql = np;
            if (ruletrce)
                {sprintf(pbuffer,"gtpy return act %lx\n", act);
                 gprintf(); }
            if (act) return(0);
            if (!PROCSTART) return(0);} else {PROCSTART = 1;
        if (ruletrce)
            {sprintf(pbuffer,"Rule processing commencing\n"); gprintf(); }} np = activq;
        detrmine = 0; k = 0; sent = 0;
        while (np)
            {Cobjcurr = Cobjptr(np->rpt->node_pid);
                            /* dequeue from active queue */ if (np->rpt->ruleno > 0) PROCDEEP++;
             girx(np->rpt);   /* send rule to intrepreter  */
             if (!np->prev) {activq= np->next; if (activq) activq->prev= 0;}
             else  np->prev->next = np->next;
             if (np->next) np->next->prev = np->prev;
             if (activql == np) activql = np->next;
             gfree((char *)np);
             if (PROCSTOP) return(0);
             np = activq;}          /* contine with next */ activql = 0;
        return(0);}
/**************************************************************************/
/*                                                                        */
/*      Processor Idle Message                                            */
/*                                                                        */
/*      Respond to Processor Idle notice from Process Controller          */
/*                                                                        */
/**************************************************************************/
gtpycnts(node_pid)
    long node_pid;
    {int cmplcnt = 0; gsobcfnd = 0;
     if (stsobjet(Cobjptr(node_pid))) ++cmplcnt; /* trigger existance */
     gMSGliii(gObjectStatus, gPC, gprostat,
              node_pid, Gtpyrule, cmplcnt, gsobcfnd);
     return(0);}

/**************************************************************************/
/*                                                                        */
```

```
/*      Transaction End Message                                              */
/*                                                                           */
/*                                                                           */
/*****************************************************************************/
grMSGl(gTransactionEnd, gOP, gtpytend, node_pid)
     {
      /* Here is where code will live that frees the rule queue when
      /* the transaction ends from other than an idle condition.     */
       } graend()
     {activq = activql = 0;
      detrmine = 0;
      procactv = quescan = procpass = 0;
      PROCSTART = 0;
      Gtpyrule = Gtpytarg = Gtpysrc = Gtpycmpl = 0;
      PRCSTRAT = PROCDEEP = 0;
      return(0);}

/*****************************************************************/
/*   gtrdb.c                                                      */
/*   External Rule Processor      */
/*     Initialization                                             */
/*****************************************************************/
#include "grulmsg.h"
#include "stdio.h"
include "gmsg.h"
#include "stsh.h"
#include "grule.h"
#include "csql.h"
#include "manx.h"

struct grulmsg *getru(), *rPtr;
extern VAR objcurr;
char *malloc();
extern int ruletrce, ruleprt, rulecncl;
extern int PROCSTART;
extern dbname[];
int RDBMSopn = 0;   /* Flag indicating Rule input from RDBMS   */ gtrdb(name)
     char *name;
     {strcpy(dbname, name);
      printf("Rule table is '%s'\n", dbname);
      gconn(); /* connect to RDBMS   */
      RDBMSopn = 1;
      return(0);}

/*****************************************************************/
/*   gtya.c
/*
/*   message passing model of inference engine         */
/*   Ascii form assertion input
/*
/*****************************************************************/
#define _FASTIO
#include <string.h>
#include <grulmsg.h>
#include <stdio.h>
#include <gmsg.h>
#include <stsh.h>
include <csql.h> define TRUE 1 extern int ruletrce, ruleprt, rulecncl; extern char pbuffer[500];
extern int PROCSTART;
char ASSRTfil[44] = "";

/**************** Load rule base  ************************/
/* This routine reads rules and formats the rule header.      */
/* It then calls the cashe routine to load the SQL data       */
/* data base.                                                 */
```

```
/*****************************************************************/
gtya()
    (FILE *F; char *C;  struct grulmsg *R;
    int i = 0, lo; short l[1];
    if ( ruletrce )
        (sprintf(pbuffer,"Using assertion file %s\n", ASSRTfil);
         gprintf(); )
    F = fopen(ASSRTfil, "rb");
    while (TRUE)   /* load and process assertions */
        (
        fread((char *)l, 2, 1, F);
        if (feof(F)) break;
        i++;
        (char *) R = galloc(l[0] + 4);
        R->rulelen = l[0]; C = (char *) R + 2;
        for (lo = 2; lo <= l[0]; lo++) *C++ = getc(F);
        gtyar(R);   /* clean up rule*/
        gnwtg(R, PROC_NEW);
        }
    if ( ruletrce )
        (sprintf(pbuffer,"\n%d assertions \n", i);
         gprintf(); } fclose(F);
    return(0);}

/*****************************************************
/*   gtydbb.c
/*
     Rule Cache /*   Also contains Ascii version of

*   External Rule Processor
/*****************************************************/
#define _FASTIO
#include "string.h"
#include "grulmsg.h"
#include "stdio.h"
include "gmsg.h"
#include "stsh.h"
#include "grule.h"
#include "csql.h"
#include "gstats.h"

struct rulestack (struct rulestack *next; int ruleno;)
 *pulseptr = 0;
int Gmaxrule = 0;
struct grulmsg *getru();
extern int ruleprt, rulecncl; extern char pbuffer[500];
extern char USER[], USERPROC[];
extern int PROCSTART;
extern int PROCMCRI;
char rulefile[44];
int rulemax = 2000, rulehigh = 0;
int rulecnt = 0;
struct cashq (struct cashq *next; struct grulmsg *ruleptr; long howold;};
long oldness = 0;
struct cashq *rulqptrs[2000];

/********************* rule cache   ******************************/
/*     This routine simulates a processor node that receives
/*     rules to process.  The other processors then request the rule by nam
/*     and the rule cashe responds by sending the requested
/*     rule to appropiate rule processors.
/*****************************************************************/
struct grulmsg *gtcrule(rulemsg, msgtype) /* rule cache processor    */
    struct grulmsg *rulemsg;  int msgtype;
    (int gruleno; struct cashq *curr, *addc;

gruleno = rulemsg->ruleno;
    if (msgtype == gRuleMessage)
       (if (gruleno >= rulemax || gruleno < 1)
```

```
          {sprintf(pbuffer,"Invalid rule number %d\n", gruleno);
           gprintf();
           exit(1);}
    if (gruleno > rulehigh) rulehigh = gruleno;
    curr = rulqptrs[gruleno % rulemax];
    while (curr)
          {if (curr->ruleptr->ruleno == gruleno)
    {sprintf(pbuffer,"gtcrule OOPs duplicate rule cache %d\n", gruleno);
     gprintf(); }
           curr = curr->next;}
    addc = (struct cashq *) galloc(sizeof(struct cashq));
    addc->ruleptr = rulemsg;   /* store message to cache */
    addc->next = 0;
    addc->howold = 0;
    if (curr)
         curr->next = addc;
      else rulqptrs[gruleno % rulemax] = addc;
    gMSGr(rulemsg, gTP, gtsrc);
    gMSGr(rulemsg, gSP, gtgty);}
  return(rulemsg);} gtcrulew(rulemsg, len)  /*  entry from Windows  */
    struct grulmsg *rulemsg;  int len;
    {rulemsg->rulelen = len; gtcrule(rulemsg, gRuleMessage);}

/*****************  Load rule base  ************************/
/* This routine reads rules from an ascii file.             */
/* It then calls the cache routine to store the rule pointer */
/* and the data indexes.                                     */
/************************************************************/
grMSGs(gExternalRuleStart, gERI, gtydb, table);
    {FILE *F; char *cp, *C; struct grulmsg *M;
     char filename[40];
     int i= 0, lo; unsigned short l[1];
     struct grulmsg *rpp;
     strcpy(filename, table);
     strcpy(rulefile, filename);
     if (F = fopen(filename, "rb"))
         while (!feof(F))           /* load and process rules  */
              {fread((char *)l, 2, 1, F);
               if (feof(F))  break;
               i++;
               M = (struct grulmsg *) galloc(l[0] + 250);
               C = (char *) &M->ruleno;   M->rulelen = l[0];
               for (lo = 2; lo <= l[0]; lo++)  *C++ = getc(F);
               if (M->ruleno > Gmaxrule) Gmaxrule = M->ruleno;
               gMSGr(M, gRC, gtcrule);}
    sprintf(pbuffer,"\n%d rules loaded from %s\n", i, filename);
    gprintf();
    rulecnt = i;
    if (!F)
        {sprintf(pbuffer,"open failed for %s\n",filename);
         gprintf();
         return(0);}
    fclose(F);
    return(0);}}

/******************* Cache Request To Send ******************/
grMSGi(gCacheRuleReq, gRC, gtcruler, ruleno)
    {struct grulmsg *rp; struct rulestack *stack; struct cashq *curr;
     curr = rulqptrs[ruleno % rulemax]; rp = 0;
     if (msgtype == gCacheRuleReq)
         {while (curr)
              {if (curr->ruleptr->ruleno == ruleno)
                   {rp = curr->ruleptr;
                    curr->howold = ++oldness;
                    break;}
               curr = curr->next;}
          if (!rp)
              {if (PROCMCRI)
                   {stack =
                    (struct rulestack *) galloc(sizeof(struct rulestack));
                    stack->next = pulseptr;
```

```
            stack->ruleno = ruleno;
            pulseptr = stack;
            return(0);}
      else
            gMSGi(gExternalRuleReq, gERI, getru, ruleno);
         return(0);}
      gtyar(rp);         /* clean rule up */
      rp->rulestat = 'C';  /* start out as active*/
      rp->ruleprog = 'n';  /* assume no progress */
      ++gs_fetches;
      gMSGr(rp, gARP, gnwtg);}
   return(0);}} gtcache(rulemsg, msgtype)    /* Cache rule from external source  */
   struct grulmsg *rulemsg;  int msgtype;
   {gtcrule(rulemsg, msgtype);    /* cache it   */
     gMSGi(gCacheRuleReq, gRC, gtcruler, rulemsg->ruleno);
     return(0);}

/* Pulse processing is only implemented for single processors  */ gtypulse()    /* respond to pulse request to fetch the next rule */
   {int ruleno;
    struct rulestack *stack; int dupe = 1;
    struct grulmsg *rp; struct cashq *curr;
    while (dupe)
       {if (!(stack = pulseptr)) return(0);
        ruleno = stack->ruleno;
        curr = rulqptrs[ruleno % rulemax]; rp = 0;
        while (curr)
           {if (curr->ruleptr->ruleno == ruleno)
                 {rp = curr->ruleptr; break;}
           curr = curr->next;}
        if (rp)
            {pulseptr = stack->next;  gfree(stack);}
        else
            {gMSGi(gExternalRuleReq, gERI, getru, ruleno);
             pulseptr = stack->next;  gfree(stack); dupe = 0;}}
    return(1);} struct grulmsg *gtxdbr(ruleno)  /* return rule pointer for browse  */
     int ruleno;
     {struct grulmsg *rp; struct cashq *curr;
      curr = rulqptrs[ruleno % rulemax]; rp = 0;
      while (curr)
         {if (curr->ruleptr->ruleno == ruleno)
               {rp = curr->ruleptr; break;}
            curr = curr->next;}
      return(rp);}

/* initialize the Cache  */
grMSG(gSessionStart, gRC, gtyinit)
    {int i = 0;
     while (i < rulemax) rulqptrs[i++] = 0;
     return(0);}

/*****************************************************/
/*    guwrt.c
/*
/*    Foreign Object Interface
/*
/*    write undetermined rules to file
/*
/*****************************************************/
#include "stdio.h"
include "gmsg.h"
.#include "grule.h"
#include "grulmsg.h"
extern char pbuffer[100];
extern int ruletrce;
FILE *RULWRTU = 0;
char *ULELOG = "UNCMPLTD";
char *Uuser[44];
```

```
guwrt(grule)    /* write rules to foreign object   */
    struct grulmsg *grule;       /* rule to be written*/
    {static char module[] = "guwrt";
     char *C; int l, lo;
     if (!RULWRTU) return(0);
     C = (char *) grule;
     l = grule->rulelen;
     for (lo = 0; lo <= l; lo++) putc(*C++, RULWRTU);
     return(0);} grMSGs(gForeignObjectStart, gFOI, guwrti, user)
     /* initialize rule log    */
    {static char module[] = "guwrti";
     strncpy(Uuser, user, 44);
     if (RULWRTU = fopen(ULELOG, "wb"))
{gtrceMSGss(module, "Uncompleted to", ULELOG, Uuser);}
     return(0);}} guwrtc()
    {if (RULWRTU) fclose(RULWRTU);} guwrtcm()     /* Commit   */
    {}    /* no commit needed for ascii files   */

/*****************************************************/
/*   csql.h                                          */
/*                                                   */
/*   In memory sql simulation                        */
/*     all access to the db must be from same source */
/*****************************************************/
#define SQL_db(db, varx)  typedef struct db SQL; \
         struct varx {SQL *dbSEL; \
         SQL *dbSTRT;} varx = {0, 0} define SQL_open(varx) varx.dbSTRT = 0;

define SQL_writeo(vax, rcdptr, key) Sptr = vax.dbSTRT; Sptrp = 0;\
         if (!Sptr) {vax.dbSTRT = rcdptr; rcdptr->next = 0;} \
         else {while (Sptr)                        \
             {if (strcmp(rcdptr->key, Sptr->key) < 0) \
                 {if (Sptrp) {Sptrp->next = rcdptr;  \
                              rcdptr->next = Sptr;}  \
                  else {vax.dbSTRT = rcdptr;         \
                        rcdptr->next = Sptr;}        \
                  break;}                            \
              Sptrp = Sptr; Sptr = Sptr->next;}      \
           if (!Sptr) \
              {Sptrp->next = rcdptr; rcdptr->next = 0;}} define SQL_close(varx) while(varx.dbSTRT)\
  {varx.dbSEL = varx.dbSTRT->next; \
             gfree(varx.dbSTRT); varx.dbSTRT = varx.dbSEL;} define SQL_sel(varx, key, compare)   {varx.dbSEL = varx.dbSTRT; \
         while (varx.dbSEL)                          \
            {if (!strcmp(varx.dbSEL->key, compare)) break; \
             varx.dbSEL = varx.dbSEL->next;}} define SQL_seln(varx, key, compare, n)  {varx.dbSEL = varx.dbSTRT; \
         while (varx.dbSEL)                          \
            {if (!strncmp(varx.dbSEL->key, compare, n)) break; \
             varx.dbSEL = varx.dbSEL->next;}} define SQL_sels(varx, key, compare)   {varx.dbSEL = varx.dbSTRT; \
         while (varx.dbSEL)                          \
            {if (varx.dbSEL->key == compare) break;  \
             varx.dbSEL = varx.dbSEL->next;}} define SQL_write(varx, rcdptr) rcdptr->next = varx.dbSTRT; \
         varx.dbSTRT = rcdptr;

#define SQL_opncur(varx, key, compare) \
  {SQL *SQLptr; SQLptr = varx.dbSTRT; \
             while (SQLptr)    \
```

```
                {if (strcmp(SQLptr->key, compare)) \
                        {SQLptr = SQLptr->next; continue;} define SQL_opncurn(varx, key, compare, n) \
 {SQL *SQLptr; SQLptr = varx.dbSTRT;   \
        while (SQLptr)        \
                {if (strncmp(SQLptr->key, compare, n)) \
                        {SQLptr = SQLptr->next; continue;} define SQL_opncuro(varx, key, compare) \
 {SQL *SQLptr; int tst; SQLptr = varx.dbSTRT;  \
        while (SQLptr)        \
                {if (tst = strcmp(SQLptr->key, compare)) \
                        {if (tst > 0) break;\
/*printf("SQLopnc key %s\n",SQLptr->key);*/\
 SQLptr = SQLptr->next; continue;}\ define SQL_opncurs(varx, key, compare) \
 {SQL *SQLptr; SQLptr = varx.dbSTRT; \
        while (SQLptr)        \
                {if (SQLptr->key != compare) \
                        {SQLptr = SQLptr->next; continue;} define SQL_opncurc(varx, key, compare) \
 {SQL *SQLptr; SQLptr = varx.dbSTRT; \
        while (SQLptr)        \
                {if (SQLptr->key != compare) \
                        {SQLptr = SQLptr->next; continue;} define SQL_selcur(varx)     /*  varx   */ define SQL_clscur(varx)    SQLptr = SQLptr->next;}} define SQL_opncurnull(varx)  {SQL *SQLptr; SQLptr = varx.dbSTRT;  \
        while (SQLptr) {

/*****************************************************/
/*   csqla.h      */
/*         */
/*   In memory sql simulation    */
/*     all access to the db must be from same source   */
/*****************************************************/
#define SQL_db(db, var)   typedef struct db SQL; \
  struct var {SQL *dbSEL; \
  SQL *dbSTRT;} var = {0, 0} define SQL_open(var) var.dbSTRT = 0;

define SQL_writeo(vax, rcdptr, key) Sptr = vax.dbSTRT; Sptrp = 0;\
 if (!Sptr) {vax.dbSTRT = rcdptr; rcdptr->next = 0;} \
 else {while (Sptr)   \
 {if (strcmp(rcdptr->key, Sptr->key) < 0)  \
     {if (Sptrp) {Sptrp->next = rcdptr;  \
  rcdptr->next = Sptr;} \
        else {vax.dbSTRT = rcdptr;  \
    rcdptr->next = Sptr;} \
       break;} \
  Sptrp = Sptr; Sptr = Sptr->next;} \
       if (!Sptr) \
  {Sptrp->next = rcdptr; rcdptr->next = 0;}} define SQL_close(var) while(var.dbSTRT) {var.dbSEL = var.dbSTRT->next; \
   free(var.dbSTRT); var.dbSTRT = var.dbSEL;}
#define SQL_sel(var, key, compare)   {var.dbSEL = var.dbSTRT; \
 while (var.dbSEL)      \
     {if (!strcmp(var.dbSEL->key, compare)) break;      \
      var.dbSEL = var.dbSEL->next;}}
#define SQL_sels(var, key, compare)   {var.dbSEL = var.dbSTRT; \
 while (var.dbSEL)      \
     {if (var.dbSEL->key == compare) break;\
      var.dbSEL = var.dbSEL->next;}} define SQL_write(var, rcdptr) rcdptr->next = var.dbSTRT;  \
 var.dbSTRT = rcdptr;
```

```
#define SQL_opncur(var, key, compare)   {SQL *SQLptr; SQLptr = var.dbSTRT;  \
    while (SQLptr)    \
        {if (strcmp(SQLptr->key, compare))  \
            {printf("SQLopnc key %s\n",SQLptr->key); SQLptr = SQLptr->next; conti
#define SQL_opncurs(var, key, compare){SQL *SQLptr; SQLptr = var.dbSTRT;  \
    while (SQLptr)    \
        {if (SQLptr->key != compare)  \
            {SQLptr = SQLptr->next; continue;}
#define SQL_selcur(var)      /*  var     */
#define SQL_clscur(var)      SQLptr = SQLptr->next;}}
#define SQL_delete(var, key, compare) (var.dbDELA = var.dbDELB = var.dbSTRT;
 while (var.dbDELA)   \
        {if (!strcmp(var.dbDELA->key, compare))   \
    {if (var.dbDELA == var.dbSTRT) var.dbSTRT = var.dbDELA->next; \
     else  var.dbDELB->next = var.dbDELA->next;         \
     var.dbDELA = var.dbDELA->next; free(var.dbDELA);} \
        else {var.dbDELB = var.dbDELA; var.dbDELA = var.dbDELA->next;}}}
#define SQL_opncurnull(var)   (SQL *SQLptr; SQLptr = var.dbSTRT;  \
    while (SQLptr)    \
        {

/**************************************************************/
/*    exobj.h
/*    Object Instance List
/**************************************************************/
struct exobjl
    {struct exobjl *next;      /* chain pointer          */
     struct ruleq *objrulqs;   /* rule list start        */
     struct procq *subobjl;    /* list of subobjects     */
     long node_pid;            /* processor id           */
     char objtype;};           /* type of object (I or O)    */ struct procq {struct procq *next;
              int instance;
              long node_pid;};

int gexc(), gexs(), gexo(), gexoc();
struct exobjl *gexcl();
long gexcn(), gtox(), gobjfill();

/**************************************************************/
/*
/*        GMSG.H
/*
/*    Definition of inter-process messages
/*
/**************************************************************/ define CH_STORE  1
define CH_REQ    2
#define PROC_NEW  3
#define TG_STORE  4
#define TG_UPDT   5
#define ACT_NEW   6
#define SRC_STORE 7
#define SRC_UPDT  8
#define PROC_ASSERT 9
#define PROC_START  10
#define OBJ_CREATE  11
#define OBJQ_RULE   12
#define OBJQ_OBJ    13
#define NWTG_CREQ 14
#define NWTG_IREQ 15
#define SUBO_NEW  16
/*   function attributes   */
#define FUNCT_NEG 1
#define FUNCT_FWD 2
#define FUNCT_BAK 4
#define FUNCT_EXISTS 8
#define isNEG(n) (ctlfunct[n] & FUNCT_NEG)
#define isEXISTS(n) (ctlfunct[n] & FUNCT_EXISTS)
extern char ctlfunct[];
```

```c
/* CompVector is owned by gtaii.c    */
extern int CompVector[20];

#define gActiveIdle 50
#define gActiveRequest 55
#define gBackchainReq 60
#define gCacheRuleReq 70
#define gCommit 75
#define gCompletenessCheck 80
#define gCompletenessNotice 90
#define gCompletenessRequest 100
#define gControlStop 110
#define gDelete 115
#define gExternalBackchainReq 120
#define gExternalDataReq 130
#define gExternalDataStart 135
#define gExternalDefinitionStart 140
#define gExternalForwardReq 150
#define gExternalInstanceReq 160
#define gExternalInstanceCreate 170
#define gExternalObjectReq 180
#define gExternalObjectStart 185
#define gExternalRuleReq 190
#define gExternalRuleStart 195
#define gExternalSourceStart 200
#define gExternalTargetStart 210
#define gForeignComplete 220
#define gForeignEnd 230
#define gForeignObjectStart 235
#define gForeignRequest 240
#define gForeignTransmit 250
#define gForwardRequest 260
#define gInstanceCreate 270
#define gObjectClosed 280
#define gObjectDelete 285
#define gObjectInit 290
#define gObjectStatus 300
#define gObjectTable 310
#define gProcessStop 320
#define gProcessorActive 330
#define gProcessorDelete 335
#define gProcessorIdle 340
#define gProcessorStart 350
#define gProcessorStop 360
#define gQueuedRule 370
#define gRuleMessage 375
#define gRuleReceipt 380
#define gRuleRequest 390
#define gSessionEnd 395
#define gSessionStart 400
#define gSourceNotice 410
#define gSourceReceipt 420
#define gSpawnRule 440
#define gStore 450
#define gSystemError 460
#define gSystemIdle 470
#define gSystemNError 475
#define gTargetNotice 480
#define gTargetReceipt 490
#define gTransactionEnd 500
#define gTransactionStart 510
#define gUserInstanceReq 520
#define gVariable 530
#define gAII    1
#define gPC     2
#define gRC     3
#define gERI    4
#define gARP    5
#define gRMR    6
#define gTP     7
#define gSP     8
#define gETP    9
#define gESP    10
```

```
#define gEOTI  11
#define gEDI   12
#define gFOI   13
#define gRLP   14
#define gOP    15
define gMON   16 struct gMSGS  {int len; long node_pid; int msgtype; };
struct gMSGSi {int len; long node_pid; int msgtype; short value;};
struct gMSGSs {int len; long node_pid; int msgtype; char value[1];};

#define gMSG(message, target, routine) {struct gMSGS *msg;  \
            msg = (struct gMSGS *) galloc(sizeof(struct gMSGS)); \
            msg->node_pid = target; \
            msg->len = sizeof(struct gMSGS); msg->msgtype = message; \
            gmsgp(msg, target, routine);} define gMSGi(message, target, routine, parm) {struct gMSGSi *msg;  \
            msg = (struct gMSGSi *) galloc(sizeof(struct gMSGSi)); \
            msg->len = sizeof(struct gMSGSi); msg->msgtype = message; \
            msg->node_pid = target; \
            msg->value = parm; \
            gmsgp(msg, target, routine);} define grMSGi(message, target, routine, parm1)\
 routine(msg)           /* target message*/ \
         struct gMSGSi *msg; \
         {int msgtype; short parm1;  \
          msgtype = msg->msgtype;  parm1 = msg->value;

#define gMSGs(message, target, routine, parm) {struct gMSGSs *msg; int gMSGL
        gMSGL = sizeof(struct gMSGSs) + strlen(parm) + 4; \
        msg = (struct gMSGSs *) galloc(gMSGL);  \
        msg->len = gMSGL; msg->msgtype = message; \
        msg->node_pid = target; \
        strcpy(msg->value, parm); \
        gmsgp(msg, target, routine);} define grMSGs(message, target, routine, parm1)\
 routine(msg)           \
         struct gMSGSs *msg; \
         {int msgtype; char *parm1;  \
          msgtype = msg->msgtype;  parm1 = msg->value;

/*#define gMSGs(message, target, routine, parm) routine(parm, message); \
                gprocvct(1)

#define grMSGs(message, target, routine, parm1)\
 routine(parm1, msgtype)  \
            int msgtype; char *parm1; {struct gMSGSs *msg; msg = parm1;*/ define gMSGss(message, target, routine, parm1, parm2)\
 routine(parm1, parm2, message); gprocvct(target)

#define gMSGl(message, target, routine, parm) routine(parm, message); \
                gprocvct(target)

#define gMSGsss(message, target, routine, parm1, parm2, parm3)\
 (routine(parm1, parm2, parm3, message); \
                gprocvct(target);} define gMSGr(rule, target, routine) (routine(rule, gRuleMessage);  \
                gprocvct(target);} define gMSGsls(message, target, routine, parm1, parm2, parm3)\
 (routine(parm1, parm2, parm3, message); \
                gprocvct(target);} define gMSGsv(message, target, routine, parm1, parm2)\
 (routine(parm1, parm2, message); \
                gprocvct(target);} define gMSGlsvc(message, target, routine, parm1, parm2, parm3, parm4)\
```

```
(routine(parm1, parm2, parm3, parm4, message); \
              gprocvct(target);} define gMSGls(message, target, routine, parm1, parm2) \
{routine(parm1, parm2, message); \
              gprocvct(target);} define gMSGsssssl(message, target, routine, parm1, parm2, parm3, parm4, parm
 {routine(parm1, parm2, parm3, parm4, parm5, message); \
              gprocvct(target);} define gMSGiiii(message, target, routine, parm1, parm2, parm3, parm4)\
 (routine(parm1, parm2, parm3, parm4, message); \
              gprocvct(target);} define gMSGiii(message, target, routine, parm1, parm2, parm3)\
 {routine(parm1, parm2, parm3, message); \
              gprocvct(target);} define gMSGlii(message, target, routine, parm1, parm2, parm3)\
 (routine(parm1, parm2, parm3, message); \
              gprocvct(target);} define gMSGliii(message, target, routine, parm1, parm2, parm3, parm4)\
 (routine(parm1, parm2, parm3, parm4, message); \
              gprocvct(target);} define grMSG(message, target, routine) routine(msgtype) \
         int msgtype;

#define grMSGsv(message, target, routine, parm1, parm2)\
 routine(parm1, parm2, msgtype)   /*  target message*/ \
         int msgtype; char *parm1; VAL *parm2;

#define grMSGl(message, target, routine, parm1)\
 routine(parm1, msgtype)   /*  target message*/ \
         int msgtype; long parm1;

#define grMSGls(message, target, routine, parm1, parm2)   \
       routine(parm1, parm2, msgtype)  /*  target message*/ \
              int msgtype; long parm1; char *parm2;

#define grMSGlsvc(message, target, routine, parm1, parm2, parm3, parm4)   \
       routine(parm1, parm2, parm3, parm4, msgtype) /* target message*/ \
              int msgtype; long parm1; char *parm2; VAL *parm3; char parm4;

#define grMSGlii(message, target, routine, parm1, parm2, parm3)   \
       routine(parm1, parm2, parm3, msgtype) /* target message*/ \
              int msgtype; long parm1; int parm2; int parm3;

#define grMSGliii(message, target, routine, parm1, parm2, parm3, parm4)   \
       routine(parm1, parm2, parm3, parm4, msgtype) /* target message*/ \
              int msgtype; long parm1; int parm2; int parm3; int parm4;

#define gerrMSG(module, errno, intdata)   gerrmsg(errno, module, intdata)

#define gtrceMSGri(module, text, ruleno, inst)\
 if (ruletrce) printf("%s %s Rule%04d.%03d\n", \
                              module, text, ruleno, inst)

#define gtrceMSGss(module, text, str1, str2)\
 if (ruletrce) printf("%s %s %s %s\n", \
                              module, text, str1, str2)

#define gtrceMSGsri(module, text, str, ruleno, inst)\
 if (ruletrce) printf("%s %s  %s Rule%04d.%03d\n", \
                              module, text, str, ruleno, inst)

/****** gMSG functions ********************/
gnwtg(); gtyinit(); gproinit(); gnwtgint(); gtproc(); gcsesend(); gtptnote()
guwrtc(); grwrtc(); gcomm(); gnwtgdmp(); gtotend(); gprotend(); gnwtgcnt();
guwrtcm(); gsqlic(); gnwtgrel(); gtptrans(); gtpaidl(); gprocfem(); gpaidl()
```

```
/******* gMSGi functions *******************/
gtprulei(); gtaiierr(); gtaiiner(); gtcruler(); gtoinit(); gtptrecp();
gnwtgreq();
/******* gMSGs functions *******************/
guwrti(); gexoc(); gsqlstrt(); gtoex(); sobjinit(); gtydb(); gtrdb(); /*DHS*
char *galloc();

/*****************************************************************/
/*      GOBJQ H
/*
/*      Object Queue
/*****************************************************************/
struct objq
   {struct objq *next;     /* chain pointer   */
    short instance;        /* which instance  */
    long  node_pid;        /* processor id - message passing model */
    char objname[1];};     /* object name     */

/*************************************************/
/*  grule.h      */
/*             */
/*  rule text tupple    */
/*************************************************/
struct rule
   {struct rule *next;/*  SQL pointer       */
    short ruleno;  /*  rule no. (key)    */
    intrulepart;/*  idenfify parts    */
    char rulestat;/*  rule status        */
    char rtxt[1];};  /*  rule text          */

/*****************************************************************/
/*
/*      grulmsg.h
/*
/*      Definition of Rule Message
/*
/*****************************************************************/
struct grulmsg/*  rule header    */
   {short rulelen;       /* 32k is big msg*/
    short ruleno;  /* rule number         */
    short ruleinst; /* instance           */
    short rulepint; /* previous instance      */
    char  ruletype; /* r normal or s SQL     */
    char  rulercur; /* rule routing control    */
    long  node_pid; /* processor id to go to next*/
    long rulestrt; long ruleend;  /* rule constraint key    */
    long *ruleintl;  /* internal pointer      */
    char  rulestat; /* rule status   */
    char  ruleprog; /* rule progress indicator  */
    short rulerout; /* routing list disp     */
    short rulepred; /* predicate list disp    */
    short ruledata; /* begining of fixed data  */
    short rulevars;}; /* begining of added vars  */ struct grulobj  /* routing list entry   */
    {long node_pid; /* processor id    */
     short val;/* value displacement    */
     short origobj;
     short objname;    /* object name displacement */
     char next;};  /* 1 or 2 for pred or action     */ struct grulsubj /* 1 or 2 for pred or action */
    {char next; /* next list entry       */
     char status;/* t, f, u, or c      */
     char targ; /* target or subj1 object entry number */
     char subj; /* subject or subj2 object entry number */
     short oper;};/* operator disp       */ struct gval  /* value list item    */
    {short len; /* length & displacement to next list item   */
     char val[1];};/* value string - delimited by null   */ define VAL  struct gval
```

```
/***********************************************************/
/*    gsrc.h        */
/*                  */
/*    rule source list tupple      */
/***********************************************************/
struct src
    {struct src *next;
     short ruleno;
     char srcstat;
     char srcvar[1];};

/***************************************************************/
/*
/*      gstats.h
/*
/*      statistics accumulators
/*
extern long gs_backwards;     /* nbr/rules selected backwardly  */
extern long gs_forwards;      /* nbr/rules selected forwardly   */
extern long gs_completions;   /* nbr/rules triggered & fired    */
extern long gs_curcount;      /* nbr of rules currently in system */
extern long gs_maxcount;      /* hiwatermark of rules in system   */
extern long gs_refused;       /* number of refusal incidents    */
extern long gs_fetches;       /* number of rule retrievals      */
extern long gs_true;          /* number of TRUEs                */
extern long gs_false;         /* number of FALSEs               */
extern long gs_tuples;        /* number of data base tuple fetches */
extern long gs_routes;        /* number of rule dispatches      */
extern long gs_suspensions;   /* number of rule suspensions     */
extern long gs_resends;       /* number of rule re-sendings     */
extern long gs_requeues;      /* number of rule re-queueings    */
extern long gs_pends;         /* number of rule pends           */
extern long start, stop;      /* timer                          */

/***********************************************************/
/*    gtgt.h        */
/*                  */
/*    rule target list tupple      */
/***********************************************************/
struct tgt
    {struct tgt *next;
     short ruleno;
     char tgttype;
     char tgtvar[1];};
/*      Object Queue    */
struct exobj
    {struct exobj *next;      /* chain pointer            */
     char objname[44];        /* object name              */
     char objtype;            /* object type              */
     char objuse;             /* object usage             */
     char objxtran;           /* cross-tran persistence   */
     char filename[20];       /* file or table name       */
     char procname[20];       /* processor name           */
     char dataproc[9];        /* data processor name      */
     char *objdef; };         /* sql 'WHERE...' clause    */

/***************************************************************/
/*                                                             */
/*      STSH.H                                                 */
/*                                                             */
/*      Stash Variables                                        */
/*                                                             */
/*                                                             */
/***************************************************************/ struct obj
    {struct var *vnext;   /* pointer to first variable in obj */
     char varname[20];    /* name of object                   */
     char status;         /* base  t SQL true, f SQL false    */
                          /* variable - e existance requested */
                          /*            n non-existance known */
     long higher;         /* process id of higher object      */
     struct subobj *sub;  /* pointer to sub object list       */
```

```
    struct ruleq *rptr;  /* beginning of rule queue         */
    long procid;         /* processor id                    */
    char dprocnm[9];     /* name of data processor          */
    int (*dprocfn)();    /* addr of data processor          */
    char *ddata;         /* addr of user registered data    */
    short inst;          /* instance                        */
    char type;           /* b base, i instance              */
    char use;            /* u user                          */
    char clostatus;      /* c closed, ' ' open, r closure request */
    char objtrap;};      /* object trap toggle              */ struct var
   {struct var *vnext;   /* pointer to next variable in obj */
    char  varname[20];   /* name of variable                */
    char  status;        /* (see obj.status)                */
    struct varrule *vr;  /* determining rules               */
    short endrs;         /* endorsement quantum             */
    char  vartrap;       /* variable trap toggle            */
    struct gval v;};     /* variable (internal form)        */ struct varrule
   {struct varrule *vnext;  /* pointer to next occurrance   */
    short kbid;          /* determining rule kbid           */
    short ruleno;        /* determining rule number         */
    short ruleinst;};    /* determining rule instance       */ struct subobj           /* one entry for each instance of obj */
   {struct subobj *next; /* next entry in list              */
    char subobjnm[44];   /* sub-object name                 */
    long node_pid;};     /* processor for sub-object        */ struct ruleq {struct ruleq *next;
              struct grulmsg *rpt;};

struct gval *stshvar();
struct var *stshvare();
struct var *gfunexst();
struct gval *stshv();
struct var *stshdatx();
struct var *stshdata();
struct var *stshrepx();
struct var *stsha();
struct var *stshvi();
struct var *gunlfre();
struct var *stshinit();
struct obj *Cobjptr();
VAL *stshvarx();      /* return pointer to variable without backchain*/
/*extern struct var varstart;*/ define VARNULL   (struct var *) 0
define VNULL (struct gval *) 0
#define VAR   struct var
#define OBJ   struct obj
#define stshvdat(x)   x->v
#define stshvd(x, y)   stshvar(x, y)->v
```

GNOME Component Cross-Reference by Source Name

| Source  | Function |
|---------|----------|
| gact.c  | gsay     |
| gact.c  | gdplseq  |
| gact.c  | gactp    |
| gact.c  | gact     |
| gact.c  | gs       |
| gact.c  | gse      |

| | | |
|---|---|---|
| gact.c | gactt | |
| gact.c | ganull | |
| gaio.c | gsay | |
| gaio.c | gask | |
| gaio.c | gtype | |
| gaio.c | gcommitt | |
| gaio.c | gsel | |
| ganum.c | gaplseq | |
| ganum.c | gamineq | |
| ganum.c | gamlteq | |
| ganum.c | gadiveq | |
| ganum.c | gasetnm | |
| ganum.c | ganmstsh | |
| ganum.c | gapad | |
| ganum.c | galdec | |
| ganum.c | gadecbak | |
| gasql.c | gasum | |
| gasql.c | gasqstsh | |
| gasql.c | gasqnm | |
| gasql.c | gasqlsel | |
| gdate.c | gdplseq | |
| gdate.c | gdmineq | |
| gdate.c | gddiff | |
| gdate.c | gdsetnm | |
| gdate.c | gdays | |
| gdate.c | gdaycalc | |
| gdate.c | gdgreg | |
| gdate.c | gdlpyr | |
| gdate.c | gdparse | |
| gdate.c | gdedit | |
| gdprocl.c | gdprocl | |
| getso.pc | getso | |
| getru.pc | getru | |
| getru.pc | FreeTS | |
| getta.pc | getta | |
| getta.pc | gtrig | |
| gexc.c | gexc | |
| gexc.c | gexcl | |
| gexc.c | gexcnc | |
| gexc.c | gexcn | |
| gexob.c | gexs | |
| gexob.c | gexo | |
| gexob.c | gexolu | |
| gexob.c | stoupper | |
| gexob.c | notwhite | |
| gexob.c | gexosql | |
| gexob.c | gexoc | gExternalDefinitionStart |
| gexob.c | readrec | |
| gexob.c | OBDprt | |
| gexob.c | gexolud | |
| gexob.c | gexolux | |
| gfe.c | gfmin | |
| gfe.c | gfmax | |
| gfe.c | gfne | |
| gfe.c | gfe | |
| gfe.c | gflt | |
| gfe.c | gfgt | |
| gfe.c | gfle | |
| gfe.c | gfge | |
| gfe.c | glike | |
| gfe.c | gfx | |
| gfe.c | gfex | |
| gfe.c | gflnum | |
| gfe.c | gfcmp | |
| gfe.c | gfnum | |
| gfl.c | gflninc | |
| gfl.c | gflinc | |
| gfl.c | gfllt | |
| gfl.c | gflgt | |
| gfl.c | gflx | |

| | | |
|---|---|---|
| gfl.c | gflxinner | |
| gfl.c | gflex | |
| gfl.c | gsapp | |
| gfl.c | gflint | |
| gfl.c | gmin | |
| gfl.c | gmax | |
| gftrue.c | gftrue | |
| gftrue.c | gfntrue | |
| gftrue.c | gffalse | |
| gfun.c | gflt | |
| gfun.c | gfunp | |
| gfun.c | gfun | |
| gfun.c | ga | |
| gfun.c | gfunt | |
| gfun.c | gfnull | |
| gfun.c | gtrue | |
| gfun.c | gfunexst | |
| gfun.c | gfexist | |
| gfun.c | gfexists | |
| gfun.c | gfnexist | |
| girprts.c | girprt | |
| girx.c | girx | |
| girx.c | girxsel | |
| giry.c | giry | |
| giry.c | girstsh | |
| gmsgp.c | gmsgp | |
| gmsgp.c | gmtest | |
| gmstub.c | gmoni | |
| gmstub.c | gmon | |
| gmstub.c | gmonend | |
| gmstub.c | gmonrlst | |
| gmstub.c | gmonvar | |
| gmstub.c | gmonsc | |
| gmstub.c | gmonstrt | |
| gnwtg.c | gnwtgint | gSessionStart |
| gnwtg.c | gnwtgl | |
| gnwtg.c | gnwtglu | |
| gnwtg.c | gnwtg | |
| gnwtg.c | gnwtgdet | |
| gnwtg.c | gnwtgreq | gRuleRequest |
| gnwtg.c | gnwtgu | |
| gnwtg.c | gnwtgdmp | |
| gnwtg.c | gnwtgrel | |
| gnwtg.c | gnwtgcmp | |
| gnwtg.c | gnwtgexs | |
| gnwtg.c | gnwtgexc | |
| gnwtg.c | gnwtgexg | |
| gnwtg.c | gnwtgfnd | |
| gnwtg.c | gnwtgcnt | gProcessorIdle |
| gnwtg.c | gnwtgsusp | |
| gproc.c | Cnextpid | |
| gproc.c | Cmypid | |
| gproc.c | Csvpid | |
| gproc.c | Cobjptr | |
| gproc.c | Cprt | |
| gproc.c | gproinit | gSessionStart |
| gproc.c | gtproc | |
| gproc.c | gtptnote | gTargetNotice |
| gproc.c | gtptrecp | gTargetReceipt |
| gproc.c | gtptrans | gRuleReceipt |
| gproc.c | gtpaidl | |
| gproc.c | gprostat | gObjectStatus |
| gproc.c | gprocfem | gForeignEnd |
| gproc.c | gprocvct | |
| gproc.c | gcsesend | gSessionEnd |
| gproc.c | gprotend | gTransactionEnd |
| gproc.c | gprocps | gProcessorActive |
| gproc.c | gprocdel | gProcessorDelete |
| gproc.c | gproctst | |
| gprts.c | gprts | |

| | | |
|---|---|---|
| gprts.c | gprtsq | |
| gprts.c | gprtsl | |
| grwrt.c | grwrt | |
| grwrt.c | grwrti | |
| grwrt.c | grwrtc | |
| gsobj.c | sobjhi | |
| gsobj.c | sobjinit | gObjectInit |
| gsobj.c | gsoinit | |
| gsobj.c | sobji | |
| gsobj.c | stshp | |
| gsobj.c | stshpx | |
| gsobj.c | stshpv | |
| gsobj.c | sobjstat | |
| gsobj.c | sobjclos | |
| gsobj.c | stsobjet | |
| gsobj.c | gsobjdel | |
| gsqlb.c | gsqla | |
| gsqlb.c | gsqltup | |
| gsqli.c | gsqlstrt | gExternalDataStart |
| gsqli.c | gsqli | |
| gsqli.c | gsqlic | gCommit |
| gsqlo.pc | gsqlo | |
| gsqlo.pc | Warning | |
| gsqlo.pc | if | |
| gsqlo.pc | cleanUp | |
| gsqlo.pc | Stasher | |
| gsqlo.pc | Fetcher | |
| gsqlo.pc | descBind | |
| gsqlo.pc | descSel | |
| gsqlo.pc | fillSelDesc | |
| gsrc.c | gtsrc | |
| gsrc.c | gsrc | |
| gsrc.c | gsrcl | |
| gsrc.c | gsrcunkn | |
| gsrc.c | gsrcsrch | |
| gsrc.c | gsrcexst | |
| gsrc.c | gsrcexsc | |
| gstring.c | gscat | |
| gstring.c | gstrintr | |
| gstring.c | findmatch | |
| gstring.c | buildset | |
| gstring.c | gstrunique | |
| gstring.c | findunique | |
| gstring.c | gcountmem | |
| gstring.c | glmax | |
| gstring.c | glmin | |
| gstsh.c | gerr | |
| gstsh.c | stshrepl | |
| gstsh.c | stshrepx | |
| gstsh.c | stsha | |
| gstsh.c | stshdat | |
| gstsh.c | stshdatr | gStore |
| gstsh.c | stshfwd | |
| gstsh.c | stshdatx | |
| gstsh.c | stshdaxr | gVariable |
| gstsh.c | stshdata | |
| gstsh.c | stshvi | |
| gstsh.c | stshclos | |
| gstsha.c | stshvar | |
| gstsha.c | stshvarx | |
| gstsha.c | stshvare | |
| gstsha.c | stshdel | |
| gstsha.c | stshdelr | gDelete |
| gstsha.c | stshdelx | |
| gtaii.c | gtsess | |
| gtaii.c | gtsproc | |
| gtaii.c | gtsesend | |
| gtaii.c | gtranend | |
| gtaii.c | gtsynch | |
| gtaii.c | gtaiir | |

| | | |
|---|---|---|
| gtaii.c | gtaiierr | gSystemError |
| gtaii.c | gtaiiner | gSystemNError |
| gtctlb.c | main | |
| gtctlb.c | gtctlh | |
| gteri.c | gtsessdb | |
| gtgt.c | gtgtreq | |
| gtgt.c | gtgty | |
| gtgt.c | gtgtent | |
| gtgt.c | tgtvar | |
| gtgt.c | tgtses | |
| gtgt.c | gtgt | gForwardReq |
| gtgt.c | gtgtsrch | |
| gtidb.c | gtidb | |
| gtmsubs.c | galloc | |
| gtmsubs.c | gfree | |
| gtmsubs.c | gtyar | |
| gtmsubs.c | gerrmsg | |
| gtmsubs.c | gstmpval | |
| gtmsubs.c | stshcpy | |
| gtmsubs.c | stshlen | |
| gtmsubs.c | tgtvsep | |
| gto.c | gtoinit | gExternalObjectStart |
| gto.c | gtonpid | |
| gto.c | gtox | |
| gto.c | gtoo | |
| gto.c | gto | |
| gto.c | gtoex | gExternalObjectReq |
| gto.c | gtoc | |
| gto.c | gtoroute | |
| gto.c | gofillup | |
| gto.c | gobjfill | |
| gto.c | gdo | |
| gto.c | gtocrule | |
| gto.c | gco | |
| gto.c | gobjinst | |
| gto.c | gtotend | gTransactionEnd |
| gto.c | gpstats | |
| gtob.c | gtob | |
| gtob.c | gtobrout | |
| gtoq.c | gtoq | |
| gtoq.c | gtoqo | |
| gtoq.c | gtoqcmp | |
| gtoq.c | gtoqs | |
| gtoq.c | gtoqsi | |
| gtoq.c | gtoqp | |
| gtpy.c | gtprule | |
| gtpy.c | gtpnew | |
| gtpy.c | gtpycnts | |
| gtpy.c | gtpytend | gTransactionEnd |
| gtpy.c | graend | |
| gtrdb.c | gtrdb | |
| gtyab.c | gtya | |
| gtydbb.c | gtcrule | |
| gtydbb.c | gtcrulew | |
| gtydbb.c | gtcruler | gCacheRuleReq |
| gtydbb.c | gtcache | |
| gtydbb.c | gtypulse | |
| gtydbb.c | gtxdbr | |
| gtydbb.c | gtyinit | gSessionStart |
| guwrt.c | guwrt | |
| guwrt.c | guwrti | gForeignObjectStart |
| guwrt.c | guwrtc | |
| guwrt.c | guwrtcm | |

GNOME Component Cross-Reference by Source Name

| Source | Function | |
|---|---|---|
| csql.h | SQL_close | |
| csql.h | SQL_opncur | |
| csql.h | SQL_opncurn | |
| csql.h | SQL_opncuro | |
| csql.h | SQL_opncurs | |
| csql.h | SQL_opncurc | |
| csql.h | SQL_selcur | |
| csqla.h | SQL_selcur | |
| gmsg.h | isNEG | |
| gmsg.h | isEXISTS | |
| gmsg.h | routine | message |
| gmsg.h | routine | message |
| gmsg.h | routine | message |
| gmsg.h | gMSGss | |
| gmsg.h | gMSGsss | |
| gmsg.h | gMSGsls | |
| gmsg.h | gMSGsv | |
| gmsg.h | gMSGlsvc | |
| gmsg.h | gMSGls | |
| gmsg.h | gMSGssssl | |
| gmsg.h | gMSGiiii | |
| gmsg.h | gMSGiii | |
| gmsg.h | gMSGlii | |
| gmsg.h | gMSGliii | |
| gmsg.h | routine | message |
| gmsg.h | routine | message |
| gmsg.h | routine | message |
| gmsg.h | routine | message |
| gmsg.h | routine | message |
| gmsg.h | routine | message |
| gmsg.h | routine | message |
| gmsg.h | gerrMSG | |
| gmsg.h | gtrceMSGri | |
| gmsg.h | gtrceMSGss | |
| gmsg.h | gtrceMSGsri | |
| stsh.h | stshvdat | |
| stsh.h | stshvd | |

GNOME Component Cross-Reference by Function Name

| Source | Function |
|---|---|
| gstring.c | buildset |
| gsqlo.pc | cleanUp |
| gproc.c | Cmypid |
| gproc.c | Cnextpid |
| gproc.c | Cobjptr |
| gproc.c | Cprt |
| gproc.c | Csvpid |
| gsqlo.pc | descBind |
| gsqlo.pc | descSel |
| gsqlo.pc | Fetcher |
| gsqlo.pc | fillSelDesc |
| gstring.c | findmatch |
| gstring.c | findunique |

| | | |
|---|---|---|
| getru.pc | FreeTS | |
| gfun.c | ga | |
| ganum.c | galdec | |
| gact.c | gact | |
| gact.c | gactp | |
| gact.c | gactt | |
| ganum.c | gadecbak | |
| ganum.c | gadiveq | |
| gtmsubs.c | galloc | |
| ganum.c | gamineq | |
| ganum.c | gamlteq | |
| ganum.c | ganmstsh | |
| gact.c | ganull | |
| ganum.c | gapad | |
| ganum.c | gaplseq | |
| ganum.c | gasetnm | |
| gaio.c | gask | |
| gasql.c | gasqlsel | |
| gasql.c | gasqnm | |
| gasql.c | gasqstsh | |
| gasql.c | gasum | |
| gto.c | gco | |
| gaio.c | gcommitt | |
| gstring.c | gcountmem | |
| gproc.c | gcsesend | gSessionEnd |
| gdate.c | gdaycalc | |
| gdate.c | gdays | |
| gdate.c | gddiff | |
| gdate.c | gdedit | |
| gdate.c | gdgreg | |
| gdate.c | gdlpyr | |
| gdate.c | gdmineq | |
| gto.c | gdo | |

| | | |
|---|---|---|
| gdate.c | gdparse | |
| gact.c | gdplseq | |
| gdate.c | gdplseq | |
| gdprocl.c | gdprocl | |
| gdate.c | gdsetnm | |
| gstsh.c | gerr | |
| gtmsubs.c | gerrmsg | |
| getru.pc | getru | |
| getso.pc | getso | |
| getta.pc | getta | |
| gexc.c | gexc | |
| gexc.c | gexcl | |
| gexc.c | gexcn | |
| gexc.c | gexcnc | |
| gexob.c | gexo | |
| gexob.c | gexoc | gExternalDefinitionStart |
| gexob.c | gexolu | |
| gexob.c | gexolud | |
| gexob.c | gexolux | |
| gexob.c | gexosql | |
| gexob.c | gexs | |
| gfe.c | gflnum | |
| gfe.c | gfcmp | |
| gfe.c | gfe | |
| gfe.c | gfex | |
| gfun.c | gfexist | |
| gfun.c | gfexists | |
| gftrue.c | gffalse | |
| gfe.c | gfge | |
| gfe.c | gfgt | |
| gfe.c | gfle | |
| gfl.c | gflex | |
| gfl.c | gflgt | |
| gfl.c | gflinc | |
| gfl.c | gflint | |
| gfl.c | gfllt | |
| gfl.c | gflninc | |
| gfe.c | gflt | |
| gfun.c | gflt | |
| gfl.c | gflx | |
| gfl.c | gflxinner | |
| gfe.c | gfmax | |
| gfe.c | gfmin | |
| gfe.c | gfne | |
| gfun.c | gfnexist | |
| gftrue.c | gfntrue | |
| gfun.c | gfnull | |
| gfe.c | gfnum | |
| gtmsubs.c | gfree | |
| gftrue.c | gftrue | |
| gfun.c | gfun | |
| gfun.c | gfunexst | |
| gfun.c | gfunp | |
| gfun.c | gfunt | |
| gfe.c | gfx | |
| girprts.c | girprt | |
| giry.c | girstsh | |
| girx.c | girx | |
| girx.c | girxsel | |
| giry.c | giry | |
| gfe.c | glike | |
| gstring.c | glmax | |
| gstring.c | glmin | |
| gfl.c | gmax | |
| gfl.c | gmin | |
| gmstub.c | gmon | |
| gmstub.c | gmonend | |
| gmstub.c | gmoni | |
| gmstub.c | gmonrlst | |
| gmstub.c | gmonsc | |

| | | |
|---|---|---|
| mstub.c | gmonstrt | |
| mstub.c | gmonvar | |
| msgp.c | gmsgp | |
| msgp.c | gmtest | |
| nwtg.c | gnwtg | |
| nwtg.c | gnwtgcmp | |
| nwtg.c | gnwtgcnt | gProcessorIdle |
| nwtg.c | gnwtgdet | |
| nwtg.c | gnwtgdmp | |
| nwtg.c | gnwtgexc | |
| nwtg.c | gnwtgexg | |
| nwtg.c | gnwtgexs | |
| nwtg.c | gnwtgfnd | |
| nwtg.c | gnwtgint | gSessionStart |
| nwtg.c | gnwtgl | |
| nwtg.c | gnwtglu | |
| nwtg.c | gnwtgrel | |
| nwtg.c | gnwtgreq | gRuleRequest |
| nwtg.c | gnwtgsusp | |
| nwtg.c | gnwtgu | |
| to.c | gobjfill | |
| to.c | gobjinst | |
| to.c | gofillup | |
| proc.c | gprocdel | gProcessorDelete |
| proc.c | gprocfem | gForeignEnd |
| proc.c | gprocps | gProcessorActive |
| proc.c | gproctst | |
| proc.c | gprocvct | |
| proc.c | gproinit | gSessionStart |
| proc.c | gprostat | gObjectStatus |
| proc.c | gprotend | gTransactionEnd |
| prts.c | gprts | |
| prts.c | gprtsl | |
| prts.c | gprtsq | |
| to.c | gpstats | |
| tpy.c | graend | |
| rwrt.c | grwrt | |
| rwrt.c | grwrtc | |
| rwrt.c | grwrti | |
| act.c | gs | |
| fl.c | gsapp | |
| aio.c | gsay | |
| act.c | gsay | |
| string.c | gscat | |
| act.c | gse | |
| aio.c | gsel | |
| sobj.c | gsobjdel | |
| sobj.c | gsoinit | |
| sqlb.c | gsqla | |
| sqli.c | gsqli | |
| sqli.c | gsqlic | gCommit |
| sqlo.pc | gsqlo | |
| sqli.c | gsqlstrt | gExternalDataStart |
| sqlb.c | gsqltup | |
| src.c | gsrc | |
| src.c | gsrcexsc | |
| src.c | gsrcexst | |
| src.c | gsrcl | |
| src.c | gsrcsrch | |
| src.c | gsrcunkn | |
| tmsubs.c | gstmpval | |
| string.c | gstrintr | |
| string.c | gstrunique | |
| taii.c | gtaiierr | gSystemError |
| taii.c | gtaiiner | gSystemNError |
| taii.c | gtaiir | |
| tydbb.c | gtcache | |
| tydbb.c | gtcrule | |
| tydbb.c | gtcruler | gCacheRuleReq |
| tydbb.c | gtcrulew | |

| | | |
|---|---|---|
| gtctlb.c | gtctlh | |
| gtgt.c | gtgt | gForwardReq |
| gtgt.c | gtgtent | |
| gtgt.c | gtgtreq | |
| gtgt.c | gtgtsrch | |
| gtgt.c | gtgty | |
| gtidb.c | gtidb | |
| gto.c | gto | |
| gtob.c | gtob | |
| gtob.c | gtobrout | |
| gto.c | gtoc | |
| gto.c | gtocrule | |
| gto.c | gtoex | gExternalObjectReq |
| gto.c | gtoinit | gExternalObjectStart |
| gto.c | gtonpid | |
| gto.c | gtoo | |
| gtoq.c | gtoq | |
| gtoq.c | gtoqcmp | |
| gtoq.c | gtoqo | |
| gtoq.c | gtoqp | |
| gtoq.c | gtoqs | |
| gtoq.c | gtoqsi | |
| gto.c | gtoroute | |
| gto.c | gtotend | gTransactionEnd |
| gto.c | gtox | |
| gproc.c | gtpaidl | |
| gtpy.c | gtpnew | |
| gproc.c | gtproc | |
| gtpy.c | gtprule | |
| gproc.c | gtptnote | gTargetNotice |
| gproc.c | gtptrans | gRuleReceipt |
| gproc.c | gtptrecp | gTargetReceipt |
| gtpy.c | gtpycnts | |
| gtpy.c | gtpytend | gTransactionEnd |
| gtaii.c | gtranend | |
| gtrdb.c | gtrdb | |
| getta.pc | gtrig | |
| gfun.c | gtrue | |
| gtaii.c | gtsesend | |
| gtaii.c | gtsess | |
| gteri.c | gtsessdb | |
| gtaii.c | gtsproc | |
| gsrc.c | gtsrc | |
| gtaii.c | gtsynch | |
| gtydbb.c | gtxdbr | |
| gtyab.c | gtya | |
| gtmsubs.c | gtyar | |
| gtydbb.c | gtyinit | gSessionStart |
| gaio.c | gtype | |
| gtydbb.c | gtypulse | |
| guwrt.c | guwrt | |
| guwrt.c | guwrtc | |
| guwrt.c | guwrtcm | |
| guwrt.c | guwrti | gForeignObjectStart |
| gsqlo.pc | if | |
| gtctlb.c | main | |
| gexob.c | notwhite | |
| gexob.c | OBDprt | |
| gexob.c | readrec | |
| gsobj.c | sobjclos | |
| gsobj.c | sobjhi | |
| gsobj.c | sobji | |
| gsobj.c | sobjinit | gObjectInit |
| gsobj.c | sobjstat | |
| gsqlo.pc | Stasher | |
| gexob.c | stoupper | |
| gstsh.c | stsha | |
| gstsh.c | stshclos | |

| | | |
|---|---|---|
| gtmsubs.c | stshcpy | |
| gstsh.c | stshdat | |
| gstsh.c | stshdata | |
| gstsh.c | stshdatr | gStore |
| gstsh.c | stshdatx | |
| gstsh.c | stshdaxr | gVariable |
| gstsha.c | stshdel | |
| gstsha.c | stshdelr | gDelete |
| gstsha.c | stshdelx | |
| gstsh.c | stshfwd | |
| gtmsubs.c | stshlen | |
| gsobj.c | stshp | |
| gsobj.c | stshpv | |
| gsobj.c | stshpx | |
| gstsh.c | stshrepl | |
| gstsh.c | stshrepx | |
| gstsha.c | stshvar | |
| gstsha.c | stshvare | |
| gstsha.c | stshvarx | |
| gstsh.c | stshvi | |
| gsobj.c | stsobjet | |
| gtgt.c | tgtses | |
| gtgt.c | tgtvar | |
| gtmsubs.c | tgtvsep | |
| gsqlo.pc | Warning | |
| gmsg.h | gerrMSG | |
| gmsg.h | gMSGiii | |
| gmsg.h | gMSGiiii | |
| gmsg.h | gMSGlii | |
| gmsg.h | gMSGliii | |
| gmsg.h | gMSGls | |
| gmsg.h | gMSGlsvc | |
| gmsg.h | gMSGsls | |
| gmsg.h | gMSGss | |
| gmsg.h | gMSGsss | |
| gmsg.h | gMSGssssl | |
| gmsg.h | gMSGsv | |
| gmsg.h | gtrceMSGri | |
| gmsg.h | gtrceMSGsri | |
| gmsg.h | gtrceMSGss | |
| gmsg.h | isEXISTS | |
| gmsg.h | isNEG | |
| gmsg.h | routine | message |
| gmsg.h | routine | message |
| gmsg.h | routine | message |
| gmsg.h | routine | message |
| gmsg.h | routine | message |
| gmsg.h | routine | message |
| gmsg.h | routine | message |
| gmsg.h | routine | message |
| gmsg.h | routine | message |
| gmsg.h | routine | message |
| csql.h | SQL_close | |
| csql.h | SQL_opncur | |
| csql.h | SQL_opncurc | |
| csql.h | SQL_opncurn | |
| csql.h | SQL_opncuro | |
| csql.h | SQL_opncurs | |
| csql.h | SQL_selcur | |
| csqla.h | SQL_selcur | |
| stsh.h | stshvd | |
| stsh.h | stshvdat | |

Appendix B - Sartre

Sartre

Expert System Language for Relational Reasoning with
Existential Functions

This document contains material which is the confidential property of Tesseract Corporation. This document may not be copied without the express written permission of Tesseract Corporation. Disclosure of this document outside Tesseract Corporation and affiliated companies without the permission of an officer of the company is a violation of trade secret agreements.

Copyright 1988, Tesseract Corporation.

Introduction

Sartre is a general purpose language for recording knowledge and for reasoning about the world. In the Sartre Language the reasoning space includes various objects that provide facets of knowledge organized into relations. The nature of the language encourages the relational organization of knowledge. The knowledge base itself is organized and stored in relations so that self-reference and self-update support explanation and learning systems.

This paper outlines the language, a prototype implementation of the language, and provides examples of key usages.

Throughout the paper the relational model and terminology are freely used. Readers not familiar with that terminology may find those terms confusing. An introduction to relational terminology should be considered a prerequisite.

Syntax

The basic component of the language is a sentence (a production, or statement, in other terms). A sentence begins with the word IF followed by some number of conditions followed by the word THEN followed by some number of actions, eg.,

```
IF condition
THEN action.
```

The section of a sentence beginning with IF will be referred to as the Left Hand Side (LHS) and the section beginning with THEN as the Right Hand Side (RHS) for brevity.

Multiple conditions in the LHS or actions in the RHS are separated by the word AND, eg.,

```
IF condition-1
AND condition-2
THEN action-1
AND action-2
```

Conditions and actions may take the following forms:

```
        variable
        variable operator
        variable operator value
     or variable operator variable
```

Variables are of the form:

object.qualifier.property.

Objects, qualifiers, and properties are described in the section "Objects" below. Operators are either truth functions (LHS) or action functions (RHS) as described in the section "Functions" below. Values may appear in conditions or actions, the nature of Values and their forms and types are explained below in the section Variables.

The words IF, THEN, and AND are reserved to preserve syntax when parsing sentences presented as character strings. Note, however, that sentences are considered the fundamental unit of the language and that connections or relations among sentences, including sentence order, is not a property of the language or its resulting knowledge base.

Objects

Objects are the largest data structures in the language. Objects are composed both of properties (attributes, or fields, in other terms) and instances. Variables are properties associated with an object by reference, eg., ANIMAL.TYPE, where ANIMAL is the object name, TYPE is the property, and ANIMAL.TYPE is the variable name. Any number of properties may be associated with an object. If an object is viewed as a record, or relational tuple, then the term property corresponds to a field or a column in the relational model. The language does not support free variables, ie., those not associated with an object.

Variables may have a value associated with them. If a variable has a value, it is referred to as determined. When a variable does not have a value, it is referred to as undetermined. All variables have names. Determined variables are a collection of name-value pairs.

An object may be composed of one or more instances. Each instance of an object has a different set of name - value pairs. Variable references are references over sets. Hence the reference to ANIMAL.TYPE refers to all instances of the object ANIMAL. For those instances of ANIMAL where TYPE has a value, ANIMAL.TYPE is determined.

For Example, the rule:

IF ANIMAL.TYPE = 'COW'
    THEN FARM.LIVESTOCK would be true if any instance of the object ANIMAL had a variable TYPE with a value 'COW'. There might be many instances of the object ANIMAL, some with the value COW, and some with the value HORSE. If any instance of ANIMAL does not have the variable TYPE, the above rule is undetermined for that instance. If some instances had the value COW then the above rule would be true. A representation of the object ANIMAL might be the table that follows:

Object  Animal

| Type  | Color |
|-------|-------|
| 1. DEER  | BROWN |
| 2. HORSE | BROWN |
| 3. COW   | BLACK |
| 4. HORSE |       |
| 5.       | PINK  |

FIGURE 1

This object has two properties, TYPE and COLOR, and five instances.

Notice that this representation is the same as that for a relational table. Objects can be treated as relational tables. In the relational nomenclature, each instance would be a tuple.

For the example, in the object ANIMAL,

ANIMAL.TYPE = 'HORSE' is true

ANIMAL.COLOR = 'PINK' is true

ANIMAL.TYPE = 'HORSE'
    AND ANIMAL.COLOR = 'BROWN' is true, but,

ANIMAL.TYPE = 'PIG' is undetermined.

The instances of an object may be selected to form what will logically be treated as another object. This selection process is performed by the SEL operator and notated by qualifications of the object name, eg.,

ANIMAL.FARM

Where ANIMAL.FARM represents a selected set of instances of the object ANIMAL. The selection might be:
    IF ANIMAL.FARM.TYPE INCL 'COW', 'HORSE';
    THEN SEL ANIMAL.FARM (Restated: if the type of animal is included in the list COW, HORSE then the animal is a farm animal.)

and the result performed on the ANIMAL table from above would be:

ANIMAL.FARM

| Type  | Color |
|-------|-------|
| HORSE | BROWN |
| COW   | BLACK |
| HORSE |       |

Figure 2

Thus, this qualified object contains two properties and three tuples; and for this object:

ANIMAL.FARM.TYPE = 'HORSE' is true,

ANIMAL.FARM.COLOR = 'PINK' is undetermined, and

ANIMAL.FARM.TYPE = 'HORSE'
    AND ANIMAL.FARM.COLOR = 'BROWN' is true.

An object can have any number of qualifications, eg., ANIMAL.FARM, ANIMAL.FOREST, ANIMAL.WATER. Also, a qualified object may itself be further qualified, eg., ANIMAL.FARM.DRAY, ANIMAL.FOREST.MAMMAL.FOUR_LEGGED. In all cases the result of a select is another relational table. The object qualification notation is used to simplify rule expression. In effect, with this notation, each relational select is given a name which eliminates restatement of a select for which many rules apply. By using other qualifications in a select operation, nested subselects are implemented.

While the qualified object name refers to the set of selected instances, in order to provide meaningful rule evaluation, object references within a rule with the same qualifications are treated as referring to the same instance.

For example, in the rule clause;

IF ANIMAL.TYPE = 'COW'
    AND ANIMAL.COLOR = 'BROWN'

Using the example object ANIMAL, in Figure 1 above, if each condition were treated independently, this LHS would be true since instance 3 is 'COW' and instance 2 is 'BROWN'. But, by treating the references which have the same qualification as referring to the same instance, this LHS is not true for the example.

But for the rule,

IF ANIMAL.FARM.TYPE = 'HORSE'
    AND ANIMAL.FARM.COLOR = 'BROWN'

(In other words, is there a BROWN HORSE?)
is true for the object in Figure 2.

This principal of the language, that object references are consistent within a rule, is referred to as Locality of Reference.

If it is desired to determine if an object satisfies two independent conditions for an object, two rules can be used, eg.,

IF ANIMAL.TYPE = 'HORSE'
    THEN SESSION.SOME_HORSE

IF ANIMAL.COLOR = 'BLACK'
    THEN SESSION.SOME_BLACK (In other words, is there an animal that is a HORSE and an animal that is BLACK? They may or may not be the same animal (instance)).

If it is necessary to have a condition that contains references to two variables in different instances within an object, then two different objects must be referred to. One of these may, of course, be a complete projection of the other, even a couple of projections, eg.,

1) IF ANIMAL.OTHER.OBJID EXISTS
   THEN SEL ANIMAL.OTHER.OBJID (All objects have an OBJID variable. This rule makes all instances of ANIMAL instances of ANIMAL.OTHER.)

2) IF ANIMAL.TYPE = 'HORSE'
   AND ANIMAL.COLOR = ANIMAL.OTHER.COLOR
   THEN SESSION.SOME_ANIMAL_SAME_COLOR_AS_HORSE

|    | Object | Animal |
|----|--------|--------|
|    | Type   | Color  |
| 1. | DEER   | BROWN  |
| 2. | HORSE  | BROWN  |
| 3. | COW    | BLACK  |
| 4. | HORSE  |        |
| 5. |        | PINK   |

FIGURE 1

The references to the ANIMAL object refer to the same object and consequently the same instance, while ANIMAL.OTHER refers to the set of instances qualified by rule 1. Logical, all instances are examined for satisfaction of the first condition in rule 2 and, for each of those instances satisfying the first condition, the COLOR variable in those instances is compared to the Color variable in all instances of the object ANIMAL.OTHER. Applying these rules to the examples in Figure 1, the rule in 2 is true twice. Condition one is true for instances 2 and 4. Condition two from instance 2 is then true for instances 1 and 2. Condition two remains undetermined for the version of the rule for which condition one was true for instance 4. A rule may be applied to different instances of an object and some conditions may be true for some instances and be evaluated differently for other instances, These different evaluations of a rule will be referred to as rule instances.

The above rule two can be restated: is there any animal the same color as the horse. If the only animal was a brown horse, the literal interpretation of that statement would be, yes. If, on the other hand, we had wished to ask if there were another animal the same color as any of the horses, we might state the rule:

IF ANIMAL.TYPE = 'HORSE'
   AND ANIMAL.COLOR = ANIMAL.OTHER.COLOR
   AND ANIMAL.OBJID ^= ANIMAL.OTHER.OBJID (Note: OBJID is unique for all the instances within an object)

This rule is true for the example in Figure 1 since there is an instance, 1, which is the same color as 2, which is a HORSE. This rule would also be true if the TYPE of instance 1 had been a HORSE.

If we had wanted to ask if there were any animals, other than horses, the same color as any horse, we would say, IF ANIMAL.TYPE = 'HORSE'
   AND ANIMAL.COLOR = ANIMAL.OTHER.COLOR
   AND ANIMAL.OTHER.TYPE ^= 'HORSE'.

Variables

Variables only exist in association with Objects. Variables within the language are not typed. That is, the Inference Engine can operate on variables without knowing their type and hence variable type is not specified within the language. This characteristic allows the language to be robust because the variables on which it operates may be simple constructs such as strings or lists or may be objects such as spread sheets or graphic objects.

The typing of a variable is related to the object to which the variable is associated. This requires that each object have some mechanism for recognizing the type of its variable. That mechanism might be a type table or some embedded type. The particular mechanism is a property of the object and is isolated from the language.

For example, in the following clause,

IF picture.person = reference.person the variable picture.person might refer to a string variable, a boolean variable, or a section of a graphic data structure, and the same for the variable reference.person.

Just as the variable person is typed only by the object to which it is associated, the functions have meaning only in the context of an object. In the above example, the precise meaning of the function "=" is relative to the objects picture and reference. If the two objects operate on strings, then the operation implied by the example clause is the string equal function. If, on the other hand, the objects are graphic objects, then the operation implied by the clause is a graphic equal compare. If variables must transport between two objects, the object processors may provide transformation functions. Object processors for data objects by be specified in the object table. The valid functions of an object and the possible transformation functions must be registered with the Rule Formation System if the standard functions are not supported.

The Gnome Inference Engine supports a default set of variable types and standard functions. Those variable types are described below. The standard functions are described in the following section.

Variables come in two styles:

Atomic - the variable contains one value.

Quantum - the variable contains more than one value (lists).

The standard functions are defined for legal results for either styles.

For the standard functions, variables are not typed. Their usage determines the appropriateness of their domains. Inconsistent usage can be detected by the system at either development time, by the Rule Formation System, or at run time. The knowledge base must contain rules that limit the domain of a variable if the source system is not reliable. The Rule Formation System can evaluate comparative statements of the form, IF effective_date < base_rate ....

and consider the consequences of comparing a date with a dollar amount and suggest reconsidering the comparison or providing a conversion. Such advice during rule development is provided based upon a variable definition table containing the data form.

Internal Forms

The quantum form of all default data (the most granular form) is a character string. Various data types are represented in such strings as defined below.

Strings: Character strings are be internally represented by null delimited character strings. Network messages may use appropriate field delimiters which are changed to the internal form. All character fields, whether entered as fixed or variable, are stored as variable. While strings will have no theoretical limit to their length, practical limitations impose some limit such as 256 or 32k based on the available memory in the environment.

Numbers: Numbers are internally represented by strings of numerics with an optional leading sign and an optional internal decimal. The only allowable internal punctuation other than '.' is ',', which is ignored. Leading '$' is ignored. Trailing '%' forces an internal multiply by 100. No leading, trailing, or internal blanks are stored. Variables with blanks will be treated as character strings. A numeric filter function will allow numeric treatment of numeric fields with embedded blanks and provide for implied decimals. Provisions for interpreting exponent forms are not be part of the initial implementation.

Dates: Internally dates are stored as numeric values in the form yyyymmdd. Transformation and date computation functions provide transformations and date arithmetic. Date transformations and arithmetic operations must be explicitly stated, eg., effdt D+ 1.

Time: Time is stored internally in hhmmssth form in twenty-four hour format. Time computation functions may be provided in the future.

Lists: Whatever form the quanta take, the form of lists is the same, a super-string of null delimited strings. Lists are of one dimension. Lists of more than one dimension must be processed as objects. While no present applications do so, this scheme allows message variables to be lists.

Null
Values: Two forms of null are supported - "unknown" and "known to be null." The value '\UNKNOWN' is used in rules to test for the "known to be null" value. See Existential Functions below for a discussion of "unknown" values.

Time Synchronization

All variables are considered mono-chronistic, that is, they are assumed to be time synchronized to the same point in time by the application. Objects and rules may have time dimensions, but variables are one dimensional. This approach allows development of rule bases using existing shells which all view variables as mono-chronistic. The key variable 'trans.effdt' is used to time synchronize rule processing and temporal logic.

<center>Functions</center>

Existential Functions

Two existential functions are supported, EXISTS and ^EXISTS (not exists). The existence functions allow reasoning to be developed around whether or not a particular property exists in an instance of an object, a set of objects (a relation), or some projection of a relation.

The clause,

IF FRUIT.COLOR EXISTS is true if any instance of FRUIT has a value for COLOR. What the color is does not matter. In fact the COLOR value could be Unknown (which might represent the knowledge that all fruits have color, but in the absence of more information, the color is unknown). This is very different from the question as to whether or not there are red fruits as might be asked by the question:

IF FRUIT.COLOR = 'RED'.

If we wish to form a sentence where the conditions ask if there are any RED APPLES we might say:

1.  IF FRUIT.TYPE = 'APPLE'
            AND FRUIT.COLOR = 'RED'
            THEN FRUIT.RED_APPLE = 'TRUE' and the existential sentence,

2.  IF FRUIT.RED_APPLE EXISTS
            THEN SESSION.ACTION = 'HAVE A BITE'

The second sentence will only be true if FRUIT.RED_APPLE obtains a value (any value including FALSE). But what about the converse? If we form the sentence, 3.  IF FRUIT.RED_APPLE  ^EXISTS
            THEN ANS ASK 'Will a green one do?' is an example of a not exists rule.

This rather simple example demonstrates the power of the existence operators. Rule 1 is an example of a typical classification rule, ie., red apples are those apples which are red. Other examples: managers are employees with grade greater than 25; knowledge engineers are programmers who write expert systems.

Rule 2 illustrates logic about whether or not a particular classification or situation exists in the current world view. If the object about which a condition is directed is a temporal relation, the power of this operator becomes clear, eg., IF POSITION_HISTORY.ACTION = 'PROMOTION'
        AND POSITION_HISTORY.EFFDT > SESSION.ONE_YEAR_AGO
        THEN POSITION_HISTORY.RECENT_PROMOTION = 'TRUE'

IF POSITION_HISTORY.RECENT_PROMOTION  ^EXISTS
        THEN SESSION.MAX_INCREASE = 10%

IF POSITION_HISTORY.RECENT_PROMOTION  EXISTS
        THEN SESSION.MAX_INCREASE = 5%

The first rule embodies the knowledge that if a promotion has occurred within one year prior to the time under consideration, it is classified as a "Recent Promotion". The second and third rules embody specific policy rules regarding the maximum increase available based on the presence of a promotion of "recent" class.

Note that Exists and ^Exists correspond to the Exists operator in the relational framework. Consequently, whenever a variable obtains any value it satisfies the Exists operation. This includes variables that obtain values with zero length (sometimes referred to in other programming language systems as null values). Null values in relational terms appear as "Not Exists" in the variable presentation. However, the "known to be NULL"

representation is implemented by \UNKNOWN. The value \UNKNOWN can be propagated by an assignment or other action operators and can, in effect, become a key in order to provide default logic values. The EXISTS status propagates through assignment, since the underlying variable propagates, but ^Exists does not propagate. In fact, once a variable is determined to "Not Exist" all references to it other than ^Exists and Exists remain undetermined.

The NULL value (a string of length zero) is separately implemented and the separate representations for Exists, ^Exists, and /UNKNOWN avoid any confusion with meaning.

A variable is determined to "Not Exist" once all rules that could determine the variable have been exhausted. The following truth table shows the value of the existence operators under the possible states of a variable:

| Variable | Exists | ^Exists |
|---|---|---|
| Some Value | True | False |
| Not Exists | False | True |
| /UNKNOWN | True | False |

Comparative Functions

These functions all return TRUE or FALSE which is used by the rule interpreter to determine the truth of a condition. Comparative functions are only legal in the conditions section (Left Hand Side) of a rule.

| Function | Arguments | Description |
|---|---|---|
| (null) | one | True |
| A | none | Assert |
| True | one | True |
| ^True | one | Not True |
| False | one | False |
| = | two | Equal |
| ^= | two | Not equal |
| GT | two | Greater than |
| LT | two | Less than |
| Incl | two | List includes |
| ^Incl | two | Not includes |
| GE | two | Greater than or equal to |
| LE | two | Less than or equal to |
| Like | two | String like compare |

Store Action Functions

These functions operate on one variable (the source) and a target variable and store the result in the target variable. The target variable may not have a starting value, in which case it is considered null. (Action functions are only legal in the actions section (Right Hand Side) of a rule.)

| Function | Description |
|---|---|
| S | Store source into target |
| += | Add source to target |
| -= | Subtract source from target |

```
*=          Multiply target by source
/=          Divide target by source
D+=         Date add source to target
D-=         Date subtract source from target
Diff        Difference between dates to target
```

Closure Action Functions

Closure functions may operate on a set or a single instance, but the variable is not considered complete unless all instances of the source variables have been considered. If all instances of a rule are either false or true and complete then the variable referenced by the target variable will be considered complete. Variables that are incomplete do not participate in rule operations.

| Function | Description |
|---|---|
| Count | Count occurrences |
| Sum | Sum variable |
| Max | Maximum |
| Min | Minimum |

Stack Functions

These functions are used in combination with either Comparative Functions or Store Functions to perform complex arithmetic or string functions. The result of a stack function is placed on a stack that is available to subsequent functions including other stack functions. The Rule Formation System expands complex statements of the form, $(b + c) * (e + (f + g/h))$ into reverse polish operations in the form, bc+gh/f+e+*.

These operations are then processed by the interpreter sequentially, with each the result of each operation being placed on the stack and previous values retrieved if needed.

| Function | Description |
|---|---|
| + | Plus |
| - | Minus |
| * | Multiply |
| / | Divide |

Object Action Functions

Object functions operate on objects to provide selections or create new instances.

| Function | Description |
|---|---|
| CO | Create Object |
| Sel | Select |
| SQLSel | Select tuples from an external SQL object |
| Commit | Commit updates |
| Insert | Insert tuples into an external SQL object |

Action Function Definitions

S
Store  The value in source is stored into the target variable. The target variable is forward fired, triggering rules referencing the variable.

| | |
|---|---|
| += | The value in source is added to the value in target. If the target variable is empty, the target is assumed to be zero. Decimal alignment is automatic with the target variable having the maximum decimals in the two variables. The target variable is forward fired, triggering rules referencing the variable. Note, if the source variable is multiply instanciated, multiple firings of the target variable will occur and consequently the results will be unpredictable. If the source variable can be multiply instanciated, the Sum function should be used. |
| -= | The value in source is subtracted from the value in target. See +=. |
| D+= | The value in source is added to the value in the target variable. The target variable is considered a date and the source is added as if it were days. The target variable is forward fired, triggering rules referencing the variable. Note, if the source variable is multiply instanciated, multiple firings of the target variable will occur and consequently the results will be unpredictable. If the source variable can be multiply instanciated, Sum should be used to collect the source variable. If the target is not a proper date, the target is considered zero. |
| Sel | The qualified object referenced in target is made part of the qualified set. If the unqualified set is composed of more than one instance, those tuples for which the conditions in the rule containing the Sel action are made part of the qualified set. Those instances for which the conditions fail are excluded from the qualified set. This function corresponds to the SQL Select operation for selecting tuples from a set. |
| SQLsel | The string expression referred to in target is combined with the string expression referred to in source to produce an SQL statement that will be used to select tuples from an external source. The SQLsel statement will be ignored if the object type in the object table is not E. Thus the SQLsel function can provide internal variables to the external SQL processor. By specifying some other object type than E, the inferencing process can be substantially changed while providing the capability of providing the internal variables to the SQL process when necessary. |
| Commit | The External SQL processor for the table is notified to commit updates for the table referenced by target. The Commit operation provides intra-transaction commit for data bases. This commit is in addition to the commit issued at transaction end. If updates should be committed at transaction end, the commit function need not be used. |

```
Rule00001
    IF      SESSION.JOE_EMOTE    EXISTS
    THEN    SCENE   CO   '1';
    AND     SCENE.JOE_EMOTE    =   SESSION.JOE_EMOTE
    AND     SCENE.GUN_LOADED   =   SESSION.GUN_LOADED Rule00002
    IF      SCENE.JOE_EMOTE    =   'MAD';
    AND     SCENE.GUN_LOADED
    AND     SCENE.JOHN_ALIVE
    THEN    SCENE.JOHN_SHOT    =   'TRUE';
```

```
Rule00003
   IF    SCENE.OBJID     EXISTS
     AND SCENE.JOHN_DEAD  ^EXISTS
   THEN  SCENE.JOHN_ALIVE  =  'TRUE';

Rule00004
   IF    SCENE.OBJID   =   '1';
   THEN  SCENE    CO    '2';

Rule00005
   IF    SCENE.OTHER.OBJID   GT   SCENE.ANY.OBJID
     AND SCENE.ANY.JOHN_SHOT
   THEN  SCENE.OTHER.JOHN_DEAD   =   'TRUE';

Rule00006
   IF    SCENE.ANY.OBJID   EXISTS
   THEN  SCENE.ANY.OBJID   SEL

Rule00007
   IF    SCENE.OTHER.OBJID   EXISTS
   THEN  SCENE.OTHER.OBJID   SEL object=session
object=scene type=o
object=scene.any type=s
object=scene.other type=s Gnome Expert System
Copyright Tesseract Corp 1988
  Intelligibility of the code strictly prohibited!
Object dump requested
7 rules loaded from NONM.KB Object file is 'nonm.obd'

Object definitions for current session

(01) Object:    <SESSION>
         Type:      <S>

(02) Object:    <SCENE>
         Type:      <O>

(03) Object:    <SCENE.ANY>
         Type:      <S>

(04) Object:    <SCENE.OTHER>
         Type:      <S>

Session ended idleSESSION.(0) Type:b Proc:001 Status:t Hi:0000
Open Use:
   GUN_LOADED=> 'TRUE'
   JOE_EMOTE=> 'MAD'
SCENE.(0) Type:b Proc:002 Status:t Hi:0000 Open Use:
SCENE.(1) Type:i Proc:003 Status:t Hi:0000 Open Use:
   JOHN_SHOT=> 'TRUE'
   JOHN_ALIVE=> 'TRUE'
   JOHN_DEAD=> (not exists)''
   GUN_LOADED=> 'TRUE'
   JOE_EMOTE=> 'MAD'
   OBJID=> '1'
SCENE.OTHER.(1) Type:i Proc:004 Status:t Hi:0003 Open Use:
   JOHN_SHOT=> 'TRUE'
   JOHN_ALIVE=> 'TRUE'
   JOHN_DEAD=> (not exists)''
   GUN_LOADED=> 'TRUE'
   JOE_EMOTE=> 'MAD'
   OBJID=> '1'
SCENE.ANY.(1) Type:i Proc:005 Status:t Hi:0003 Open Use:
   JOHN_SHOT=> 'TRUE'
   JOHN_ALIVE=> 'TRUE'
   JOHN_DEAD=> (not exists)''
```

```
  GUN_LOADED=> 'TRUE'
  JOE_EMOTE=> 'MAD'
  OBJID=> '1'
SCENE.(2) Type:i Proc:006 Status:t Hi:0000 Open Use:
  JOHN_DEAD=> 'TRUE'
  OBJID=> '2'
SCENE.OTHER.(2) Type:i Proc:007 Status:t Hi:0006 Open Use:
  JOHN_DEAD=> 'TRUE'
  OBJID=> '2'
SCENE.ANY.(2) Type:i Proc:008 Status:t Hi:0006 Open Use:
  JOHN_DEAD=> 'TRUE'
  OBJID=> '2'
    500.000000 elapsed time.   170.000000 inference time.
    Rule iterations 63

Begin end-of-transaction processing...
Transaction ended.

Begin end-of-session processing...

Session ended.
Rule0001.0000① prev= 0② type=r③ stat= ⑤ prog=n⑥ nextpid 00 0000⑦
      routing 0036 predicate 0120 rulelen 0265           ⑧
           data 0144      vars 0265  datalen = 121
obj 1047396508 objend 1047396592
obj nxt 01 val 000  proc 0000 objname 001    ()     SESSION
obj nxt 02 val 023  proc 0000 objname 000    1  ()
obj nxt 02 val 000  proc 0000 objname 027    ()     SCENE
obj nxt 02 val 000  proc 0000 objname 035    ()     SESSION    ⑨
obj nxt 02 val 000  proc 0000 objname 057    ()     SCENE
obj nxt 02 val 000  proc 0000 objname 077    ()     SESSION
obj nxt 02 val 000  proc 0000 objname 100    ()     SCENE
pred   01 u  targ 01  srce 00  oper 009    SESSION.JOE_EMOTE
opr=EXISTS
pred   02 u  targ 03  srce 02  oper 003    SCENE     '1'  opr=CO
pred   02 u  targ 05  srce 04  oper 001    SCENE.JOE_EMOTE
SESSION.JOE_EMOTE   opr=S                                      ⑩
pred   02 u  targ 07  srce 06  oper 001    SCENE.GUN_LOADED
SESSION.GUN_LOADED  opr=S
;
;SESSION;;;⑪JOE_EMOTE;;;1;;;SCENE;
;SESSION;;;JOE_EMOTE;^H;SCENE;;;JOE_EMOTE;
;SESSION;;;GUN_LOADED;^H;SCENE;;;GUN_LOADED;

Rule0002.0000 prev= 0 type=r stat=  prog=n nextpid 00 0000
      routing 0036 predicate 0108 rulelen 0228
           data 0132      vars 0228  datalen = 96
obj 1047396508 objend 1047396580
obj nxt 01 val 001  proc 0000 objname 000    MAD   ()
obj nxt 01 val 000  proc 0000 objname 007    ()     SCENE
obj nxt 01 val 000  proc 0000 objname 027    ()     SCENE
obj nxt 01 val 000  proc 0000 objname 048    ()     SCENE
obj nxt 02 val 069  proc 0000 objname 000    TRUE  ()
obj nxt 02 val 000  proc 0000 objname 076    ()     SCENE
pred   01 u  targ 02  srce 01  oper 004    SCENE.JOE_EMOTE
'MAD'  opr==
pred   01 u  targ 03  srce 00  oper 000    SCENE.GUN_LOADED  opr=
pred   01 u  targ 04  srce 00  oper 000    SCENE.JOHN_ALIVE  opr=
pred   02 u  targ 06  srce 05  oper 001    SCENE.JOHN_SHOT
'TRUE'  opr=
;;;MAD;^H;SCENE;;;JOE_EMOTE;^H;SCENE;;;GUN_LOADED;^H;SCENE;-
;;JOHN_ALIVE;;;TRUE;^H;SCENE;;;JOHN_SHOT;

Rule0003.0000 prev= 0 type=r stat=  prog=n nextpid 00 0000
      routing 0036 predicate 0084 rulelen 0167
           data 0102      vars 0167  datalen = 65
obj 1047396508 objend 1047396556
obj nxt 01 val 000  proc 0000 objname 001    ()     SCENE
obj nxt 01 val 000  proc 0000 objname 017    ()     SCENE
obj nxt 02 val 037  proc 0000 objname 000    TRUE   ()
```

```
obj nxt 02 val 000  proc 0000 objname 044   ()    SCENE
pred  01 u  targ 01  srce 00  oper 009   SCENE.OBJID  opr=EXISTS
pred  01 u  targ 02  srce 00  oper 010   SCENE.JOHN_DEAD
opr=^EXISTS
pred  02 u  targ 04  srce 03  oper 001   SCENE.JOHN_ALIVE
'TRUE'  opr=S
;^H;SCENE;;;OBJID;^H;SCENE;;;JOHN_DEAD;;;TRUE;^H;SCENE;;;JOHN_AL-
IVE;

Rule0004.0000 prev=  0 type=r stat=  prog=n nextpid 00 0000
      routing 0036 predicate 0084 rulelen 0129
          data 0096       vars 0129   datalen = 33
obj 1047396508 objend 1047396556
obj nxt 01 val 001  proc 0000 objname 000   1   ()
obj nxt 01 val 000  proc 0000 objname 005   ()    SCENE
obj nxt 02 val 021  proc 0000 objname 000   2   ()
obj nxt 02 val 000  proc 0000 objname 025   ()    SCENE
pred  01 u  targ 02  srce 01  oper 004   SCENE.OBJID       '1'
opr==
pred  02 u  targ 04  srce 03  oper 003   SCENE        '2'  opr=CO
;;;1;^H;SCENE;;;OBJID;;;2;;;SCENE;

Rule0005.0000 prev=  0 type=r stat=  prog=n nextpid 00 0000
      routing 0036 predicate 0096 rulelen 0222
          data 0114       vars 0222   datalen = 108
obj 1047396508 objend 1047396568
obj nxt 01 val 000  proc 0000 objname 001   ()    SCENE
obj nxt 01 val 000  proc 0000 objname 023   ()    SCENE
obj nxt 01 val 000  proc 0000 objname 047   ()    SCENE
obj nxt 02 val 073  proc 0000 objname 000   TRUE  ()
obj nxt 02 val 000  proc 0000 objname 080   ()    SCENE
pred  01 u  targ 02  srce 01  oper 006   SCENE.OTHER.OBJID
SCENE.ANY.OBJID  opr=GT
pred  01 u  targ 03  srce 00  oper 000   SCENE.ANY.JOHN_SHOT
opr=
pred  02 u  targ 05  srce 04  oper 001   SCENE.OTHER.JOHN_DEAD
'TRUE'  opr=S
;^H;SCENE;^F;ANY;;;OBJID;^H;SCENE;^H;OTHER;;;OBJID;^H;SCENE;-
^F;ANY;;;JOHN_SHOT;;;TRUE;^H;SCENE;^H;OTHER;;;JOHN_DEAD;

Rule0006.0000 prev=  0 type=s④ stat=  prog=n nextpid 00 0000
      routing 0036 predicate 0060 rulelen 0117
          data 0072       vars 0117   datalen = 45
obj 1047396508 objend 1047396532
obj nxt 01 val 000  proc 0000 objname 001   ()    SCENE
obj nxt 02 val 000  proc 0000 objname 023   ()    SCENE
pred  01 u  targ 01  srce 00  oper 009   SCENE.ANY.OBJID
opr=EXISTS
pred  02 u  targ 02  srce 00  oper 005   SCENE.ANY.OBJID  opr=SEL
;^H;SCENE;^F;ANY;;;OBJID;^H;SCENE;^F;ANY;;;OBJID;

Rule0007.0000 prev=  0 type=s stat=  prog=n nextpid 00 0000
      routing 0036 predicate 0060 rulelen 0121
          data 0072       vars 0121   datalen = 49
obj 1047396508 objend 1047396532
obj nxt 01 val 000  proc 0000 objname 001   ()    SCENE
obj nxt 02 val 000  proc 0000 objname 025   ()    SCENE
pred  01 u  targ 01  srce 00  oper 009   SCENE.OTHER.OBJID
opr=EXISTS
pred  02 u  targ 02  srce 00  oper 005   SCENE.OTHER.OBJID
opr=SEL
;^H;SCENE;^H;OTHER;;;OBJID;^H;SCENE;^H;OTHER;;;OBJID;

Rule-001.0000① prev=  0 type=r stat=  prog=n nextpid 00 0000
      routing 0036 predicate 0060 rulelen 0101
          data 0072       vars 0101   datalen = 29
obj 1047396508 objend 1047396532
obj nxt 02 val 001  proc 0000 objname 000   MAD   ()
obj nxt 02 val 000  proc 0000 objname 007   ()    SESSION
pred  01 u  targ 00  srce 00  oper 003   <>    opr=A
```

```
pred   02 u    targ 02    srce 01    oper 001    SESSION.JOE_EMOTE
'MAD'  opr=S
;;;MAD;
;SESSION;;;JOE_EMOTE;

Rule-002.0000 prev=   0 type=r stat=  prog=n nextpid 00 0000
       routing 0036 predicate 0060 rulelen 0103
           data 0072      vars 0103   datalen = 31
obj 1047396508 objend 1047396532
obj nxt 02 val 001  proc 0000 objname 000   TRUE   ()
obj nxt 02 val 000  proc 0000 objname 008   ()     SESSION
pred   01 u    targ 00    srce 00    oper 003    <>    opr=A
pred   02 u    targ 02    srce 01    oper 001    SESSION.GUN_LOADED
'TRUE' opr=S
;;;TRUE;
;SESSION;;;GUN_LOADED;

Rule-001.0000 prev=   0 type=r stat=t prog=p nextpid 01 0001 ③
       routing 0036 predicate 0060 rulelen 0101
           data 0072      vars 0101   datalen = 29
obj 1047396508 objend 1047396532                            ①
obj nxt 04 val 001  proc 0000 objname 000   MAD    ()
obj nxt 04 val 000  proc 0001 ③ objname 017   ()    JOE_EMOTE
pred   04 t    targ 00    srce 00    oper 003    <>    opr=A
pred   04 c    targ 02    srce 01    oper 001    JOE_EMOTE     'MAD'
opr=S
;;;MAD;
;SESSION;;;JOE_EMOTE;

Rule-002.0000 prev=   0 type=r stat=t prog=p nextpid 01 0001
       routing 0036 predicate 0060 rulelen 0103
           data 0072      vars 0103   datalen = 31
obj 1047396508 objend 1047396532                            ②
obj nxt 04 val 001  proc 0000 objname 000 ④   TRUE   ()
obj nxt 04 val 000  proc 0001 objname 018 ④   ()    GUN_LOADED
pred   04 t    targ 00    srce 00    oper 003    <>    opr=A
pred   04 c    targ 02    srce 01    oper 001    GUN_LOADED    'TRUE'
opr=S
;;;TRUE;
;SESSION;;;GUN_LOADED;

Rule0001.0000 prev=   0 type=r stat=t prog=p nextpid 00 0001
       routing 0036 predicate 0120 rulelen 0265
           data 0144      vars 0265   datalen = 121
obj 1047396508 objend 1047396592                            ⑤
obj nxt 04 ⑥ val 000  proc 0001 objname 011   ()    JOE_EMOTE
obj nxt 02 val 023  proc 0000 objname 000    1    ()
obj nxt 02 val 000  proc 0001 objname 027    ()   SCENE
obj nxt 02 val 000  proc 0001 objname 045    ()   JOE_EMOTE
obj nxt 02 val 000  proc 0002 ⑦ objname 065    ()   JOE_EMOTE
obj nxt 02 val 000  proc 0001 objname 087    ()   GUN_LOADED
obj nxt 02 val 000  proc 0002 ⑦ objname 108    ()   GUN_LOADED
pred   04 ⑥ t  targ 01    srce 00    oper 009   JOE_EMOTE  opr=EXISTS
pred   02 u    targ 03    srce 02    oper 003   SCENE       '1'  opr=CO
pred   02 u    targ 05    srce 04    oper 001   JOE_EMOTE  .  JOE_EMOTE
opr=S
pred   02 u    targ 07    srce 06    oper 001   GUN_LOADED .
GUN_LOADED opr=S
;
;SESSION;;;JOE_EMOTE;;;1;;;SCENE;
;SESSION;;;JOE_EMOTE;^H;SCENE;;;JOE_EMOTE;
;SESSION;;;GUN_LOADED;^H;SCENE;;;GUN_LOADED;

Rule0001.0000 prev=   0 type=r stat=t prog=p nextpid 03 0001
       routing 0036 predicate 0120 rulelen 0278
           data 0144      vars 0278   datalen = 134
obj 1047396508 objend 1047396592
obj nxt 04 val 000  proc 0001 objname 011   ()    JOE_EMOTE
obj nxt 04 val 023  proc 0000 objname 000    1    ()
obj nxt 04 val 000  proc 0001 objname 027    ()   SCENE
obj nxt 02 val 121 ⑯  proc 0001 objname 045   MAD  JOE_EMOTE
```

```
obj nxt 02 val 000   proc 0003 objname 065    ()    JOE_EMOTE
obj nxt 02 val 127 ⑯   proc 0001 objname 087   TRUE   GUN_LOADED
obj nxt 02 val 000   proc 0003 objname 108    ()    GUN_LOADED
pred  04 t  targ 01  srce 00  oper 009   JOE_EMOTE  opr=EXISTS
pred  04 c  targ 03  srce 02  oper 003   SCENE        '1'   opr=CO ⑭
pred  02 u  targ 05  srce 04  oper 001   JOE_EMOTE    'MAD' ⑮
JOE_EMOTE  opr=S
pred  02 u  targ 07  srce 06  oper 001   GUN_LOADED
'TRUE' ⑮    GUN_LOADED  opr=S
;
;SESSION;;;JOE_EMOTE;;;1;;;SCENE;
;SESSION;;;JOE_EMOTE;^H;SCENE;;;JOE_EMOTE;
;SESSION;;;GUN_LOADED;^H;SCENE;;;GUN_LOADED;;;MAD;;;TRUE;

Rule0001.0000 prev=  0 type=r stat=t prog=p nextpid 04 0003
     routing 0036 predicate 0120 rulelen 0278
         data 0144      vars 0278  datalen = 134
obj 1047396508 objend 1047396592                          ㉕
obj nxt 04 val 000  proc 0001 objname 011    ()    JOE_EMOTE
obj nxt 04 val 023  proc 0000 objname 000    1    ()
obj nxt 04 val 000  proc 0001 objname 027    ()    SCENE
obj nxt 04 val 121  proc 0001 objname 045   MAD   JOE_EMOTE
obj nxt 04 val 000  proc 0003 objname 065    ()    JOE_EMOTE
obj nxt 04 val 127  proc 0001 objname 087   TRUE   GUN_LOADED
obj nxt 04 val 000  proc 0003 objname 108    ()    GUN_LOADED
pred  04 t  targ 01  srce 00  oper 009   JOE_EMOTE  opr=EXISTS
pred  04 c  targ 03  srce 02  oper 003   SCENE        '1'   opr=CO
pred  04 c  targ 05  srce 04  oper 001   JOE_EMOTE          'MAD'
JOE_EMOTE  opr=S
pred  04 c  targ 07  srce 06  oper 001   GUN_LOADED        'TRUE'
  GUN_LOADED  opr=S
;
;SESSION;;;JOE_EMOTE;;;1;;;SCENE;
;SESSION;;;JOE_EMOTE;^H;SCENE;;;JOE_EMOTE;
;SESSION;;;GUN_LOADED;^H;SCENE;;;GUN_LOADED;;;MAD;;;TRUE;

Rule0007.0001 ⑨ prev=   0 type=s stat=u prog=n nextpid 00 0003
     routing 0036 predicate 0060 rulelen 0121
         data 0072      vars 0121  datalen = 49
obj 1047396508 objend 1047396532                          ⑧
obj nxt 01 val 000  proc 0003 ⑩ objname 009   ()    OTHER
obj nxt 02 val 000  proc 0003 ⑩ objname 033   ()    OTHER
pred  01 u  targ 01  srce 00  oper 009 ⑪     OTHER.OBJID
opr=EXISTS
pred  02 u  targ 02  srce 00  oper 005   OTHER.OBJID  opr=SEL
;^H;SCENE;^H;OTHER;;;OBJID;^H;SCENE;^H;OTHER;;;OBJID;

Rule0007.0001 prev=  0 type=s stat=t prog=p nextpid 00 0004
     routing 0036 predicate 0060 rulelen 0121
         data 0072      vars 0121  datalen = 49
obj 1047396508 objend 1047396532                          ⑰
obj nxt 04 val 000  proc 0004 objname 017    ()    OBJID
obj nxt 04 val 000  proc 0004 objname 041    ()    OBJID
pred  04 t  targ 01  srce 00  oper 009   OBJID  opr=EXISTS
pred  04 c  targ 02  srce 00  oper 005   OBJID  opr=SEL
;^H;SCENE;^H;OTHER;;;OBJID;^H;SCENE;^H;OTHER;;;OBJID;

Rule0006.0002 prev=  0 type=s stat=u prog=n nextpid 00 0003
     routing 0036 predicate 0060 rulelen 0117
         data 0072      vars 0117  datalen = 45
obj 1047396508 objend 1047396532                          ⑧
obj nxt 01 val 000  proc 0003 objname 009    ()    ANY
obj nxt 02 val 000  proc 0003 objname 031    ()    ANY
pred  01 u  targ 01  srce 00  oper 009   ANY.OBJID  opr=EXISTS
pred  02 u  targ 02  srce 00  oper 005   ANY.OBJID  opr=SEL
;^H;SCENE;^F;ANY;;;OBJID;^H;SCENE;^F;ANY;;;OBJID;

Rule0006.0002 prev=  0 type=s stat=t prog=p nextpid 00 0005
     routing 0036 predicate 0060 rulelen 0117
         data 0072      vars 0117  datalen = 45
obj 1047396508 objend 1047396532                          ⑱
```

```
obj nxt 04 val 000  proc 0005 objname 015   ()    OBJID
obj nxt 04 val 000  proc 0005 objname 037   ()    OBJID
pred  04 t  targ 01  srce 00  oper 009  OBJID   opr=EXISTS
pred  04 c  targ 02  srce 00  oper 005  OBJID   opr=SEL
;^H;SCENE;^F;ANY;;;OBJID;^H;SCENE;^F;ANY;;;OBJID;

Rule0005.0003 prev=  0 type=r stat=u prog=n nextpid 00 0003
         routing 0036 predicate 0096 rulelen 0222
             data 0114       vars 0222  datalen = 108
obj 1047396508 objend 1047396568                                ⑧
obj nxt 01 val 000  proc 0003 ⑫ objname 009 ⑳    ()    ANY
obj nxt 01 val 000  proc 0002 ⑫ objname 031   ()    OTHER
obj nxt 01 val 000  proc 0003 objname 055   ()    ANY
obj nxt 02 val 073  proc 0000 objname 000   TRUE  ()
obj nxt 02 val 000  proc 0002 objname 088   ()    OTHER
pred  01 u  targ 02  srce 01  oper 006  OTHER.OBJID
ANY.OBJID  opr=GT
pred  01 u  targ 03  srce 00  oper 000  ANY.JOHN_SHOT  opr=
pred  02 u  targ 05  srce 04  oper 001  OTHER.JOHN_DEAD
'TRUE'  opr=S
;^H;SCENE;^F;ANY;;;OBJID;^H;SCENE;^H;OTHER;;;OBJID;^H;SCENE;-
^F;ANY;;;JOHN_SHOT;;;TRUE;^H;SCENE;^H;OTHER;;;JOHN_DEAD;

Rule0005.0003 prev=  0 type=r stat=u prog=p nextpid 00 0005
         routing 0036 predicate 0096 rulelen 0226
             data 0114       vars 0226  datalen = 112
obj 1047396508 objend 1047396568                                ⑲
obj nxt 01 val 108  proc 0005 objname 015 ㉑   1    OBJID
obj nxt 01 val 000  proc 0002 objname 031   ()    OTHER
obj nxt 01 val 000  proc 0005 objname 061   ()    JOHN_SHOT
obj nxt 02 val 073  proc 0000 objname 000   TRUE  ()
obj nxt 02 val 000  proc 0002 objname 088   ()    OTHER
pred  01 u  targ 02  srce 01  oper 006  OTHER.OBJID    '1'
OBJID  opr=GT
pred  01 u  targ 03  srce 00  oper 000  JOHN_SHOT  opr=
pred  02 u  targ 05  srce 04  oper 001  OTHER.JOHN_DEAD
'TRUE'  opr=S
;^H;SCENE;^F;ANY;;;OBJID;^H;SCENE;^H;OTHER;;;OBJID;^H;SCENE;-
^F;ANY;;;JOHN_SHOT;;;TRUE;^H;SCENE;^H;OTHER;;;JOHN_DEAD;;;1;

Rule0005.0004 prev=  3 ㉗ type=r stat=u prog=p nextpid 01 0003
         routing 0036 predicate 0096 rulelen 0226
             data 0114       vars 0226  datalen = 112
obj 1047396508 objend 1047396568                                ㉖
obj nxt 01 val 108  proc 0005 objname 015    1    OBJID
obj nxt 01 val 000  proc 0003 ㉘ objname 031   ()    OTHER
obj nxt 01 val 000  proc 0005 objname 061   ()    JOHN_SHOT
obj nxt 02 val 073  proc 0000 objname 000   TRUE  ()
obj nxt 02 val 000  proc 0003 ㉘ objname 088   ()    OTHER
pred  01 u  targ 02  srce 01  oper 006  OTHER.OBJID    '1'
OBJID  opr=GT
pred  01 u  targ 03  srce 00  oper 000  JOHN_SHOT  opr=
pred  02 u  targ 05  srce 04  oper 001  OTHER.JOHN_DEAD
'TRUE'  opr=S
;^H;SCENE;^F;ANY;;;OBJID;^H;SCENE;^H;OTHER;;;OBJID;^H;SCENE;-
^F;ANY;;;JOHN_SHOT;;;TRUE;^H;SCENE;^H;OTHER;;;JOHN_DEAD;;;1;

Rule0005.0004 prev=  3 type=r stat=f prog=p nextpid 01 0004
         routing 0036 predicate 0096 rulelen 0226
             data 0114       vars 0226  datalen = 112
obj 1047396508 objend 1047396568
obj nxt 04 val 108  proc 0005 objname 015    1    OBJID
obj nxt 04 val 000  proc 0004 objname 039   ()    OBJID
obj nxt 01 val 000  proc 0005 objname 061   ()    JOHN_SHOT
obj nxt 02 val 073  proc 0000 objname 000   TRUE  ()
obj nxt 02 val 000  proc 0004 objname 096   ()    JOHN_DEAD
pred  04 f  targ 02  srce 01  oper 006  OBJID    '1'    OBJID
opr=GT
pred  01 u  targ 03  srce 00  oper 000  JOHN_SHOT  opr=
pred  02 u  targ 05  srce 04  oper 001  JOHN_DEAD   'TRUE'
opr=S
;^H;SCENE;^F;ANY;;;OBJID;^H;SCENE;^H;OTHER;;;OBJID;^H;SCENE;-
^F;ANY;;;JOHN_SHOT;;;TRUE;^H;SCENE;^H;OTHER;;;JOHN_DEAD;;;1;
```

```
Rule0004.0005 prev=  0 type=r stat=t prog=p nextpid 01 0003
      routing 0036 predicate 0084 rulelen 0129
            data 0096       vars 0129  datalen = 33
obj 1047396508 objend 1047396556                              ⑧  ⑬
obj nxt 04 val 001  proc 0000 objname 000   1   ()
obj nxt 04 val 000  proc 0003 objname 013   ()  OBJID
obj nxt 02 val 021  proc 0000 objname 000   2   ()
obj nxt 02 val 000  proc 0001 objname 025   ()  SCENE
pred 04 t  targ 02  srce 01  oper 004  OBJID      '1'  opr==
pred 02 u  targ 04  srce 03  oper 003  SCENE     '2'  opr=CO
;;;1;^H;SCENE;;;OBJID;;;2;;;SCENE;

Rule0004.0006 prev=  0 type=r stat=f prog=p nextpid 01 0006
      routing 0036 predicate 0084 rulelen 0129
            data 0096       vars 0129  datalen = 33
obj 1047396508 objend 1047396556                              ㉔
obj nxt 04 val 001  proc 0000 objname 000   1   ()
obj nxt 04 val 000  proc 0006 objname 013   ()  OBJID
obj nxt 02 val 021  proc 0000 objname 000   2   ()
obj nxt 02 val 000  proc 0001 objname 025   ()  SCENE
pred 04 f  targ 02  srce 01  oper 004  OBJID      '1'  opr==
pred 02 u  targ 04  srce 03  oper 003  SCENE     '2'  opr=CO
;;;1;^H;SCENE;;;OBJID;;;2;;;SCENE;

Rule0005.0007 prev=  3 type=r stat=u prog=p nextpid 01 0006
      routing 0036 predicate 0096 rulelen 0226
            data 0114       vars 0226  datalen = 112
obj 1047396508 objend 1047396568                              ㉙
obj nxt 01 val 108  proc 0005 objname 015   1   OBJID
obj nxt 01 val 000  proc 0006 objname 031   ()  OTHER
obj nxt 01 val 000  proc 0005 objname 061   ()  JOHN_SHOT
obj nxt 02 val 073  proc 0000 objname 000   TRUE ()
obj nxt 02 val 000  proc 0006 objname 088   ()  OTHER
pred 01 u  targ 02  srce 01  oper 006  OTHER.OBJID      '1'
OBJID opr=GT
pred 01 u  targ 03  srce 00  oper 000  JOHN_SHOT  opr=
pred 02 u  targ 05  srce 04  oper 001  OTHER.JOHN_DEAD
'TRUE'  opr=S
;^H;SCENE;^F;ANY;;;OBJID;^H;SCENE;^H;OTHER;;;OBJID;^H;SCENE;-
^F;ANY;;;JOHN_SHOT;;;TRUE;^H;SCENE;^H;OTHER;;;JOHN_DEAD;;;1;

Rule0005.0008 prev=  0 type=r stat=u prog=n nextpid 00 0006
      routing 0036 predicate 0096 rulelen 0222
            data 0114       vars 0222  datalen = 108
obj 1047396508 objend 1047396568
obj nxt 01 val 000  proc 0006 objname 009   ()  ANY
obj nxt 01 val 000  proc 0002 objname 031   ()  OTHER
obj nxt 01 val 000  proc 0006 objname 055   ()  ANY
obj nxt 02 val 073  proc 0000 objname 000   TRUE ()
obj nxt 02 val 000  proc 0002 objname 088   ()  OTHER
pred 01 u  targ 02  srce 01  oper 006  OTHER.OBJID
ANY.OBJID  opr=GT
pred 01 u  targ 03  srce 00  oper 000  ANY.JOHN_SHOT  opr=
pred 02 u  targ 05  srce 04  oper 001  OTHER.JOHN_DEAD
'TRUE'  opr=S
;^H;SCENE;^F;ANY;;;OBJID;^H;SCENE;^H;OTHER;;;OBJID;^H;SCENE;-
^F;ANY;;;JOHN_SHOT;;;TRUE;^H;SCENE;^H;OTHER;;;JOHN_DEAD;

Rule0006.0009 prev=  0 type=s stat=u prog=n nextpid 00 0006
      routing 0036 predicate 0060 rulelen 0117
            data 0072       vars 0117  datalen = 45
obj 1047396508 objend 1047396532
obj nxt 01 val 000  proc 0006 objname 009   ()  ANY
obj nxt 02 val 000  proc 0006 objname 031   ()  ANY
pred 01 u  targ 01  srce 00  oper 009  ANY.OBJID  opr=EXISTS
pred 02 u  targ 02  srce 00  oper 005  ANY.OBJID  opr=SEL
;^H;SCENE;^F;ANY;;;OBJID;^H;SCENE;^F;ANY;;;OBJID;

Rule0007.0010 prev=  0 type=s stat=u prog=n nextpid 00 0006
      routing 0036 predicate 0060 rulelen 0121
            data 0072       vars 0121  datalen = 49
```

```
obj 1047396508 objend 1047396532
obj  nxt 01 val 000   proc 0006 objname 009    ()    OTHER
obj  nxt 02 val 000   proc 0006 objname 033    ()    OTHER
pred  01 u   targ 01   srce 00   oper 009    OTHER.OBJID   opr=EXISTS
pred  02 u   targ 02   srce 00   oper 005    OTHER.OBJID   opr=SEL
;^H;SCENE;^H;OTHER;;;OBJID;^H;SCENE;^H;OTHER;;;OBJID;

Rule0006.0009 prev=  0 type=s stat=t prog=p nextpid 00 0008
        routing 0036 predicate 0060 rulelen 0117
            data 0072       vars 0117  datalen = 45
obj 1047396508 objend 1047396532
obj  nxt 04 val 000   proc 0008 objname 015    ()    OBJID
obj  nxt 04 val 000   proc 0008 objname 037    ()    OBJID
pred  04 t   targ 01   srce 00   oper 009    OBJID  opr=EXISTS
pred  04 c   targ 02   srce 00   oper 005    OBJID  opr=SEL
;^H;SCENE;^F;ANY;;;OBJID;^H;SCENE;^F;ANY;;;OBJID;

Rule0005.0008 prev=  0 type=r stat=u prog=p nextpid 00 0008
        routing 0036 predicate 0096 rulelen 0226
            data 0114       vars 0226  datalen = 112
obj 1047396508 objend 1047396568                                    (30)
obj  nxt 01 val 108   proc 0008 objname 015    2    OBJID
obj  nxt 01 val 000   proc 0002 objname 031    ()   OTHER
obj  nxt 01 val 000   proc 0008 objname 061    ()   JOHN_SHOT
obj  nxt 02 val 073   proc 0000 objname 000    TRUE ()
obj  nxt 02 val 000   proc 0002 objname 088    ()   OTHER
pred  01 u   targ 02   srce 01   oper 006    OTHER.OBJID    '2'
OBJID  opr=GT
pred  01 u   targ 03   srce 00   oper 000    JOHN_SHOT  opr=
pred  02 u   targ 05   srce 04   oper 001    OTHER.JOHN_DEAD
'TRUE'  opr=S
;^H;SCENE;^F;ANY;;;OBJID;^H;SCENE;^H;OTHER;;;OBJID;^H;SCENE;-
^F;ANY;;;JOHN_SHOT;;;TRUE;^H;SCENE;^H;OTHER;;;JOHN_DEAD;;;2;

Rule0007.0010 prev=  0 type=s stat=t prog=p nextpid 00 0007
        routing 0036 predicate 0060 rulelen 0121
            data 0072       vars 0121  datalen = 49
obj 1047396508 objend 1047396532
obj  nxt 04 val 000   proc 0007 objname 017    ()    OBJID
obj  nxt 04 val 000   proc 0007 objname 041    ()    OBJID
pred  04 t   targ 01   srce 00   oper 009    OBJID  opr=EXISTS
pred  04 c   targ 02   srce 00   oper 005    OBJID  opr=SEL
;^H;SCENE;^H;OTHER;;;OBJID;^H;SCENE;^H;OTHER;;;OBJID;

Rule0005.0007 prev=  3 type=r stat=u prog=p nextpid 01 0007
        routing 0036 predicate 0096 rulelen 0226
            data 0114       vars 0226  datalen = 112
obj 1047396508 objend 1047396568
obj  nxt 04 val 108   proc 0005 objname 015    1    OBJID
obj  nxt 04 val 000   proc 0007 objname 039    ()   OBJID
obj  nxt 01 val 000   proc 0005 objname 061    ()   JOHN_SHOT
obj  nxt 02 val 073   proc 0000 objname 000    TRUE ()
obj  nxt 02 val 000   proc 0007 objname 096    ()   JOHN_DEAD
pred  04 t   targ 02   srce 01   oper 006    OBJID    '1'       OBJID
opr=GT
pred  01 u   targ 03   srce 00   oper 000    JOHN_SHOT  opr=
pred  02 u   targ 05   srce 04   oper 001    JOHN_DEAD    'TRUE'
opr=S
;^H;SCENE;^F;ANY;;;OBJID;^H;SCENE;^H;OTHER;;;OBJID;^H;SCENE;-
^F;ANY;;;JOHN_SHOT;;;TRUE;^H;SCENE;^H;OTHER;;;JOHN_DEAD;;;1;

Rule0005.0011 prev=  8 type=r stat=u prog=p nextpid 01 0006
        routing 0036 predicate 0096 rulelen 0226
            data 0114       vars 0226  datalen = 112
obj 1047396508 objend 1047396568
obj  nxt 01 val 108   proc 0008 objname 015    2    OBJID
obj  nxt 01 val 000   proc 0006 objname 031    ()   OTHER
obj  nxt 01 val 000   proc 0008 objname 061    ()   JOHN_SHOT
obj  nxt 02 val 073   proc 0000 objname 000    TRUE ()
obj  nxt 02 val 000   proc 0006 objname 088    ()   OTHER
pred  01 u   targ 02   srce 01   oper 006    OTHER.OBJID    '2'
```

```
OBJID opr=GT
pred  01 u  targ 03  srce 00  oper 000   JOHN_SHOT   opr=
pred  02 u  targ 05  srce 04  oper 001   OTHER.JOHN_DEAD
'TRUE'  opr=S
;^H;SCENE;^F;ANY;;;OBJID;^H;SCENE;^H;OTHER;;;OBJID;^H;SCENE;-
^F;ANY;;;JOHN_SHOT;;;TRUE;^H;SCENE;^H;OTHER;;;JOHN_DEAD;;;2;

Rule0005.0012 prev=  8 type=r stat=u prog=p nextpid 01 0003
      routing 0036 predicate 0096 rulelen 0226
        data 0114       vars 0226  datalen = 112
obj 1047396508 objend 1047396568
obj nxt 01 val 108  proc 0008 objname 015   2    OBJID
obj nxt 01 val 000  proc 0003 objname 031   ()   OTHER
obj nxt 01 val 000  proc 0008 objname 061   ()   JOHN_SHOT
obj nxt 02 val 073  proc 0000 objname 000   TRUE ()
obj nxt 02 val 000  proc 0003 objname 088   ()   OTHER
pred  01 u  targ 02  srce 01  oper 006   OTHER.OBJID     '2'
OBJID opr=GT
pred  01 u  targ 03  srce 00  oper 000   JOHN_SHOT   opr=
pred  02 u  targ 05  srce 04  oper 001   OTHER.JOHN_DEAD
'TRUE'  opr=S
;^H;SCENE;^F;ANY;;;OBJID;^H;SCENE;^H;OTHER;;;OBJID;^H;SCENE;-
^F;ANY;;;JOHN_SHOT;;;TRUE;^H;SCENE;^H;OTHER;;;JOHN_DEAD;;;2;

Rule0005.0007 prev=  3 type=r stat=u prog=p nextpid 02 0005
      routing 0036 predicate 0096 rulelen 0226
        data 0114       vars 0226  datalen = 112
obj 1047396508 objend 1047396568
obj nxt 04 val 108  proc 0005 objname 015   1    OBJID
obj nxt 04 val 000  proc 0007 objname 039   ()   OBJID
obj nxt 01 val 000  proc 0005 objname 061   ()   JOHN_SHOT
obj nxt 02 val 073  proc 0000 objname 000   TRUE ()
obj nxt 02 val 000  proc 0007 objname 096   ()   JOHN_DEAD
pred  04 t  targ 02  srce 01  oper 006   OBJID           '1'       OBJID
opr=GT
pred  01 u  targ 03  srce 00  oper 000   JOHN_SHOT   opr=
pred  02 u  targ 05  srce 04  oper 001   JOHN_DEAD       'TRUE'
opr=S
;^H;SCENE;^F;ANY;;;OBJID;^H;SCENE;^H;OTHER;;;OBJID;^H;SCENE;-
^F;ANY;;;JOHN_SHOT;;;TRUE;^H;SCENE;^H;OTHER;;;JOHN_DEAD;;;1;

Rule0005.0011 prev=  8 type=r stat=f prog=p nextpid 01 0007
      routing 0036 predicate 0096 rulelen 0226
        data 0114       vars 0226  datalen = 112
obj 1047396508 objend 1047396568
obj nxt 04 val 108  proc 0008 objname 015   2    OBJID
obj nxt 04 val 000  proc 0007 objname 039   ()   OBJID
obj nxt 01 val 000  proc 0008 objname 061   ()   JOHN_SHOT
obj nxt 02 val 073  proc 0000 objname 000   TRUE ()
obj nxt 02 val 000  proc 0007 objname 096   ()   JOHN_DEAD
pred  04 f  targ 02  srce 01  oper 006   OBJID           '2'       OBJID
opr=GT
pred  01 u  targ 03  srce 00  oper 000   JOHN_SHOT   opr=
pred  02 u  targ 05  srce 04  oper 001   JOHN_DEAD       'TRUE'
opr=S
;^H;SCENE;^F;ANY;;;OBJID;^H;SCENE;^H;OTHER;;;OBJID;^H;SCENE;-
^F;ANY;;;JOHN_SHOT;;;TRUE;^H;SCENE;^H;OTHER;;;JOHN_DEAD;;;2;

Rule0005.0012 prev=  8 type=r stat=f prog=p nextpid 01 0004
      routing 0036 predicate 0096 rulelen 0226
        data 0114       vars 0226  datalen = 112
obj 1047396508 objend 1047396568
obj nxt 04 val 108  proc 0008 objname 015   2    OBJID
obj nxt 04 val 000  proc 0004 objname 039   ()   OBJID
obj nxt 01 val 000  proc 0008 objname 061   ()   JOHN_SHOT
obj nxt 02 val 073  proc 0000 objname 000   TRUE ()
obj nxt 02 val 000  proc 0004 objname 096   ()   JOHN_DEAD
pred  04 f  targ 02  srce 01  oper 006   OBJID           '2'       OBJID
opr=GT
pred  01 u  targ 03  srce 00  oper 000   JOHN_SHOT   opr=
pred  02 u  targ 05  srce 04  oper 001   JOHN_DEAD       'TRUE'
opr=S
```

;^H;SCENE;^F;ANY;;;OBJID;^H;SCENE;^H;OTHER;;;OBJID;^H;SCENE;-
^F;ANY;;;JOHN_SHOT;;;TRUE;^H;SCENE;^H;OTHER;;;JOHN_DEAD;;;2;

```
Rule0005.0007 prev=   3 type=r stat=u prog=p nextpid 04 0007
      routing 0036 predicate 0096 rulelen 0226
           data 0114      vars 0226  datalen = 112
obj 1047396508 objend 1047396568
obj nxt 04 val 108  proc 0005 objname 015   1    OBJID
obj nxt 04 val 000  proc 0007 objname 039   ()   OBJID
obj nxt 01 val 000  proc 0005 objname 061   ()   JOHN_SHOT
obj nxt 02 val 073  proc 0000 objname 000   TRUE ()
obj nxt 02 val 000  proc 0007 objname 096   ()   JOHN_DEAD
pred  04 t  targ 02  srce 01  oper 006   OBJID     '1'       OBJID
opr=GT
pred  01 u  targ 03  srce 00  oper 000   JOHN_SHOT opr=
pred  02 u  targ 05  srce 04  oper 001   JOHN_DEAD     'TRUE'
opr=S
```
;^H;SCENE;^F;ANY;;;OBJID;^H;SCENE;^H;OTHER;;;OBJID;^H;SCENE;-
^F;ANY;;;JOHN_SHOT;;;TRUE;^H;SCENE;^H;OTHER;;;JOHN_DEAD;;;1;

```
Rule0005.0007 prev=   3 type=r stat=u prog=n nextpid 02 0005
      routing 0036 predicate 0096 rulelen 0226
           data 0114      vars 0226  datalen = 112
obj 1047396508 objend 1047396568
obj nxt 04 val 108  proc 0005 objname 015   1    OBJID
obj nxt 04 val 000  proc 0007 objname 039   ()   OBJID
obj nxt 01 val 000  proc 0005 objname 061   ()   JOHN_SHOT
obj nxt 02 val 073  proc 0000 objname 000   TRUE ()
obj nxt 02 val 000  proc 0007 objname 096   ()   JOHN_DEAD
pred  04 t  targ 02  srce 01  oper 006   OBJID     '1'       OBJID
opr=GT
pred  01 u  targ 03  srce 00  oper 000   JOHN_SHOT opr=
pred  02 u  targ 05  srce 04  oper 001   JOHN_DEAD     'TRUE'
opr=S
```
;^H;SCENE;^F;ANY;;;OBJID;^H;SCENE;^H;OTHER;;;OBJID;^H;SCENE;-
^F;ANY;;;JOHN_SHOT;;;TRUE;^H;SCENE;^H;OTHER;;;JOHN_DEAD;;;1;

```
Rule0005.0007 prev=   3 type=r stat=u prog=n nextpid 04 0007
      routing 0036 predicate 0096 rulelen 0226
           data 0114      vars 0226  datalen = 112
obj 1047396508 objend 1047396568
obj nxt 04 val 108  proc 0005 objname 015   1    OBJID
obj nxt 04 val 000  proc 0007 objname 039   ()   OBJID
obj nxt 01 val 000  proc 0005 objname 061   ()   JOHN_SHOT
obj nxt 02 val 073  proc 0000 objname 000   TRUE ()
obj nxt 02 val 000  proc 0007 objname 096   ()   JOHN_DEAD
pred  04 t  targ 02  srce 01  oper 006   OBJID     '1'       OBJID
opr=GT
pred  01 u  targ 03  srce 00  oper 000   JOHN_SHOT opr=
pred  02 u  targ 05  srce 04  oper 001   JOHN_DEAD     'TRUE'
opr=S
```
;^H;SCENE;^F;ANY;;;OBJID;^H;SCENE;^H;OTHER;;;OBJID;^H;SCENE;-
^F;ANY;;;JOHN_SHOT;;;TRUE;^H;SCENE;^H;OTHER;;;JOHN_DEAD;;;1;

```
Rule0003.0013 prev=   0 type=r stat=u prog=p nextpid 00 0006
      routing 0036 predicate 0084 rulelen 0167
           data 0102      vars 0167  datalen = 65
obj 1047396508 objend 1047396556
obj nxt 04 val 000  proc 0006 objname 009   ()   OBJID
obj nxt 01 val 000  proc 0006 objname 025   ()   JOHN_DEAD
obj nxt 02 val 037  proc 0000 objname 000   TRUE ()
obj nxt 02 val 000  proc 0006 objname 052   ()   JOHN_ALIVE
pred  04 t  targ 01  srce 00  oper 009   OBJID     opr=EXISTS
pred  01 u  targ 02  srce 00  oper 010   JOHN_DEAD opr=^EXISTS
pred  02 u  targ 04  srce 03  oper 001   JOHN_ALIVE    'TRUE'
opr=S
```
;^H;SCENE;;;OBJID;^H;SCENE;;;JOHN_DEAD;;;TRUE;^H;SCENE;;;JOHN_AL-
IVE;

```
Rule0003.0013 prev=   0 type=r stat=u prog=p nextpid 01 0006
      routing 0036 predicate 0084 rulelen 0167
```

```
              data 0102      vars 0167   datalen = 65
obj 1047396508 objend 1047396556
obj nxt 04 val 000  proc 0006 objname 009    ()   OBJID
obj nxt 01 val 000  proc 0006 objname 025    ()   JOHN_DEAD
obj nxt 02 val 037  proc 0000 objname 000   TRUE   ()
obj nxt 02 val 000  proc 0006 objname 052    ()   JOHN_ALIVE
pred  04 t  targ 01  srce 00  oper 009   OBJID  opr=EXISTS
pred  01 u  targ 02  srce 00  oper 010   JOHN_DEAD opr=^EXISTS
pred  02 u  targ 04  srce 03  oper 001   JOHN_ALIVE    'TRUE'
opr=S
;^H;SCENE;;;OBJID;^H;SCENE;;;JOHN_DEAD;;;TRUE;^H;SCENE;;;JOHN_AL-
IVE;

Rule0003.0013 prev=  0 type=r stat=u prog=p nextpid 03 0006
      routing 0036 predicate 0084 rulelen 0167
           data 0102      vars 0167   datalen = 65
obj 1047396508 objend 1047396556
obj nxt 04 val 000  proc 0006 objname 009    ()   OBJID
obj nxt 01 val 000  proc 0006 objname 025    ()   JOHN_DEAD
obj nxt 02 val 037  proc 0000 objname 000   TRUE   ()
obj nxt 02 val 000  proc 0006 objname 052    ()   JOHN_ALIVE
pred  04 t  targ 01  srce 00  oper 009   OBJID  opr=EXISTS
pred  01 u  targ 02  srce 00  oper 010   JOHN_DEAD opr=^EXISTS
pred  02 u  targ 04  srce 03  oper 001   JOHN_ALIVE    'TRUE'
opr=S
;^H;SCENE;;;OBJID;^H;SCENE;;;JOHN_DEAD;;;TRUE;^H;SCENE;;;JOHN_AL-
IVE;

Rule0003.0013 prev=  0 type=r stat=u prog=n nextpid 01 0006
      routing 0036 predicate 0084 rulelen 0167
           data 0102      vars 0167   datalen = 65
obj 1047396508 objend 1047396556
obj nxt 04 val 000  proc 0006 objname 009    ()   OBJID
obj nxt 01 val 000  proc 0006 objname 025    ()   JOHN_DEAD
obj nxt 02 val 037  proc 0000 objname 000   TRUE   ()
obj nxt 02 val 000  proc 0006 objname 052    ()   JOHN_ALIVE
pred  04 t  targ 01  srce 00  oper 009   OBJID  opr=EXISTS
pred  01 u  targ 02  srce 00  oper 010   JOHN_DEAD opr=^EXISTS
pred  02 u  targ 04  srce 03  oper 001   JOHN_ALIVE    'TRUE'
opr=S
;^H;SCENE;;;OBJID;^H;SCENE;;;JOHN_DEAD;;;TRUE;^H;SCENE;;;JOHN_AL-
IVE;

Rule0003.0013 prev=  0 type=r stat=u prog=n nextpid 03 0006
      routing 0036 predicate 0084 rulelen 0167
           data 0102      vars 0167   datalen = 65
obj 1047396508 objend 1047396556
obj nxt 04 val 000  proc 0006 objname 009    ()   OBJID
obj nxt 01 val 000  proc 0006 objname 025    ()   JOHN_DEAD
obj nxt 02 val 037  proc 0000 objname 000   TRUE   ()
obj nxt 02 val 000  proc 0006 objname 052    ()   JOHN_ALIVE
pred  04 t  targ 01  srce 00  oper 009   OBJID  opr=EXISTS
pred  01 u  targ 02  srce 00  oper 010   JOHN_DEAD opr=^EXISTS
pred  02 u  targ 04  srce 03  oper 001   JOHN_ALIVE    'TRUE'
opr=S
;^H;SCENE;;;OBJID;^H;SCENE;;;JOHN_DEAD;;;TRUE;^H;SCENE;;;JOHN_AL-
IVE;

Rule0003.0014 prev=  0 type=r stat=u prog=p nextpid 00 0003
      routing 0036 predicate 0084 rulelen 0167
           data 0102      vars 0167   datalen = 65
obj 1047396508 objend 1047396556
obj nxt 04 val 000  proc 0003 objname 009    ()   OBJID
obj nxt 01 val 000  proc 0003 objname 025    ()   JOHN_DEAD
obj nxt 02 val 037  proc 0000 objname 000   TRUE   ()
obj nxt 02 val 000  proc 0003 objname 052    ()   JOHN_ALIVE
pred  04 t  targ 01  srce 00  oper 009   OBJID  opr=EXISTS
pred  01 u  targ 02  srce 00  oper 010   JOHN_DEAD opr=^EXISTS
pred  02 u  targ 04  srce 03  oper 001   JOHN_ALIVE    'TRUE'
opr=S
;^H;SCENE;;;OBJID;^H;SCENE;;;JOHN_DEAD;;;TRUE;^H;SCENE;;;JOHN_AL-
IVE;
```

```
Rule0003.0014 prev=  0 type=r stat=u prog=p nextpid 01 0003
      routing 0036 predicate 0084 rulelen 0167
            data 0102      vars 0167  datalen = 65
obj 1047396508 objend 1047396556
obj nxt 04 val 000  proc 0003 objname 009     ()    OBJID
obj nxt 01 val 000  proc 0003 objname 025     ()    JOHN_DEAD
obj nxt 02 val 037  proc 0000 objname 000     TRUE  ()
obj nxt 02 val 000  proc 0003 objname 052     ()    JOHN_ALIVE
pred  04 t  targ 01  srce 00  oper 009   OBJID  opr=EXISTS
pred  01 u  targ 02  srce 00  oper 010   JOHN_DEAD opr=^EXISTS
pred  02 u  targ 04  srce 03  oper 001   JOHN_ALIVE     'TRUE'
opr=S
;^H;SCENE;;;OBJID;^H;SCENE;;;JOHN_DEAD;;;TRUE;^H;SCENE;;;JOHN_AL-
IVE;

Rule0003.0014 prev=  0 type=r stat=u prog=p nextpid 03 0003
      routing 0036 predicate 0084 rulelen 0167
            data 0102      vars 0167  datalen = 65
obj 1047396508 objend 1047396556
obj nxt 04 val 000  proc 0003 objname 009     ()    OBJID
obj nxt 01 val 000  proc 0003 objname 025     ()    JOHN_DEAD
obj nxt 02 val 037  proc 0000 objname 000     TRUE  ()
obj nxt 02 val 000  proc 0003 objname 052     ()    JOHN_ALIVE
pred  04 t  targ 01  srce 00  oper 009   OBJID  opr=EXISTS
pred  01 u  targ 02  srce 00  oper 010   JOHN_DEAD opr=^EXISTS
pred  02 u  targ 04  srce 03  oper 001   JOHN_ALIVE     'TRUE'
opr=S
;^H;SCENE;;;OBJID;^H;SCENE;;;JOHN_DEAD;;;TRUE;^H;SCENE;;;JOHN_AL-
IVE;

Rule0003.0014 prev=  0 type=r stat=u prog=n nextpid 01 0003
      routing 0036 predicate 0084 rulelen 0167
            data 0102      vars 0167  datalen = 65
obj 1047396508 objend 1047396556
obj nxt 04 val 000  proc 0003 objname 009     ()    OBJID
obj nxt 01 val 000  proc 0003 objname 025     ()    JOHN_DEAD
obj nxt 02 val 037  proc 0000 objname 000     TRUE  ()
obj nxt 02 val 000  proc 0003 objname 052     ()    JOHN_ALIVE
pred  04 t  targ 01  srce 00  oper 009   OBJID  opr=EXISTS
pred  01 u  targ 02  srce 00  oper 010   JOHN_DEAD opr=^EXISTS
pred  02 u  targ 04  srce 03  oper 001   JOHN_ALIVE     'TRUE'
opr=S
;^H;SCENE;;;OBJID;^H;SCENE;;;JOHN_DEAD;;;TRUE;^H;SCENE;;;JOHN_AL-
IVE;

Rule0003.0014 prev=  0 type=r stat=u prog=n nextpid 03 0003
      routing 0036 predicate 0084 rulelen 0167
            data 0102      vars 0167  datalen = 65
obj 1047396508 objend 1047396556
obj nxt 04 val 000  proc 0003 objname 009     ()    OBJID
obj nxt 01 val 000  proc 0003 objname 025     ()    JOHN_DEAD
obj nxt 02 val 037  proc 0000 objname 000     TRUE  ()
obj nxt 02 val 000  proc 0003 objname 052     ()    JOHN_ALIVE
pred  04 t  targ 01  srce 00  oper 009   OBJID  opr=EXISTS
pred  01 u  targ 02  srce 00  oper 010   JOHN_DEAD opr=^EXISTS
pred  02 u  targ 04  srce 03  oper 001   JOHN_ALIVE     'TRUE'
opr=S
;^H;SCENE;;;OBJID;^H;SCENE;;;JOHN_DEAD;;;TRUE;^H;SCENE;;;JOHN_AL-
IVE;

Rule0002.0015 prev=  0 type=r stat=u prog=n nextpid 01 0006
      routing 0036 predicate 0108 rulelen 0228
            data 0132      vars 0228  datalen = 96                  (31)
obj 1047396508 objend 1047396580
obj nxt 01 val 001  proc 0000 objname 000     MAD   ()
obj nxt 01 val 000  proc 0006 objname 015     ()    JOE_EMOTE
obj nxt 01 val 000  proc 0006 objname 035     ()    GUN_LOADED
obj nxt 01 val 000  proc 0006 objname 056     ()    JOHN_ALIVE
obj nxt 02 val 069  proc 0000 objname 000     TRUE  ()
obj nxt 02 val 000  proc 0006 objname 084     ()    JOHN_SHOT
pred  01 u  targ 02  srce 01  oper 004   JOE_EMOTE      'MAD'
```

```
opr==
pred   01 u   targ 03   srce 00   oper 000   GUN_LOADED   opr=
pred   01 u   targ 04   srce 00   oper 000   JOHN_ALIVE   opr=
pred   02 u   targ 06   srce 05   oper 001   JOHN_SHOT              'TRUE'
opr=S
;;;MAD;^H;SCENE;;;JOE_EMOTE;^H;SCENE;;;GUN_LOADED;^H;SCENE;-
;;JOHN_ALIVE;;;TRUE;^H;SCENE;;;JOHN_SHOT;

Rule0002.0015 prev=  0 type=r stat=u prog=n nextpid 02 0006
        routing 0036 predicate 0108 rulelen 0228
            data 0132       vars 0228  datalen = 96
obj 1047396508 objend 1047396580
obj nxt 01 val 001   proc 0000 objname 000    MAD      ()
obj nxt 01 val 000   proc 0006 objname 015    ()   JOE_EMOTE
obj nxt 01 val 000   proc 0006 objname 035    ()   GUN_LOADED
obj nxt 01 val 000   proc 0006 objname 056    ()   JOHN_ALIVE
obj nxt 02 val 069   proc 0000 objname 000    TRUE     ()
obj nxt 02 val 000   proc 0006 objname 084    ()   JOHN_SHOT
pred   01 u   targ 02   srce 01   oper 004   JOE_EMOTE            'MAD'
opr==
pred   01 u   targ 03   srce 00   oper 000   GUN_LOADED   opr=
pred   01 u   targ 04   srce 00   oper 000   JOHN_ALIVE   opr=
pred   02 u   targ 06   srce 05   oper 001   JOHN_SHOT              'TRUE'
opr=S
;;;MAD;^H;SCENE;;;JOE_EMOTE;^H;SCENE;;;GUN_LOADED;^H;SCENE;-
;;JOHN_ALIVE;;;TRUE;^H;SCENE;;;JOHN_SHOT;

Rule0002.0015 prev=  0 type=r stat=u prog=n nextpid 03 0006
        routing 0036 predicate 0108 rulelen 0228
            data 0132       vars 0228  datalen = 96
obj 1047396508 objend 1047396580
obj nxt 01 val 001   proc 0000 objname 000    MAD      ()
obj nxt 01 val 000   proc 0006 objname 015    ()   JOE_EMOTE
obj nxt 01 val 000   proc 0006 objname 035    ()   GUN_LOADED
obj nxt 01 val 000   proc 0006 objname 056    ()   JOHN_ALIVE
obj nxt 02 val 069   proc 0000 objname 000    TRUE     ()
obj nxt 02 val 000   proc 0006 objname 084    ()   JOHN_SHOT
pred   01 u   targ 02   srce 01   oper 004   JOE_EMOTE            'MAD'
opr==
pred   01 u   targ 03   srce 00   oper 000   GUN_LOADED   opr=
pred   01 u   targ 04   srce 00   oper 000   JOHN_ALIVE   opr=
pred   02 u   targ 06   srce 05   oper 001   JOHN_SHOT              'TRUE'
opr=S
;;;MAD;^H;SCENE;;;JOE_EMOTE;^H;SCENE;;;GUN_LOADED;^H;SCENE;-
;;JOHN_ALIVE;;;TRUE;^H;SCENE;;;JOHN_SHOT;

Rule0002.0015 prev=  0 type=r stat=u prog=n nextpid 05 0006
        routing 0036 predicate 0108 rulelen 0228
            data 0132       vars 0228  datalen = 96
obj 1047396508 objend 1047396580
obj nxt 01 val 001  'proc 0000 objname 000    MAD      ()
obj nxt 01 val 000   proc 0006 objname 015    ()   JOE_EMOTE
obj nxt 01 val 000   proc 0006 objname 035    ()   GUN_LOADED
obj nxt 01 val 000   proc 0006 objname 056    ()   JOHN_ALIVE
obj nxt 02 val 069   proc 0000 objname 000    TRUE     ()
obj nxt 02 val 000   proc 0006 objname 084    ()   JOHN_SHOT
pred   01 u   targ 02   srce 01   oper 004   JOE_EMOTE            'MAD'
opr==
pred   01 u   targ 03   srce 00   oper 000   GUN_LOADED   opr=
pred   01 u   targ 04   srce 00   oper 000   JOHN_ALIVE   opr=
pred   02 u   targ 06   srce 05   oper 001   JOHN_SHOT              'TRUE'
opr=S
;;;MAD;^H;SCENE;;;JOE_EMOTE;^H;SCENE;;;GUN_LOADED;^H;SCENE;-
;;JOHN_ALIVE;;;TRUE;^H;SCENE;;;JOHN_SHOT;

Rule0002.0016 prev=  0 type=r stat=u prog=p nextpid 01 0003
        routing 0036 predicate 0108 rulelen 0228
            data 0132       vars 0228  datalen = 96
obj 1047396508 objend 1047396580
obj nxt 04 val 001   proc 0000 objname 000    MAD      ()
obj nxt 04 val 000   proc 0003 objname 015    ()   JOE_EMOTE
```

```
obj nxt 04 val 000  proc 0003 objname 035   ()    GUN_LOADED
obj nxt 01 val 000  proc 0003 objname 056   ()    JOHN_ALIVE
obj nxt 02 val 069  proc 0000 objname 000   TRUE  ()
obj nxt 02 val 000  proc 0003 objname 084   ()    JOHN_SHOT
pred  04 t  targ 02  srce 01  oper 004   JOE_EMOTE    'MAD'
opr==
pred  04 t  targ 03  srce 00  oper 000   GUN_LOADED  opr=
pred  01 u  targ 04  srce 00  oper 000   JOHN_ALIVE  opr=
pred  02 u  targ 06  srce 05  oper 001   JOHN_SHOT    'TRUE'
opr=S
;;;MAD;^H;SCENE;;;JOE_EMOTE;^H;SCENE;;;GUN_LOADED;^H;SCENE;-
;;JOHN_ALIVE;;;TRUE;^H;SCENE;;;JOHN_SHOT;

Rule0002.0016 prev=  0 type=r stat=u prog=p nextpid 03 0003
     routing 0036 predicate 0108 rulelen 0228
         data 0132      vars 0228   datalen = 96
obj 1047396508 objend 1047396580
obj nxt 04 val 001  proc 0000 objname 000   MAD   ()
obj nxt 04 val 000  proc 0003 objname 015   ()    JOE_EMOTE
obj nxt 04 val 000  proc 0003 objname 035   ()    GUN_LOADED
obj nxt 01 val 000  proc 0003 objname 056   ()    JOHN_ALIVE
obj nxt 02 val 069  proc 0000 objname 000   TRUE  ()
obj nxt 02 val 000  proc 0003 objname 084   ()    JOHN_SHOT
pred  04 t  targ 02  srce 01  oper 004   JOE_EMOTE    'MAD'
opr==
pred  04 t  targ 03  srce 00  oper 000   GUN_LOADED  opr=
pred  01 u  targ 04  srce 00  oper 000   JOHN_ALIVE  opr=
pred  02 u  targ 06  srce 05  oper 001   JOHN_SHOT    'TRUE'
opr=S
;;;MAD;^H;SCENE;;;JOE_EMOTE;^H;SCENE;;;GUN_LOADED;^H;SCENE;-
;;JOHN_ALIVE;;;TRUE;^H;SCENE;;;JOHN_SHOT;

Rule0002.0016 prev=  0 type=r stat=u prog=p nextpid 05 0003
     routing 0036 predicate 0108 rulelen 0228
         data 0132      vars 0228   datalen = 96
obj 1047396508 objend 1047396580
obj nxt 04 val 001  proc 0000 objname 000   MAD   ()
obj nxt 04 val 000  proc 0003 objname 015   ()    JOE_EMOTE
obj nxt 04 val 000  proc 0003 objname 035   ()    GUN_LOADED
obj nxt 01 val 000  proc 0003 objname 056   ()    JOHN_ALIVE
obj nxt 02 val 069  proc 0000 objname 000   TRUE  ()
obj nxt 02 val 000  proc 0003 objname 084   ()    JOHN_SHOT
pred  04 t  targ 02  srce 01  oper 004   JOE_EMOTE    'MAD'
opr==
pred  04 t  targ 03  srce 00  oper 000   GUN_LOADED  opr=
pred  01 u  targ 04  srce 00  oper 000   JOHN_ALIVE  opr=
pred  02 u  targ 06  srce 05  oper 001   JOHN_SHOT    'TRUE'
opr=S
;;;MAD;^H;SCENE;;;JOE_EMOTE;^H;SCENE;;;GUN_LOADED;^H;SCENE;-
;;JOHN_ALIVE;;;TRUE;^H;SCENE;;;JOHN_SHOT;

Rule0002.0016 prev=  0 type=r stat=u prog=n nextpid 03 0003
     routing 0036 predicate 0108 rulelen 0228
         data 0132      vars 0228   datalen = 96
obj 1047396508 objend 1047396580
obj nxt 04 val 001  proc 0000 objname 000   MAD   ()
obj nxt 04 val 000  proc 0003 objname 015   ()    JOE_EMOTE
obj nxt 04 val 000  proc 0003 objname 035   ()    GUN_LOADED
obj nxt 01 val 000  proc 0003 objname 056   ()    JOHN_ALIVE
obj nxt 02 val 069  proc 0000 objname 000   TRUE  ()
obj nxt 02 val 000  proc 0003 objname 084   ()    JOHN_SHOT
pred  04 t  targ 02  srce 01  oper 004   JOE_EMOTE    'MAD'
opr==
pred  04 t  targ 03  srce 00  oper 000   GUN_LOADED  opr=
pred  01 u  targ 04  srce 00  oper 000   JOHN_ALIVE  opr=
pred  02 u  targ 06  srce 05  oper 001   JOHN_SHOT    'TRUE'
opr=S
;;;MAD;^H;SCENE;;;JOE_EMOTE;^H;SCENE;;;GUN_LOADED;^H;SCENE;-
;;JOHN_ALIVE;;;TRUE;^H;SCENE;;;JOHN_SHOT;

Rule0002.0016 prev=  0 type=r stat=u prog=n nextpid 05 0003
```

```
      routing 0036 predicate 0108 rulelen 0228
         data 0132      vars 0228  datalen = 96
obj 1047396508 objend 1047396580
obj nxt 04 val 001  proc 0000 objname 000   MAD    ()
obj nxt 04 val 000  proc 0003 objname 015   ()     JOE_EMOTE
obj nxt 04 val 000  proc 0003 objname 035   ()     GUN_LOADED
obj nxt 01 val 000  proc 0003 objname 056   ()     JOHN_ALIVE
obj nxt 02 val 069  proc 0000 objname 000   TRUE   ()
obj nxt 02 val 000  proc 0003 objname 084   ()     JOHN_SHOT
pred  04 t  targ 02  srce 01  oper 004   JOE_EMOTE       'MAD'
opr==
pred  04 t  targ 03  srce 00  oper 000   GUN_LOADED  opr=
pred  01 u  targ 04  srce 00  oper 000   JOHN_ALIVE  opr=
pred  02 u  targ 06  srce 05  oper 001   JOHN_SHOT       'TRUE'
opr=S
;;;MAD;^H;SCENE;;;JOE_EMOTE;^H;SCENE;;;GUN_LOADED;^H;SCENE;-
;;JOHN_ALIVE;;;TRUE;^H;SCENE;;;JOHN_SHOT;

Rule0005.0007 prev=   3 type=r stat=u prog=n nextpid 02 0005
      routing 0036 predicate 0096 rulelen 0226
         data 0114      vars 0226  datalen = 112
obj 1047396508 objend 1047396568
obj nxt 04 val 108  proc 0005 objname 015   1      OBJID
obj nxt 04 val 000  proc 0007 objname 039   ()     OBJID
obj nxt 01 val 000  proc 0005 objname 061   ()     JOHN_SHOT
obj nxt 02 val 073  proc 0000 objname 000   TRUE   ()
obj nxt 02 val 000  proc 0007 objname 096   ()     JOHN_DEAD
pred  04 t  targ 02  srce 01  oper 006   OBJID      '1'        OBJID
opr=GT
pred  01 u  targ 03  srce 00  oper 000   JOHN_SHOT  opr=
pred  02 u  targ 05  srce 04  oper 001   JOHN_DEAD       'TRUE'
opr=S
;^H;SCENE;^F;ANY;;;OBJID;^H;SCENE;^H;OTHER;;;OBJID;^H;SCENE;-
^F;ANY;;;JOHN_SHOT;;;TRUE;^H;SCENE;^H;OTHER;;;JOHN_DEAD;;;1;

Rule0005.0007 prev=   3 type=r stat=u prog=n nextpid 04 0007
      routing 0036 predicate 0096 rulelen 0226
         data 0114      vars 0226  datalen = 112
obj 1047396508 objend 1047396568
obj nxt 04 val 108  proc 0005 objname 015   1      OBJID
obj nxt 04 val 000  proc 0007 objname 039   ()     OBJID
obj nxt 01 val 000  proc 0005 objname 061   ()     JOHN_SHOT
obj nxt 02 val 073  proc 0000 objname 000   TRUE   ()
obj nxt 02 val 000  proc 0007 objname 096   ()     JOHN_DEAD
pred  04 t  targ 02  srce 01  oper 006   OBJID      '1'        OBJID
opr=GT
pred  01 u  targ 03  srce 00  oper 000   JOHN_SHOT  opr=
pred  02 u  targ 05  srce 04  oper 001   JOHN_DEAD       'TRUE'
opr=S
;^H;SCENE;^F;ANY;;;OBJID;^H;SCENE;^H;OTHER;;;OBJID;^H;SCENE;-
^F;ANY;;;JOHN_SHOT;;;TRUE;^H;SCENE;^H;OTHER;;;JOHN_DEAD;;;1;

Rule0005.0007 prev=   3 type=r stat=u prog=n nextpid 02 0005
      routing 0036 predicate 0096 rulelen 0226
         data 0114      vars 0226  datalen = 112
obj 1047396508 objend 1047396568
obj nxt 04 val 108  proc 0005 objname 015   1      OBJID
obj nxt 04 val 000  proc 0007 objname 039   ()     OBJID
obj nxt 01 val 000  proc 0005 objname 061   ()     JOHN_SHOT
obj nxt 02 val 073  proc 0000 objname 000   TRUE   ()
obj nxt 02 val 000  proc 0007 objname 096   ()     JOHN_DEAD
pred  04 t  targ 02  srce 01  oper 006   OBJID      '1'        OBJID
opr=GT
pred  01 u  targ 03  srce 00  oper 000   JOHN_SHOT  opr=
pred  02 u  targ 05  srce 04  oper 001   JOHN_DEAD       'TRUE'
opr=S
;^H;SCENE;^F;ANY;;;OBJID;^H;SCENE;^H;OTHER;;;OBJID;^H;SCENE;-
^F;ANY;;;JOHN_SHOT;;;TRUE;^H;SCENE;^H;OTHER;;;JOHN_DEAD;;;1;

Rule0005.0007 prev=   3 type=r stat=u prog=n nextpid 04 0007
      routing 0036 predicate 0096 rulelen 0226
```

```
           data 0114      vars 0226  datalen = 112
obj 1047396508 objend 1047396568
obj nxt 04 val 108  proc 0005 objname 015    1    OBJID
obj nxt 04 val 000  proc 0007 objname 039    ()   OBJID
obj nxt 01 val 000  proc 0005 objname 061    ()   JOHN_SHOT
obj nxt 02 val 073  proc 0000 objname 000    TRUE ()
obj nxt 02 val 000  proc 0007 objname 096    ()   JOHN_DEAD
pred  04 t  targ 02  srce 01  oper 006   OBJID       '1'      OBJID
opr=GT
pred  01 u  targ 03  srce 00  oper 000   JOHN_SHOT   opr=
pred  02 u  targ 05  srce 04  oper 001   JOHN_DEAD   'TRUE'
opr=S
;^H;SCENE;^F;ANY;;;OBJID;^H;SCENE;^H;OTHER;;;OBJID;^H;SCENE;-
^F;ANY;;;JOHN_SHOT;;;TRUE;^H;SCENE;^H;OTHER;;;JOHN_DEAD;;;1;

Rule0003.0014 prev=  0 type=r stat=u prog=n nextpid 01 0003
      routing 0036 predicate 0084 rulelen 0167
           data 0102      vars 0167  datalen = 65
obj 1047396508 objend 1047396556
obj nxt 04 val 000  proc 0003 objname 009    ()   OBJID
obj nxt 01 val 000  proc 0003 objname 025    ()   JOHN_DEAD
obj nxt 02 val 037  proc 0000 objname 000    TRUE ()
obj nxt 02 val 000  proc 0003 objname 052    ()   JOHN_ALIVE
pred  04 t  targ 01  srce 00  oper 009   OBJID      opr=EXISTS
pred  01 u  targ 02  srce 00  oper 010   JOHN_DEAD  opr=^EXISTS
pred  02 u  targ 04  srce 03  oper 001   JOHN_ALIVE   'TRUE'
opr=S
;^H;SCENE;;;OBJID;^H;SCENE;;;JOHN_DEAD;;;TRUE;^H;SCENE;;;JOHN_AL-
IVE;

Rule0003.0014 prev=  0 type=r stat=u prog=n nextpid 03 0003
      routing 0036 predicate 0084 rulelen 0167
           data 0102      vars 0167  datalen = 65
obj 1047396508 objend 1047396556
obj nxt 04 val 000  proc 0003 objname 009    ()   OBJID
obj nxt 01 val 000  proc 0003 objname 025    ()   JOHN_DEAD
obj nxt 02 val 037  proc 0000 objname 000    TRUE ()
obj nxt 02 val 000  proc 0003 objname 052    ()   JOHN_ALIVE
pred  04 t  targ 01  srce 00  oper 009   OBJID      opr=EXISTS
pred  01 u  targ 02  srce 00  oper 010   JOHN_DEAD  opr=^EXISTS
pred  02 u  targ 04  srce 03  oper 001   JOHN_ALIVE   'TRUE'
opr=S
;^H;SCENE;;;OBJID;^H;SCENE;;;JOHN_DEAD;;;TRUE;^H;SCENE;;;JOHN_AL-
IVE;

Rule0003.0013 prev=  0 type=r stat=u prog=n nextpid 01 0006
      routing 0036 predicate 0084 rulelen 0167
           data 0102      vars 0167  datalen = 65
obj 1047396508 objend 1047396556
obj nxt 04 val 000  proc 0006 objname 009    ()   OBJID
obj nxt 01 val 000  proc 0006 objname 025    ()   JOHN_DEAD
obj nxt 02 val 037  proc 0000 objname 000    TRUE ()
obj nxt 02 val 000  proc 0006 objname 052    ()   JOHN_ALIVE
pred  04 t  targ 01  srce 00  oper 009   OBJID      opr=EXISTS
pred  01 u  targ 02  srce 00  oper 010   JOHN_DEAD  opr=^EXISTS
pred  02 u  targ 04  srce 03  oper 001   JOHN_ALIVE   'TRUE'
opr=S
;^H;SCENE;;;OBJID;^H;SCENE;;;JOHN_DEAD;;;TRUE;^H;SCENE;;;JOHN_AL-
IVE;

Rule0003.0013 prev=  0 type=r stat=u prog=n nextpid 03 0006
      routing 0036 predicate 0084 rulelen 0167
           data 0102      vars 0167  datalen = 65
obj 1047396508 objend 1047396556
obj nxt 04 val 000  proc 0006 objname 009    ()   OBJID
obj nxt 01 val 000  proc 0006 objname 025    ()   JOHN_DEAD
obj nxt 02 val 037  proc 0000 objname 000    TRUE ()
obj nxt 02 val 000  proc 0006 objname 052    ()   JOHN_ALIVE
pred  04 t  targ 01  srce 00  oper 009   OBJID      opr=EXISTS
pred  01 u  targ 02  srce 00  oper 010   JOHN_DEAD  opr=^EXISTS
pred  02 u  targ 04  srce 03  oper 001   JOHN_ALIVE   'TRUE'
opr=S
```

;^H;SCENE;;;OBJID;^H;SCENE;;;JOHN_DEAD;;;TRUE;^H;SCENE;;;JOHN_AL-
IVE;

Rule0002.0016 prev= 0 type=r stat=t prog=p nextpid 03 0003
    routing 0036 predicate 0108 rulelen 0228
        data 0132     vars 0228  datalen = 96
obj 1047396508 objend 1047396580                   (35)
obj nxt 04 val 001  proc 0000 objname 000    MAD   ()
obj nxt 04 val 000  proc 0003 objname 015    ()    JOE_EMOTE
obj nxt 04 val 000  proc 0003 objname 035    ()    GUN_LOADED
obj nxt 04 val 000  proc 0003 objname 056    ()    JOHN_ALIVE
obj nxt 04 val 069  proc 0003 objname 000    TRUE  ()
obj nxt 04 val 000  proc 0003 objname 084    ()    JOHN_SHOT
pred  04 t  targ 02  srce 01  oper 004    JOE_EMOTE      'MAD'
opr==
pred  04 t  targ 03  srce 00  oper 000    GUN_LOADED opr=
pred  04 t  targ 04  srce 00  oper 000    JOHN_ALIVE opr=
pred  04 c  targ 06  srce 05  oper 001    JOHN_SHOT      'TRUE'
opr=S
;;;MAD;^H;SCENE;;;JOE_EMOTE;^H;SCENE;;;GUN_LOADED;^H;SCENE;-
;;JOHN_ALIVE;;;TRUE;^H;SCENE;;;JOHN_SHOT;

Rule0003.0013 prev= 0 type=r stat=u prog=n nextpid 01 0006
    routing 0036 predicate 0084 rulelen 0167
        data 0102     vars 0167  datalen = 65
obj 1047396508 objend 1047396556                   (33)
obj nxt 04 val 000  proc 0006 objname 009    ()    OBJID
obj nxt 01 val 000  proc 0006 objname 025    ()    JOHN_DEAD
obj nxt 02 val 037  proc 0000 objname 000    TRUE  ()
obj nxt 02 val 000  proc 0006 objname 052    ()    JOHN_ALIVE
pred  04 t  targ 01  srce 00  oper 009    OBJID opr=EXISTS
pred  01 u  targ 02  srce 00  oper 010    JOHN_DEAD opr=^EXISTS
pred  02 u  targ 04  srce 03  oper 001    JOHN_ALIVE     'TRUE'
opr=S
;^H;SCENE;;;OBJID;^H;SCENE;;;JOHN_DEAD;;;TRUE;^H;SCENE;;;JOHN_AL-
IVE;

Rule0003.0013 prev= 0 type=r stat=u prog=n nextpid 03 0006
    routing 0036 predicate 0084 rulelen 0167
        data 0102     vars 0167  datalen = 65
obj 1047396508 objend 1047396556
obj nxt 04 val 000  proc 0006 objname 009    ()    OBJID
obj nxt 01 val 000  proc 0006 objname 025    ()    JOHN_DEAD
obj nxt 02 val 037  proc 0000 objname 000    TRUE  ()
obj nxt 02 val 000  proc 0006 objname 052    ()    JOHN_ALIVE
pred  04 t  targ 01  srce 00  oper 009    OBJID opr=EXISTS
pred  01 u  targ 02  srce 00  oper 010    JOHN_DEAD opr=^EXISTS
pred  02 u  targ 04  srce 03  oper 001    JOHN_ALIVE     'TRUE'
opr=S
;^H;SCENE;;;OBJID;^H;SCENE;;;JOHN_DEAD;;;TRUE;^H;SCENE;;;JOHN_AL-
IVE;

Rule0003.0014 prev= 0 type=r stat=t prog=p nextpid 01 0003
    routing 0036 predicate 0084 rulelen 0167
        data 0102     vars 0167  datalen = 65
obj 1047396508 objend 1047396556                   (34)
obj nxt 04 val 000  proc 0003 objname 009    ()    OBJID
obj nxt 04 val 000  proc 0003 objname 025    ()    JOHN_DEAD
obj nxt 04 val 037  proc 0000 objname 000    TRUE  ()
obj nxt 04 val 000  proc 0003 objname 052    ()    JOHN_ALIVE
pred  04 t  targ 01  srce 00  oper 009    OBJID opr=EXISTS
pred  04 t  targ 02  srce 00  oper 010    JOHN_DEAD opr=^EXISTS
pred  04 c  targ 04  srce 03  oper 001    JOHN_ALIVE     'TRUE'
opr=S
;^H;SCENE;;;OBJID;^H;SCENE;;;JOHN_DEAD;;;TRUE;^H;SCENE;;;JOHN_AL-
IVE;

Rule0002.0015 prev= 0 type=r stat=u prog=n nextpid 01 0006
    routing 0036 predicate 0108 rulelen 0228
        data 0132     vars 0228  datalen = 96
obj 1047396508 objend 1047396580                   (36)

```
obj nxt 01 val 001  proc 0000 objname 000    MAD     ()
obj nxt 01 val 000  proc 0006 objname 015    ()      JOE_EMOTE
obj nxt 01 val 000  proc 0006 objname 035    ()      GUN_LOADED
obj nxt 01 val 000  proc 0006 objname 056    ()      JOHN_ALIVE
obj nxt 02 val 069  proc 0000 objname 000    TRUE    ()
obj nxt 02 val 000  proc 0006 objname 084    ()      JOHN_SHOT
pred   01 u   targ 02   srce 01   oper 004   JOE_EMOTE      'MAD'
opr==
pred   01 u   targ 03   srce 00   oper 000   GUN_LOADED  opr=
pred   01 u   targ 04   srce 00   oper 000   JOHN_ALIVE  opr=
pred   02 u   targ 06   srce 05   oper 001   JOHN_SHOT      'TRUE'
opr=S
;;;MAD;^H;SCENE;;;JOE_EMOTE;^H;SCENE;;;GUN_LOADED;^H;SCENE;-
;;JOHN_ALIVE;;;TRUE;^H;SCENE;;;JOHN_SHOT;

Rule0002.0015 prev=  0 type=r stat=u prog=n nextpid 02 0006
           routing 0036 predicate 0108 rulelen 0228
              data 0132      vars 0228   datalen = 96
obj 1047396508 objend 1047396580
obj nxt 01 val 001  proc 0000 objname 000    MAD     ()
obj nxt 01 val 000  proc 0006 objname 015    ()      JOE_EMOTE
obj nxt 01 val 000  proc 0006 objname 035    ()      GUN_LOADED
obj nxt 01 val 000  proc 0006 objname 056    ()      JOHN_ALIVE
obj nxt 02 val 069  proc 0000 objname 000    TRUE    ()
obj nxt 02 val 000  proc 0006 objname 084    ()      JOHN_SHOT
pred   01 u   targ 02   srce 01   oper 004   JOE_EMOTE      'MAD'
opr==
pred   01 u   targ 03   srce 00   oper 000   GUN_LOADED  opr=
pred   01 u   targ 04   srce 00   oper 000   JOHN_ALIVE  opr=
pred   02 u   targ 06   srce 05   oper 001   JOHN_SHOT      'TRUE'
opr=S
;;;MAD;^H;SCENE;;;JOE_EMOTE;^H;SCENE;;;GUN_LOADED;^H;SCENE;-
;;JOHN_ALIVE;;;TRUE;^H;SCENE;;;JOHN_SHOT;

Rule0002.0015 prev=  0 type=r stat=u prog=n nextpid 03 0006
           routing 0036 predicate 0108 rulelen 0228
              data 0132      vars 0228   datalen = 96
obj 1047396508 objend 1047396580
obj nxt 01 val 001  proc 0000 objname 000    MAD     ()
obj nxt 01 val 000  proc 0006 objname 015    ()      JOE_EMOTE
obj nxt 01 val 000  proc 0006 objname 035    ()      GUN_LOADED
obj nxt 01 val 000  proc 0006 objname 056    ()      JOHN_ALIVE
obj nxt 02 val 069  proc 0000 objname 000    TRUE    ()
obj nxt 02 val 000  proc 0006 objname 084    ()      JOHN_SHOT
pred   01 u   targ 02   srce 01   oper 004   JOE_EMOTE      'MAD'
opr==
pred   01 u   targ 03   srce 00   oper 000   GUN_LOADED  opr=
pred   01 u   targ 04   srce 00   oper 000   JOHN_ALIVE  opr=
pred   02 u   targ 06   srce 05   oper 001   JOHN_SHOT      'TRUE'
opr=S
;;;MAD;^H;SCENE;;;JOE_EMOTE;^H;SCENE;;;GUN_LOADED;^H;SCENE;-
;;JOHN_ALIVE;;;TRUE;^H;SCENE;;;JOHN_SHOT;

Rule0002.0015 prev=  0 type=r stat=u prog=n nextpid 05 0006
           routing 0036 predicate 0108 rulelen 0228
              data 0132      vars 0228   datalen = 96
obj 1047396508 objend 1047396580
obj nxt 01 val 001  proc 0000 objname 000    MAD     ()
obj nxt 01 val 000  proc 0006 objname 015    ()      JOE_EMOTE
obj nxt 01 val 000  proc 0006 objname 035    ()      GUN_LOADED
obj nxt 01 val 000  proc 0006 objname 056    ()      JOHN_ALIVE
obj nxt 02 val 069  proc 0000 objname 000    TRUE    ()
obj nxt 02 val 000  proc 0006 objname 084    ()      JOHN_SHOT
pred   01 u   targ 02   srce 01   oper 004   JOE_EMOTE      'MAD'
opr==
pred   01 u   targ 03   srce 00   oper 000   GUN_LOADED  opr=
pred   01 u   targ 04   srce 00   oper 000   JOHN_ALIVE  opr=
pred   02 u   targ 06   srce 05   oper 001   JOHN_SHOT      'TRUE'
opr=S
;;;MAD;^H;SCENE;;;JOE_EMOTE;^H;SCENE;;;GUN_LOADED;^H;SCENE;-
;;JOHN_ALIVE;;;TRUE;^H;SCENE;;;JOHN_SHOT;
```

```
Rule0005.0007 prev=  3 type=r stat=t prog=p nextpid 02 0005
        routing 0036 predicate 0096 rulelen 0226
              0114       vars 0226   datalen = 112
obj 1[...]         [obj]end 1047396568                              (38)
obj [...]    108  proc 0005 objname 015   1      OBJID
obj nxt [...] 000  proc 0007 objname 039   ()     OBJID
obj nxt [...]val 000  proc 0005 objname 061   ()     JOHN_SHOT
obj nxt 02 val 073  proc 0000 objname 000   TRUE   ()
obj nxt 02 val 000  proc 0007 objname 096   ()     JOHN_DEAD
pred 04 t  targ 02  srce 01  oper 006  OBJID    '1'      OBJID
opr=GT
pred 04 t  targ 03  srce 00  oper 000  JOHN_SHOT  opr=
pred 02 u  targ 05  srce 04  oper 001  JOHN_DEAD         'TRUE'
opr=S
;^H;SCENE;^F;ANY;;;OBJID;^H;SCENE;^H;OTHER;;;OBJID;^H;SCENE;-
^F;ANY;;;JOHN_SHOT;;;TRUE;^H;SCENE;^H;OTHER;;;JOHN_DEAD;;;1;

Rule0005.0007 prev=  3 type=r stat=t prog=p nextpid 04 0007
        routing 0036 predicate 0096 rulelen 0226
              data 0114       vars 0226   datalen = 112
obj 1047396508 objend 1047396568                              (39)
obj nxt 04 val 108  proc 0005 objname 015   1      OBJID
obj nxt 04 val 000  proc 0007 objname 039   ()     OBJID
obj nxt 04 val 000  proc 0005 objname 061   ()     JOHN_SHOT
obj nxt 04 val 073  proc 0000 objname 000   TRUE   ()
obj nxt 04 val 000  proc 0007 objname 096   ()     JOHN_DEAD
pred 04 t  targ 02  srce 01  oper 006  OBJID    '1'      OBJID
opr=GT
pred 04 t  targ 03  srce 00  oper 000  JOHN_SHOT  opr=
pred 04 c  targ 05  srce 04  oper 001  JOHN_DEAD         'TRUE'
opr=S
;^H;SCENE;^F;ANY;;;OBJID;^H;SCENE;^H;OTHER;;;OBJID;^H;SCENE;-
^F;ANY;;;JOHN_SHOT;;;TRUE;^H;SCENE;^H;OTHER;;;JOHN_DEAD;;;1;

Rule0003.0013 prev=  0 type=r stat=f prog=p nextpid 01 0006
        routing 0036 predicate 0084 rulelen 0167
              data 0102       vars 0167   datalen = 65
obj 1047396508 objend 1047396556
obj nxt 04 val 000  proc 0006 objname 009   ()     OBJID
obj nxt 04 val 000  proc 0006 objname 025   ()     JOHN_DEAD
obj nxt 02 val 037  proc 0000 objname 000   TRUE   ()
obj nxt 02 val 000  proc 0006 objname 052   ()     JOHN_ALIVE
pred 04 t  targ 01  srce 00  oper 009  OBJID  opr=EXISTS
pred 04 f  targ 02  srce 00  oper 010  JOHN_DEAD  opr=^EXISTS
pred 02 u  targ 04  srce 03  oper 001  JOHN_ALIVE       'TRUE'
opr=S
;^H;SCENE;;;OBJID;^H;SCENE;;;JOHN_DEAD;;;TRUE;^H;SCENE;;;JOHN_AL-
IVE;
```

Appendix C - Application Inference Interface

Application Inference Interface

A COBOL application communicates with Gnome through a series of
CALL statements to the Gnome Application Inference Interface
(GAII). This interface, along with Gnome, will be directly
linked to the application. If necessary, the interface will be
able to communicate to other applications across a network using
the LU 6.2 protocol.

The call statements that are supported are:

CALL GAIISS      (Start Session)
            CALL GAIIES      (End Session)
            CALL GAIIST      (Start Transaction)

```
CALL GAIIET      (End Transaction)
CALL GAIIRO      (Register Object)
CALL GAIIOG      (Open Goal)
CALL GAIIRG      (Request Goal)
CALL GAIIRV      (Request Variable)
CALL GAIICG      (Close Goal)
CALL GAIIAD      (Assert Data)
CALL GAIICR      (Create Rule Message)
CALL GAIIRM      (Rule Message)
CALL GAIISP      (Sync Point)
CALL GAIIRB      (Rollback)
CALL GAIIRE      (Return Error)
```

The application program will initiate a session by calling GAIISS. Once a session is initiated, the application can submit one or many transactions using a bracketed protocol. A transaction bracket consists of a START TRANSACTION, one or more calls to request modules, and is ended by an END TRANSACTION. The request modules are,

```
GAIIRO     GAIICR
GAIIAD     GAIIRM
GAIIOG     GAIICG
GAIIRG     GAIIRV
GAIISP     GAIIRE
GAIIRB
```

Since Gnome is primarily a forward-firing mechanism, the application is required to assert a value for at least one data field during each inference transaction. This assertion can be made by calling GAIIAD with the appropriate value and will serve to 'seed' the inference transaction, allowing Gnome to propagate forward.

Once all transactions are complete, the application will end the session with a call to GAIIES. The following pages discuss the necessary parameters for each of the above call statements and provides descriptions of usage.

AII PROTOCOL

APPLICATION

START SESSION
START TRANSACTION

.....

OPEN GOAL
REQUEST GOAL
REQUEST VARIABLE
REQUEST VARIABLE
CLOSE GOAL

.....

END TRANSACTION
START TRANSACTION
ASSERT DATA
OPEN GOAL
OPEN GOAL
OPEN GOAL

.....

.....

CREATE RULE

.....

.....

CLOSE GOAL
END TRANSACTION
END SESSION

GNOME

APPLICATION INFERENCE INTERFACE

- SESSION CONTROL

START SESSION
    END SESSION

- TRANSACTION CONTROL

START TRANSACTION
    END TRANSACTION

- DATA FLOW CONTROL

INPUT DATA

REGISTER OBJECT
    CREATE RULE
    ASSERT DATA
    RULE MESSAGE

OUTPUT DATA

OPEN GOAL
    REQUEST GOAL
    REQUEST VARIABLE
    CLOSE GOAL

- ERROR CONTROL

RETURN ERROR
    SYNCPOINT
    ROLLBACK

SESSION CONTROL

START SESSION

CALL GAIISS USING SESS_PROFILE, SESS_ID,
             RETURN_CODE

END SESSION

CALL GAIIES USING SESS_ID, RETURN_CODE

---

START SESSION

CALL GAIISS USING SESS_PROFILE, SESSION_ID, RETURN_CODE

SESS_PROFILE - Data field that contains the filename of the session profile. This can be a DD NAME in the execution JCL. The filename is limited to eight characters and must be defined in the COBOL application as, PIC X(8). The session profile contains the values for all the necessary parameters to start a Gnome session. These are defined as keyword/value pairs. Those that are currently available are:

| KEYWORD | VALUE |
|---------|-------|
| SYS | System Name (ie. region, LU..) |
| USER | User ID |
| PASS | User Password |
| PROF | User Profile |
| OBD | Object Definition File |
| IE | Inference Engine Name |
| KB | Knowledge Base Name |
| PROCS | Number of Object Processors |
| PARM | Inference Session Options |

GAIISS will assign defaults to all of the above parameters (See Appendix A for more complete details on each of the above). The application can then overlay any of them by placing the parameter and its associated value in a file using the following protocol.

(KEYWORD(VALUE)}{KEYWORD(VALUE)) ETC ....

For example, if the application only wanted to overlay the KB_NAME, they would put the following string in the session profile file.

(KB(RULES.KB))

The interface will print out error messages if invalid parameters are found but execution will continue.

SESSION_ID - Data field where the AII will return a unique SESSION ID. This must be defined in a COBOL program as, S9(7) USAGE COMPUTATIONAL. The application will then be required to pass this value back as the first parameter in every subsequent call to the AII.

RETURN_CODE - Data field where the AII will return a completion code for this CALL statement. This must be defined in a COBOL program as, S9(3) USAGE COMPUTATIONAL.

GAIISS will keep a list of the sessions that have been started with various applications. Currently, an application will only be allowed one session to be open at a time.

Example:

DATA DIVISION.

```
01  GTCTL-FIELDS.
    05  SESSION-FIELDS.
        10  SESSION-PROFILE        PIC X(8).
        10  SESSION-ID             PIC S9(7) USAGE IS COMP.
        10  RETURN-CODE            PIC S9(3) USAGE IS COMP.

PROCEDURE DIVISION.

P-SESS-START.
    MOVE 'DISKIA' TO SESSION-PROFILE.
    MOVE 0 TO RETURN-CODE.
    CALL 'GAIISS' USING SESSION-PROFILE, SESSION-ID, RETURN-CODE.
    IF RETURN-CODE IS GREATER THAN ZERO
        GO TO P-GNOME-ERR.
P-SESS-START-EXIT.
    EXIT.
```

RETURN CODES

>   000 - Session was started successfully.
>   005 - GAIISS could not open the file specified in the
>         SESSION-PROFILE.
>   006 - A START SESSION was issued and another session was
>         already active.

END SESSION

CALL GAIIES USING SESSION_ID, RETURN_CODE

>   SESSION_ID - Data field that contains the Session ID of the
>         session the application wants to end. This ID was
>         returned to the application by a call to GAIISS. This
>         field must be defined by a COBOL program as, PIC S9(7)
>         USAGE IS COMPUATIONAL.
>
>   RETURN_CODE - Data field where the AII will return a
>         completion code for this statement. This field must be
>         defined by a COBOL program as, PIC S9(3) USAGE IS
>         COMPUTATIONAL.

This will end the session that was established with Gnome. Before ending the session, GAIIES will check to make sure there is not an active transaction or any active requests. Issuing END SESSION before a transaction has ended (ie. between a START and END TRANSACTION) results in a system error and a ROLLBACK will be issued to a prior syncpoint or to the previous END TRANSACTION.

Example:

NOTE:   This statement has had all of its fields defined already
        by START SESSION.

```
DATA DIVISION.

01  GTCTL-FIELDS.
    05  SESSION-FIELDS.
        10  SESSION-PROFILE            PIC X(8).
        10  SESSION-ID                 PIC S9(7) USAGE IS COMP.
        10  RETURN-CODE                PIC S9(3) USAGE IS COMP.

PROCEDURE DIVISION.

P-SESS-END.
    CALL 'GAIIES' USING SESSION-ID, RETURN-CODE.
    IF RETURN-CODE IS GREATER THAN ZERO
        GO TO P-GNOME-ERR.
P-SESS-END-EXIT.
    EXIT.
```

RETURN CODES

>   000 - The session was ended successfully.
>   001 - The session specified in SESSION-ID was not found or
>         was not active.
>   013 - An END SESSION request was made while a transaction
>         within the specified session was still active.

TRANSACTION CONTROL

START TRANSACTION

CALL GAIIST USING SESS_ID, RETURN_CODE

END TRANSACTION

CALL GAIIET USING SESS_ID, RETURN_CODE

---

START TRANSACTION

CALL GAIIST USING SESSION_ID, RETURN_CODE

SESSION_ID - Data field that contains the Session ID of
        the session that the application wants to initiate a
        transaction.  This ID was returned to the application
        by a call to GAIISS.  This field must be defined by a
        COBOL program as, PIC S9(7) USAGE IS COMPUTATIONAL.

RETURN_CODE - Data field where the AII will return a
        completion code for this statement.  This field must be defined by a COBOL program as, PIC S9(3) USAGE IS COMPUTATIONAL.

GAIIST will tie a transaction to its associated session. A session can have many transactions initiated and ended inside of it for as long as it is active. However, there can only be one transaction active at any one time. Issuing two START TRANSACTIONS without an intervening END TRANSACTION or ROLLBACK will result in a system error and forces a ROLLBACK to be issued.

Example:

NOTE: This statement has had all of its fields already defined
      for the call to START SESSION

DATA DIVISION.

```
01  GTCTL-FIELDS.
    05  SESSION-FIELDS.
        10  SESSION-PROFILE          PIC X(8).
        10  SESSION-ID               PIC S9(7) USAGE IS COMP.
        10  RETURN-CODE              PIC S9(3) USAGE IS COMP.
```

PROCEDURE DIVISION.

```
P-START-TRAN.
    CALL 'GAIIST' USING SESSION-ID, RETURN-CODE.
    IF RETURN-CODE IS GREATER THAN ZERO
        GO TO P-GNOME-ERR.
P-START-TRAN-EXIT.
    EXIT.
```

RETURN CODES

000 - Transaction was started successfully.
    001 - The session specified by SESSION-ID was not found or
          was not active.
    019 - There was already a transaction started within the
          session specified by SESSION-ID.

END TRANSACTION

CALL GAIIET USING SESSION_ID, RETURN_CODE

SESSION_ID -   Data field that contains the SessionID of the
        session within which that application wants to end a
        transaction. This ID was returned to the application
        by a call to GAIISS. This field must be defined by a
        COBOL program as, PIC S9(7) USAGE IS COMPUTATIONAL.

RETURN_CODE  - The data field where the AII will return a
        completion code for this statement. This field must be
        defined by a COBOL program as, PIC S9(3) USAGE IS
        COMPUTATIONAL.

This will cause all objects to be released except the session object. GAIIET will also release any goal requests that have not been closed and will release any object instances that have been registered during the transaction, unless these objects have been defined in the OBD file to span transactions.

Example:

NOTE: This statement has had all of its fields already defined by
      the call to GAIISS.

DATA DIVISION.

```
01 GTCTL-FIELDS.
    05  SESSION-FIELDS.
        10  SESSION-PROFILE         PIC X(8).
        10  SESSION-ID              PIC S9(7) USAGE IS COMP.
        10  RETURN-CODE             PIC S9(3) USAGE IS COMP.

PROCEDURE DIVISION.

P-END-TRAN.
    CALL 'GAIIET' USING SESSION-ID, RETURN-CODE.
    IF RETURN-CODE IS GREATER THAN ZERO
        GO TO P-GNOME-ERR.
P-END-TRAN-EXIT.
    EXIT.

RETURN CODES

000 - The transaction was ended successfully.
        001 - The session specified by SESSION-ID was not found or
              was not active.
        002 - There was not a transaction active within the session
              specified by SESSION-ID.
        010 - The AII tried to close an open goal request and could
              not find it.
```

DATA FLOW CONTROL

INPUT DATA

REGISTER OBJECT

CALL GAIIRO USING SESS_ID, OBJ_NAME, DATA_HANDLE,
          DATA_LENGTH, RETURN_CODE

CREATE RULE

CALL GAIICR USING SESS_ID, RULE_ID, NUM_TUPLES,
          RULE_TUPLES, RETURN_CODE

ASSERT DATA

CALL GAIIAD USING SESS_ID, NUM_ASSERT,
          ASSERT_TUPLES, RETURN_CODE

RULE MESSAGE

CALL GAIIRM USING SESS_ID, RULE_MESSAGE,
          RETURN_CODE

GETTING DATA INTO A GNOME INFERENCE TRANSACTION

In order to get data into a Gnome inference transaction, an application must use at least one of the following statements:

```
CALL GAIIRO   (Register Object)
CALL GAIICR   (Create Rule)
CALL GAIIAD   (Assert Data)
CALL GAIIRM   (Rule Message)
```

GAIIRO will allow an application to register objects and their associated instances with Gnome. These objects would typically contain data that Gnome would not otherwise have access.

GAIICR, GAIIAD, and GAIIRM all pass Gnome rule messages into a Gnome inference transaction. GAIICR will create the internal form of a Gnome rule message from the parameters that are passed to it. GAIIAD is very similar, (in fact it uses GAIICR to create the Gnome rule message), however, it assumes a positive predicate and therefore can only be used to pass action-side tuples which will make data value assertions. GAIIRM does not do any translation. This would only be used if the application wanted to pass a rule on that was already translated into Gnome's internal form.

The application may not have a need to use any of the above. However, since Gnome is primarily a forward-firing mechanism, the application is required to assert a value for at least one data field. This assertion can be made by calling GAIIAD with the appropriate value and will serve to 'seed' the inference transaction, allowing Gnome to propagate forward. An inference transaction cannot be 'seeded' by simply registering an object and passing data to that object. This is because Gnome will not forward fire from data values that are in objects registered by an application program.

REGISTER OBJECT

CALL GAIIRO USING SESSION_ID, OBJ_NAME, DATA_HANDLE, DATA_LENGTH, RETURN_CODE

- SESSION_ID - Data field that contains the session ID of the session that the application wants to register an object with. This ID was returned to the application by a call to GAIISS. This field must be defined by a COBOL program as, PIC S9(7) USAGE IS COMPUTATIONAL.

- OBJ_NAME - Data field that contains the name of the object that is to be created and registered. This name of the object can be any length, but it must be terminated by a '#'. For example, if the application wanted to register the object 'CLAIM', it would be defined as PIC X(10) VALUE 'CLAIM#'.

- DATA_HANDLE - Set of data items that are part of the object to be registered.

- DATA_LENGTH - Data field that contains the length of the data to be registered. This field must be defined by a COBOL program as, PIC S9(7) USAGE IS COMPUTATIONAL.

- RETURN_CODE - Data field where the AII will return a completion code for this statement. This field must be defined by a COBOL program as, PIC S9(3) USAGE IS COMPUTATIONAL.

This is used to register any object, and associated data, that the application has knowledge of that will be active during a transaction. If there are multiple instances of an object, the application will have to register each instance with an associated sequence number or other unique identifier. For example, suppose there is a claim record defined in a COBOL program with a group item BILLINES OCCURS 30 TIMES (See below). For each occurrence of BILLINE, the application will have to make a call to GAIIRO and pass the pointer to the occurrence and the length of the occurrence with a call to GAIIRO.

Additionally, if the data is in a form that the Gnome object processor cannot interpret, (for example, in a COBOL record format), the application must designate a data processor that can interpret the data for the object processor. This data processor is designated in the Object Definition File with the keyword, PROC. At the time of registration, Gnome will dynamically load the module that contains the data processor and as data is needed, will make data requests.

The integrity of the data area referenced in the DATA_HANDLE must remain until the issuance of the next END TRANSACTION. The data area may be directly accessed by the inference engine and consequently, modification of the data area can produce unpredictable results. If the application program cannot provide integrity of the data (ie. the data is in an I/O buffer) then the application should use GAIIROS (Register Object and Save).

Example:

DATA DIVISION.

```
01  CLAIM-RECORD.
    05  CLAIMANT-INFO.
        10  NAME                 PIC X(40).
        10  ADDRESS              PIC X(100).
        10  ......
    05  BILLINES                 OCCURS 30 TIMES.
        10  CLAIMID              PIC X(18).
        10  PROCODE              PIC X(5).
        10  DIAG                 PIC X(8).
        10  NOS                  PIC X.
        10  .....
        10  CHRGAMT              PIC S9(7) USAGE COMP-3.

01  GTCTL-FIELDS.
    05  SESSION-FIELDS.
        10  SESSION-PROFILE      PIC X(8).
        10  SESSION-ID           PIC S9(7) USAGE IS COMP.
        10  RETURN-CODE          PIC S9(3) USAGE IS COMP.
    05  .....
    05  OBJECT-REG-FIELDS.
        10  OBJECT-NAME          PIC X(10).
        10  OBJECT-LEN           PIC S9(7) USAGE COMP.
```

PROCEDURE DIVISION.

```
P-REG-OBJECT.
    MOVE 1 TO SUB.
    MOVE 'BILLINE#' TO OBJECT-NAME.
    MOVE 500 TO OBJECT-LEN.
    WHILE CLAIMID (SUB) IS NOT EQUAL TO SPACES
        CALL 'GAIIRO' USING SESSION-ID, OBJECT-NAME,
                      BILLINES (SUB), OBJECT-LEN, RETURN-CODE.
        IF RETURN-CODE IS NOT EQUAL TO ZERO
            GO TO P-GNOME-ERR.
        ADD 1 TO SUB.
    END-WHILE.
P-REG-OBJECT-EXIT.
    EXIT.
```

This example will register an instance of the object, BILLINE, for each occurrence of BILLINES where the CLAIMID does not equal spaces.

RETURN CODES

000 - Object registered successfully.
    001 - The session specified by SESSION-ID was not found or
          was not active.
    002 - There was not a transaction active within the session
          specified by SESSION-ID.

CREATE RULE

CALL GAIICR USING SESSION_ID, RULE_ID, NUM_TUPLES, RULE_TUPLES,
           RETURN_CODE

SESSION_ID -   Data field that contains the session ID.
        This ID was returned to the application by a call to
        GAIISS.  This field must be defined by a COBOL program
        as, PIC S9(7) USAGE COMPUTATIONAL.

RULE_ID - Data field that contains the rule id of the rule
        to be created.  This should be a unique number to the
        application and must be defined in a COBOL program as,
        PIC S9(3) USAGE IS COMPUTATIONAL.  If the rule is an
        assertion, RULE_ID must be a negative number.  However,
        it is easier to call GAIIAD to perform this function.

NUM_TUPLES - Data field that contains the number of tuples
        in this rule.  This is defined in a COBOL program as,
        PIC S9(7) USAGE IS COMPUTATIONAL.

RULE_TUPLES - A set of fixed areas that contain all the rule
        tuples in the rule to be created.  This may be defined
        in a COBOL program as a group item that occurs 'n'
        times.  The group item would include:

PRED_ACT- Indicator of whether the current
             tuple is a condition (IF or LEFT side) or action
             (THEN or RIGHT side).  Specify 'L' or 'R'
             respectively.  Must be defined as PIC X.

SUBJ_1 - The first data name, or target data field.
             The data field must be defined as PIC X(40).  The
             data name that is placed in this field must be
             terminated by a ';#'.  For example, the data name
             'SSN' would be defined:

05  SUBJ1   PIC X(40) VALUE 'SSN;#'.

SUBJ_2 - The second field name, or source data field.
             The data field must be defined as PIC X(40).  The
             data name that is placed in this field must be
             terminated by a ';#'.  Any values, as opposed to
             data names, that are placed in this field must
             also be enclosed in quotes (").  For example, the
             data value for 'SSN' would be defined:

05 SUBJ2 PIC X(40) VAL '"137701927";#'.

OPERATOR- The operator for the two subject fields.  The
             data field must be defined as PIC X(10).  The
             operator string that is placed in this field must
             be terminated by a '#'.

RETURN_CODE - Data field where the AII will return a
        completion code for this statement.  This field must be
        defined in a COBOL program as, PIC S9(3) USAGE IS
        COMPUTATIONAL.

This is used to create a rule message that can be used by Gnome.
GAIICR will create a Gnome rule message, and pass it on to the
AII for routing assignments.  CREATE RULE is used by other
modules of the AII, such as ASSERT DATA, to form rule messages to
be sent on to Gnome.

Example:

DATA DIVISION.

01 GTCTL-FIELDS.

```
   05  SESSION-FIELDS.
       10  SESSION-PROFILE      PIC X(8).
       10  SESSION-ID           PIC S9(7) USAGE IS COMP.
       10  RETURN-CODE          PIC S9(3) USAGE IS COMP.
   05  .....
   05  CREATE-RULE-FIELDS.
       10  RULE-ID              PIC S9(3) USAGE IS COMP.
       10  NUM-TUPLES           PIC S9(7) USAGE IS COMP.
       10  RULE-TUPLES          OCCURS 10 TIMES.
           15  PRED-ACT         PIC X.
           15  SUBJ1            PIC X(40).
           15  SUBJ2            PIC X(40).
           15  OPER             PIC X(10).

PROCEDURE DIVISION.

P-CREATE-RULE.
    MOVE 999 TO RULE-ID.
    MOVE 2 TO NUM-TUPLES.
    MOVE 'L' TO PRED-ACT (1).
    MOVE 'SESSION.ON;#' TO SUBJ1 (1).
    MOVE '"TRUE";#' TO SUBJ (1).
    MOVE '=@#' TO OPER (1).
    MOVE 'R' TO PRED-ACT (2).
    MOVE 'SESSION.QUESTION_NUMBER;#' TO SUBJ1 (2).
    MOVE '"1";#' TO SUBJ2 (2).
    CALL 'GAIICR' USING SESSION-ID, RULE-ID, NUM-TUPLES,
         RULE-TUPLES (1), RETURN-CODE.
    IF RETURN-CODE IS NOT EQUAL TO ZERO
        GO TO P-GNOME-ERR.
P-CREATE-RULE-EXIT.
    EXIT.
```

This example will create the rule:

```
    IF SESSION.ON = 'TRUE';
    THEN SESSION.QUESTION_NUMBER = '1';
```

RETURN CODES

000 - Rule created successfully.
001 - The session specified by SESSION-ID was not found or
      was not active.
002 - There was not a transaction active within the session
      specified by SESSION-ID.
003 - The number of allowable rule tuples was exceeded.

ASSERT DATA

CALL   GAIIAD   USING   SESSION_ID,   NUM_ASSERT,   ASSERT_TUPLES,
                RETURN_CODE

SESSION_ID -   Data field containing the session ID.  This
         ID was returned to the application by a call to GAIISS.
         This field must be defined by a COBOL application as,
         PIC S9(7) USAGE COMPUTATIONAL.

NUM_ASSERT - Data field containing the number of asserted
         data items.  In a COBOL program this field must be
         defined as, PIC S9(7) USAGE COMPUTATIONAL.

ASSERT_TUPLES - A set of fixed areas that contains all the
         assertion tuples.  This may be defined in a COBOL
         program as a group item that occurs 'n' times.  These
         tuples include:

ASSERT - The name of the field to be asserted.
              This data field must be defined as, PIC X(40).
              The data name that is placed in this field must be
              terminated by a ';#'.  For example, the field
              'SSN' would be defined:

```
        05  ASSERT   PIC X(40) VALUE 'SSN;#'.
```

LEN - The length of the data value defined in
      VALUE.  This field must be defined in a COBOL
      program as, PIC S9(7) USAGE COMPUATATIONAL.

VALUE - The value to be asserted.  This field must
      be defined as, PIC X(40).  The value must
      converted to character format before being passed
      to the interface.  If the LEN parameter is ZERO,
      the value will default to '"TRUE";'.

RETURN_CODE - The data field where the AII will return a
      completion code for this statement.  This field must be
      defined as, PIC S9(3) USAGE COMPUTATIONAL.

This call will be used to seed sessions or transactions with
data.  GAIIAD will form a rule tuple, attach a negative rule
number and call GAIICR to create a rule message and pass it on to
the AII.

Since Gnome is primarily a forward firing mechanism, the
application is required to assert at least one data field for
each transaction.  The asserted value should be a field that will
allow Gnome to propagate forward to the proper portion of the
knowledge base where it can make conclusions about the desired
goals.

It is a further requirement that all properties for the same
object be asserted with one call to GAIIAD.

Example:

DATA DIVISION.

```
01  GTCTL-FIELDS.
    05  SESSION-FIELDS.
        10  SESSION-PROFILE    PIC X(8).
        10  SESSION-ID         PIC S9(7) USAGE IS COMP.
        10  RETURN-CODE        PIC S9(3) USAGE IS COMP.
    05  .....
    05  ASSERT-DATA-FIELDS.
        10  NUM-TUPLES         PIC S9(7) USAGE IS COMP.
        10  ASSERT-TUPLES      OCCURS 10 TIMES.
            15  SUBJ1          PIC X(40).
            15  VALUE          PIC X(40).
            15  VALUE-LEN      PIC S9(7) USAGE IS COMP.

PROCEDURE DIVISION.

P-ASSERT-DATA.
    MOVE 1 TO NUM-TUPLES.
    MOVE 'SESSION.ON;#' TO SUBJ1 (1).
    MOVE 0 TO VALUE-LEN (1).
    CALL 'GAIIAD' USING SESSION-ID, NUM-TUPLES, RULE-TUPLES (1),
                RETURN-CODE.
    IF RETURN-CODE IS NOT EQUAL TO ZERO
        GO TO P-GNOME-ERR.
P-ASSERT-DATA-EXIT.
    EXIT.
```

This example will create a rule that will immediately assign the
value 'TRUE' the property, ON, in object, SESSION.

RETURN CODES

000 - Data asserted successfully.

001 - The session specified by SESSION-ID was not found or was not active.
002 - There was not a transaction active in the session specified by SESSION-ID.
003 - Too many assertion tuples.
004 - Memory allocation error.

RULE MESSAGE

CALL GAIIRM USING SESSION_ID, RULE_MESSAGE, RETURN_CODE

SESSION_ID - Data field that contains the session ID. This ID was returned to the application by a call to GAIISS. This field must be defined by a COBOL application as, PIC S9(7) USAGE COMPUTATIONAL.

RULE_MESSAGE - Data field containing a Gnome rule message.

RETURN_CODE - Data field where the AII will return a completion code for this statement. This field must be defined by a COBOL application as, PIC S9(3) USAGE COMPUTATIONAL.

This is used to pass on a rule message to Gnome. This rule message is already in the form that Gnome uses. This will probably be used infrequently by a COBOL program as it is probably easier to format a Create Rule Message call or use one of the other rule interface forms.

RETURN CODES

000 - Rule message was passed to Gnome successfully.
   001 - The session specified by SEESION-ID was not found or was not active.
   002 - There was not a transaction active within the session specified by SESSION-ID.

DATA FLOW CONTROL

OUTPUT DATA

OPEN GOAL

CALL GAIIOG USING SESS_ID, REQ_ID, SQL, RETURN_CODE

REQUEST GOAL

CALL GAIIRG USING SESS_ID, REQ_ID, RETURN_CODE

REQUEST VARIABLE

CALL GAIIRV USING SESS_ID, REQ_ID, VARNAME,
                    VARNAME_LEN, DATA, DATA_LEN,
                    DATA_TYPE, DATA_PREC,
                    NULL_IND, RETURN_CODE

CLOSE GOAL

CALL GAIICG USING SESS_ID, REQ_ID, RETURN_CODE

GETTING DATA FROM GNOME OBJECTS.

An application can retrieve data values from a Gnome object by making a series of calls to GAIIOG, GAIIRG, GAIIRV, and GAIICG. In order to understand how these functions work together, it is important that the structure of a Gnome object be understood.

Very briefly, a Gnome object is similar to a relational table. A table has many columns, or data fields, and many rows. The corresponding Gnome names for these would be that an object is a table, a property is a data field and an instance is a row. Since a Gnome object can have many instances, it is important that an application be able to retrieve all instances of a particular property. This is achieved by issuing the above calls in the following way.

The first call is made to GAIIOG (Open Goal). GAIIOG works like an open cursor operation. The function is passed an SQL statement which is used to determine the selection criteria for the request. The cursor is initialized and the necessary selection criteria (ie. object and properties) are saved. GAIIOG assigns a REQUEST ID and places the value in a field defined by the application. The application will then be required to pass this field back to the interface in any call to GAIIRG, GAIIRV or GAIICG.

The application then issues one or many calls to GAIIRG and GAIIRV. GAIIRG (Request Goal) will search down the object table in order to find a Gnome object that meets the selection criteria. If no object instance is found that satisfies the criteria, GAIIRG will return a non-zero return code to the application. If an object instance is found that meets the selection criteria, GAIIRG will internally associate the cursor's current position with the REQUEST ID and return control to the application.

If an instance is found, the application issues a call to GAIIRV (Request Variable) for each of the variables for which it wants to retrieve a value. GAIIRV will return a value or NULL into a data field that is specified by the application. Once the application has retrieved all the variables it specified in its SQL statement, it can issue another call to GAIIRG to see if there is another object instance that satisfies the selection criteria. If there is, the cursor is reset and the application can again issue calls to GAIIRV to retrieve values for the requested variables. This sequence should continue until GAIIRG returns a value that indicates that no more object instances can be found that satisfy the selection criteria.

When no more instances can be found, or the application is done retrieving data from an object, the application can issue a call to GAIICG (Close Goal). This will free all resources that were used by the other functions. If GAIICG is not called, all requests will be released at END TRANSACTION.

OPEN GOAL

CALL GAIIOG USING SESSION_ID, REQ_ID, SQL, RETURN_CODE

SESSION_ID - Data field that contains the session ID. This ID was returned to the application by a call to GAIISS. This field must be defined by a COBOL application as, PIC S9(7) USAGE COMPUTATIONAL.

REQ_ID - Data field where the AII will return an ID for the request. This is very similar to the was SESSION-ID works, only for goal requests. A COBOL program must define this as, PIC S9(7) USAGE COMPUTAIONAL. This field will be returned to the AII by the application for every subsequent call that is related to the goal specified in SQL.

SQL -      Data field that contains an SQL statement that
      defines the request. This should take the form of:

SELECT var1, var2, ... varN FROM object name;

The statement must end with a semi-colon. Currently,
      the WHERE clause or sub-selects are not supported.

RETURN_CODE - Data field where the AII will return a
      completion code for this statement. This field must be
      defined as, PIC S9(3) USAGE COMPUTAIONAL.

OPEN GOAL works like an SQL open cursor function. Its function
is to initialize the cursor to zero, save the necessary
information requested, and return an ID which must be passed back
by the application when requesting data values for variables.

Since it is possible that more than one response will be found
for each goal that is opened, (because multiple instances of
objects can exist), the application should make sure that it can
uniquely identify each instance of the responses it retrieves.
In the example below, the application may have given Gnome three
diagnosis codes to validated (resulting in the creation of three
DIAGNOSIS objects). By retrieving the code along with the
property VALID_DIAG, the application can tell which diagnoses
Gnome has deemed valid or invalid.

Example:

DATA DIVISION.

```
01  GTCTL-FIELDS.
    05  SESSION-FIELDS.
        10  SESSION-PROFILE     PIC X(8).
        10  SESSION-ID          PIC S9(7) USAGE IS COMP.
        10  RETURN-CODE         PIC S9(3) USAGE IS COMP.
    05  .....
    05  GOAL-FIELDS.
        10  REQ-ID              PIC S9(7) USAGE IS COMP.
        10  SQL                 PIC X(50).

PROCEDURE DIVISION.

P-OPEN-GOAL.
    MOVE 'SELECT DIAG_CODE, VALID_DIAG FROM DIAGNOSIS;' TO SQL.
    CALL 'GAIIOG' USING SESSION-ID, REQ-ID, SQL, RETURN-CODE.
    IF RETURN-CODE IS NOT EQUAL TO ZERO
        GO TO P-GNOME-ERR.
P-OPEN-GOAL-EXIT.
    EXIT.
```

This example will open a goal that later can be accessed to
retrieve values for the properties DIAG_CODE and VALID_DIAG from
instances of the object DIAGNOSIS.

RETURN CODES

000 - Goal opened successfully.
    001 - The session specified by SESSION-ID was not found or
          was not active.
    002 - Ther was not a transaction active in the session
          specified by SESSION-ID.
    007 - The SQL statement had no SELECT clause.
    008 - The SQL statement had no FROM clause. (No object).
    009 - The SQL statement did not specify variable name(s)

REQUEST GOAL

CALL GAIIRG USING SESSION_ID, REQ_ID, RETURN_CODE

SESSION_ID - Data field that contains the session ID.
This ID was returned to the application by a call to
GAIISS. This field must be defined as, PIC S9(7) USAGE
COMPUTATIONAL.

REQ_ID - Data field that contains the request ID returned
to the application by GAIIOG. This field must be
defined as, PIC S9(7) USAGE COMPUTATIONAL.

RETURN_CODE - Pointer to a data field where the AII will
return a completion code for this statement. This
field must be defined as PIC S9(7) USAGE COMPUTATIONAL.

GAIIRG will advance the cursor to the next instance of the object
that is referenced by the REQ_ID. If no instance is found, an
error is returned and the application can assume that no more
data is available for this request.

Example: (See example following GAIIRV.)

RETURN CODES

000 - An instance of the object associated with REQ_ID was
found successfully.
    001 - The session specified by SESSION-ID was not found or
was not active.
    002 - There was not a transaction active within the session
specified by SESSION-ID.
    010 - The request specified by REQ_ID was not found or
was not active.
    011 - The request specified by REQ_ID had a NULL cursor.
    012 - An instance of the object associated with REQ_ID was
NOT found.

REQUEST VARIABLE

CALL GAIIRV USING SESSION_ID, REQ_ID, VARNAME, VARNAME_LEN,
DATA_LEN, DATA_TYPE, DATA_PREC, DATA, NULL_IND, RET_CODE

SESSION_ID - Data field containing the ID of the session
that was established with Gnome. This ID was returned
to the application by a call to GAIISS. This field
must be defined as, PIC S9(7) USAGE COMPUTATIONAL.

REQ_ID - Data field containing the REQ_ID that was assigned
by GAIIOG. This field must be defined as, PIC S9(7)
USAGE COMPUTATIONAL.

VARNAME - Data field containing the name of the requested
variable. This name must have been named in the SQL
statement that was passed to GAIIOG.

VARNAME_LEN - Data field containing the length of the
variable name. This field must be defined as, PIC
S9(7) USAGE COMPUTATIONAL.

DATA_LEN - Data field that contains the maximum length the
application will accept for the requested variable.
This relates directly to the variable DATA listed
below. This field must be defined as, PIC S9(7) USAGE
COMPUTATIONAL.

DATA_TYPE - Character field that indicates the data type
of the requested variable. Data types that are supported are 'C', character, 'P', packed decimal. This field must be defined as, PIC X.

DATA_PREC - Data field that indicates the precision of the data to be passed back to the application. This is a character field, PIC X.

DATA - Data field where the value of the requested variable should be placed. Initially, this must be a character field.

NULL_IND - Data field where the AII will place an indicator if the variable was found to exist in the requested object, but was found to be NULL.

RETURN_CODE - Pointer to a data field where the AII will return a completion code for this statement. This field must be defined as, PIC S9(3) USAGE COMPUTATIONAL.

GAIIRV will search the current instance of a requested object (the instance the cursor is positioned on) and return a value for the requested variable in the requested format.

Example:

Please see the example following this statement description.

RETURN CODES

```
000 - An instance of the object associated with REQ_ID was
      found successfully.
001 - The session specified by SESSION-ID was not found or
      was not active.
002 - There was not a transaction active within the session
      specified by SESSION-ID.
010 - The request specified by REQ_ID was not found or
      was not active.
011 - The request specified by REQ_ID had a NULL cursor.
014 - The variable list from the SQL statement (registered
      by a call to GAIIOG) could not be found or was null.
015 - The requested variable was not included in the
      associated SQL statement.
016 - The object that was associated with this request could
      not be found.
017 - The requested variable does not exist on this object
      instance.
018 - Invalid data type. Only 'C' or 'P'.
```

GETTING DATA FROM GNOME

Example:

DATA DIVISION.

```
01  GTCTL-FIELDS.
    05  SESSION-FIELDS.
        10  SESSION-PROFILE    PIC X(8).
        10  SESSION-ID         PIC S9(7) USAGE IS COMP.
        10  RETURN-CODE        PIC S9(3) USAGE IS COMP.
    05  .....
    05  GOAL-FIELDS.
        10  REQ-ID             PIC S9(7) USAGE IS COMP.
        10  SQL                PIC X(50).
    05  GET-VAR-FIELDS.
        10  VAR-NAME           PIC X(10).
```

```
    10  VAR-NAME-LEN        PIC S9(7) USAGE IS COMP.
    10  ANSWER-LEN          PIC S9(7) USAGE IS COMP.
    10  ANSWER-TYPE         PIC X.
    10  ANSWER-PREC         PIC X.
    10  ANSWER              PIC X(4).
    10  ANSWER-NULL-IND     PIC X.

PROCEDURE DIVISION.

NOTE: First, open a goal request.

P-OPEN-GOAL.
    MOVE 'SELECT DIAG_CODE, VALID_DIAG FROM DIAGNOSIS;' TO SQL.
    CALL 'GAIIOG' USING SESSION-ID, REQ-ID, SQL, RETURN-CODE.
    IF RETURN-CODE IS NOT EQUAL TO ZERO
        GO TO P-GNOME-ERR.
P-OPEN-GOAL-EXIT.
    EXIT.
```

This opens a goal request that later can be accessed to retrieve a value for the property VALID_DIAG from instances of the object DIAGNOSIS.

```
P-GET-DATA.
    CALL 'GAIIRG' USING SESSION-ID, REQ-ID, RETURN-CODE.
    IF RETURN-CODE IS NOT EQUAL TO ZERO
        GO TO P-GNOME-ERR.
    MOVE 'VALID_DIAG' TO VAR-NAME.
    MOVE 10 TO VAR-NAME-LEN.
    MOVE 4 TO ANSWER-LEN.
    MOVE 'C' TO ANSWER-TYPE.
    MOVE '0' TO ANSWER-PREC.
    MOVE SPACES TO ANSWER.
    MOVE SPACES TO ANSWER-NULL-IND.
    CALL 'GAIIRV' USING SESSION-ID, REQ-ID, VAR-NAME,
                VAR-NAME-LEN, ANSWER-LEN, ANSWER-TYPE,
                ANSWER-PREC, ANSWER, ANSWER-NULL-IND,
                RETURN-CODE.
    IF RETURN-CODE IS NOT EQUAL TO ZERO
        OR ANSWER IS NOT EQUAL TO 'TRUE'
            ADD 1 TO INVALID-DIAG-COUNT
            GO TO P-GET-DATA.
    ADD 1 TO VALID-DIAG-COUNT.
    GO TO P-GET-DATA.
P-GET-DATA-EXIT.
    EXIT.
```

The above paragraph will loop until there are no more instances of the object 'DIAGNOSIS'. That will occur when the call to GAIIRV returns a non-zero return code.

If an instance of the object DIAGNOSIS is found, then the application calls GAIIRV to get a value for VALID_DIAG. If VALID-DIAG does not exist, (when GAIIRV returns '17'), or if VALID_DIAG is not equal to 'TRUE', then the application adds one to the INVALID-DIAG-COUNT. Otherwise, the application adds one to the VALID-DIAG-COUNT.

The application would then close the goal with a call to GAIICG.

```
P-CLOSE-GOAL.
    CALL 'GAIICG' USING SESSION-ID, REQ_ID, RETURN-CODE.
    IF RETURN-CODE IS NOT EQUAL TO ZERO
        GO TO P-GNOME-ERR.
P-CLOSE-GOAL-EXIT.
    EXIT.
```

By following the above procedure, an application should be able to retrieve multiple values from multiple instances of the same object. It should be noted that the above call statements must occur in the above sequence, but do not have to be done immediately after one another. In other words, an application can call GAIIOG with all the goal requests it intends to use as part of its initialization routine. It is then free to go perform other processing and return to use GAIIRG at a later time. With the cursor then positioned at a particular instance of the requested object, the application can retrieve all the variables associated with this request or it can perform other processing before coming back to collect the necessary variables.

CLOSE GOAL

CALL GAIICG USING SESSION_ID, REQ_ID, RETURN_CODE

SESSION_ID - Pointer to a field that contains the session ID. This ID was returned to the application by a call to GAIISS. This field must be defined as, PIC S9(7) USAGE IS COMPUTATIONAL.

REQ_ID - Pointer to a field that contains the request ID assigned by the AII in GAIIOG. This field must be defined as, PIC S9(7) USAGE COMPUTATIONAL.

RETURN_CODE - Pointer to a data field where the AII will return a completion code for this statement. This field must be defined as, PIC S9(3) USAGE COMPUTATIONAL.

GAIICG should be issued after the application has finished requesting data from an object. GAIICG will release the cursor and associated data and will help the efficiency of future requests. If this is not done, GAIIET will close any goals that remain open.

Example:

```
DATA DIVISION.

01  GTCTL-FIELDS.
    05  SESSION-FIELDS.
        10  SESSION-PROFILE    PIC X(8).
        10  SESSION-ID         PIC S9(7) USAGE IS COMP.
        10  RETURN-CODE        PIC S9(3) USAGE IS COMP.
    05  GOAL-FIELDS.
        10  REQ-ID             PIC S9(7) USAGE IS COMP.
        10  SQL                PIC X(50).

PROCEDURE DIVISION.

P-CLOSE-GOAL.
    CALL 'GAIICG' USING SESSION-ID, REQ_ID, RETURN-CODE.
    IF RETURN-CODE IS NOT EQUAL TO ZERO
        GO TO P-GNOME-ERR.
P-CLOSE-GOAL-EXIT.
    EXIT.
```

RETURN CODES

000 - Open goal closed successfully.
    001 - The session specified by SESSION_ID was not found or was not active.
    002 - There was not a transaction active within the session specified by SESSION-ID.
    010 - The request specified by REQ_ID was not found.

ERROR CONTROL

RETURN ERROR

CALL GAIIRE USING SESS_ID, ERROR_RET_AREA,
                RETURN_CODE

SYNCPOINT

CALL GAIISP USING SESS_ID, RETURN_CODE

ROLLBACK

CALL GAIIRB USING SESS_ID, RETURN_CODE

RETURN ERROR

CALL GAIIRE USING SESS_ID, ERROR_RET_AREA, RETURN_CODE

SESSION_ID - Data field that contains the session ID. This ID was returned to the application by a a call to GAIISS. This field must be defined as, PIC S9(7) USAGE COMPUTATIONAL.

ERROR_RET_AREA - This field will contain information that is specific to an error that was encountered during the inference process. This information will include the node and processor where the error occurred; the return code and error information from an external process such as a DBMS; identifying information such as the object name, variable name, external process name and external database name; and if the error explanation option was select in the Session Profile, a text explanation of the error will be provided.

RETURN_CODE - Pointer to a data field where the AII will return a completion code for this statement. This field must be defined as, PIC S9(3) USAGE COMPUTATIONAL.

When the AII returns a non-zero return code, the application can immediately issue a RETURN ERROR call to obtain more information about the error. GAIIRE must be issued as the next call the the AII following the call that resulted in the error or the error data will be lost.

Example:

```
DATA DIVISION.

01  GTCTL-FIELDS.
    05  SESSION-FIELDS.
        10  SESSION-PROFILE    PIC X(8).
        10  SESSION-ID         PIC S9(7) USAGE IS COMP.
        10  RETURN-CODE        PIC S9(3) USAGE IS COMP.
    05  GOAL-FIELDS.
        10  REQ-ID             PIC S9(7) USAGE IS COMP.
        10  SQL                PIC X(50).

PROCEDURE DIVISION.

P-CLOSE-GOAL.
    CALL 'GAIICG' USING SESSION-ID, REQ_ID, RETURN-CODE.
    IF RETURN-CODE IS NOT EQUAL TO ZERO
        CALL 'GAIIRE' USING SESSION-ID, RETURN-CODE
        GO TO P-GNOME-ERROR.
    END-IF.
P-CLOSE-GOAL-EXIT.
    EXIT.
```

RETURN CODES

000 - Successful.

SYNCPOINT

CALL GAIISP USING SESSION_ID, RETURN_CODE

SESSION_ID - Data field containing the session ID. This ID was returned to the application by a call to GAIISS. This field must be defined as, PIC S9(7) USAGE COMPUTATIONAL.

RETURN CODE - Pointer to a data field where the AII will return a completion code for this statement. This field must be defined as, PIC S9(3) USAGE COMPUTATIONAL.

This will cause all databases, files, kb's, etc to commit their changes and get in sync with one another. Syncpoint is automatically issued at END TRANSACTION. It should only be used for long running transactions and then only at the end of a logical unit of work.

RETURN CODES

000 - Successful.
    001 - The session specified by SESSION-ID was not found or was not active.
    002 - There was no transaction active within the session specified by SESSION-ID.

ROLLBACK

CALL GAIIRB USING SESSION_ID, RETURN_CODE

SESSION_ID - Data field that contains the session ID. This ID was returned to the application by a call to GAIISS. This field must be defined as, PIC S9(7) USAGE COMPUTATIONAL.

RETURN_CODE - Pointer to a data field where the AII will return a completion code for this statement. This field must be defined as, PIC S9(3) USAGE COMPUTATIONAL.

This will provide for an abnormal termination of a transaction. It performs the same as END TRANSACTION except that data base updates will be rolled back to the last syncpoint or END TRANSACTION.

RETURN CODES

000 - Rollback was executed successfully.
    001 - The session specified by SESSION-ID was not found or was not active.
    002 - There was not a transaction active within the session specified by SESSION-ID.

Appendix A

| KEYWORD | Explanation |
|---|---|
| SYS | This is the system name (ie.. LU Name, CICS region etc) where the inference engine that the application wishes to communicate with resides. This keyword is primarily used for those applications that are communicating using the LU 6.2 protocol. Default is "NO SYS".<br><br>{SYS(CICS4)} |
| USER | This is the User ID of the person or application that is starting this session. This is primarily provided for those applications that are communicating using the LU 6.2 protocol. For example, if the application wanted to communicate with an Gnome application running in CICS, the USER parameter would contain the CICS ID of the user. Default is "X999999".<br><br>{USER(X002822)}{PASS(ORIALI)} |

| | |
|---|---|
| PASS | This is the password of the user defined by the USER keyword. See USER for additional explanation. Default is "99999999". |

{USER(X002822)}{PASS(ORIALI)}

| | |
|---|---|
| PROF | This is the profile of the user defined by the USER keyword. The associated value would point to a file that would contain user access, priority, etc. See USER for additional explanation. Default is "PROFILE". |

{PROF(2822FILE)}

| | |
|---|---|
| OBD | The name of the Object Definition File to be used for the session. This might be a DD Name in the MVS batch environment, or a filename.filetype in VM/CMS or a filename.extension on a personal computer. Default is "OBJECT.OBD". |

(OBD(CLAIM.OBD)}
          or
       (OBD(READER1)}

| | |
|---|---|
| IE | The name of the Inference Engine that the application wants to communicate with for this session. Default is "GTCTL". |

{IE(GTCTLP)}

| | |
|---|---|
| KB | The name of the Knowledge Base to be used for this session. This might be a DD Name in the MVS batch environment, or a filename.filetype in VM/CMS or a filename.extension on a personal computer. Default is "RULES.KB". |

{KB(CLAIM.KB)}{OBD(CLAIM.OBD)}
          or
       {KB(DISKIA)}{OBD(READER1)}

| | |
|---|---|
| PROCS | The number of Object Processors the inference engine should pre-load before the session starts. This is primarily an efficiency mechanism. Default is "99". |

{PROCS(5)}

| | |
|---|---|
| PARM | This contains the runtime parameters for a Gnome session. There are several options that can be placed in this value: |

/T - Inference trace ON.
/D - Inference strategy is DEEP.
/S - Print inference statistics at the end of each transaction.
/L - Rule logging ON.
/U - Uncompleted file ON.
/M - Monitor ON.
/Zxxx- Memory conservation ON. Where xxx is the memory threshold.
/C - Print rule conclusions at the end of each transaction.
/N - NO IDEA.

{PARM(/L/C)}

The above parm will turn rule logging and conclusions ON.

Appendix B

The following is an example of a COBOL program that will read in claim accounting records, assert the diagnosis codes to the inference engine, allow the inference engine to check the validity of these diagnosis codes, and retrieve the fields that contain the results. The program will then print an appropriate message for valid and invalid diagnosis codes.

After the COBOL program is a listing of the knowledge base.

```
CBL   SOURCE,OBJECT,L  T,MAP,NOSEQ,XREF,APOST,NOA  ,CLIST              00001090
    IDENTIFICATION DIV  ION.
    PROGRAM-ID.        AIIGTCTL.
    AUTHOR.            N GRANDE BUCCA.
    DATE-WRITTEN.      OCTOBER 25, 1988.
    DATE-COMPILED.
*
    ENVIRONMENT DIVISION.
    CONFIGURATION SECTION.
    SOURCE-COMPUTER. IBM-370.
    OBJECT-COMPUTER. IBM-370.
*
    INPUT-OUTPUT SECTION.
    FILE-CONTROL.
        SELECT INPUT-FILE    ASSIGN TO DISKIA
        FILE STATUS IS INPUT-STATUS.
*
    DATA DIVISION.
    FILE SECTION.
*
    FD  INPUT-FILE
        LABEL RECORDS ARE STANDARD
        BLOCK CONTAINS  23436 CHARACTERS
        RECORDING MODE IS F
        DATA RECORD IS ACCT-REC-01.
    01  ACCT-REC-01.
        05  FILLER              PIC X(23).
        05  ACCT-CLAIMID        PIC S9(11) USAGE IS COMP-3.
        05  FILLER              PIC X(45).
        05  ACCT-DIAG1          PIC X(8).
        05  ACCT-DIAG2          PIC X(8).
        05  FILLER              PIC X(282).
*
    WORKING-STORAGE SECTION.
*
    01  WORKING-STORAGE-AREA   PIC X(32)
        VALUE 'WORKING STORAGE BEGINS HERE'.
*
    01  WORK-FIELDS.
        05  INPUT-COUNT         PIC 9(5) VALUE ZEROS.
        05  CLAIMID-SVE         PIC 9(11) VALUE ZEROS.
        05  DIAG-SVE            PIC X(8).
*
    01  GTCTL-FIELDS.
        05  START-SESSION.
            10  SESS-ID         PIC S9(7) USAGE IS COMP.
            10  RET-CODE        PIC S9(3) USAGE IS COMP.
            10  PROFILE         PIC X(8).
        05  ASSERT-DATA.
            10  ASSERT-NUM-TUPS PIC S9(7) USAGE IS COMP.
            10  ASSERT-TUPLES   OCCURS 10 TIMES.
                20  ASSERT-SUBJ     PIC X(40).
                20  ASSERT-VAL      PIC X(40).
                20  ASSERT-VAL-LEN  PIC S9(7) USAGE IS COMP.
        05  GOAL-REQ.
            10  GOAL-REQ-ID     PIC S9(7) USAGE IS COMP.
            10  GOAL-SQL        PIC X(100).
        05  VAR-REQ.
            10  VAR-NAME        PIC X(10).
            10  VAR-NAME-LEN    PIC S9(7) USAGE IS COMP.
            10  ANSWER          PIC X(4).
```

```
        10  ANSWER-LEN              PIC S9(7) USAGE IS COMP.
        10  VAR-TYPE                PIC X VALUE IS 'C'.
        10  VAR-PREC                PIC S9(7) VALUE IS +0
                                    USAGE IS COMP.
        10  VAR-NULL-IND            PIC X.
*
01  STATUS-FIELDS.
    05  INPUT-STATUS                PIC 99.
*
01  EOF-FOR-INPUT                   PIC X VALUE SPACES.
*
LINKAGE SECTION.
01  PARM-AREA.
    05  FILLER                      PIC X.
*
PROCEDURE DIVISION USING PARM-AREA.
*
    PERFORM 1000-INIT-RTN THRU 1000-INIT-EXIT.
    PERFORM 2000-READ-RTN THRU 2000-READ-EXIT.
    PERFORM 3000-PROCESS-RTN THRU 3000-PROCESS-EXIT.
    GO TO 9999-EOJ-RTN.
*
1000-INIT-RTN.
    OPEN INPUT INPUT-FILE.
    IF INPUT-STATUS NOT = 0
        DISPLAY 'ERROR OPENING INPUT FILE ' INPUT-STATUS
        STOP RUN.
    MOVE 'PROF' TO PROFILE.
    CALL 'GAIISS' USING PROFILE, SESS-ID, RET-CODE.
    IF RET-CODE IS GREATER THAN ZERO
        DISPLAY 'GAIISS: RETURN CODE IS ' RET-CODE.
1000-INIT-EXIT.
    EXIT.
*
2000-READ-RTN.
    READ INPUT-FILE.
    IF INPUT-STATUS NOT = 0
        MOVE 'Y' TO EOF-FOR-INPUT
        GO TO 2000-READ-EXIT.
    DISPLAY 'CLAIM ' CLAIMID-SVE ' WAS JUST READ'.
    ADD 1 TO INPUT-COUNT.
2000-READ-EXIT.
    EXIT.
*
3000-PROCESS-RTN.
    IF EOF-FOR-INPUT IS EQUAL TO 'Y'
        GO TO 3000-PROCESS-EXIT.
    MOVE ACCT-CLAIMID TO CLAIMID-SVE.
    PERFORM 3100-START-TRAN THRU 3100-START-TRAN-EXIT.
    PERFORM 3200-ASSERT-DATA THRU 3200-ASSERT-DATA-EXIT.
    PERFORM 3300-OPEN-GOAL THRU 3300-OPEN-GOAL-EXIT.
    PERFORM 3400-GET-DATA THRU 3400-GET-DATA-EXIT.
    PERFORM 3500-CLOSE-GOAL THRU 3500-CLOSE-GOAL-EXIT.
    PERFORM 3600-END-TRAN THRU 3600-END-TRAN-EXIT.
    PERFORM 2000-READ-RTN THRU 2000-READ-EXIT.
    GO TO 3000-PROCESS-RTN.
3000-PROCESS-EXIT.
    EXIT.
*
3100-START-TRAN.
    CALL 'GAIIST' USING SESS-ID, RET-CODE.
    IF RET-CODE IS GREATER THAN ZERO
        DISPLAY 'GAIIST: ERROR CODE IS ' RET-CODE.
3100-START-TRAN-EXIT.
    EXIT.
*
3200-ASSERT-DATA.
    MOVE 1 TO ASSERT-NUM-TUPS.
    MOVE 'CLAIM.DIAG1#' TO ASSERT-SUBJ (1).
    MOVE ACCT-DIAG1 TO ASSERT-VAL (1).
    MOVE 8 TO ASSERT-VAL-LEN (1).
```

```
        IF ACCT-DIAG2 - NOT EQUAL TO SPACES
            ADD 1 TO ALERT-NUM-TUPS
            MOVE 'CLAIM.DIAG2#' TO ASSERT-SUBJ (2)
            MOVE ACCT-DIAG2 TO ASSERT-VAL (2)
            MOVE 8 TO ASSERT-VAL-LEN (2).
        CALL 'GAIIAD' USING SESS-ID, ASSERT-NUM-TUPS,
                      ASSERT-TUPLES (1), RET-CODE.
        IF RET-CODE IS GREATER THAN ZERO
            DISPLAY 'GAIIAD: ERROR CODE IS ' RET-CODE.
    3200-ASSERT-DATA-EXIT.
        EXIT.
*
    3300-OPEN-GOAL.
        MOVE 'SELECT diag, VALID_DIAG FROM DIAG;' TO GOAL-SQL.
        CALL 'GAIIOG' USING SESS-ID, GOAL-REQ-ID,
                      GOAL-SQL, RET-CODE.
        IF RET-CODE IS GREATER THAN ZERO
            DISPLAY 'GAIIOG: RETURN CODE IS ' RET-CODE.
    3300-OPEN-GOAL-EXIT.
        EXIT.
*
    3400-GET-DATA.
        CALL 'GAIIRG' USING SESS-ID, GOAL-REQ-ID, RET-CODE.
        IF RET-CODE IS NOT EQUAL TO 0
            DISPLAY 'GAIRG: RETURN CODE IS ' RET-CODE
            GO TO 3400-GET-DATA-EXIT.
        MOVE 'DIAG' TO VAR-NAME.
        MOVE 4 TO VAR-NAME-LEN.
        MOVE SPACES TO DIAG-SVE.
        MOVE 8 TO ANSWER-LEN.
        CALL 'GAIIRV' USING SESS-ID, GOAL-REQ-ID, VAR-NAME,
                      VAR-NAME-LEN, ANSWER-LEN, VAR-TYPE,
                      VAR-PREC, DIAG-SVE, VAR-NULL-IND, RET-CODE.
        IF RET-CODE IS GREATER THAN ZERO
            DISPLAY 'GAIIRV:(DIAG) ERROR CODE IS ' RET-CODE.
        MOVE 'VALID_DIAG' TO VAR-NAME.
        MOVE 10 TO VAR-NAME-LEN.
        MOVE SPACES TO ANSWER.
        MOVE 4 TO ANSWER-LEN.
        CALL 'GAIIRV' USING SESS-ID, GOAL-REQ-ID, VAR-NAME,
                      VAR-NAME-LEN, ANSWER-LEN, VAR-TYPE,
                      VAR-PREC, ANSWER, VAR-NULL-IND, RET-CODE.
        IF RET-CODE IS GREATER THAN ZERO
            DISPLAY 'GAIIRV:(VALID) ERROR CODE IS ' RET-CODE.
        IF ANSWER IS EQUAL TO 'TRUE'
            DISPLAY 'CL# ' CLAIMID-SVE ' DIAG ' DIAG-SVE 'IS VALID'
            GO TO 3400-GET-DATA.
        DISPLAY 'CL# ' CLAIMID-SVE ' DIAG ' DIAG-SVE 'IS NOT VALID'.
        GO TO 3400-GET-DATA.
    3400-GET-DATA-EXIT.
        EXIT.
*
    3500-CLOSE-GOAL.
        CALL 'GAIICG' USING SESS-ID, GOAL-REQ-ID, RET-CODE.
        IF RET-CODE IS GREATER THAN ZERO
            DISPLAY 'GAIICG: ERROR CODE IS ' RET-CODE.
    3500-CLOSE-GOAL-EXIT.
        EXIT.
*
    3600-END-TRAN.
        CALL 'GAIIET' USING SESS-ID, GOAL-REQ-ID, RET-CODE.
        IF RET-CODE IS GREATER THAN ZERO
            DISPLAY 'GAIIET: ERROR CODE IS ' RET-CODE.
    3600-END-TRAN-EXIT.
        EXIT.
*
    9999-EOJ-RTN.
        CALL 'GAIIES' USING SESS-ID, RET-CODE.
        IF RET-CODE IS GREATER THAN ZERO
            DISPLAY 'GAIIES: ERROR CODE IS ' RET-CODE.
        DISPLAY 'TOTAL NUMBER OF INPUT RECORDS = '
                INPUT-COUNT.
        CLOSE INPUT-FILE.
```

```
IF INPUT-STATUS NOT = 0
    DISPLAY 'ERROR EXTRACT FILE, STATUS IS ' INPUT-STATUS.
STOP RUN.

Rule00000
   IF     CLAIM.DIAG1 ^= '\UNKNOWN'
   THEN       DIAG   CO
   AND    DIAG.DIAG  =    CLAIM.DIAG1
   AND    CLAIM.VALID_DIAG   =   DIAG.VALID_DIAG
   AND    CLAIM.DISEASE_TYPE =   DIAG.DISEASE_TYPE
   AND    CLAIM.DIAG_DESC    =   DIAG.DIAG_DESC Rule00000
   IF     CLAIM.DIAG2 ^= '\UNKNOWN'
   THEN       DIAG   CO
   AND    DIAG.DIAG  =    CLAIM.DIAG2
   AND    CLAIM.VALID_DIAG   =   DIAG.VALID_DIAG
   AND    CLAIM.DISEASE_TYPE =   DIAG.DISEASE_TYPE
   AND    CLAIM.DIAG_DESC    =   DIAG.DIAG_DESC Rule00000
   IF     CLAIM.DIAG3 ^= '\UNKNOWN'
   THEN       DIAG   CO
   AND    DIAG.DIAG  =    CLAIM.DIAG3
   AND    CLAIM.VALID_DIAG   =   DIAG.VALID_DIAG
   AND    CLAIM.DISEASE_TYPE =   DIAG.DISEASE_TYPE
   AND    CLAIM.DIAG_DESC    =   DIAG.DIAG_DESC Rule00000
   IF     DIAG.DIAG   =   '477    '
   THEN   DIAG.VALID_DIAG   =   'TRUE'
   AND    DIAG.DIAG_DESC    =   'ALLERGIC_RHINITIS'
   AND    DIAG.DISEASE_TYPE =   'RHINITIS'

Rule00000
   IF     DIAG.DIAG   =   '477.0  '
   THEN   DIAG.VALID_DIAG   =   'TRUE'
   AND    DIAG.DIAG_DESC    =   'ALLERGIC_RHINITIS_POLLEN'
   AND    DIAG.DISEASE_TYPE =   'RHINITIS'

Rule00000
   IF     DIAG.DIAG   =   '477.8  '
   THEN   DIAG.VALID_DIAG   =   'TRUE'
   AND    DIAG.DIAG_DESC    =   'ALLERGIC_RHINITIS_OTHER'
   AND    DIAG.DISEASE_TYPE =   'RHINITIS'

Rule00000
   IF     DIAG.DIAG   =   '477.9  '
   THEN   DIAG.VALID_DIAG   =   'TRUE'
   AND    DIAG.DIAG_DESC    =   'ALLERGIC_RHINITIS_UNSPECIFIED'
   AND    DIAG.DISEASE_TYPE =   'RHINITIS'
```

Appendix C - Error Codes

000 -   Function call was completed successfully.
        Cross Reference -   GAIISS, GAIIES, GAIIST, GAIIET,
                            GAIIRO, GAIICR, GAIIAD, GAIIRM,
                            GAIIOG, GAIIRG, GAIIRV, GAIICG,
                            GAIISP, GAIIRE, GAIIRB.

001 -   The session specified by SESSION-ID was not found or
        was not active.
        Cross Reference -   GAIIES, GAIIST, GAIIET, GAIIRO,
                            GAIICR, GAIIAD, GAIIRM, GAIIOG,
                            GAIIRG, GAIIRV, GAIICG, GAIIRE,
                            GAIIRE, GAIIRB.

002 -   There was not a transaction active within the session
        specified by SESSION-ID.
        Cross Reference -   GAIIET, GAIIRO, GAIICR, GAIIAD,

GAIIRM, GAIIOG, GAIIRG, GAIIRV, GAIICG, GAIIRE, GAIISP, GAIIRB.

003 - There were too many tuples. The rule creation routine tried to prevent an overflow.
Cross Reference - GAIICR, GAIIAD.

004 - Memory allocation error. Out of memory.
Cross Reference - GAIIAD

005 - Could not open the specified file.
Cross Reference - GAIISS

006 - A START SESSION was issued and another session was already active.
Cross Reference - GAIISS 007 - Error in the SQL statement. No SELECT found.
Cross Reference - GAIIOG 008 - Error in the SQL statement. No FROM found (no object).
Cross Reference - GAIIOG 009 - Error in the SQL statement. No variables found.
Cross Reference - GAIIOG 010 - The request specified by the REQUEST-ID, was not found or was not active.
Cross Reference - GAIIET, GAIIRG, GAIIRV, GAIICG.

011 - The request specified by the REQUEST-ID had a NULL cursor.
Cross Reference - GAIIRG, GAIIRV.

012 - An instance of the object associated with the REQUEST_ID was not found.
Cross Reference - GAIIRG 013 - An END SESSION request was made while a transaction was still active within the specified session.
Cross Reference - GAIIES 014 - The variable list created from the associated OPEN GOAL could not be found or was NULL.
Cross Reference - GAIIRV 015 - The requested variable was not included in the associated SQL statement.
Cross Reference - GAIIRV 016 - The object that is associated with this request could not be found or does not exist.
Cross Reference - GAIIRV 017 - The requested variable does not exist on this object instance.
Cross Reference - GAIIRV 018 - Invalid data type.
Cross Reference - GAIIRV 019 - A START TRANSACTION request was made and a transaction was already active within the specified session.
Cross Reference - GAIIST Appendix D - Relational Rule Data Base Rule Table Definitions One feature of the Gnome prototype is the capability of maintaining rules in a Relational Data Base. This section describes the three tables used to contain a knowledge base and its associated retrieval structures, giving the name, datatype, and purpose of each column in the tables.

RULES  (Base Rule Table)

The Base Rule Table contains one tuple for each predicate and consequent in a rule. When a rule is requested from the External Rule Interface, the appropriate tuples are read, using column RULENAME as the retrieval key, and compiled into a rule message.

RULENAME INTEGER

A number that uniquely identifies the rule within the base rule table.

SEQNO    INTEGER

A sequence number, assigned in ascending order that uniquely identifies this tuple within the rule. This field is used to maintain the tuples in the sequence in which they were entered into the rule table.

RULEPART CHAR(1)

'L' or 'R', indicating that the tuple belongs to the left-or right-hand-side of the rule.

SUBJECT1 VARCHAR(40)

Left  operand of the predicate or consequent.

SUBJECT2 VARCHAR(240)

Right operand of the predicate or consequent.

ACTION   VARCHAR(16)

Relation or operation to be applied to the operands.

RULES_TGT   (Variable Target List)

The Variable Target List contains one tuple for every distinct occurrence of a variable-name in the left-hand-side of a rule.

The purpose of this table is to enable Gnome to identify rules that are triggered in the course of forward-chaining.

RULENAME INTEGER as in base rule table.

VARCOUNT INTEGER contains the number of distinct variable references present in the left-hand-side of the rule.

BASENAME VARCHAR(40)

The name of a variable that occurs, in the left-hand-side of the rule identified by RULENAME, as the possible target of a forward-chaining event. An example would be the variable 'employee.name' in the following predicate:

>    If employee.name = 'Fred'
>    ...

This column is the primary key of the _TGT table and is used by the ERI to identify rules that might be triggered as a result of the variable acquiring a value. The value in BASENAME may differ from the variable-name as it appears in the rule because intermediate levels of qualification are dropped from the name, so that, for example, 'claim.prior.diagnosis' and 'claim.current.diagnosis' would both be stored as in the BASENAME column as 'claim.diagnosis'.

>    RULETYPE INTEGER
>
>    This is a numeric code indicating the forward chaining category of the rule. The possible values and their meaning are:
>
>    >    1 = [RULES.]SUBJECT1 is a variable name SUBJECT2 is a literal, and ACTION is '='.
>    >
>    >    2 = SUBJECT1 is a variable name, SUBJECT2 is a literal, and ACTION is not '='.
>    >
>    >    3 = both SUBJECT1 and SUBJECT2 are variables; or SUBJECT1 is a variable and the ACTION is 'exists', '^exists', or 'is known'.
>
>    TGTVALUE VARCHAR(240)
>
>    If the RULETYPE is '1' or '2', this column contains the literal stored in RULES.SUBJECT2.RULES_SRC (Variable Source List).

RULES_SRC (Variable Source List)

The Variable Source List contains one tuple for every occurrence of a variable-name (i.e. 'BASENAME') as the target of a 'store' type operation. This table is used to select rules when backward chaining in search of a value or values for a variable.

>    BASENAME INTEGER(40)
>
>    as in RULES_TGT
>
>    RULENAME INTEGER
>
>    as in RULES, RULES_TGT.

Rules Table Processing

When a variable has a value stored into it during a Gnome transaction, a SELECT statement such as the following is constructed and dynamically executed by means of an SQL CURSOR operation in the ERI:

>    SELECT DISTINCT RULENAME, VARCOUNT FROM RULES_TGT WHERE BASENAME = 'employee.name' AND (RULETYPE = 3 OR ((RULETYPE = 1 AND TGTVALUE = '''Fred'';' OR (RULETYPE = 2 AND TGTVALUE != '''Fred'';')))

The result table of this operation will contain the identifiers (RULENAME) of rules that are candidates for forward firing, and, for each rule, the number of distinct variable references on the left-hand side (VARCOUNT). The WHERE clause is designed to reduce the active rule set by failing to select rules wherein the target variable is being tested for equality against a literal that does not match the value that was just stored into the variable (or the converse). A further optimization utilizes the value of VARCOUNT to defer releasing a rule for processing until all of its target variables have values. If VARCOUNT is greater than 1, the ERI will save the RULENAME and its associated count, decrementing the count by one every time the RULENAME is selected; when and if the count goes to zero, the rule tuples are retrieved, translated into the message format, and routed for processing.

To identify source rules for backward chaining...

> SELECT DISTINCT RULENAME FROM RULES_SRC WHERE BASENAME = 'employee.name'

The following SELECT statement (within a cursur loop) retrieves the rule tuples of rules triggered by forward or backward chaining:
> SELECT RULENAME, SEQNO, RULEPART, SUBJECT1, SUBJECT2, ACTION FROM RULES WHERE RULENAME = (n, n, n) order BY RULENAME, SEQNO

Appendix E - Shared Memory Message Passing Description

EMULATION OF MESSAGE PASSING VIA FUNCTION RECURSION

Since real emulation of a message passing data flow on either the PC or Mainframe would involve playing with stack pointers and hence damage portability, another approach allowing emulation in a shared memory model is desirable. While either Windows on the PC or Lu6.2 on the Mainframe provide real message passing protocols, they are much more cumbersome to use than that provided by a shared memory model. Additionally, it would be desirable to code programs in such a way that they could take advantage of either the shared memory model or the message passing model depending upon the machine they happen to be targeted for. Several debuggers on both PC and mainframe do not support simultaneous debugging of multiple modules in a message passing architecture. This paper describes a method for developing programs that can use the message passing paradigm and operate in either the shared memory or message passing architectures. Hopefully, the paper also lays the framework for an environment independent message passing protocol.

Message passing programs normally have the form:

```
functname(initial_parms)
    {local declaratives;
      ..initialize code..
      while (not_end_message)
         {..read message..
          ..process message..
          ..send message(s)..}
      ..wrapup code..
      return(end_return);}
```

Note that for this code to be re-entrant all referenced variables must be local declaratives so that they can be allocated from the stack. Note also that the routine may send one, none, or many messages in response to a single input message. This capability is critical and common in message passing programs but requires careful handling in shared memory models.

If this structure is modified to look as follows:

```
functname(msg, msgtype)
    {local declarative..
      if (msgtype == INIT_MSG)
```

```
      {..initialize code.. return(CONTINUE_RETURN);}
  if (msgtype == END_MSG)
      {..wrapup code.. return(END_RETURN);}
  ..process normal message..
  ..send message(s)..
  return(CONTINUE_RETURN);}
```

Such a piece of code could be wrapped in a function prefix for message passing as follows:

```
prefunct(initial_parms)
    (int msg_return;
    msg_return = functname(initial_parms, INIT_MSG);
    while (msg_return == CONTINUE_RETURN)
        {..read message..
        if (..end message..)
            msg_return = functname(msg, END_MSG);
        else
            msg_return = functname(msg, msgtype);}
    return(msg_return);}
``` or in similar code depending on the message passing protocol.

Certainly message passing resembles function variable passing and hence programs can be coded similarly fashion. In a shared memory environment, an interesting problem arises when one message passing program calls a function with a message which, when processed, ends up calling the first function again. This is not illegal since it is normal recursion. It becomes a problem if messages begin to cascade. Since most message passing systems do cause messages to cascade (that's the objective), this results in impossibly deep recursions since each spawned message might recurse through many levels and the all levels for all prior messages remain on the stack until some module finally stops spawning new messages. It is easily possible to limit the recursions without giving up the message passing model by implementing an alternative prefix in the following form:

```
struct stack {struct stack *next; char *msg; int msgtype;}
         *shared_stack = 0, *shared_stackend = 0;
shared_prefix(msg, msgtype)
    (int msg_return; struct stack *active;
    active = shared_stack;
    if (msgtype == INIT_MSG)
        msg_return = functname(msg, INIT_MSG);

..push msg on end of stack....

if (active) return(MSG_RECEIVED);

while(shared_stack)
        {msg_return     =       functname(shared_stack->msg,
                            shared_stack->msgtype);
        ..pop front of message stack..}
    return(msg_return);}
```

This routine stops the very deep recursions by testing the top of the stack pointer as preserved on entry to the function. Since messages are queued LIFO, any optimization of the message passing strategy should be maintained. All messages will be processed since the routine will not exit until the stack is empty. This algorithm requires a variable of global scope but nonetheless remains quasi-reentrant. To be fully reentrant, the push operation would have to be uninterruptable. None of the common message passing processors require more than quasi-reentrancy.

This message queuing operation does not need to be in every message passing component just in key ones. It acts as a recursion stop and consequently as long as the recursions are tolerable, recursion can provide an effective emulation of messsage passing. When the recursions are too deep the message queue process can be inserted to unwind the recursions.

We claim:

1. In a computer system having at least one processing unit and a memory coupled to the processing unit,
   a knowledge engineering tool comprising:
   a knowledge base stored in the memory, said knowledge base comprising a plurality of rules containing conditions referencing LHS variables, and actions referencing RHS variables, said actions to be performed if said conditions are true; and
   an inference engine executing on the at least one processing unit, said inference engine comprising,
   application interface means for receiving rules from a user; and
   a plurality of object processors, each one of said object processors comprising:
   means for accessing a set of variables;
   means for evaluating said conditions in said rules;
   means for performing said actions in said rules to determine a value for said RHS variables;
   target processor means for selecting rules which reference a variable having a determined value;
   means for routing the retrieved rules and the selected rules to one of said object processors having access to at least one of the variables referenced in said rules.

2. The system of claim 1, said routing means further comprising means for passing a rule message containing a rule to one of said plurality of object processors.

3. The system of claim 2 wherein there are a plurality of processing units and each one of said plurality of object processors comprises a programmed processing unit.

4. The system of claim 3 wherein said rule message contains routing data for indicating one of said object processors and said routing means includes means for updating said routing data.

5. The system of claim 4 wherein each of said object processors further comprises means for storing a value of an accessed variable, and an indication of the type of the variable, in said rule message.

6. The system of claim 3 further comprising. means for spawning rules and routing each spawned rule to an one of said object processors.

7. The system of claim 3 wherein each of said object processors further comprises means for accessing an object, said object comprising a set of variables and associated values.

8. The system of claim 7 wherein each of said object processors further comprises means for creating said object.

9. The system of claim 8 wherein said one of said object processors further comprises means for creating a base object and means for creating an instance object, whereby an object may have multiple instances.

10. The system of claim 9 said one of said object processors further comprises means for spawning rules and routing each spawned rule to another of said object processor having access to said instance object.

11. The system of claim 7 wherein each of said object processors further comprises means for accessing a relational data base to retrieve tuples.

12. The system of claim 3 wherein said routing means, said application interface means, and said target processor means each comprise a programmed processing unit.

13. The system of claim 1 wherein the memory for storing the knowledge base includes external storage means and an internal rule cache.

14. The system of claim 1 wherein said application interface means comprises means for receiving an assertion from a user.

15. The system of claim 1 further comprising means for suspending and resuming the routing of said rule.

16. The system of claim 1 wherein each one of said plurality of object processors further comprises means for accessing a relational data base containing relations, said relations containing sets of tuples which are projections of other relations.

17. The system of claim 9 wherein said rules indicate which relations and projections contain the variables referenced in said rule.

18. The system of claim 1 wherein said target processor means includes means for selecting rules containing existence operators.

19. The system of claim 1 further comprising,
   means for determining when a user-requested goal has been reached: and
   means for determining when the routing of a rule has been completed.

20. The system of claim 1 wherein each one of said object processors further comprises means for accessing said object, said object comprising a set of variables and associated values stored in a relational data base.

21. A method of operating a computer system, the computer system having at least one processing unit, a plurality of object processors executing on the at least one processing unit and a memory coupled to the at least one processing unit, the method comprising,
   (a) storing a knowledge base in the memory, said knowledge base comprising rules containing conditions referencing LHS variables, and actions referencing RHS source variables and RHS target variables, said actions to be performed if said conditions are true;
   (b) determining a value for a variable
   (c) selecting a rule which references the determined variable
   (d) if there are any unevaluated conditions in the selected rule, then, for each unevaluated condition,
      (i) routing said selected rule to each one of the object processors having access to at least one of said LHS variables referenced in said condition, and accessing said at least one LHS variable:
      (ii) when all LHS variables for said condition have been accessed, then evaluating said condition using the accessed variables;
   (e) if all conditions in said selected rule have been evaluated as true, then, for each action in said selected rule:
      (i) routing said selected rule to each one of the object processors having access to at least one of said RHS source variables referenced in said action, and accessing said at least one RHS source variable;
      (ii) when all RHS source variables for said action have been accessed, then routing said selected rule to one of the object processors having access to said RHS target variables referenced in said action;

(iii) performing said action to determine a value for said RHS target variables;

(f) repeating steps c, d and e with the variable determined in step (e) (ii) as the determined variable.

22. The method of claim 21 wherein said routing steps comprise passing a message to one of the object processors, said message including said selected rule.

23. The method of claim 22 wherein said passing step comprises passing a plurality of messages to the object processors functioning in parallel.

24. The method of claim 22 wherein said accessing steps comprise storing the accessed variable in said message.

25. The method of claim 21 further comprising the steps of:

suspending the routing of said selected rule when a referenced variable in said rule cannot be accessed because a value has not been determined for said referenced variable:

resuming the routing of said selected rule when the value of said referenced variable has been determined.

26. The method of claim 25 wherein the selecting step comprises selecting a suspended rule which references the determined RHS target variable.

27. A Knowledge Engineering Tool including one or more computers having memory for storing relations. productions, and definitions, comprising:

means for storing, selecting, and interpreting the productions and definitions to perform selected actions upon said relations as requested by a user and perform subsidiary actions implicitly required by said selected actions. wherein said productions include, rules including conditions having logical operations and corresponding actions, and meta-rules equivalent in form to productions but prescribing the manner in which relations should be wherein said definitions include, declarations defining the source or target of relations for processing.

declarations defining projections of relations into other relations, and declarations defining local treatment of relations and variables, and wherein said means for selecting the productions includes, means for searching for productions containing conditions referencing variables, and means for searching for productions containing actions satisfying variables, and wherein said means for interpreting said productions and definitions includes.

means for receiving and transmitting productions from and to user programs, means for determining the truth of a condition, means for performing actions upon relations and variables within relations, means for invoking and routing a production to the variables upon which it operates, means for generating a record of a session of interpreting, and means for suspending and resuming interpreting productions when actions are performed.

wherein said means for storing definitions includes, means for storing definition apart from productions, means for storing definitions in relations, and means for retrieving selected definitions requested by the user program, and wherein said means for storing productions includes, means for uniquely identifying a production, and means for determining the value of a condition or action in a production.

28. A Knowledge Engineering Tool as set forth in claim 27 wherein, said relations contain sets of one or more tuples which are projections of other relations where the selection of variables for the projection and the selection of tuples for the projection is determined by one or more productions or definitions, said conditions and actions in said productions include.

means for determining which relations and projections of relations contain the referenced variables, and means for determining which tuples and which variables belong in a projection of a relation.

29. A Knowledge Engineering Tool as set forth in claim 27 wherein, said means for searching for productions containing conditions referencing variables means for restricting the search to only productions containing the values of variables within tuples under consideration, and means for searching for productions containing existence operators.

30. A Knowledge Engineering Tool as set forth in claim 27 wherein, said means for searching for productions containing actions satisfying variables includes means for restricting search to certain variables as determined by the user.

31. A Knowledge Engineering Tool as set forth in claim 27 wherein, said means for defining the source or target of relations for processing includes, means to define a statement for a data base management system in that system's language for retrieving or storing relations, and means for identifying a processing system such as a data base management system for retrieving or storing relations.

32. A Knowledge Engineering Tool as set forth in claim 27 wherein, said declaration defining local treatment of relations and variables includes, means for defining a relation source as forward (foreign), local, or backward (user).

33. A Knowledge Engineering Tool as set forth in claim 27 wherein, said means for determining a condition or action in a production includes.

means for determining when actions that operate on multiple tuples in relations are complete.

means for determining when a value composed of the results of one or more productions is complete, and means for determining when the sources for satisfying a variable have been exhausted.

34. A Knowledge Engineering Tool as set forth in claim 27 wherein said meta-rules include means for determining the relations that may satisfy variables under certain conditions.

35. A Knowledge Engineering Tool as set forth in claim 27 wherein, said means for receiving and conveying productions from and to user programs includes.

means for receiving productions from user programs, including other Knowledge Engineering Tools, that may be prior in the processing of a production, means for sending productions to user programs, including other Knowledge Engineering Tools, that may be ahead in the processing of a production, and means for receiving productions from user programs, including other Knowledge Engineering Tools, that may be ahead in the processing of a production.

36. A Knowledge Engineering Tool as set forth in claim 27 wherein, said means for uniquely identifying rules includes.

means for uniquely identifying rules from different knowledge sources, and means for uniquely identifying rules created internally from partial copies of other rules.

37. A Knowledge Engineering Tool as set forth in claim 27 wherein, said means for interpreting said productions includes, means for determining when a user requested goal has been reached, and means for determining when interpreting activity has completed.

38. A Knowledge Engineering Tool as set forth in claim 27 wherein, said means for performing actions upon relations and upon variables within relations includes, means for creating new tuples within relations, means for selecting tuples to be part of a projection of a relation, means for propagating productions to projections of relations in a way that provides consistent reference.

means for propagating productions to all tuples of a relation even if tuples are created in unpredictable sequences, and means for retrieving relations from external sources.

39. A Knowledge Engineering Tool as set forth in claim 38 wherein, said means for creating new tuples within relations includes means for performing said creating new tuples in relations in parallel with other means for interpreting.

40. A Knowledge Engineering Tool as set forth in claim 38 wherein, said means for selecting tuples to be part of a projection of a relation includes, means for performing said selecting in parallel with other means for interpreting.

41. A Knowledge Engineering Tool as set forth in claim 38 wherein said means for propagating productions to projections of relations includes, means for performing said propagating in parallel with other means for interpreting.

42. A Knowledge Engineering Tool as set forth in claim 38 wherein, said means for propagating productions to all tuples of a relation includes means for performing said propagating in parallel with other means for interpreting.

43. A Knowledge Engineering Tool as set forth in claim 38 wherein, said means for retrieving relations from external sources includes, means for retrieving relations from external sources in parallel with other means for interpreting.

44. A Knowledge Engineering Tool as set forth in claim 27 wherein, said means for searching for productions containing conditions referencing variables includes, means for performing said searches in parallel with other means for interpreting.

45. A Knowledge Engineering Tool as set forth in claim 27 wherein, said means for searching for productions containing actions satisfying variables includes, means for performing said searches in parallel with other means for interpreting.

46. A Knowledge Engineering Tool as set forth in claim 27 wherein, said means for receiving and transmitting productions includes, means for performing such receiving and transmitting in parallel with other means for interpreting.

47. A Knowledge Engineering Tool as set forth in claim 27 wherein, said means for invoking and routing a production to the variables upon which it operates includes, means for performing such invoking and routing in parallel with other means for interpreting.

48. A Knowledge Engineering Tool as set forth in claim 27 wherein, said means for determining the truth of a condition includes, means for performing such determining in parallel with other means of interpreting.

49. A Knowledge Engineering Tool as set forth in claim 27 wherein, said means for performing actions upon relations and upon variables within relations includes, means for performing such actions in parallel with other means for interpreting.

50. A Knowledge Engineering Tool as set forth in claim 27 wherein, said means for suspending and resuming interpreting productions when certain actions are performed includes, means for performing such suspending and resuming interpreting in parallel with other means of interpreting.

51. A Knowledge Engineering Tool as set forth in claim 27 wherein, said means for generating a record of a session includes, means for performing such generating a record of a session in parallel with other means of interpreting.

52. A Knowledge Engineering Tool as set forth in claim 27 wherein, said productions include means for performing operations on productions.

53. A Knowledge Engineering Tool including one or more computers having memory for storing relations and productions, comprising:

means for storing, selecting and interpreting the productions to perform selected actions upon relations as requested by the user and perform subsidiary actions implicitly required by said selected actions.

wherein said productions include rules including conditions having logical operations and corresponding actions, and wherein said means for selecting the productions includes, means for searching for productions containing conditions referencing variables, and means for searching for productions containing actions satisfying variables, wherein said means for interpreting said productions includes, means for receiving and transmitting productions from and to user programs, means for determining the truth of a condition.

means for performing actions upon relations and variables within relations, means for invoking and routing a production to the variables upon which it operates.

means for generating a record of a session of interpreting, and means for suspending and resuming interpreting productions when certain actions are performed, and wherein said means for storing productions means for uniquely identifying a production.

means for determining the value of a condition or action in a production.

54. A Knowledge Engineering Tool as set forth in claim 53 wherein, said relations contain sets of one or more tuples which are projections of other relations where the selection of variables for the projection and the selection of tuples for the projection is determined by one or more productions.

said conditions and actions in said productions include means for determining which relations and projections of relations contain the referenced variables, and said actions in said productions include, means for determining which tuples and which variables belong in a projection of a relation.

55. A Knowledge Engineering Tool as set forth in claim 53 wherein, said means for searching for productions containing conditions referencing variables includes, means for restricting the search to only productions containing the values of variables within tuples under consideration, and means for searching for productions containing existence operators.

56. A Knowledge Engineering Tool as set forth in claim 53 wherein said means for searching for productions containing actions satisfying variables includes, means for restricting search to certain variables as determined by the user.

57. A Knowledge Engineering Tool as set forth in claim 53 wherein, said means for determining a condition or action in a production includes.

means for determining when variables require completion, means for determining when a value composed of the results of one or more productions is complete, and means for determining when the sources for satisfying a variable have been exhausted.

58. A Knowledge Engineering Tool as set forth in claim 53 wherein, said means for performing actions upon relations and upon variables within relations includes.

means for creating new tuples within relations, means for selecting tuples to be part of a projection of a relation.

means for propagating productions to projections of relations in a way that provides consistent reference, means for propagating productions to all tuples of a relation even if tuples are created in unpredictable sequences, and means for retrieving relations from external sources.

59. A Knowledge Engineering Tool as set forth in claim 53 wherein, said means for interpreting said productions includes.

means for determining when a user requested goal has been reached, and means for determining when interpreting activity has completed.

60. A Knowledge Engineering Tool as set forth in claim 59 wherein, said means for creating new tuples within relations includes, means for performing said creating new tuples in relations in parallel with other means for interpreting.

61. A Knowledge Engineering Tool as set forth in claim 59 wherein, said means for selecting tuples to be part of a projection of a relation includes, means for performing said selecting in parallel with other means for interpreting.

62. A Knowledge Engineering Tool as set forth in claim 59 wherein, said means for propagating productions to projections of relations includes, means for performing said propagating in parallel with other means for interpreting.

63. A Knowledge Engineering Tool as set forth in claim 59 wherein, said means for propagating productions to all tuples of a relation includes, means for performing said propagating in parallel with other means for interpreting.

64. A Knowledge Engineering Tool as set forth in claim 59 wherein, said means for retrieving relations from external sources includes, means for retrieving relations from external sources in parallel with other means for interpreting.

65. A Knowledge Engineering Tool as set forth in claim 53 wherein, said means for searching for productions containing conditions referencing variables includes, means for performing said searches in parallel with other means for interpreting.

66. A Knowledge Engineering Tool as set forth in claim 53 wherein, said means for searching for productions containing actions satisfying variables includes, means for performing said searches in parallel with other means for interpreting.

67. A Knowledge Engineering Tool as set forth in claim 53 wherein, said means for receiving and transmitting productions includes, means for performing such receiving and transmitting in parallel with other means for interpreting.

68. A Knowledge Engineering Tool as set forth in claim 59 wherein, said means for invoking and routing a production to the variables upon which it operates includes, means for performing such invoking and routing in parallel with other means for interpreting.

69. A Knowledge Engineering Tool as set forth in claim 53 wherein, said means for determining the truth of a condition includes, means for performing such determining in parallel with other means of interpreting.

70. A Knowledge Engineering Tool as set forth in claim 53 wherein, said means for performing actions upon relations and upon variables within relations includes, means for performing such actions in parallel with other means for interpreting.

71. A Knowledge Engineering Tool as set forth in claim 53 wherein, said means for suspending and resuming interpreting productions when certain actions are performed includes, means for performing such suspending and resuming interpreting in parallel with other means of interpreting.

72. A Knowledge Engineering Tool as set forth in claim 53 wherein, said means for generating a record of a session includes, means for performing such generating a record of a session in parallel with other means of interpreting.

* * * * *